US008762191B2

(12) United States Patent
Lawrence et al.

(10) Patent No.: US 8,762,191 B2
(45) Date of Patent: Jun. 24, 2014

(54) SYSTEMS, METHODS, APPARATUS, AND SCHEMA FOR STORING, MANAGING AND RETRIEVING INFORMATION

(75) Inventors: David Lawrence, New York, NY (US); Peter Nitze, Morristown, NJ (US); Alasdair MacDonald, Incline Village, NV (US)

(73) Assignee: Goldman, Sachs & Co., New York, NY (US)

( * ) Notice: Subject to any disclaimer, the term of this patent is extended or adjusted under 35 U.S.C. 154(b) by 1299 days.

(21) Appl. No.: 10/941,265

(22) Filed: Sep. 15, 2004

(65) Prior Publication Data

US 2006/0004814 A1    Jan. 5, 2006

Related U.S. Application Data

(60) Provisional application No. 60/585,343, filed on Jul. 2, 2004.

(51) Int. Cl.
*G06Q 10/00* (2012.01)
*G06Q 10/06* (2012.01)

(52) U.S. Cl.
CPC ................................. *G06Q 10/0635* (2013.01)
USPC ...................................................... 705/7.28

(58) Field of Classification Search
CPC ............................................... G06Q 10/0635
USPC ........................................................ 705/1, 1.1
See application file for complete search history.

(56) References Cited

U.S. PATENT DOCUMENTS

| | | |
|---|---|---|
| 4,326,259 A | 4/1982 | Cooper et al. |
| 4,346,442 A | 8/1982 | Musmanno |
| 4,376,978 A | 3/1983 | Musmanno |
| 4,386,233 A | 5/1983 | Smid et al. |
| 4,597,046 A | 6/1986 | Musmanno et al. |
| 4,718,009 A | 1/1988 | Cuervo |
| 4,727,243 A | 2/1988 | Savar |

(Continued)

FOREIGN PATENT DOCUMENTS

| | | |
|---|---|---|
| CA | 2441211 A1 | 9/2002 |
| EP | 0999489 A2 | 5/2000 |

(Continued)

OTHER PUBLICATIONS

Butcher, Anthony, "Sams Teach Yourself MySQL in 21 Days," 2nd Edition, Sams Publishing, 3 pages, Dec. 27, 2002.

(Continued)

*Primary Examiner* — Candice D Wilson
(74) *Attorney, Agent, or Firm* — Perkins Coie LLP

(57) ABSTRACT

An amount of risk associated with a transaction may be determined by transforming collected information into a searchable database where the collected information may be assessed for relevancy and redundancy, parsed into categories of relevancy based on at least one risk, stored in a database, and outputted into a graphical user interface. Information may also be collected from a plurality of sources, translated into at least one standardized format, parsed into a plurality of portions, assessed based on a risk-relevancy metric, tagged based on the risk-relevancy metric, filtered based on redundancy, stored within the data structure, and outputted into a data storage structure to a graphical user interface. Unstructured information may be obtained from a large variety of sources, which may allow users to make decisions—regarding, for example, transactions, relationships, or the like—from a risk perspective.

31 Claims, 46 Drawing Sheets

(56) References Cited

U.S. PATENT DOCUMENTS

| | | |
|---|---|---|
| 4,734,564 A | 3/1988 | Boston et al. |
| 4,736,294 A | 4/1988 | Gill et al. |
| 4,774,663 A | 9/1988 | Musmanno et al. |
| 4,774,664 A | 9/1988 | Campbell et al. |
| 4,799,156 A | 1/1989 | Shavit et al. |
| 4,812,628 A | 3/1989 | Boston et al. |
| 4,868,866 A | 9/1989 | Williams, Jr. |
| 4,914,587 A | 4/1990 | Clouse |
| 4,953,085 A | 8/1990 | Atkins |
| 4,989,141 A | 1/1991 | Lyons et al. |
| 5,025,138 A | 6/1991 | Cuervo |
| 5,038,284 A | 8/1991 | Kramer |
| 5,068,888 A | 11/1991 | Scherk et al. |
| 5,161,103 A | 11/1992 | Kosaka et al. |
| 5,177,342 A | 1/1993 | Adams |
| 5,210,687 A | 5/1993 | Wolfberg et al. |
| 5,239,462 A | 8/1993 | Jones et al. |
| 5,274,547 A | 12/1993 | Zoffel et al. |
| 5,323,315 A | 6/1994 | Highbloom |
| 5,347,632 A | 9/1994 | Filepp et al. |
| 5,398,300 A | 3/1995 | Levey |
| 5,432,542 A | 7/1995 | Thibadeau et al. |
| 5,444,819 A | 8/1995 | Negishi |
| 5,446,885 A | 8/1995 | Moore et al. |
| 5,448,047 A | 9/1995 | Nair et al. |
| 5,453,601 A | 9/1995 | Rosen |
| 5,455,407 A | 10/1995 | Rosen |
| 5,457,305 A | 10/1995 | Akel et al. |
| 5,478,993 A | 12/1995 | Derksen |
| 5,502,637 A | 3/1996 | Beaulieu et al. |
| 5,557,518 A | 9/1996 | Rosen |
| 5,565,909 A | 10/1996 | Thibadeau et al. |
| 5,615,109 A | 3/1997 | Eder |
| 5,627,886 A | 5/1997 | Bowman |
| 5,648,900 A | 7/1997 | Bowen et al. |
| 5,649,116 A | 7/1997 | McCoy et al. |
| 5,671,279 A | 9/1997 | Elgamal |
| 5,677,955 A | 10/1997 | Doggett et al. |
| 5,679,938 A | 10/1997 | Templeton et al. |
| 5,679,940 A | 10/1997 | Templeton et al. |
| 5,680,305 A | 10/1997 | Apgar, IV |
| 5,684,991 A | 11/1997 | Malcolm |
| 5,689,652 A | 11/1997 | Lupien et al. |
| 5,692,029 A | 11/1997 | Husseiny et al. |
| 5,696,907 A | 12/1997 | Tom |
| 5,704,045 A | 12/1997 | King et al. |
| 5,717,923 A | 2/1998 | Dedrick |
| 5,720,026 A | 2/1998 | Uemura et al. |
| 5,732,397 A | 3/1998 | DeTore et al. |
| 5,732,400 A | 3/1998 | Mandler et al. |
| 5,778,363 A | 7/1998 | Light |
| 5,787,402 A | 7/1998 | Potter et al. |
| 5,790,639 A | 8/1998 | Ranalli et al. |
| 5,797,133 A | 8/1998 | Jones et al. |
| 5,799,087 A | 8/1998 | Rosen |
| 5,809,478 A | 9/1998 | Greco et al. |
| 5,819,226 A | 10/1998 | Gopinathan et al. |
| 5,819,236 A | 10/1998 | Josephson |
| 5,852,812 A | 12/1998 | Reeder |
| 5,864,828 A | 1/1999 | Atkins |
| 5,875,431 A | 2/1999 | Heckman et al. |
| 5,878,400 A | 3/1999 | Carter, III |
| 5,884,289 A | 3/1999 | Anderson et al. |
| 5,898,154 A | 4/1999 | Rosen |
| 5,903,882 A | 5/1999 | Asay et al. |
| 5,920,629 A | 7/1999 | Rosen |
| 5,930,762 A | 7/1999 | Masch |
| 5,933,816 A | 8/1999 | Zeanah et al. |
| 5,940,812 A | 8/1999 | Tengel et al. |
| 5,940,843 A | 8/1999 | Zucknovich et al. |
| 5,953,423 A | 9/1999 | Rosen |
| 5,959,577 A | 9/1999 | Fan et al. |
| 5,963,648 A | 10/1999 | Rosen |
| 5,963,923 A | 10/1999 | Garber |
| 5,970,479 A | 10/1999 | Shepherd |
| 5,974,146 A | 10/1999 | Randle et al. |
| 5,976,082 A | 11/1999 | Wong et al. |
| 5,991,743 A | 11/1999 | Irving et al. |
| 6,003,013 A | 12/1999 | Boushy et al. |
| 6,014,228 A | 1/2000 | Castro |
| 6,016,963 A | 1/2000 | Ezawa et al. |
| 6,018,715 A | 1/2000 | Lynch et al. |
| 6,018,723 A | 1/2000 | Siegel et al. |
| 6,021,397 A | 2/2000 | Jones et al. |
| 6,047,887 A | 4/2000 | Rosen |
| 6,049,784 A | 4/2000 | Weatherly et al. |
| 6,055,636 A | 4/2000 | Hillier et al. |
| 6,078,904 A | 6/2000 | Rebane |
| 6,078,905 A | 6/2000 | Pich-LeWinter |
| 6,085,175 A | 7/2000 | Gugel et al. |
| 6,085,976 A | 7/2000 | Sehr |
| 6,088,686 A | 7/2000 | Walker et al. |
| 6,105,007 A | 8/2000 | Norris |
| 6,105,010 A | 8/2000 | Musgrave |
| 6,112,190 A | 8/2000 | Fletcher et al. |
| 6,119,103 A | 9/2000 | Basch et al. |
| 6,148,297 A | 11/2000 | Swor et al. |
| 6,148,301 A | 11/2000 | Rosenthal |
| 6,151,688 A | 11/2000 | Wipfel et al. |
| 6,154,879 A | 11/2000 | Pare, Jr. et al. |
| 6,158,658 A | 12/2000 | Barclay |
| 6,182,095 B1 | 1/2001 | Leymaster et al. |
| 6,199,073 B1 | 3/2001 | Peairs et al. |
| 6,202,053 B1 | 3/2001 | Christiansen et al. |
| 6,205,433 B1 | 3/2001 | Boesch et al. |
| 6,219,805 B1 | 4/2001 | Jones et al. |
| 6,223,143 B1 | 4/2001 | Weinstock et al. |
| 6,236,972 B1 | 5/2001 | Shkedy |
| 6,246,996 B1 | 6/2001 | Stein et al. |
| 6,249,770 B1 | 6/2001 | Erwin et al. |
| 6,253,322 B1 | 6/2001 | Susaki et al. |
| 6,263,447 B1 | 7/2001 | French et al. |
| 6,269,362 B1 | 7/2001 | Broder et al. |
| 6,278,981 B1 | 8/2001 | Dembo et al. |
| 6,278,983 B1 | 8/2001 | Ball |
| 6,289,320 B1 | 9/2001 | Drummond et al. |
| 6,292,827 B1 | 9/2001 | Raz |
| 6,301,563 B1 | 10/2001 | Brown et al. |
| 6,304,915 B1 | 10/2001 | Nguyen et al. |
| 6,304,973 B1 | 10/2001 | Williams |
| 6,311,272 B1 | 10/2001 | Gressel |
| 6,317,727 B1 | 11/2001 | May |
| 6,321,212 B1 | 11/2001 | Lange |
| 6,330,546 B1 | 12/2001 | Gopinathan et al. |
| 6,330,547 B1 | 12/2001 | Martin |
| 6,341,267 B1 | 1/2002 | Taub |
| 6,347,307 B1 | 2/2002 | Sandhu et al. |
| 6,349,290 B1 | 2/2002 | Horowitz et al. |
| 6,393,423 B1 | 5/2002 | Goedken |
| 6,397,308 B1 | 5/2002 | Ofek et al. |
| 6,401,068 B1 | 6/2002 | Cherveny et al. |
| 6,405,173 B1 | 6/2002 | Honarvar et al. |
| 6,415,271 B1 | 7/2002 | Turk et al. |
| 6,421,653 B1 | 7/2002 | May |
| 6,456,984 B1 | 9/2002 | Demoff et al. |
| 6,460,038 B1 | 10/2002 | Khan et al. |
| 6,470,319 B1 | 10/2002 | Ryan |
| 6,513,018 B1 | 1/2003 | Culhane |
| 6,513,020 B1 | 1/2003 | Weiss et al. |
| 6,516,056 B1 | 2/2003 | Justice et al. |
| 6,523,027 B1 | 2/2003 | Underwood |
| 6,542,905 B1 | 4/2003 | Fogel et al. |
| 6,542,993 B1 | 4/2003 | Erfani |
| 6,591,252 B1 | 7/2003 | Young |
| 6,598,028 B1 | 7/2003 | Sullivan et al. |
| 6,598,030 B1 | 7/2003 | Siegel et al. |
| 6,598,087 B1 | 7/2003 | Dixon, III et al. |
| 6,605,120 B1 | 8/2003 | Fields et al. |
| 6,609,114 B1 | 8/2003 | Gressel et al. |
| 6,609,128 B1 | 8/2003 | Underwood |
| 6,609,658 B1 | 8/2003 | Sehr |
| 6,629,110 B2 | 9/2003 | Cane et al. |
| 6,631,384 B1 | 10/2003 | Richman et al. |
| 6,633,878 B1 | 10/2003 | Underwood |

(56) References Cited

U.S. PATENT DOCUMENTS

| | | |
|---|---|---|
| 6,658,393 B1 | 12/2003 | Basch et al. |
| 6,658,400 B2 | 12/2003 | Perell et al. |
| 6,671,818 B1 | 12/2003 | Mikurak |
| 6,684,190 B1 | 1/2004 | Powers et al. |
| 6,714,894 B1 | 3/2004 | Tobey et al. |
| 6,714,918 B2 | 3/2004 | Hillmer et al. |
| 6,738,760 B1 | 5/2004 | Krachman |
| 6,751,607 B2 | 6/2004 | Kraay et al. |
| 6,757,898 B1 | 6/2004 | Ilsen et al. |
| 6,785,661 B1 | 8/2004 | Mandler et al. |
| 6,789,091 B2 | 9/2004 | Gogolak |
| 6,829,590 B1 | 12/2004 | Greener et al. |
| 6,839,682 B1 | 1/2005 | Blume et al. |
| 6,842,737 B1 | 1/2005 | Stiles et al. |
| 6,868,408 B1 | 3/2005 | Rosen |
| 6,876,992 B1 | 4/2005 | Sullivan |
| 6,895,393 B1 | 5/2005 | Numata et al. |
| 6,898,574 B1 | 5/2005 | Regan |
| 6,910,628 B1 | 6/2005 | Sehr |
| 6,915,265 B1 | 7/2005 | Johnson |
| 6,915,269 B1 | 7/2005 | Shapiro et al. |
| 6,915,271 B1 | 7/2005 | Meyer et al. |
| 6,934,692 B1 | 8/2005 | Duncan |
| 6,947,908 B1 | 9/2005 | Slater |
| 6,965,831 B2 | 11/2005 | Domany et al. |
| 6,971,026 B1 | 11/2005 | Fujiyama et al. |
| 6,975,996 B2 | 12/2005 | Lawrence et al. |
| 6,983,266 B1 | 1/2006 | Goldschmidt |
| 6,985,886 B1 | 1/2006 | Broadbent et al. |
| 7,003,661 B2 | 2/2006 | Beattie et al. |
| 7,006,992 B1 | 2/2006 | Packwood |
| 7,013,291 B1 | 3/2006 | Green |
| 7,024,383 B1 | 4/2006 | Mancini et al. |
| 7,069,234 B1 | 6/2006 | Cornelius et al. |
| 7,089,208 B1 | 8/2006 | Levchin et al. |
| 7,100,195 B1 | 8/2006 | Underwood |
| 7,114,177 B2 | 9/2006 | Rosenberg et al. |
| 7,120,929 B2 | 10/2006 | Beattie et al. |
| 7,124,101 B1 | 10/2006 | Mikurak |
| 7,133,846 B1 | 11/2006 | Ginter et al. |
| 7,161,465 B2 | 1/2007 | Wood et al. |
| 7,165,045 B1 | 1/2007 | Kim-E |
| 7,167,844 B1 | 1/2007 | Leong et al. |
| 7,181,428 B2 | 2/2007 | Lawrence |
| 7,194,426 B1 | 3/2007 | Box |
| 7,194,684 B1 | 3/2007 | Shazeer |
| 7,203,711 B2 | 4/2007 | Borden et al. |
| 7,209,889 B1 | 4/2007 | Whitfield |
| 7,231,327 B1 | 6/2007 | Beverina et al. |
| 7,231,353 B1 | 6/2007 | Goyal |
| 7,231,395 B2 | 6/2007 | Fain et al. |
| 7,263,506 B2 | 8/2007 | Lee et al. |
| 7,319,971 B2 | 1/2008 | Abrahams et al. |
| 7,376,618 B1 | 5/2008 | Anderson et al. |
| 7,389,265 B2 | 6/2008 | Lawrence et al. |
| 7,403,922 B1 | 7/2008 | Lewis et al. |
| 7,415,607 B2 | 8/2008 | Sinn |
| 7,426,489 B2 | 9/2008 | van Soestbergen et al. |
| 7,426,492 B1 | 9/2008 | Bishop et al. |
| 7,428,756 B2 | 9/2008 | Wookey |
| 7,430,536 B1 | 9/2008 | Borten |
| 7,437,310 B1 | 10/2008 | Dutta |
| 7,451,114 B1 | 11/2008 | Matsuda et al. |
| 7,461,250 B1 | 12/2008 | Duane et al. |
| 7,506,158 B2 | 3/2009 | Fox et al. |
| 7,519,587 B2 | 4/2009 | Lawrence et al. |
| 7,523,054 B2 | 4/2009 | Tyson-Quah |
| 7,523,135 B2 | 4/2009 | Bradford et al. |
| 7,536,331 B1 | 5/2009 | Pellegrino et al. |
| 7,552,466 B2 | 6/2009 | Rosenberg et al. |
| 7,562,212 B2 | 7/2009 | Beattie et al. |
| 7,593,859 B1 | 9/2009 | Owens et al. |
| 7,593,892 B2 | 9/2009 | Balk et al. |
| 7,603,705 B2 | 10/2009 | Roy |
| 7,620,556 B1 | 11/2009 | Ross |
| 7,650,496 B2 | 1/2010 | Thornton et al. |
| 7,653,810 B2 | 1/2010 | Thornton et al. |
| 7,657,482 B1 | 2/2010 | Shirey et al. |
| 7,694,135 B2 | 4/2010 | Rowan et al. |
| 7,698,549 B2 | 4/2010 | Thornton et al. |
| 7,698,557 B2 | 4/2010 | Saarepera et al. |
| 7,708,200 B2 | 5/2010 | Helsper et al. |
| 7,711,637 B2 | 5/2010 | Lawrence |
| 7,711,950 B2 | 5/2010 | Orbke et al. |
| 7,742,998 B2 | 6/2010 | Stiffler |
| 7,752,154 B2 | 7/2010 | Friedlander et al. |
| 7,801,758 B2 | 9/2010 | Gracie et al. |
| 7,813,944 B1 | 10/2010 | Luk et al. |
| 7,822,656 B2 | 10/2010 | Knight et al. |
| 7,853,611 B2 | 12/2010 | Friedlander et al. |
| 7,899,722 B1 | 3/2011 | Lawrence et al. |
| 7,904,361 B2 | 3/2011 | Lawrence |
| 7,930,228 B1 | 4/2011 | Hawkins et al. |
| 7,958,027 B2 | 6/2011 | Lawrence |
| 8,090,734 B2 | 1/2012 | Maloche et al. |
| 8,131,560 B2 | 3/2012 | Lawton et al. |
| 8,140,346 B2 | 3/2012 | Kaplan |
| 8,185,457 B1 | 5/2012 | Bear et al. |
| 2001/0000535 A1 | 4/2001 | Lapsley et al. |
| 2001/0001014 A1 | 5/2001 | Akins et al. |
| 2001/0001877 A1 | 5/2001 | French et al. |
| 2001/0011243 A1 | 8/2001 | Dembo et al. |
| 2001/0016833 A1 | 8/2001 | Everling et al. |
| 2001/0018674 A1 | 8/2001 | Schein et al. |
| 2001/0023414 A1 | 9/2001 | Kumar et al. |
| 2001/0027388 A1 | 10/2001 | Beverina et al. |
| 2001/0027389 A1 | 10/2001 | Beverina et al. |
| 2001/0029493 A1 | 10/2001 | Pare et al. |
| 2001/0032150 A1 | 10/2001 | Terashima |
| 2001/0032156 A1 | 10/2001 | Candura et al. |
| 2001/0037275 A1 | 11/2001 | Johnson et al. |
| 2001/0037318 A1 | 11/2001 | Lindskog et al. |
| 2001/0039533 A1 | 11/2001 | Pare et al. |
| 2001/0044768 A1 | 11/2001 | Wares |
| 2001/0047279 A1 | 11/2001 | Gargone |
| 2001/0047347 A1 | 11/2001 | Perell et al. |
| 2001/0049651 A1 | 12/2001 | Selleck |
| 2001/0049793 A1 | 12/2001 | Sugimoto |
| 2001/0054020 A1 | 12/2001 | Barth et al. |
| 2001/0056359 A1 | 12/2001 | Abreu |
| 2002/0004725 A1 | 1/2002 | Martin et al. |
| 2002/0016854 A1 | 2/2002 | Hirasawa et al. |
| 2002/0019804 A1 | 2/2002 | Sutton |
| 2002/0023053 A1 | 2/2002 | Szoc et al. |
| 2002/0023109 A1 | 2/2002 | Lederer et al. |
| 2002/0029249 A1 | 3/2002 | Campbell et al. |
| 2002/0032626 A1 | 3/2002 | DeWolf et al. |
| 2002/0032635 A1 | 3/2002 | Harris et al. |
| 2002/0032646 A1 | 3/2002 | Sweeney et al. |
| 2002/0032665 A1 | 3/2002 | Creighton et al. |
| 2002/0035520 A1 | 3/2002 | Weiss |
| 2002/0035543 A1 | 3/2002 | Shedd et al. |
| 2002/0035685 A1 | 3/2002 | Ono et al. |
| 2002/0046053 A1 | 4/2002 | Hare et al. |
| 2002/0059093 A1 | 5/2002 | Barton et al. |
| 2002/0059137 A1 | 5/2002 | Freeman et al. |
| 2002/0062438 A1 | 5/2002 | Asay et al. |
| 2002/0069084 A1 | 6/2002 | Donovan |
| 2002/0077941 A1 | 6/2002 | Halligan et al. |
| 2002/0083079 A1* | 6/2002 | Meier et al. ............... 707/104.1 |
| 2002/0087454 A1 | 7/2002 | Calo et al. |
| 2002/0087455 A1 | 7/2002 | Tsagarakis et al. |
| 2002/0091622 A1 | 7/2002 | Mastwyk et al. |
| 2002/0091635 A1 | 7/2002 | Dilip et al. |
| 2002/0091706 A1 | 7/2002 | Anderson et al. |
| 2002/0099640 A1 | 7/2002 | Lange |
| 2002/0099649 A1 | 7/2002 | Lee et al. |
| 2002/0099651 A1 | 7/2002 | May |
| 2002/0103744 A1 | 8/2002 | Llewelyn |
| 2002/0103747 A1 | 8/2002 | Lawrence |
| 2002/0103809 A1 | 8/2002 | Starzl et al. |
| 2002/0103834 A1 | 8/2002 | Thompson et al. |
| 2002/0103852 A1 | 8/2002 | Pushka |
| 2002/0107767 A1 | 8/2002 | McClair et al. |

(56) References Cited

U.S. PATENT DOCUMENTS

| | | |
|---|---|---|
| 2002/0111890 A1 | 8/2002 | Sloan et al. |
| 2002/0120477 A1 | 8/2002 | Jinnett |
| 2002/0120582 A1 | 8/2002 | Elston et al. |
| 2002/0120846 A1 | 8/2002 | Stewart et al. |
| 2002/0128939 A1 | 9/2002 | Tarrant |
| 2002/0128945 A1 | 9/2002 | Moss et al. |
| 2002/0128952 A1 | 9/2002 | Melkomian et al. |
| 2002/0128964 A1 | 9/2002 | Baker et al. |
| 2002/0129248 A1 | 9/2002 | Wheeler et al. |
| 2002/0129255 A1 | 9/2002 | Tsuchiyama et al. |
| 2002/0133442 A1 | 9/2002 | Laycock |
| 2002/0138318 A1* | 9/2002 | Ellis et al. ............ 705/7 |
| 2002/0138371 A1 | 9/2002 | Lawrence et al. |
| 2002/0138407 A1 | 9/2002 | Lawrence et al. |
| 2002/0138408 A1 | 9/2002 | Lawrence |
| 2002/0138412 A1 | 9/2002 | Englert |
| 2002/0138417 A1 | 9/2002 | Lawrence |
| 2002/0139837 A1 | 10/2002 | Spitz et al. |
| 2002/0142815 A1 | 10/2002 | Candelore |
| 2002/0143562 A1 | 10/2002 | Lawrence |
| 2002/0143686 A1 | 10/2002 | Greene et al. |
| 2002/0143693 A1 | 10/2002 | Soestbergen et al. |
| 2002/0143755 A1 | 10/2002 | Wynblatt et al. |
| 2002/0147669 A1 | 10/2002 | Taylor et al. |
| 2002/0152156 A1 | 10/2002 | Tyson-Quah |
| 2002/0156658 A1 | 10/2002 | Selesny et al. |
| 2002/0156917 A1 | 10/2002 | Nye |
| 2002/0161707 A1 | 10/2002 | Cole et al. |
| 2002/0169747 A1 | 11/2002 | Chapman et al. |
| 2002/0169759 A1 | 11/2002 | Kraft et al. |
| 2002/0178046 A1 | 11/2002 | Lawrence |
| 2002/0184068 A1 | 12/2002 | Krishnan et al. |
| 2002/0186240 A1* | 12/2002 | Eisenberger et al. ......... 345/738 |
| 2002/0188861 A1 | 12/2002 | Townsend |
| 2002/0194014 A1 | 12/2002 | Starnes et al. |
| 2002/0194094 A1 | 12/2002 | Lancaster et al. |
| 2002/0198827 A1 | 12/2002 | van Leeuwen |
| 2003/0004954 A1 | 1/2003 | Clark et al. |
| 2003/0009418 A1 | 1/2003 | Green et al. |
| 2003/0009419 A1 | 1/2003 | Chavez et al. |
| 2003/0018483 A1 | 1/2003 | Pickover et al. |
| 2003/0018522 A1 | 1/2003 | Denimarck et al. |
| 2003/0018549 A1 | 1/2003 | Fei et al. |
| 2003/0023543 A1 | 1/2003 | Gunewardena et al. |
| 2003/0026268 A1 | 2/2003 | Navas |
| 2003/0046114 A1* | 3/2003 | Davies et al. ............ 705/3 |
| 2003/0050718 A1 | 3/2003 | Tracy et al. |
| 2003/0061201 A1 | 3/2003 | Grefenstette et al. |
| 2003/0065613 A1 | 4/2003 | Smith |
| 2003/0065656 A1 | 4/2003 | de la Torre et al. |
| 2003/0065942 A1 | 4/2003 | Lineman et al. |
| 2003/0066872 A1 | 4/2003 | McClure et al. |
| 2003/0069742 A1 | 4/2003 | Lawrence |
| 2003/0069821 A1 | 4/2003 | Williams |
| 2003/0069894 A1 | 4/2003 | Cotter et al. |
| 2003/0074272 A1 | 4/2003 | Knegendorf et al. |
| 2003/0074310 A1 | 4/2003 | Grovit et al. |
| 2003/0088562 A1 | 5/2003 | Dillon et al. |
| 2003/0135457 A1 | 7/2003 | Stewart et al. |
| 2003/0140102 A1 | 7/2003 | Takeuchi et al. |
| 2003/0145124 A1 | 7/2003 | Guyan et al. |
| 2003/0154150 A1 | 8/2003 | Wefers et al. |
| 2003/0163398 A1 | 8/2003 | Yoshioka et al. |
| 2003/0167177 A1 | 9/2003 | Branch |
| 2003/0167237 A1 | 9/2003 | Degen et al. |
| 2003/0172017 A1 | 9/2003 | Feingold et al. |
| 2003/0177087 A1 | 9/2003 | Lawrence |
| 2003/0187701 A1 | 10/2003 | Bonissone et al. |
| 2003/0187703 A1 | 10/2003 | Bonissone et al. |
| 2003/0187790 A1 | 10/2003 | Swift et al. |
| 2003/0195843 A1 | 10/2003 | Matsuda et al. |
| 2003/0225692 A1 | 12/2003 | Bosch et al. |
| 2003/0229525 A1 | 12/2003 | Callahan et al. |
| 2003/0233297 A1 | 12/2003 | Campbell |
| 2003/0233347 A1* | 12/2003 | Weinberg et al. ............ 707/3 |
| 2003/0236740 A1 | 12/2003 | Lang et al. |
| 2004/0006532 A1 | 1/2004 | Lawrence et al. |
| 2004/0006533 A1 | 1/2004 | Lawrence |
| 2004/0015376 A1 | 1/2004 | Zhu et al. |
| 2004/0024693 A1 | 2/2004 | Lawrence |
| 2004/0039704 A1 | 2/2004 | Gilliam et al. |
| 2004/0044505 A1 | 3/2004 | Horwitz |
| 2004/0044617 A1 | 3/2004 | Lu |
| 2004/0054563 A1 | 3/2004 | Douglas |
| 2004/0111379 A1 | 6/2004 | Hicks et al. |
| 2004/0122790 A1* | 6/2004 | Walker et al. ............ 707/1 |
| 2004/0148252 A1 | 7/2004 | Fleishman |
| 2004/0177020 A1 | 9/2004 | Alderman et al. |
| 2004/0193532 A1 | 9/2004 | Lawrence |
| 2004/0215557 A1 | 10/2004 | Michelsen |
| 2004/0234117 A1 | 11/2004 | Tibor |
| 2004/0243588 A1 | 12/2004 | Tanner et al. |
| 2004/0249630 A1 | 12/2004 | Parry et al. |
| 2004/0249678 A1 | 12/2004 | Henderson |
| 2004/0268235 A1 | 12/2004 | Wason |
| 2005/0033849 A1 | 2/2005 | Matz |
| 2005/0065872 A1 | 3/2005 | Moebs et al. |
| 2005/0080716 A1 | 4/2005 | Belyi et al. |
| 2005/0086090 A1 | 4/2005 | Abrahams et al. |
| 2005/0138067 A1 | 6/2005 | Billsus et al. |
| 2005/0144114 A1 | 6/2005 | Ruggieri et al. |
| 2005/0187841 A1 | 8/2005 | Grear et al. |
| 2005/0240608 A1 | 10/2005 | Jones et al. |
| 2006/0004719 A1 | 1/2006 | Lawrence et al. |
| 2006/0004878 A1 | 1/2006 | Lawrence et al. |
| 2006/0010063 A1 | 1/2006 | Drummond et al. |
| 2006/0074793 A1 | 4/2006 | Hibbert et al. |
| 2006/0089894 A1 | 4/2006 | Balk et al. |
| 2006/0116898 A1 | 6/2006 | Peterson |
| 2006/0218651 A1 | 9/2006 | Ginter et al. |
| 2007/0005496 A1 | 1/2007 | Cataline et al. |
| 2007/0038544 A1 | 2/2007 | Snow et al. |
| 2007/0061594 A1 | 3/2007 | Ginter et al. |
| 2007/0219882 A1 | 9/2007 | May |
| 2007/0255662 A1 | 11/2007 | Tumminaro |
| 2007/0288355 A1 | 12/2007 | Roland et al. |
| 2008/0021835 A1 | 1/2008 | Ginter et al. |
| 2008/0027749 A1 | 1/2008 | Meyer et al. |
| 2008/0077530 A1 | 3/2008 | Banas et al. |
| 2008/0140576 A1 | 6/2008 | Lewis et al. |
| 2008/0319922 A1 | 12/2008 | Lawrence et al. |
| 2008/0320092 A1 | 12/2008 | Campbell et al. |
| 2009/0024500 A1 | 1/2009 | Kay et al. |
| 2009/0031127 A1 | 1/2009 | Campbell et al. |
| 2009/0043687 A1 | 2/2009 | van Soestbergen et al. |
| 2009/0132813 A1 | 5/2009 | Schibuk |
| 2009/0187761 A1 | 7/2009 | Campbell et al. |
| 2009/0299896 A1 | 12/2009 | Zhang et al. |
| 2009/0319420 A1 | 12/2009 | Sanchez et al. |
| 2010/0138262 A1 | 6/2010 | Lawrence |
| 2010/0235300 A1 | 9/2010 | Feingold |
| 2011/0131136 A1 | 6/2011 | Lawrence |
| 2011/0202457 A1 | 8/2011 | Lawrence |
| 2012/0116954 A1 | 5/2012 | Lawrence et al. |
| 2012/0259753 A1 | 10/2012 | Orad et al. |
| 2012/0284186 A1 | 11/2012 | Lawrence |
| 2012/0330815 A1 | 12/2012 | Ogundipe |

FOREIGN PATENT DOCUMENTS

| | | |
|---|---|---|
| EP | 1137209 A2 | 9/2001 |
| EP | 1143365 A2 | 10/2001 |
| GB | 2354608 A | 3/2001 |
| JP | 2000-020618 A | 1/2000 |
| JP | 2003-050896 A | 2/2003 |
| WO | WO-94/06103 A1 | 3/1994 |
| WO | WO-96/21903 A1 | 7/1996 |
| WO | WO-98/54667 A1 | 12/1998 |
| WO | WO-00/17799 A1 | 3/2000 |
| WO | WO-00/54186 A1 | 9/2000 |
| WO | WO-00/75820 A2 | 12/2000 |
| WO | WO-00/75836 A2 | 12/2000 |
| WO | WO-01/55885 A2 | 8/2001 |

(56) References Cited

FOREIGN PATENT DOCUMENTS

| | | |
|---|---|---|
| WO | WO-02/075485 A2 | 9/2002 |
| WO | WO-03/032112 A2 | 4/2003 |
| WO | WO-2004/072803 A2 | 8/2004 |

OTHER PUBLICATIONS

Cosset, Jean-Claude et al., Abstract for "Political Risk and the Benefits of International Portfolio Diversification," Journal of International Business Studies, vol. 26, No. 2, 1 page, Second Quarter 1995.
European Patent Application No. 02701971.0, Supplementary European Search Report, 3 pages, Apr. 25, 2007.
International Application No. PCT/US2002/001016, International Search Report, 2 pages, Aug. 26, 2002.
Lewin, Rebecca, "Banks Use AI to Battle Fraud, Avoid Risks," Bank Systems & Technology, vol. 32, No. 11, p. 22, Nov. 1995.
U.S. Appl. No. 13/963,022, filed Aug. 9, 2013, Systems and Methods for Managing Information Associated with Legal, Compliance and Regulatory Risk.
U.S. Appl. No. 12/892,059, filed May 10, 2013, Method, System, Apparatus, Program Code and Means for Determining A Redundancy of Information.
Aguais, Scott D., "It's The Economy, Issuer!," Credit Card Management, vol. 5, No. 11, 4 pages, Feb. 1993.
Aritake, Toshio, "Japanese Government Panel Recommends New Laws To Protect Personal Information," BNA's Banking Report, vol. 73, Issue 21, 1 page, Dec. 6, 1999.
Arizona Daily Star, "Capitol Briefs," 2 pages, Feb. 5, 1997.
Banasiak, Michael, "Don't Be Out-Scored By Your Competition," Credit and Financial Management Review, 7 pages, 2nd Quarter 2000.
Barrett, Jennifer, "Banking On Software Solutions," Newsweek, Inc., 5 pages, Jun. 12, 2002.
Batt, Tony, "Indians Protest Proposed Changes In Gaming Regulations," Las Vegas Review Journal, 1 page, Apr. 27, 1994.
Berns, Dave, "Resort Owners Seek Loans," Las Vegas Review Journal, 3 pages, Nov. 16, 1999.
Business Editors, "Tarrant Apparel Group Announces Exercise Of LDA Option; Limited Now Holds 7.3% Interest In Tarrant," Business Wire, 3 pages, Oct. 22, 1998.
Carreker Corporation, Press Release for "Carreker-Antinori Forms Risk Management Unit: New Service Helps Banks Identify, Reduce Operations Risk," 2 pages, Nov. 17, 1997.
Caudill, Maureen et al., "Chapter 18—Neural Network Applications," Naturally Intelligent Systems, The MIT Press, 12 pages, 1991.
Cetron, Martin et al., "Travelers' Health," Emerging Infectious Diseases, vol. 4, No. 3, pp. 405-407, Jul.-Sep. 1998.
Chandler, Gary G., "Credit Scoring—A Feasibility Study," Executive, 10 pages, Summer 1985.
Clarke, Richard N., "SICs As Delineators Of Economic Markets," Journal of Business, vol. 62, No. 1, pp. 17-31, 1989.
Collins Dictionary of Law, Definition of "Proprietary Right," W. J. Stewart, 1 page, 2006.
Credit Risk Management Report, "Five Ways To Reduce Risk With Neural Networks," vol. 3, No. 19, 2 pages, Sep. 27, 1993.
Detroit News, "Regulatory Risks," 2 pages, Sep. 20, 1999.
Everest-Hill, Deborah et al., "Automating Risk Assessment," The Internal Auditor, vol. 56, Issue 3, 4 pages, Jun. 1999.
Federal Trade Commission, "Fair Credit Reporting," 5 pages, Mar. 1999.
Federal Trade Commission, "The Gramm-Leach-Bliley Act—Privacy Of Consumer Financial Information," 15 pages, Nov. 12, 1999.
Geiger, Keri, "Dirty Dollars Elude The Authorities," LatinFinance, Issue 140, 5 pages, Sep. 2002.
Grafton, David, "Analysing Customers With Behavioural Modelling," Credit Control, vol. 17, No. 6, 4 pages, 1996.
Gullo, Karen, "Neural Nets Versus Card Fraud; Chases Software Learns To Detect Potential Crime," The American Banker, 2 pages, Feb. 2, 1990.

Haynes, William, "FTC Settles With Debt Collection Agency," Credit Risk Management Report, vol. 10, Issue 17, 2 pages, Sep. 5, 2000.
Healy, Thomas J., "The New Science Of Borrower Behavior," Mortgage Banking, vol. 58, No. 5, 7 pages, Feb. 1, 1998.
Hicks, Matt, "What, Me Spam?" Good Intentions Alone Aren't Enough To Avoid Alienating Customers, eWeek, 5 pages, Sep. 3, 2001.
Higgins, Kevin T., "Retention By The Numbers," Credit Card Management, vol. 5, No. 11, 4 pages, Feb. 1993.
InsureMarket, "Home Page," "Quotes, Purchasing & Agents," and "How InsureMarket Works," 8 pages, Feb. 2, 1999.
International Application No. PCT/US2002/007110, International Preliminary Examination Report, 5 pages, Sep. 17, 2004.
International Application No. PCT/US2002/007110, International Search Report, 4 pages, Feb. 3, 2003.
International Application No. PCT/US2002/024123, International Search Report, 1 page, May 30, 2003.
International Application No. PCT/US2002/032339, International Preliminary Examination Report, 3 pages, Feb. 7, 2005.
International Application No. PCT/US2002/032339, International Search Report, 1 page, Oct. 13, 2004.
International Application No. PCT/US2002/039260, International Preliminary Examination Report, 5 pages, May 13, 2004.
International Application No. PCT/US2002/039260, International Search Report, 1 page, Sep. 9, 2003.
International Application No. PCT/US2003/003993, International Search Report, 3 pages, Jun. 2, 2003.
International Application No. PCT/US2003/003993, Written Opinion, 4 pages, Oct. 7, 2003.
International Application No. PCT/US2003/003994, International Preliminary Examination Report, 5 pages, Jun. 14, 2004.
International Application No. PCT/US2003/003994, International Search Report, 1 page, Oct. 1, 2003.
International Application No. PCT/US2003/007337, International Preliminary Examination Report, 6 pages, Aug. 24, 2004.
International Application No. PCT/US2003/007337, International Search Report, 4 pages, Jun. 19, 2003.
International Application No. PCT/US2003/013169, International Preliminary Examination Report, 3 pages, Nov. 4, 2004.
International Application No. PCT/US2003/013169, International Search Report, 4 pages, Dec. 2, 2003.
International Application No. PCT/US2003/017935, International Preliminary Examination Report, Mar. 6, 2005, 3 pages.
International Application No. PCT/US2003/017935, International Search Report, 1 page, Oct. 7, 2003.
International Application No. PCT/US2003/018273, International Search Report, 1 page, Jun. 24, 2004.
International Application No. PCT/US2003/018430, International Search Report, 4 pages, Dec. 22, 2003.
International Application No. PCT/US2003/019198, International Search Report, 4 pages, Dec. 23, 2003.
International Application No. PCT/US2003/019198, Written Opinion, 4 pages, Jul. 6, 2004.
International Application No. PCT/US2003/019219, International Preliminary Examination Report, 3 pages, Sep. 7, 2004.
International Application No. PCT/US2003/019219, International Search Report, 3 pages, Dec. 15, 2003.
International Application No. PCT/US2003/019242, International Preliminary Examination Report, 6 pages, Mar. 31, 2005.
International Application No. PCT/US2003/019242, International Search Report, 3 pages, Dec. 3, 2003.
International Application No. PCT/US2003/019242, Written Opinion, 5 pages, Jun. 21, 2004.
International Application No. PCT/US2003/019376, International Preliminary Examination Report, 3 pages, Jan. 25, 2004.
International Application No. PCT/US2003/019376, International Search Report, 1 page, Dec. 4, 2003.
International Application No. PCT/US2003/023033, International Preliminary Examination Report, 4 pages, Jun. 15, 2004.
International Application No. PCT/US2003/023033, International Search Report, 3 pages, Apr. 9, 2004.
International Application No. PCT/US2003/023310, International Preliminary Examination Report, 3 pages, Apr. 13, 2005.

(56) References Cited

OTHER PUBLICATIONS

International Application No. PCT/US2003/023310, International Search Report, 5 pages, Jun. 18, 2004.
International Application No. PCT/US2003/024373, International Preliminary Examination Report, 3 pages, May 2, 2005.
International Application No. PCT/US2003/024373, International Search Report, 1 page, Jun. 15, 2004.
International Application No. PCT/US2004/003766, International Search Report, 4 pages, Jul. 6, 2005.
International Application No. PCT/US2004/003766, Written Opinion, 3 pages, Jul. 6, 2005.
Leonard, Kevin J. et al., "Automating The Credit Decision Process," Journal of Retail Banking, vol. 16, No. 1, 6 pages, Spring 1994.
Mantas, Inc., "Enterprise Anti-Money Laundering Product Specification," 17 pages, 2001.
Mantas, "Transforming Discovery Into Opportunity," 28 pages, 2001.
McClure, Leslie, "Taking The Risk Out Of Transactions," Security Management, vol. 38, No. 3, 3 pages, Mar. 1, 1994.
Michlig, Greg, "To Catch A Thief," Credit Union Management, vol. 24, No. 1, 6 pages, Jan. 2001.
Mills, Anthony, "A Systematic Approach To Risk Management For Construction," Structural Survey, vol. 19, No. 5, pp. 245-252, 2001.
New Jersey Casino Control Commission, "Casino Gambling In New Jersey—A Report To The National Gambling Impact Study Commission," 56 pages, Jan. 1998.
Office of Foreign Assets Control, "OFAC Compliance—A Perspective For Community Banks," ABA Bank Compliance, pp. 39-48, Nov./Dec. 1998.
Office of Foreign Assets Control, "Specially Designated Who? A Primer On OFAC Compliance," ABA Bank Compliance, pp. 29-36, Mar./Apr. 1996.
Power, Stephen, "Background Checks Await Fliers," The Wall Street Journal, 1 page, Jun. 7, 2002.
PR Newswire, "Acxiom®, PerformanceData To Link List Databases; Agreement Provides Credit Data, Real Property/Demographic Data," 3 pages, Jul. 27, 1999.
PR Newswire, "InsureZone's AgentSecure Expands By Adding Life and Disability Insurance To Its Existing Commercial P&C Product Set," 2 pages, May 13, 2002.
Purcell, Lea, "Roping in Risk," Bank Systems & Technology, 4 pages, May 1, 1994.
Quinn, Jane Bryant, "Credit Card Issuers Keeping A Closer Watch On How You Pay Bills," The Washington Post, 2 pages, Apr. 25, 1988.
Reuters Limited, "Firms Consider Pact To Track Terror Money—WSJ," 2 pages, Nov. 26, 2001.
Schniederjans, Marc J. et al., "Strategic Acquisition Management: A Multi-Objective Synergistic Approach," Journal of the Operational Research Society, vol. 40, No. 4, pp. 333-345, Apr. 1989.
Sinkey, Jr., Joseph F., "Commercial Bank Financial Management In The Financial Services Industry," 4th Edition, MacMillan Publishing Company, 12 pages, 1992.
The National Academy Press, "Computer-Assisted Passenger Screening and Positive Passenger Bag-Matching," Assessment of Technologies Deployed to Improve Aviation Security: First Report, 1 page, 2000.
U.S. Department of the Treasury, "Preparation Guidelines For Suspicious Activity Report Form (SAR)," and "SAR PC Software User Guide—Version 4.0," 66 pages, Jun. 2000.
U.S. Environmental Protection Agency, "EPA Asbestos Ban: Clarification," 3 pages, May 18, 1999.
U.S General Services Administration, Title 41 Code of Federal Regulations, Part 301-1—Travel Allowances, 8 pages, Jul. 1, 1997.
U.S. Office of Foreign Assets Control, "Foreign Assets Control Regulations: The Countries Aren't Enough!," Letter of Credit Update, pp. 23-27, Mar. 1996.
Wall Street Journal (Europe), "Retailing: Casino, Cora Create Joint Buying Venture," 1 page, Apr. 20, 1999.
Weir, George C., "Can Fiduciaries Avoid Liability Under Environmental Law?," Estate Planning, vol. 19, Issue 4, 2 pages, Jul./Aug. 1992.
World-Check, Version II, 6 pages, 2001.
World Health Organization, "International Health Regulations," Third Annotated Edition, 74 pages, 1983.
International Application No. PCT/US2002/007110, Written Opinion, 5 pages, Dec. 3, 2003.
Dowd, Kevin, "Beyond Value At Risk," John Wiley & Sons, pp. 2 cover, 3-5, 38-40, Jan. 1999.
Hansen, Fay, "Business Credit: The Revolution In Online Credit Resources," Business Credit, vol. 102, Issue 9, 6 pages, Oct. 2000.
International Application No. PCT/US2002/007243, International Search Report, 5 pages, Jan. 27, 2003.
Shim, Jae K. et al., Definition of "Weighted Average," Dictionary of Economics, John Wiley & Sons, Inc., 2 pages, 1995.
Welsh, James, "Covering Your Bets On Credit And Collections," World Trade, vol. 12, Issue 2, 4 pages, Feb. 1999.
International Application No. PCT/US2002/007243, International Preliminary Examination Report, 4 pages, Mar. 7, 2005.
Blommestein, Hans J., "The Changing Nature Of Risk And The Challenges To Sound Risk Management In The New Global Financial Landscape," Financial Market Trends, 15 pages, Mar. 2000.
International Application No. PCT/US2002/07242, International Preliminary Examination Report, 4 pages, Jun. 7, 2005.
International Application No. PCT/US2002/07242, International Search Report, 5 pages, Feb. 3, 2003.
International Application No. PCT/US2002/031644, International Search Report, 3 pages, May 15, 2003.
International Application No. PCT/US2002/031644, Written Opinion, 6 pages, Oct. 23, 2003.
International Application No. PCT/US2002/031644, International Preliminary Examination Report, 7 pages, Jul. 23, 2004.
International Application No. PCT/US2003/007337, Written Opinion, 4 pages, Oct. 23, 2003.

* cited by examiner

Regulatory Data Risk ALERT

| | | | |
|---|---|---|---|
| Alert Date: | 03/01/2003 | Client Name: | JDF |
| Date of Inquiry: | 03/01/2003 | Customer Reporting ID: | H8FJ459 |
| Firm Number: | 00192-64a | Customer Tracking ID: | 2003-281 |

[X] New Inquiry  [ ] Portfolio  — 4202

Information Provided by Subscriber

| Last Name/Business Name | BENEVOLENCE HUNGER FOUNDATION |
|---|---|
| First Name | |
| Street Address/Delivery Line | |
| City Name | |
| Province, State, County, or Region | |
| Zip Code | |
| Identifier *(e.g., Social Security Number, Tax ID Number)* | |
| Date of Birth | |
| Age | |

— 4204

— 4206

Information From Global Regulatory Information Database (GRID)

[X] Summary  ← 4208     [ ] Full Text Article     [ ] Watch List
[ ] OFAC      4212      [ ] PEP/SPF               [ ] Copy Available (Added charges may apply)

Risk Relevant Code:  (VM) TERRORIST RELATED

4210

Based on the original document dated 1/30/2003 from Associated Press the following information was identified:

Headline:   Government reveals alleged link between Hunger charity and Terrorist cells

Mohamed Loay Bayaxid (aka Abu Al Rida Suli - whereabouts unknown), former president of the Benevolence Hunger Foundation, a Hunger charity based in Chicago was a key Terrorist operative and federal authorities say he likely participated in recent embassy attacks.

Enmaan Arnboug, age 40, head of Benevolence Hunger, based in Palo Pueblo is subject of a federal lawsuit charging conspiracy to commit racketeering and providing aid to...

FIG. 42      ↖ 4200

Browser by Worldscape http://www.FinRisk.rsk/Alert.htm

Regulatory Data Risk ALERT

| Alert Date: | 03/01/2003 | Client Name: | JDF |
| --- | --- | --- | --- |
| Date of Inquiry: | 03/01/2003 | Customer Reporting ID: | H8FJ459 |
| Firm Number: | 00192-64a | Customer Tracking ID: | 2003-281 |

[X] New Inquiry  [ ] Portfolio 4314
4302

Information Provided by Subscriber

| Last Name/Business Name | BENEVOLENCE HUNGER FOUNDATION |
| --- | --- |
| First Name | |
| Street Address/Delivery Line | |
| City Name | |
| Province, State, County, or Region | |
| Zip Code | |
| Identifier *(e.g., Social Security Number, Tax ID Number)* | |
| Date of Birth | |
| Age | |

4304

4306

Information From Global Regulatory Information Database (GRID)

[ ] Summary  4308   [ ] Full Text Article   [ ] Watch List

[X] OFAC   4312   [ ] PEP/SPF   [ ] Copy Available (Added charges may apply)

Risk Relevant Code: (VT) SPECIALLY DESIGNATED INDIVIDUAL TREASURY DEPT

4310

Based on the original document dated 3/07/2003 from Office of Foreign Asset Control the following information was identified:

Headline:   OFAC LIST OF SPECIALTY DESIGNATED PERSONS OR ENTITIES

7127   Benevolence Hunger Foundation, Inc., BPI-PA

ALL FINANCIAL ASSETS AND ALL RECORDS ARE BLOCKED; U.S. FEIN: 36-387652.

FIG. 43    4300

SYSTEMS, METHODS, APPARATUS, AND SCHEMA FOR STORING, MANAGING AND RETRIEVING INFORMATION

CROSS REFERENCE TO RELATED APPLICATIONS

This application is based on, and hereby claims benefit of and priority to, U.S. Provisional Patent Application Ser. No. 60/585,343, filed on Jul. 2, 2004, the contents of which are incorporated herein in their entirety for all purposes.

BACKGROUND

Embodiments relate to the storage, management and retrieval of information. In particular, some embodiments relate to the storage, management and retrieval of information associated with risk.

Advances in communication and computing as well as the growing integration of economies and societies around the world have increased the complexity of operating a business or other institution. In simpler times, a company selling machine parts generally knew each of its customers and was primarily concerned with the credit risk posed by each customer (i.e., the risk that the customer did not pay for the part). Thanks to the Internet and advances in communication and transportation, the company may now sell its machine parts around the world to unknown buyers. The company is still concerned about the credit risk posed by each customer, but is also concerned about other risks associated with conducting business with each customer, such as regulatory, political or reputational risk. For example, is the sale aiding a criminal act? Could it violate any laws? Is the transaction somehow associated with a terrorist or criminal organization?

Businesses and other institutions are generally well-equipped to manage and assess credit risk (e.g., by performing credit checks, requiring payment on certain terms such as in advance or under a letter of credit, etc.). However, these entities are generally not able to systematically evaluate and assess the other risks (such as political, regulatory, and/or reputational risks) that may be associated with transactions or other relationships.

Unfortunately, it is difficult to store, manage and retrieve this type of information. It would be desirable to provide systems, methods, apparatus, and schema for storing, managing and retrieving risk related information.

BRIEF DESCRIPTION OF THE DRAWINGS

FIG. 42 is a diagram of an exemplary screen display according to some embodiments;

FIG. 43 is a diagram of an exemplary screen display according to some embodiments;

DETAILED DESCRIPTION

Figure 1:
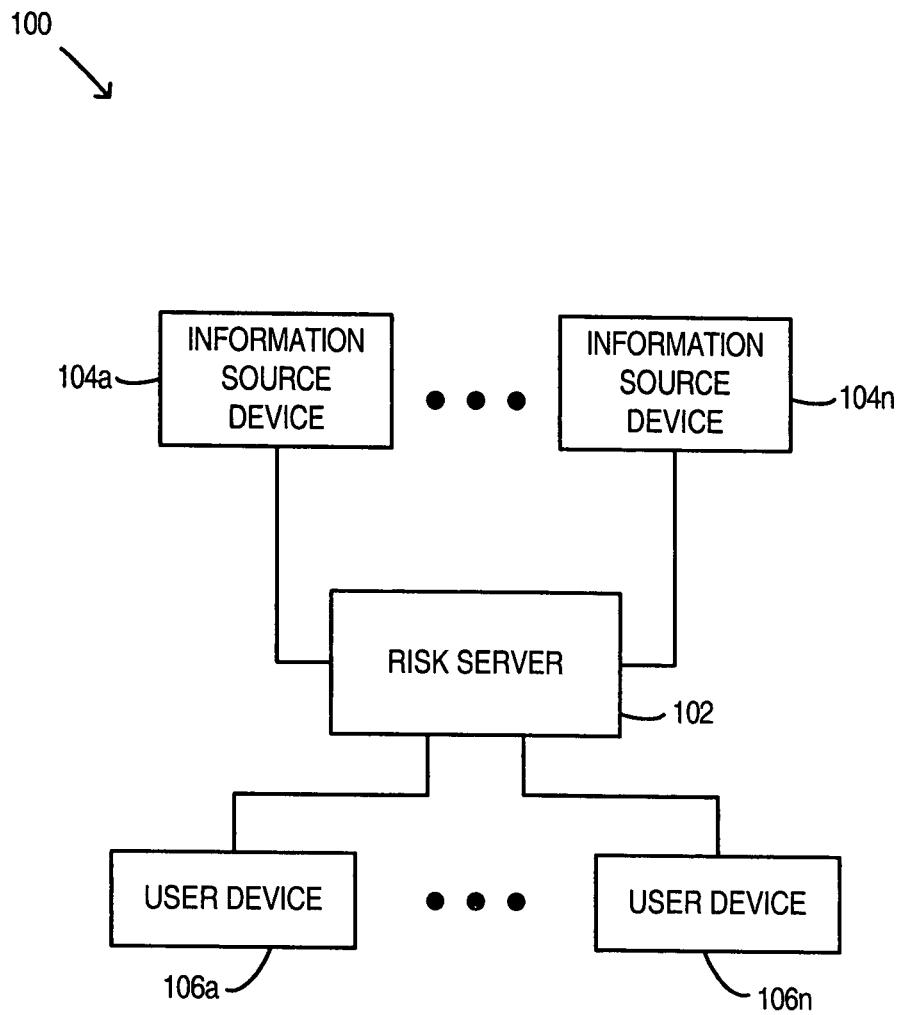
FIG. 1 is a block diagram of a system according to some embodiments.

To alleviate the problems inherent in the prior art, embodiments provide systems, methods, apparatus and means for storing, managing and retrieving information associated with risk. In some embodiments, risk may be identified, determined, assessed, and/or otherwise analyzed. Applicants have recognized that there is a need for systems, methods, apparatus and means for managing information associated with risk. In addition, Applicants have recognized that there is a need for a data structure that facilitates the identification of risk. Applicants have further realized that there is a need for systems, methods, apparatus and means for determining and/or assisting in the determination of risk.

One benefit of some embodiments is that information associated with risk may be collected from a wide variety of different types of information sources, assessed for relevance, checked to ensure the information is not redundant, and stored in a specially configured data structure. As a result, users such as financial institutions, businesses, government agencies, or the like may access the information to determine a risk associated with any given entity, object, and/or transaction. Some embodiments provide benefits such as automatically determining risk and/or automatically determining actions to be taken based on the risk. Other features and advantages that are derived from some embodiments will become apparent upon reading this disclosure.

TERMS AND DEFINITIONS

Some embodiments described herein are associated with a "network device". As used herein, the phrase "network device" may refer to any device that can communicate via a network. Examples of network devices include a Personal Computer (PC), a workstation, a server, a printer, a scanner, a facsimile machine, a copier, a Personal Digital Assistant (PDA), a storage device (e.g., a disk drive), a hub, a router, a switch, and a communication device (e.g., a modem, a wireless phone, etc.). Network devices may comprise one or more network components. As used herein, the term "network component" may refer to a network device, or a component, piece, portion, or combination of network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or of any other configuration and/or type that is or becomes known. Communication networks may include, for example, one or more networks configured to operate in accordance with the Fast Ethernet LAN transmission standard 802.3-2002® published by the Institute of Electrical and Electronics Engineers (IEEE).

Further, some embodiments herein are associated with "information" or "data". As used herein, the terms "information" and "data" may be used interchangeably and may refer to any data, text, voice, video, image, message, bit, packet, pulse, tone, waveform, and/or other type or configuration of signal and/or information. Information may be or include information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encrypted, and/or otherwise packaged or manipulated in accordance with any method that is or becomes known.

Some embodiments described herein are associated with "information indicative of" or "indicia" of information associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information.

In addition, some embodiments are associated with identifying, analyzing and utilizing information associated with "risk". As used herein, the term "risk" may generally refer to any possibility, chance, and/or likelihood of incurring and/or encountering peril, loss, hazard, danger, and/or injury. In some embodiments, "risk" may refer to any actual, perceived, inherent, intrinsic, and/or other form or type of peril, loss, hazard, danger, and/or injury. According to some embodiments, "risk" may refer to any individual, item, device, event, agent, organization, and/or other object or entity that may contribute to, cause, result from, and/or otherwise be associated with any type or form of risk. Risk may, according to some embodiments, be associated with any type and/or aspect of possibility of peril, loss, hazard, danger, and/or injury. Examples of risk may include, but are not limited to, financial risk, political risk, risk of injury, risk of theft, risk of damage, risk of terrorism, risk to reputation, regulatory risk, legal risk, war risk, and environmental risk.

Upon reading this disclosure, those skilled in the art will recognize that embodiments of the present invention may be used to identify, analyze, and utilize other types of information.

Some embodiments herein are associated with "risk segments" or "key risk segments". As used herein, the terms "risk segment" and "key risk segment" may be used interchangeably and may generally refer to any metric, item, identifier, category, and/or any other type of information that is determined and/or otherwise identified to be associated with the determination of risk. In some embodiments for example, risk segments may be or include any category and/or type of information that is determined to affect and/or be indicative of risk. Key risk segments may, for example, be important factors that are desirable and/or necessary to the analysis, assessment, and/or determination of risk. In some embodiments, key risk segments may include, but are not limited to, information associated with persons, items, organizations, relationships, events, and/or addresses.

System Overview

Referring first to FIG. 1, a block diagram of a system 100 to identify, analyze and utilize information associated with risk is shown. The various systems described herein are depicted for use in explanation, but not limitation, of described embodiments. Different types, layouts, quantities, and configurations of any of the systems described herein may be used without deviating from the scope of some embodiments of the present invention.

System 100 may comprise, for example, a risk server 102, one or more information source devices 104a-n, and/or one or more user devices 106a-n. In some embodiments, the risk server 102 may be or include multiple servers and/or devices (e.g., network devices) that may be, for example, distributed and/or otherwise coupled and/or connected. According to some embodiments, fewer or more components than are shown in FIG. 1 may be included within system 100. In some embodiments, any of the components 102, 104, 106 may be or include one or more network devices and/or may be configured in any manner that is or becomes known.

The risk server 102 may, according to some embodiments, be a computer server having one or processors as are commonly known and used in the art. In some embodiments, the risk server 102 may be configured and/or adapted to identify, analyze and utilize information associated with risk. For example, the risk server 102 may contain program code and/or other instructions or components directed to various processes to identify, analyze and utilize information associated with risk. In some embodiments, code stored by the risk server 102 may, for example, collect information from one or more of the information source devices 104a-n. In some embodiments, the information may be collected, retrieved, received from, harvested from, extracted from, and/or otherwise obtained from an information source device 104. According to some embodiments, the information may be or include information that is not associated with risk, information that is associated with risk, information indicative of risk, and/or any combination thereof.

In some embodiments, the risk server 102 may conduct and/or facilitate an identification, assessment, and/or analysis of the risk relevancy of information received from information source devices 104. For example, the risk server 102 may perform key word searches and analyses of received information to identify information that is relevant to risk (where the relevance is defined by an operator or administrator of the system). In some embodiments, the analysis of information is performed in an automated fashion by performing automated key word searches and predicate analyses on data packets and information obtained from information source devices 104. Information analyzed by the risk server 102 may, in some embodiments, be checked to determine whether it is redundant or cumulative with information previously analyzed and collected by the risk server 102. Information that is both relevant and non-redundant is formatted and stored in a database of the risk server.

This database of risk-relevant information may be used in a number of different ways. For example, the risk server 102 may receive a query or other information from one or more user devices 106a-n. In some embodiments, the query may be presented to determine whether a person, transaction, place, or other activity is risky. As a specific example, a financial institution may present a query to determine whether a person associated with a proposed financial transaction poses a political or regulatory risk to the financial institution. Embodiments allow such queries to be performed and responses to be provided based on current and up to date information that has been analyzed for its risk-relevance. Other types of queries and uses of the data will be described further below. Still others will become apparent to those skilled in the art upon reading this disclosure.

The risk server 102 may, according to some embodiments, utilize the query and/or other received information to determine, compute, look up, derive, and/or otherwise identify risk relevant information. Information indicative of or associated with the identified risk (e.g., a risk assessment, a computed risk factor, background materials, articles, alerts, etc.) may then, for example, be provided to, transmitted to, sent to, and/or otherwise made available to one or more of the user devices 106a-n.

The information source devices 104a-n may, according to some embodiments, be or include any type or configuration of devices (e.g., network devices) that are associated with the storage, delivery, presentation, sale, and/or management of information, and/or are otherwise associated with information. In some embodiments, one or more of the information source devices 104a-n may be or include devices owned, operated by, operated on behalf of, and/or otherwise associated with one or more news and/or press organizations, businesses, groups, and/or individuals. The information source device 104a may be or include, for example, a device operated by a commercial information source such as the Associated Press (AP) or a governmental information source such as the United States Department of the Treasury's Office of Foreign Assets Control (OFAC), the United States Federal Bureau of Investigation, the Bank of England, or the European Union. In some embodiments the information source device 104a may be operated by a commercial information provider such as Jane's™ Information Group. The information source device 104 may also or alternatively encompass print and/or other media that is entered into a computer system manually or automatically.

According to some embodiments, the user devices 106a-n may be or include any type or configuration of devices (e.g., network devices) that are associated with one or more users. For example, the user device 106a may be or include a PC, PDA, and/or wireless telephone owned, operated by, and/or operated on behalf of a user. In some embodiments a user may be or include any individual, group, organization, business, government, and/or other entity or combination of entities that desires access to information associated with risk and/or desires an assessment, determination, and/or identification of risk. Users may include, for example, financial institutions and/or financial institution employees, government agencies, bodies, and/or employees, businesses, institutions (e.g., colleges, universities, etc.), and/or private individuals.

In some embodiments, one or more of the components 102, 104, 106 of the system 100 may be or include the same device and/or may be components and/or portions of the same or similar devices. The risk server 102 may, for example, be included within and/or as a part of a device including one or more of the user devices 106a-n. In some embodiments, one or more of the user devices 106a-n may be or include and/or otherwise be associated with one or more of the information source devices 104a-n.

Figure 2:
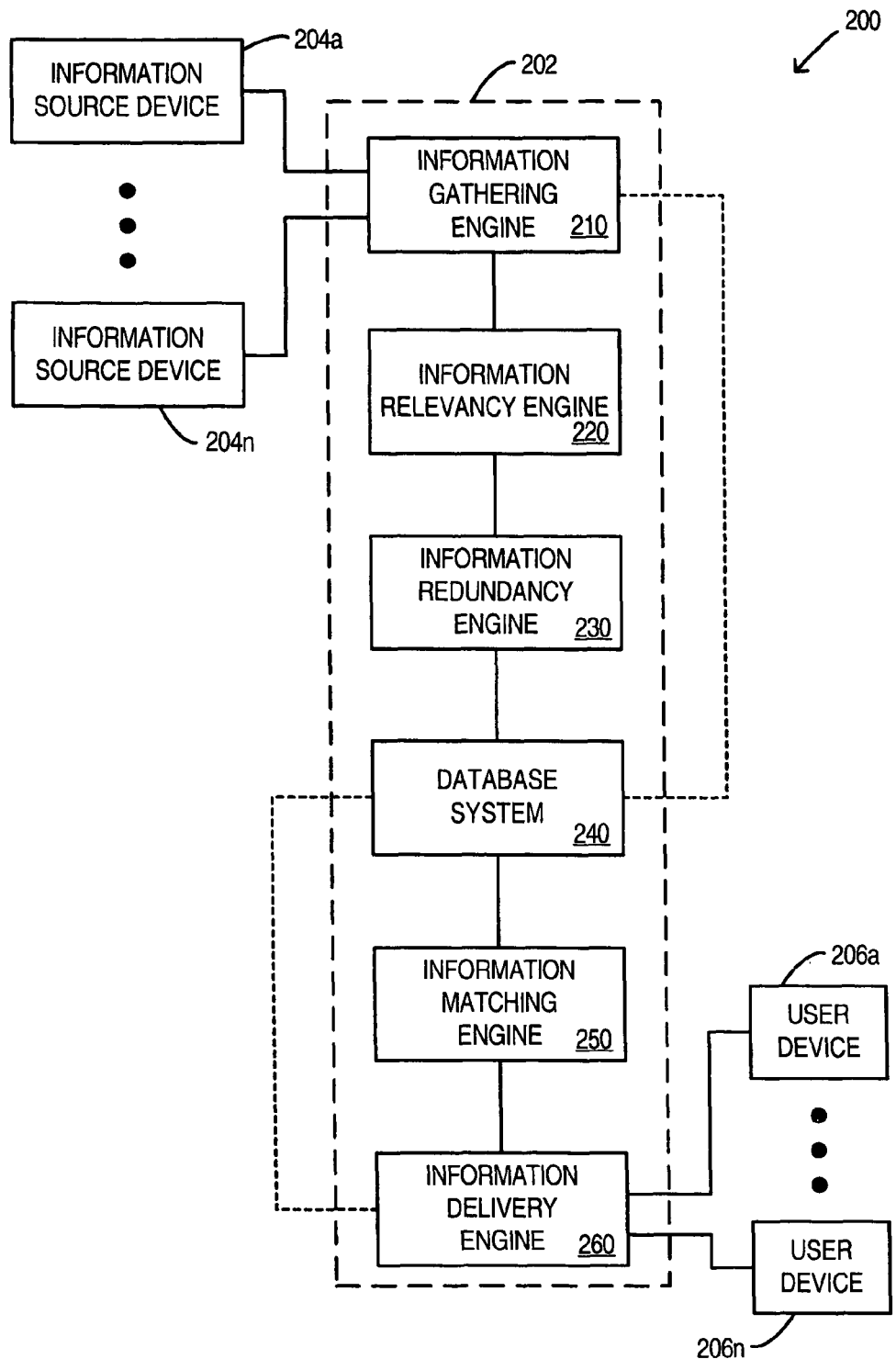
FIG. 2 is a block diagram of a system according to some embodiments.

Referring now to FIG. 2, a block diagram of a system 200 according to some embodiments is shown. The system 200 may include, according to some embodiments, a risk server 202, one or more information source devices 204a-n, and one or more user devices 206a-n. In some embodiments, the components 202, 204, 206 of the system 200 may be similar in configuration and/or functionality to the similarly-named components described in conjunction with FIG. 1 above.

In some embodiments, the risk server 202 may include multiple components such as an information gathering engine 210, an information relevancy engine 220, an information redundancy engine 230, a database system 240, an information matching engine 250, and/or an information delivery engine 260. According to some embodiments, the risk server 202 may not be included in system 200 and the functionality of the risk server 202 may instead be accomplished by one or more components such as the components 210, 220, 230, 240, 250, 260 shown in FIG. 2. In some embodiments, fewer or more components than are shown in FIG. 2 may be included in the system 200 and/or the risk server 202.

The information gathering engine 210 may, according to some embodiments, gather information from one or more of the information source devices 104a-n. For example, the information gathering engine 210 may receive, extract, and/or otherwise obtain information from various information sources such as the information source devices 204a-n. In some embodiments, the information gathered by the information gathering engine 210 may generally be indicative of and/or otherwise associated with risk. For example, in some embodiments, information gathering engine 210 is configured to retrieve or receive information from a variety of information source devices 104, where the information source devices 104 are selected based on an assessment that the sources provide information that is generally relevant to risk.

According to some embodiments, the information gathering engine 210 may perform other operations with respect to the gathered information. For example, the information gathering engine 210 may aggregate, translate, and/or otherwise manipulate the gathered information as is necessary or desired for the management of such information. The information may, according to some embodiments, be translated into one or more standardized formats. For example, the information gathering engine 210 may convert any or all gathered information into a standardized digital, eXtensible Markup Language (XML), and/or other format that is or becomes known. In one current embodiment, the information gathering engine 210 performs a coarse tagging of each received item of information, creating a data packet or document having document tags allowing the packet or document to be identified. Further tagging may be performed on data packets that are determined to include relevant data, as will be described further below.

In some embodiments, the information gathering engine 210 may forward, transmit, send, and/or otherwise provide the gathered information to the information relevancy engine 220. In some embodiments, certain items of information or data packets are sent directly from the information gathering engine 210 to a database system 240 for inclusion in one or more databases.

In some embodiments, an information relevancy engine 220 may receive and/or otherwise obtain information from the information gathering engine 210. In some embodiments, the information may be received in one or more standardized formats. The information may be received, for example, in a format that is in accordance with an XML, a Hyper Text Markup Language (HTML), and/or an eXtensible HTML (XHTML) template. According to some embodiments, the information relevancy engine 220 determines whether a data packet includes relevant information.

In some embodiments, the engine 220 assesses or measures an overall relevancy of the information in a data packet. For example, the information relevancy engine 220 may evaluate the information for a relevancy to risk. In some embodiments, information that is not relevant (e.g., the information in a data packet does not relate to risk) may be filtered out and/or deleted or removed. The risk relevant information contained within a data packet may also be tagged by the engine 220 (e.g., using a markup language or the like). This tagging allows the information to be stored in a useful manner in the database system 240. The remaining information that has been deemed to be relevant may then, according to some embodiments, be forwarded, transmitted, and/or otherwise be provided and/or made available to the information redundancy engine 230.

The information redundancy engine 230 may, in some embodiments, receive and/or otherwise obtain information (e.g., in the form of tagged or formatted data packets) from the information relevancy engine 220. The information redundancy engine 230 may then, for example, compare the received information to stored information to determine if the received information is redundant. According to some embodiments, the information redundancy engine 230 may compare the received information to information stored within and/or by the database system 240. Information that is determined not to be redundant may then be stored, for example, by and/or within the database system 240.

In some embodiments, the information redundancy engine 230 may prevent duplication of information within one or more databases (not shown in FIG. 2). For example, the information redundancy engine 230 may compare the received information to stored information to ensure that only information that is not already stored in the one or more databases will be added to the one or more databases (or other information stores). In some embodiments, the information redundancy engine 230 may include logic and/or code that perform more complex comparisons between the received information and any stored information.

For example, the information redundancy engine 230 may compare the story, subject, and/or material covered and/or described by both the received information and any stored information. In some embodiments, a pre-determined number of sources and/or pieces of information relating to a particular topic may be stored in the one or more databases, while any further sources and/or pieces of information covering and/or relating to the same topic may be considered redundant.

The database system 240 may, according to some embodiments, be or include one or more databases or other information stores (not shown in FIG. 2). In some embodiments, the database system 240 may store information associated with risk. The database system 240 may receive and/or store, for example, information received from the information gathering engine 210, the information relevancy engine 220, and/or the information redundancy engine 230. Any databases within and/or associated with the database system 240 may be or include any type and/or configuration of databases that are or become known.

In some embodiments for example, a database within the database system 240 may include one or more relational data structures. According to some embodiments, a relational data structure stored in the database of the database system 240 may be specially configured to store data in a manner conducive to facilitating the identification of risk. The data structure may include, for example, tables and relations that associate various key risk segments. Risk assessment and/or analysis may, according to some embodiments, utilize the special data structure to quickly, efficiently, and/or accurately identify and/or otherwise analyze risk. Various embodiments relating to such a specialized data structure will be described in subsequent sections of this disclosure (e.g., in conjunction with the description of FIGS. 13-35).

In some embodiments, the information matching engine 250 may perform and/or assist in the performance of risk assessment and/or analysis procedures as describe above in relation to the special data structure of the database system 240. For example, the information matching engine 250 may be in communication with one or more of the user devices 206a-n (e.g., via the information delivery engine 260). The information matching engine 250 may, in some embodiments, receive a query (or information indicative of a query) from one of the user devices 206.

The information matching engine 250 may then, for example, use information in the query to analyze potential risk information associated with a particular individual, item, event, organization, and/or other object or entity. In some embodiments, the information matching engine 250 may compare the query information to information stored within and/or by the database system 240. In such a manner, for example, the query information may be compared to stored information (e.g., that is associated with risk) to determine and/or identify any potential risk associated with the query information. The information matching engine 250 may also perform matching operations to assist in the retrieval of data from the database. For example, if a query seeks to find information related to a person's name such as John Smith, the information matching engine 250 may create additional queries to match variants to the person's name (e.g., such as Johnny Smith). Similarly, the information matching engine 250 may assist in ensuring that company names or other queries are expanded or presented to match a number of variants to ensure that a query is as accurate as possible.

In some embodiments, the risk server 202 may include an information delivery engine 260. The information delivery engine 260 may, according to some embodiments, manage and/or perform the transfer of information between the risk server 202 and the one or more user devices 206a-n. The information delivery engine 260 may, for example, receive queries and/or other information from one of the user devices 206 and/or may send information associated with risk and/or risk assessment information to the user devices 206. In some embodiments, the information delivery engine 260 may provide one or more of the user device 206a-n with direct access to the information stored within and/or by the database system 240. According to some embodiments, the information delivery engine 260 may broker information between the user devices 206 and the information matching engine 250.

The various components 210, 220, 230, 240, 250, 260 of the risk server 202 may, according to some embodiments, be configured in any manner that is or becomes practicable. For example, any of the components 210, 220, 230, 240, 250, 260 may be included within and/or as part of a single device (e.g., risk server 202) or multiple devices. In some embodiments, one or more of the components 210, 220, 230, 240, 250, 260 may be combined in one or more other components and/or devices. In some embodiments, the functionality of any or all of the components 210, 220, 230, 240, 250, 260 may be performed by a single device (e.g., risk server 202). According to some embodiments, the risk server 202 and/or any of the components 210, 220, 230, 240, 250, 260 may be associated with and/or included within either or both of the information source devices 204 and the user devices 206.

Further, the components 210, 220, 230, 240, 250, 260 and devices 202, 204, 206 described herein may, according to some embodiments, be or include any number of devices (e.g., network devices), objects, functions, procedures, code, and/or any combination thereof that is or becomes known. In some embodiments, for example, any or all of the components 210, 220, 230, 240, 250, 260 may be or include a software procedure, module, and/or object that is executed on and/or by the risk server 202, an information source device 204, a user device 206, and/or any combination thereof.

Figure 3:
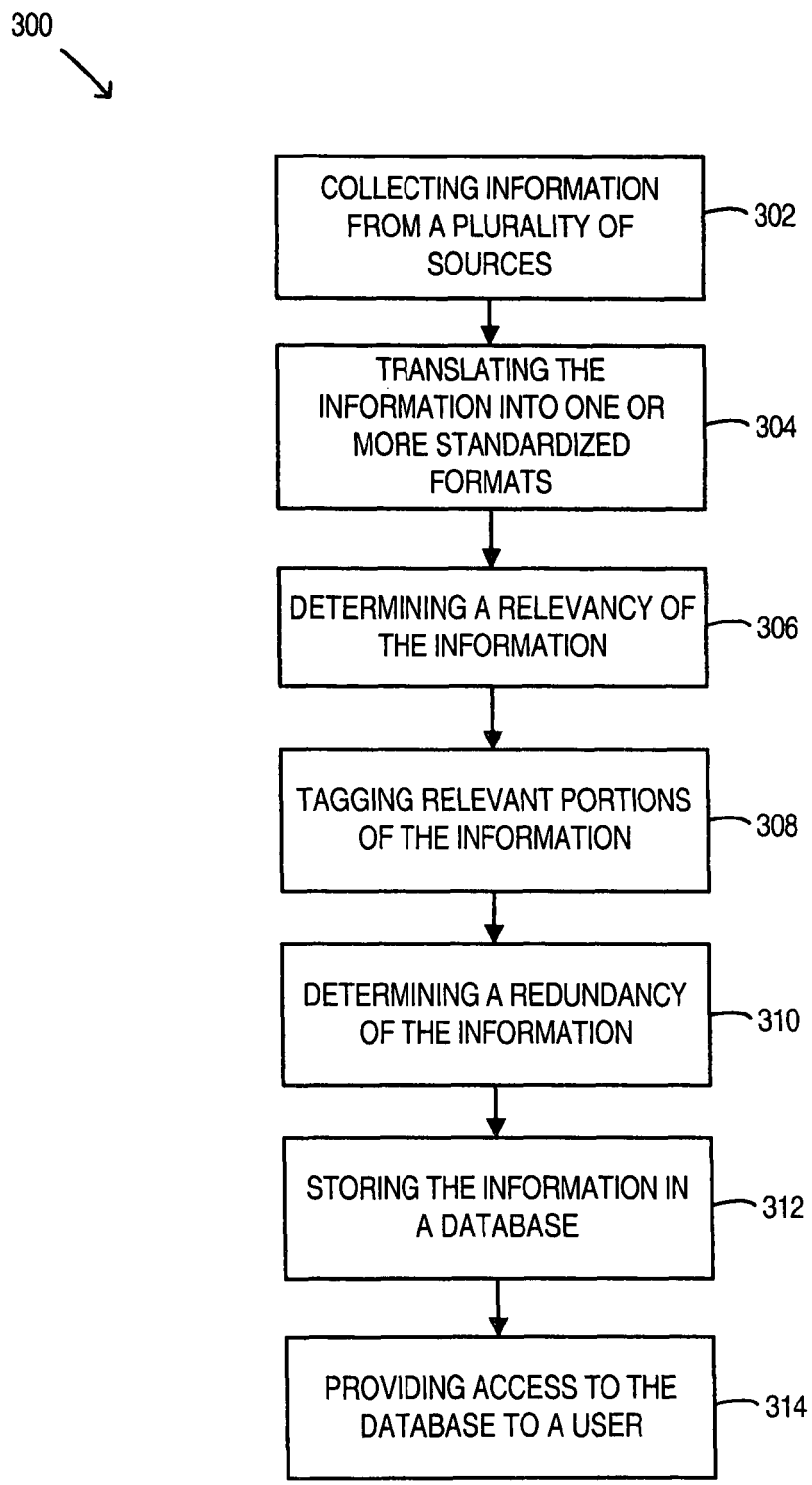
FIG. 3 is a flow diagram of a method according to some embodiments.

Referring now to FIG. 3, a method 300 according to some embodiments is shown. In some embodiments, the method 300 is conducted by and/or by utilizing any of the systems 100, 200 described above and/or may be otherwise associated with any of the systems 100, 200 and/or any of the system components described in conjunction with any of FIG. 1 and/or FIG. 2 above. The flow diagrams described herein do not necessarily imply a fixed order to the actions, and embodiments may be performed in any order that is practicable. Note that any of the methods described herein may be performed by hardware, software (including microcode), firmware, manual means, or any combination thereof. For example, a storage medium may store thereon instructions that when executed by a machine result in performance according to any of the embodiments described herein.

In some embodiments, the method 300 begins at 302 with the collection of information from a plurality of sources (e.g., from a plurality of information source devices 104, 204). According to some embodiments, the collecting at 302 is performed by the risk server 102, 202 and/or by the information gathering engine 210, as described above. As discussed above, and as will be discussed further below, information may be collected from a wide variety of information sources.

In some embodiments, processing at 302 is conducted under the control of the risk server 102, 202. In some embodiments, processing at 302 includes repeatedly retrieving or obtaining information from a selected list or set of information sources. For example, an operator controlling or otherwise operating risk server 102, 202 may configure the server to obtain or retrieve information from a list of information sources identified as providing risk relevant information. The information sources may be, for example, commercial data sources, Internet web sites, newspapers, government data sources, etc.

According to some embodiments, the information may be collected on a periodic basis, as needed or desired, and/or on any other basis that is or becomes practicable. The collecting may include, for example, receiving (e.g., via a scheduled information feed), extracting, gathering, harvesting (e.g., using a software robot or "bot"), and/or otherwise obtaining the information. In some embodiments, processing at 302 includes routinely checking data sources to determine if new or modified information is available, and, if so, retrieving the new or modified information. In this manner, the risk server 102, 202 may obtain current information from sources identified as providing relevant information.

The method 300 continues at 304, according to some embodiments, by translating the information into one or more standardized formats. The translating may be performed, according to some embodiments, by the information gathering engine 210 as described above. The information which is collected may include information in a variety of differing formats. In some embodiments, the information (or portions thereof) is converted into a standardized format and tagged with high-level document tags allowing the information to be processed further by the risk server 102, 202. In some embodiments, the information may not need to be translated and/or otherwise converted or standardized (e.g., the information may have been received in a standardized and/or acceptable format).

In some embodiments, the method 300 continues by determining a relevancy of each item of information (otherwise referred to herein as a "data packet" or "document"), at 306. For example, the information relevancy engine 220 may examine each data packet to determine if the information contained therein is relevant to risk and/or to the determination of risk. In some embodiments, portions of the information may be reviewed and/or analyzed to determine if the contents of the information are likely to be relevant to risk. According to some embodiments, a relevancy metric, rank, and/or score may be determined for the information (and/or portions of the information). Information that is ranked or scored lower than a pre-determined threshold may, according to some embodiments, be filtered, removed, and/or deleted. In some embodiments, two or more filtering steps may be used: an initial or coarse filtering to remove clearly non-relevant information, and one or more subsequent filtering steps to identify specific items of information that make an item of information relevant.

The method 300, in some embodiments, continues at 308 by tagging relevant portions of the information. According to some embodiments, the information relevancy engine 220 tags the portions of the information determined to have a relevancy with respect to risk. In some embodiments, only information that is determined to have a relevancy that satisfies a relevancy criterion are tagged. For example, portions of the information that are determined to have a relevancy score or rank higher than a pre-determined minimum threshold may be tagged. The tagging may generally be accomplished via any method and/or procedure that is or becomes known.

In some embodiments, at 310 the method 300 continues by determining a redundancy of the information. The information redundancy engine 230 may, for example, compare the information to stored information to determine if a newly received data packet includes information that is redundant with previously-received (and stored) information. In some embodiments, the redundancy of the information may be expressed as a metric, rank, score, and/or other value. The redundancy value may, for example, then be compared to a pre-determined redundancy threshold to determine whether the information in the newly received data packet should be added to the database, or be removed or deleted. In some embodiments, a determination may be made whether to update portions of the existing data with some or all of the information in the newly received data packet. According to some embodiments, only information which is equivalent to information that is already stored (e.g., in database system 240) is filtered or discarded. In some embodiments, only the tagged portions of the information are evaluated for redundancy.

The method 300 continues, in some embodiments, at 312 by storing the information contained in a newly received data packet in a database. For example, the information redundancy engine 230 may cause non-redundant information to be inserted into one or more databases. In some embodiments, the information redundancy engine 230 sends the data packet to the database system 240, which then stores the appropriate portions of the information. According to some embodiments, all received information that is deemed to be relevant is stored in the database system 240. In some embodiments, only tagged portions of information and/or only non-redundant portions of information are stored by the database system 240.

In some embodiments, the database system 240 includes a specially designed data structure in which to store the information. For example, the database system 240 may store one or more relational database schemas that are configured to facilitate the identification of risk. In some embodiments, the schemas may be structured to store the information in a manner that permits easy access to the information and/or allows risk-associated relationships to be easily and/or quickly identified. Similarly, in some embodiments, the tagging scheme applied at 308 is selected to include tags based on the database schema.

The method 300 continues at 314, in some embodiments, by providing access to the database (e.g., the database system 240) to a user. For example, once the database is populated with data from different information sources, the data can be utilized by a variety of users for a variety of different purposes. The information delivery engine 260 (and/or the information matching engine 250 or the risk server 102, 202), for example, allows a user to access the stored information. In some embodiments, the user may submit a query (e.g., utilizing a user device 106, 206) associated with identifying risk, to the information delivery engine 260 (and/or the information matching engine 250 or risk server 102, 202). The query may then be compared to the stored information to identify, quantify, assess, and/or otherwise analyze risk information.

In some embodiments, the risk server 102, 202 identifies information stored in the database system 240 that satisfies and/or is otherwise associated with the user's query. The information may be used, for example, to determine an action that is desirable and/or necessary (e.g., to reduce or avoid risk). According to some embodiments, the risk server 102, 202 and/or the information delivery engine 260 provides the identified information and/or the determined action to the user. The risk server 102, 202 may, for example, be operated to provide a recommended action that the user should undertake (e.g., avoid financial dealings with a certain individual, alert authorities regarding a certain transaction, etc.). In some embodiments, the determined action may be automatically undertaken by the risk server 102, 202 and/or one of the server components 210, 220, 230, 240, 250, 260.

In this manner, embodiments of the present invention may be utilized to obtain unstructured information from a large variety of types of sources, determine the relevancy of the unstructured information, structure the information according to a tagging scheme, determine whether the information is redundant or otherwise cumulative with previously obtained information, and store the information in a database in a manner that allows ready retrieval and use. Users of the database may use the information to make decisions regarding transactions, relationships, or the like which they were previously unable to assess from a risk perspective (particularly from a political, reputational, or regulatory risk perspective).

Information Gathering

Figure 4:
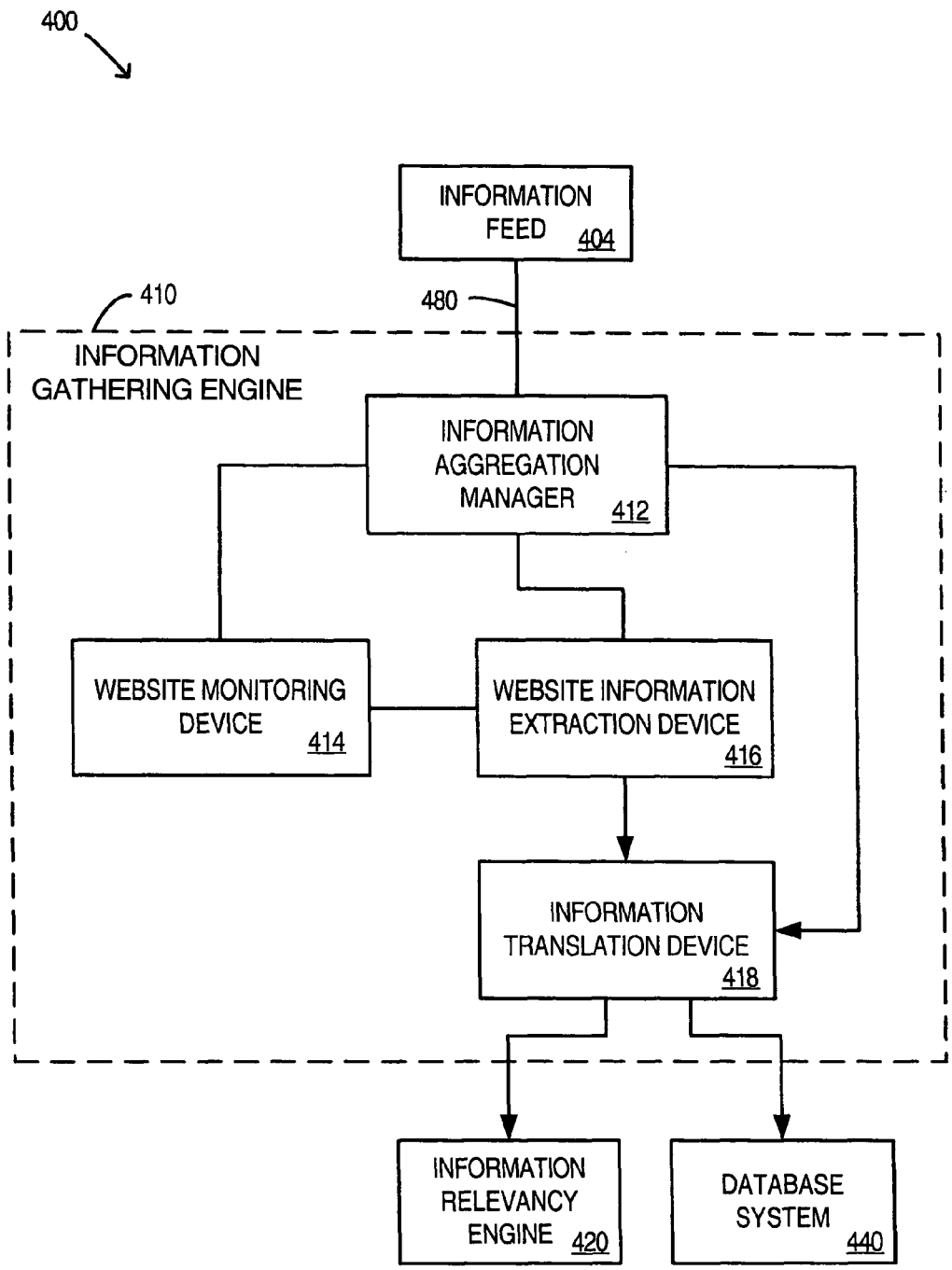
FIG. 4 is a block diagram of a system according to some embodiments.

Turning now to FIG. 4, a block diagram of a system 400 according to some embodiments is shown. In some embodiments, the system 400 is used to implement or perform the method 300 and/or may otherwise be associated with the method 300 (or any portions thereof) as described in conjunction with FIG. 3 above. The system 400 may, for example, be similar in configuration and/or functionality to the information gathering engine 210 (or the risk server 102, 202) and/or may perform in accordance with the procedures 302, 304 as described above.

In general, the system 400 is operable to control and/or perform the collection, aggregation and raw conversion of data from a plurality of information sources. The system, for example, allows the systematic and repeatable collection of source data from a large variety of different types of sources. The system allows the conversion of this source data into a common format used by the system, allowing further analysis, processing and manipulation of the data.

In some embodiments, the system 400 includes information feed 404 and information gathering engine 410. In some embodiments, the information gathering engine 410 includes an information aggregator 412, a website monitoring device 414, a website information extraction device 416, and/or an information translation device 418. The system 400, according to some embodiments, also or alternatively includes an information relevancy engine 420, a database system 440, and/or an information path 480. In some embodiments, the components 404, 410, 420, 440 of system 400 are similar in configuration and/or functionality to the similarly-named components described in conjunction with any FIG. 1 and/or FIG. 2 above.

In some embodiments, the system 400 also or alternatively includes a control mechanism and/or control inputs (shown as the information aggregation manager 412) that allow an operator of the system 400 to configure the operation of the system 400. For example, an operator may be able to configure or define the data to be collected, including the frequency with which it is to be collected from various sources. An operator may also, for example, be able to designate certain information sources as "pre-qualified" such that the data from those sources need not be processed using some or all of the components of the system 400 (e.g., the data may be passed directly to the information translation device 418 and/or may even be directly input to the database system 240 of FIG. 2).

In some embodiments, the information feed 404 includes information received from various information sources (e.g., information source devices 104, 204). Information gathering engine 410, for example, collects and/or otherwise obtains information from multiple sources via the information feed 404 and/or the information path 480. According to some embodiments, information aggregation manager 412 defines how, and from what sources, information is collected.

In some embodiments, such as where the information feed 404 includes one or more websites, a website monitoring device 414 keeps track of the information stored on and/or available from the websites. The website monitoring device 414 may, for example, determine when new, changed, and/or updated information is available from any monitored websites. The determination of new, changed, and/or updated information may then, according to some embodiments, be forwarded and/or otherwise provided to either or both of the information aggregation manager 412 and the website information extraction device 416. In some embodiments, the website monitoring device 414 may run or control a script associated with each website to be monitored. Each script defines how it's associated website is to be monitored in order to determine whether information on the website has been updated or otherwise changed. For example, in some embodiments, each time a website is monitored, a hash code is generated for each page on the website, where the hash code is a numeric representation of the information on the page. If a page is updated to change even a single word, the hash code will change and the website monitoring script will indicate that the website has changed.

When a monitored website has changed or is known to include new or updated information, a website extraction device 416 is operated to extract information from the website (or other information source). For example, the website information extraction device 416 may receive an indication from the website monitoring device 414 and/or from the information aggregation manager 412 that new, changed, and/or updated information is available at a particular website or group of websites.

Each website that is monitored by the system may have a separate extraction script associated with it. In one specific embodiment, extraction scripts may be coded using any of a number of so-called "visual web task" (VWT) tools that assist in the creation of executable spiders for download and extraction tasks. For example, the tool may be configured to navigate to a monitored website, and is instructed to follow certain links to a desired page. The tool is configured to find particular areas on the desired page that include relevant or desired information. For example, the tool may be used to monitor the FBI's top ten most wanted list by causing the tool to navigate to: http://www.fbi.gov/mostwant/topten/fugitives/fugitives.htm The tool may also be configured to extract each picture on the overview page, and then navigate thru the link associated with each picture to the page containing detailed information about each fugitive. The tool then collects the information from each page and outputs the information as a formatted data packet for further processing by the system.

In some embodiments, the efficiency and accuracy of the extraction and monitoring scripts are dependent on each site's formatting. When a site's format changes (e.g., if the FBI's Top Ten list were moved or broken into different pages), the efficiency and accuracy of the extracted data may drop. To identify such changes, each batch or group of extracted data is analyzed to identify changes in output quality. For example, if a site normally has a high output of data, but the output suddenly drops, the site may be flagged for further inspection (e.g., by a system operator).

The website information extraction device 416 may receive, for example, a list and/or feed including one or more Uniform Resource Locator (URL) addresses that are associated with desired information. A system operator, for example, may specify the list such that the engine 410 maintains a current list of websites that are to be monitored and/or from which information is to be extracted. In some embodiments, websites may be added or removed from the list as is necessary and/or desired to effectuate the extraction of the desired types and/or quantities of information.

In some embodiments, the website information extraction device 416 may be or include a software program, module, and/or package which may form, for example, a software "bot" or other harvesting or downloading procedure. The website information extraction device 416 may also or alternatively be configured to extract information from designated websites or information sources on a scheduled basis. According to some embodiments, the website information extraction device 416 forwards any extracted information to the information translation device 418 for any required and/or desired formatting, conversion, and/or standardization.

In some embodiments, the information translation device 418 receives information from either or both of the information aggregation manager 412 and the website information extraction device 416. According to some embodiments, the information translation device 418 converts and/or translates received information into one or more standardized formats. For example, the information translation device 418 may receive various types of information (e.g., website information, news articles, watch lists, regulatory documents, etc.) and convert each of the various types of information into an XML format.

In some embodiments, received information may already be configured in an acceptable standardized format and may not require translation (e.g., for sources designated as "pre-qualified"). The information translation device 418 may, according to some embodiments, also or alternatively translate the received information from one or more languages, codes, and/or other types of formats, into one or more desirable and/or useful formats, languages, and/or configurations. The information translation device 418 may, according to some embodiments, be or include an encryption device for encrypting and/or decrypting the information and/or may also or alternatively compress, decompress, and/or otherwise translate the information.

According to some embodiments, the information translation device 418 forwards and/or otherwise provides the standardized information to either or both of the information redundancy engine 420 and the database system 440. Information that originated from a commercial information source, for example, may be pre-formatted and/or standardized, and/or may be pre-determined to be relevant (e.g., pre-determined to be associated with risk), and thus may be sent directly to the database system 440 for storage.

For example, certain pre-determined types and/or pieces of information may be purchased from a commercial source. In other words, information may, according to some embodiments, not be purchased unless it is pre-determined to be relevant for one or more desired purposes. This "pre-qualified", pre-formatted and/or specially selected information is, according to some embodiments, sent by the information translation device 418 directly to the database system 440 for storage (e.g., in a database). Other public websites may also be designated as "pre-qualified". For example, a system operator may determine that the FBI's most wanted list is always considered to be relevant information. Information extracted from this website may, thus, be forwarded directly to the database system 440 for storage. Other information, such as information extracted from websites and other sources may be forwarded to the information relevancy engine 420 to determine if the information is relevant.

Figure 5:
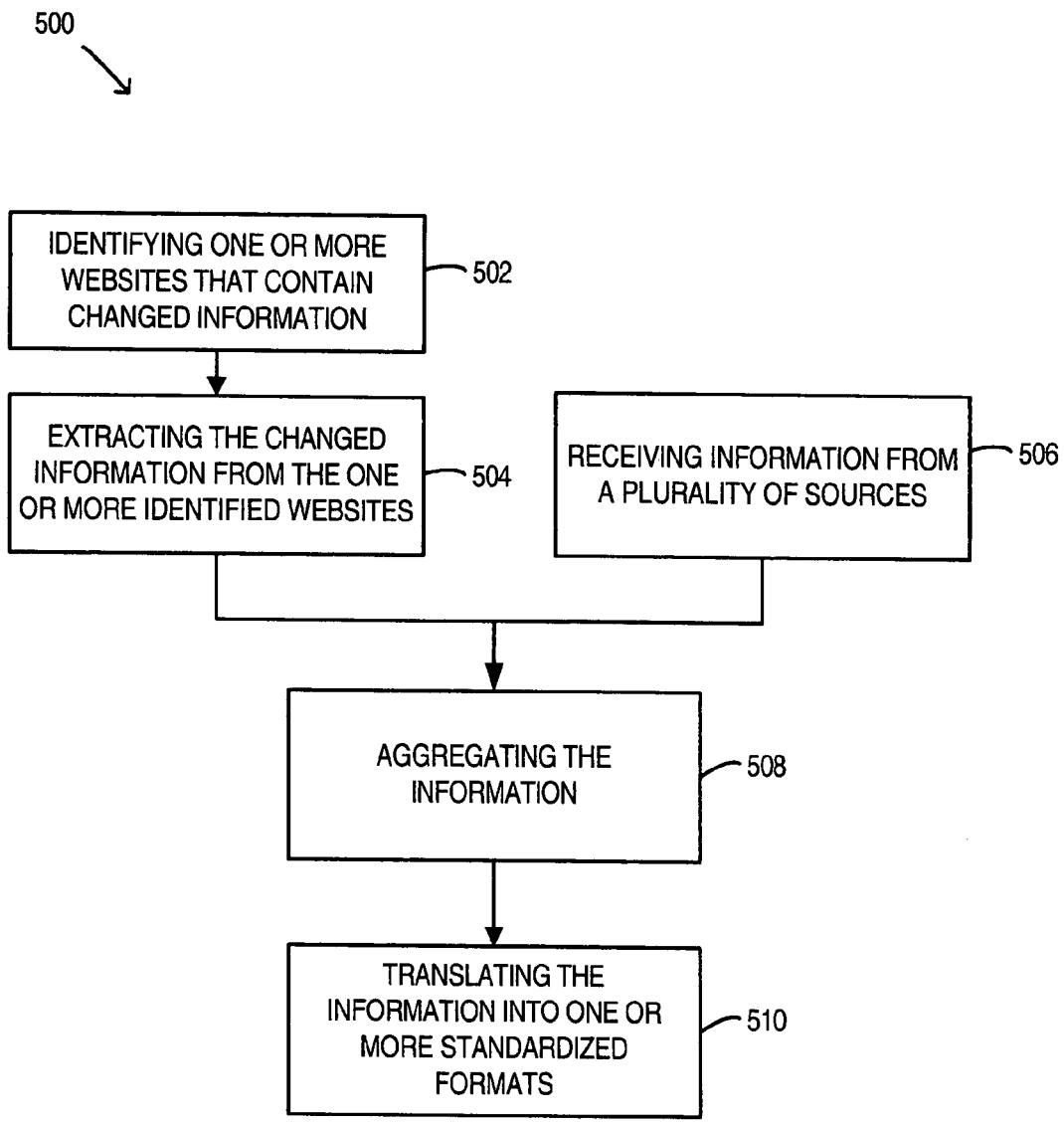
FIG. 5 is a flow diagram of a method according to some embodiments.

Referring now to FIG. 5, a method 500 according to some embodiments is shown. In some embodiments, the method 500 is conducted by and/or by utilizing any of the systems 100, 200, 400 described above and/or is otherwise associated with any of the systems 100, 200, 400 and/or any of the system components (e.g., the information gathering engine 210, 410) described in conjunction with any of FIG. 1, FIG. 2, and/or FIG. 4 above. In some embodiments, the method 500 is or includes a portion of and/or a procedure within other methods such as method 300 described above.

In some embodiments, the method 500 begins at 502 by identifying one or more websites that contain (or are believed to contain) relevant information. The website monitoring device 414 may, for example, determine whether one or more monitored websites (e.g., websites on a list of websites to be monitored) include new, changed, updated, and/or other information that may be of interest. In some embodiments, the Internet may be searched for websites that may include and/or may otherwise be associated with relevant information (e.g., information associated with risk). In some embodiments, a website on a list of websites to be monitored may be evaluated to determine if the website should remain on the list. Websites that have not been updated for long periods of time, for example, may be dropped from the list. Other websites may also or alternatively be added to the list when a determination is made that the website may contain desirable and/or useful information (e.g., information associated with risk).

The method 500 continues, according to some embodiments, by extracting the information from the one or more websites, at 504. For example, the website information extraction device 416 may utilize information associated with the identified one or more websites (e.g., a URL) to locate the one or more websites and extract the information. In some embodiments, the information available at an identified website may be searched, analyzed, and/or otherwise examined to determine which portions of available information are desired. According to some embodiments, all of the information provided by an identified website may be extracted.

At 506, the method 500, according to some embodiments, includes receiving information from a plurality of sources. The receiving at 506 may include, for example, receiving the information extracted at 504. In some embodiments, other information may also or alternatively be received. For example, information may be collected by the information gathering engine 210, 410 from a plurality of information source devices 104, 204 and/or information feeds 404. In some embodiments, any or all of the information may be received via a scheduled and/or otherwise pre-arranged feed. For example, a commercial or governmental information source may be contracted to deliver certain types of information (e.g., on a periodic basis, as new information becomes available, etc.).

According to some embodiments, the method 500 continues at 508 by aggregating the information. The information aggregation manager 412 (and/or the information gathering engine 210, 410) may, for example, combine the information received from the plurality of sources into one or more data packets, packages, feeds, and/or groups. In some embodiments, the information from the various sources may be combined and/or grouped according to various factors. The information may be grouped, for example, based upon the type of information source, the quality and/or reliability of the information source, and/or may be based upon the information type, format, and/or content.

In some embodiments, the method 500 continues by translating the information into one or more standardized formats, at 510. For example, the information translation device 418 (and/or the information gathering engine 210, 410) converts and/or otherwise transforms the information into various formats. In some embodiments, only portions of the information may require translation. Translation may include, for example, translating information from one language to another, converting the information from one format to another, organizing the information into one or more formats and/or templates, and/or otherwise converting, standardizing, decoding, decrypting, decompressing, and/or manipulating the information.

Figure 6:
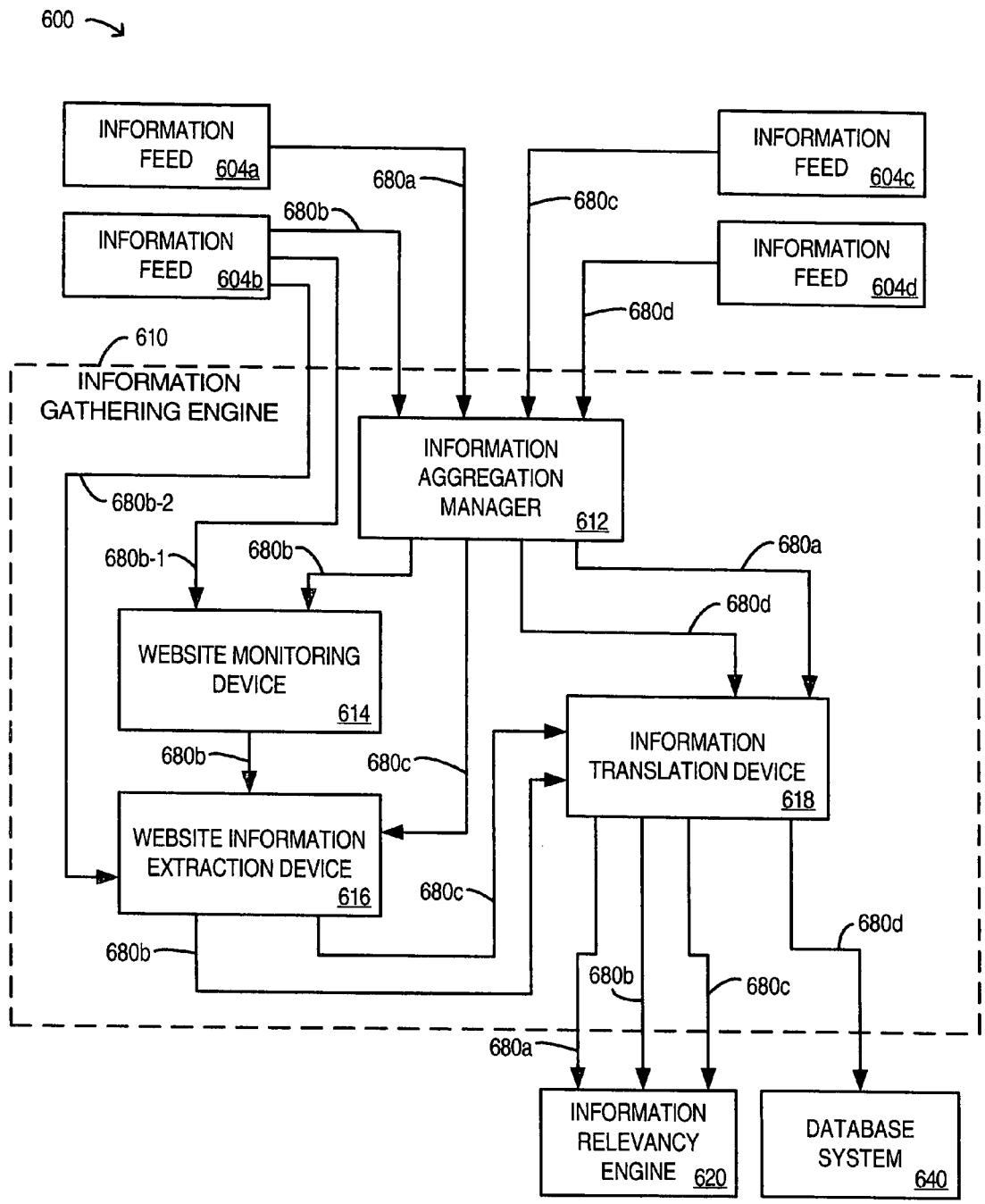
FIG. 6 is a block diagram of a system according to some embodiments.

FIG. 6 shows a block diagram of a system 600 according to some embodiments. In some embodiments, the system 600 is used to implement or perform and/or may otherwise be associated with the methods 300, 500 (or any portions thereof) as described in conjunction with any of FIG. 3 and/or FIG. 5 above. The system 600, according to some embodiments, is similar in configuration and/or functionality to the system 400 described above.

According to some embodiments, the system 600 includes multiple information feeds 604*a-d* and an information gathering engine 610. The information gathering engine 610 includes, for example, an information aggregation manager 612, a website monitoring device 614, a website information extraction device 616, and an information translation device 618. In some embodiments, the system 600 also or alternatively includes an information relevancy engine 620 and/or a database system 640. In some embodiments, the components 604, 610, 620, 640 of system 600 may be similar in configuration and/or functionality to the similarly-named components described in conjunction with any of FIG. 1, FIG. 2, and/or FIG. 4 above.

In some embodiments, the various information feeds 604*a-d* correspond to and/or otherwise are associated with various information source devices 104, 204. According to some embodiments, various types of information are received from the information feeds 604 and/or the information received from the information feeds 604 are treated and/or handled differently within system 600 and/or within the information gathering device 610.

For example, the information feed 604*a* may provide information from a news source such as a newspaper or broadcast network. The information may be or include, for example, a news article describing the results of a political election. In some such embodiments, the information may be received by the information aggregation manager 612 of the information gathering engine 610 via an information path 680*a*. In some embodiments, the information from the information feed 604*a* is aggregated and/or otherwise processed by the information aggregation manager 612 (e.g., combined and/or grouped with other news articles covering the same election). The information may then, for example, continue along the information path 680*a* to the information translation device 618. In some embodiments, the information translation device 618 operates to translate received information into a common format so that it may be passed to the information relevancy engine 620 and/or the database system 640 for further processing. In some embodiments, the information translation device 618 may further perform preliminary or coarse tagging of information to facilitate further processing. For example, the information translation device 618 may insert tags that define the beginning and the end of the document, the title, and other basic document information (if readily discernable). According to some embodiments, the article may also or alternatively be converted into a standardized format such as may be defined by an XML template. In some embodiments, the article (now contained in a standardized data packet) continues along the information path 680*a* to the information relevancy engine 620, where, for example, the relevancy of the article (e.g., with respect to risk) is determined.

In some embodiments, the information feed 604*b* provides information from a monitored website. For example, the information feed 604*b* may be associated with a website such as a terrorist watch group website that posts information relating to suspected terrorists. Such information is, for example, directed along the information path 680*b* to the information aggregation manager 612. The information aggregation manager 612, for example, sends the information along the information path 680*b* through the website monitoring device 614 and to the website extraction device 616. In some embodiments, the information may be sent along the information path 680*b*-1 directly from the information source device 604*b* to the website monitoring device 614. According to some embodiments, the information may be sent and/or retrieved directly from the information source device 604*b* to the website information extraction device 616 (e.g., via the information path 680*b*-2). The website is monitored, for example, by the website monitoring device 614, which may direct the website information extraction device 616 to retrieve the information from the website when changes or updates in the website are detected.

In some embodiments, the website information is sent further along the information path 680*b* to the information translation device 618. The information translation device 618, according to some embodiments, performs various transformations on the website information (e.g., such as the translations, conversions, and tagging described above and elsewhere herein). In some embodiments, the information is then be directed further along the information path 680*b* to the information relevancy engine 620, where, for example, the relevancy of the website information (e.g., with respect to risk) is determined.

According to some embodiments, the information feed 604*c* provides information from one or more websites. The information may include, for example, information from a website that provides important information (or information having known relevance) on a regular basis (e.g., via a subscription). The website may include, for example, a website operated by the Jane'S™ Information Group that provides security and other intelligence information. In some embodiments, the information (such as security intelligence information) may be received by the information aggregation manager 612 via the information path 680*c*. According to some embodiments, the information is extracted from the Jane'S™ website using the website information extraction device 616. In other embodiments, the information may be provided by Jane's™ directly (e.g., via a scheduled data export or download).

As another example, the information feed 604*c*, according to some embodiments, provides information from an entity engaged in the collection of data from hardcopy and other sources. For example, an entity may be engaged to obtain and collect information from a variety of sources such as municipalities or other entities by scanning, entering data, and/or otherwise processing information. As a specific example, a service provider may be engaged to scan and enter data from immigration records and visa applications which are otherwise unavailable in electronic form. The information source (e.g., in this example, a service provider that scans and enters the data) may, for example, provide the information via an information feed (such as the information feed 604*c*) and/or may process the information as described above.

In some embodiments, the information received is sent along the information path 680*c* to the information translation device 618. The information translation device 618, according to some embodiments, performs various transformations on the information (e.g., such as the translations, conversions, and tagging described above and elsewhere herein). In some embodiments, the information is then be directed further along the information path 680*c* to the information relevancy engine 620, where, for example, the relevancy of the information (e.g., with respect to risk) is determined.

In some embodiments, information is received from a "pre-qualified" information source, and/or an information source that is known to contain risk relevant information in a desired or otherwise known format. In such embodiments, the information is sent directly from the information aggregation manager 612 to the information relevancy engine 620 (path not shown in FIG. 6). In some embodiments, whether the information requires processing or not, it may be known that the information provided by is relevant and/or non-redundant. The information is then, for example, sent directly from the information gathering engine 610 (e.g., via the information path 680*d*) to the database system 640 for storage.

As a specific illustrative example, an operator of the system 600 may designate the OFAC list published by the U.S. Department of Treasury to be a "pre-qualified" source having information deemed to be risk relevant, non-redundant, and/or provided in a known format. Each time the OFAC list is updated, the list is received by the information gathering engine 610 and processed along path 680*d*, for example. Other information sources may also be treated in a similar manner. In general, embodiments allow different information sources to be treated differently, depending on the nature of the data. Sources known to contain risk relevant data in a known format can be, for example, readily processed and transmitted to database system 640.

In some embodiments, the information from such an information source may require further processing and/or translation and the information may be sent along the information path 680*d* to the information translation device 618. The information translation device 618, according to some embodiments, performs various transformations on the website information (e.g., such as the translations, conversions, and tagging described above and elsewhere herein). For example, in some embodiments, the OFAC list may require formatting, tagging, and/or other processes that may be performed by the information translation device 618.

The exemplary information types and sources described above are provided for illustrative purposes only. Other variations of information types and/or sources may be incorporated into some embodiments. The information paths 680 are also described in an illustrative manner. For example, a news article (e.g., information feed 604*a*) can be sent directly to the database system 640 for storage without being processed by the information translation device 618. Similarly, website information (e.g., information feeds 604*b*, 604*c*) may not require a website information extraction device 616 and/or may also or alternatively be sent directly to the database system 640. Any information sources, types, and/or paths that are or become desirable and/or useful may be utilized to practice some embodiments.

Relevancy Engine

Figure 7:
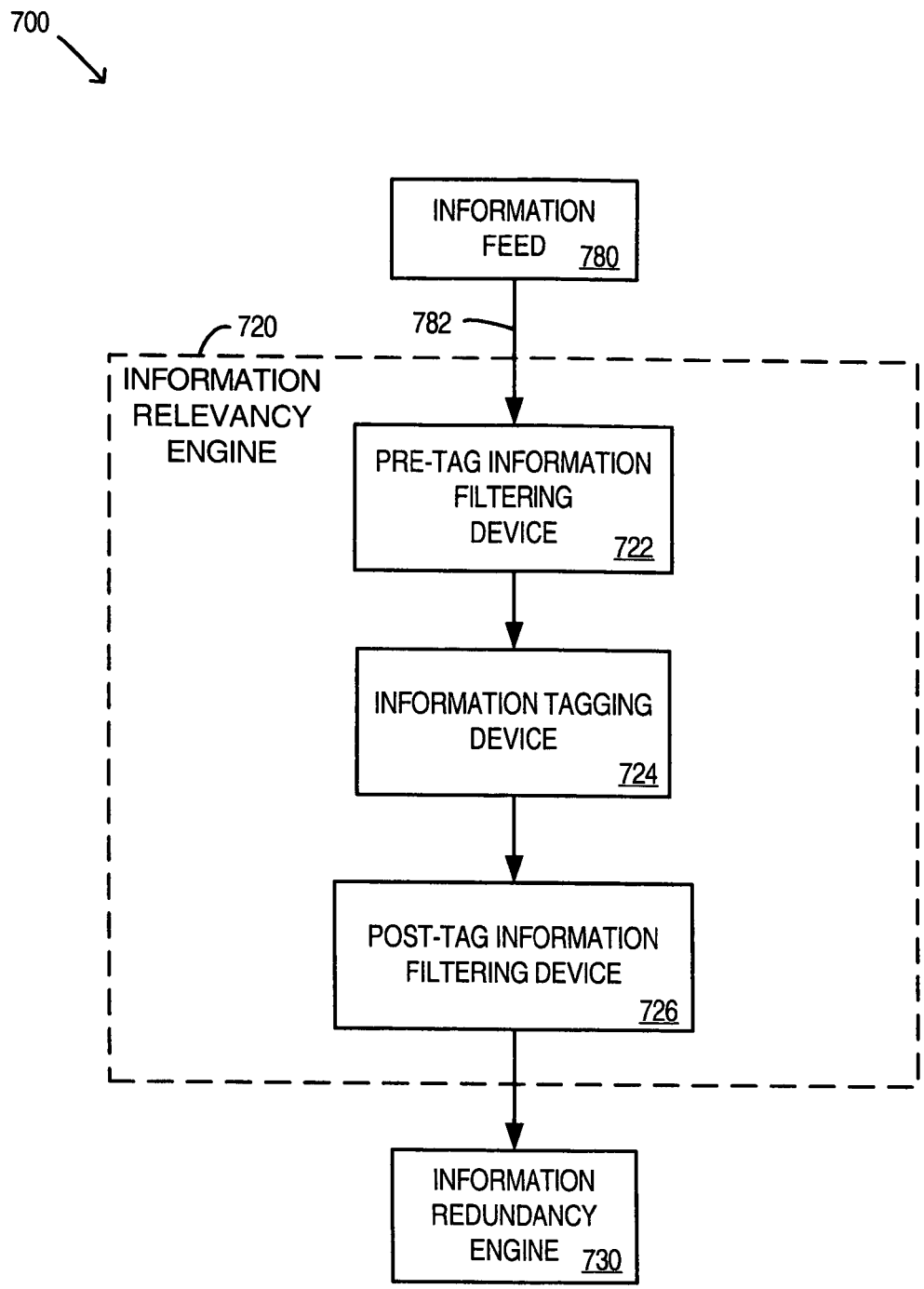
FIG. 7 is a block diagram of a system according to some embodiments.

Turning now to FIG. 7, a block diagram of a system 700 according to some embodiments is shown. In some embodiments, the system 700 is used to implement or perform the methods 300, 500 and/or may otherwise be associated with the methods 300, 500 (or any portions thereof) as described in conjunction with any of FIG. 3 and/or FIG. 5 above. The system 700 may, for example, be similar in configuration and/or functionality to the information relevancy engine 220, 420, 620 (or the risk server 102, 202) and/or may perform in accordance with the procedures 306, 308 as described above.

The system 700 includes an information relevancy engine 720 that is configured and operable to receive data from information feed 780, filter non-relevant data out of the information feed, tag the relevant data, and output the tagged data for further processing. Features of some embodiments of an information relevancy engine 720 will be described in conjunction with an illustrative example. In the illustrative example, a number of data packets have been collected from information sources (e.g., by the information gathering engine 410 described above). As discussed above, each of the information sources are selected as generally providing risk-relevant information. However, because there may be a huge amount of information gathered from the sources, not all of the information may actually be relevant to risk.

Embodiments allow the configuration and operation of relevancy engine 720 to filter out information that is deemed to include non-relevant data. As will be described, the operator of the relevancy engine can configure and adapt the engine to vary the type of information that is considered to be risk relevant (for example, a system operated on behalf of a governmental entity may put less emphasis on risk associated with financial transactions than a system operated on behalf of a financial institution).

In the illustrative example, the operator of the system has determined that information associated with the term "fugitive" is generally relevant. Further, the operator has specified that documents or packets of data that include the term "fugitive" must be used in conjunction with one or more associated terms that tend to indicate that the term is used in a manner of interest. As a specific example, the operator has specified that the term "fugitive" is risk-relevant if it is used in conjunction with a person's name, a place, and/or one or more verbs (such as "flight", "flee" or "escape"). The system operator may define a number of such terms and relationships to identify data that it considers to be relevant. The set of terms may be updated as needed.

In the illustrative example, two data packets of information are provided to information relevancy engine: a first data packet retrieved from a money laundering website discussing a fugitive named John Smith who fled the United States to seek refuge in Mexico, and a second data packet retrieved from the same money laundering website which simply includes a dictionary definition of the term "fugitive" (i.e., defining the term as: "Running away or fleeing, as from the law"). Of course, in operation, many other data packets may be received and processed by the information relevancy engine.

Referring again to FIG. 7, in some embodiments, the information relevancy engine 720 includes a pre-tag information filtering device 722, an information tagging device 724, and/or a post-tag information filtering device 726. The system 700 may, according to some embodiments, also or alternatively include an information redundancy engine 730, an information feed 780, and/or an information path 782. In some embodiments, the components 720, 730 of system 700 may be similar in configuration and/or functionality to the similarly-named components described in conjunction with any of FIG. 1, FIG. 2, FIG. 4, and/or FIG. 6 above.

In some embodiments, some or all of the system 700 may be implemented using commercially-available software configured to perform information tagging. As a specific example, the ClearTags® intelligent tagging engine offered by ClearForest, Inc.® of New York, N.Y. may be used to apply tags to information received via information feed 780 pursuant to rules established by an operator of the information relevancy engine 720. Other custom or commercial software may also or alternatively be used without deviating from some embodiments.

In some embodiments, the information feed 780 may be or include information received from the information gathering device 210, 410, 610. The information feed 780 may include and/or be fed by, for example, the information path 480, 680 from the systems 400, 600 described above. In some embodiments, the information feed 780 may be or include information from other sources. According to some embodiments, the information feed 780 may provide information to the pre-tag filtering device 722 (and/or to the information relevancy engine 720) via the information path 782.

The information may also or alternatively be received in one or more standardized formats (e.g., as described herein) and/or may include tags identifying certain information types. For example, the information received via the information path 782 may be formatted as packets or items of data representing a single document or item of information retrieved by, for example, the information gathering device 210, 410, 610. Each packet or item of data may be formatted using coarse document tags (e.g., which identify the start and end of the document, and may also identify the source, date or a other essential characteristics of the packet or item of data).

In some embodiments, the pre-tag filtering device 722 is configured and operated to filter each of the data packets provided by information feed 780. In some embodiments, each data packet is filtered by identifying the presence or absence of predetermined keywords or phrases selected as indicators of risk-relevant information. According to some embodiments, the filtering may be based on a relevancy score or determination (e.g., based on the presence or lack of identified keywords, phrases or collections of keywords). The pre-tag filtering device 722 may, for example, remove, delete, and/or otherwise discard any data packets (or, in some embodiments, portions of data packets) that are determined not to include risk relevant information. In some embodiments, logic may be included within the pre-tag filtering device 722, for example, that identifies unwanted and/or unnecessary information.

Continuing the illustrative example introduced above, a system operator may configure the system to search for a number of keywords, including the keyword "fugitive". Pre-tag information filtering device 722 may, in the example, perform keyword searches against each incoming data packet to identify whether the data packet includes the term "fugitive." In some embodiments, the system may be configured to search for predetermined keyword densities. For example, if the term "fugitive" is used only once in a data packet including 10,000 words, the data packet may be deemed non-relevant (unless some other term or terms are present in sufficient density). If the term "fugitive" is used ten times in a document containing one-hundred words, the data packet may be initially deemed to be relevant (although other associated terms may also be required as will be discussed below). By modifying and updating keyword and keyword density information, a system operator can respond to changed circumstances and can improve the accuracy of information filtering, thereby obtaining highly relevant data for further processing. In some embodiments, the pre-tag information filtering device 722 is not the final determination of relevancy, instead, it is a coarse or initial screen for relevancy. A data packet that is deemed initially relevant by the device 722 may still be determined to be non-relevant by later processing to be described further below.

In the illustrative embodiment, two different data packets are received for analysis. Both data packets contain a key word searched by the system. For illustration, assume that both data packets contain it in sufficient density to pass the initial relevancy query.

Those data packets that pass the filtering at filtering device 722 are processed further by the information tagging device 724 which receives the filtered information from the pre-tag information filtering device 722. In some embodiments, the tagging device 724 operates to both identify information and tag the information in the data packets. In some embodiments, the tagging device 724 again searches each data packet for the presence of keywords that are deemed to be relevant to risk. For example, the term "fugitive" may again be searched for. If keywords are found, they are tagged so that they may be used in further processing. The tagging may involve, for example, inserting tags (e.g., XML tags) into the information.

Other information associated with keywords may also be searched for and tagged. For example, the term "fugitive" may be associated with one or more associated terms that have been determined to be present in relevant data packets. In the example, if the term "fugitive" is present in a data packet, associated terms such as "flight", or "escape" must also be present for the data packet to be relevant. Other associated terms may also need to be present, such as a relationship of the term to a person, an organization or a place. In the example, the data packet about "John Smith" may be analyzed to identify that the key word "fugitive" is present, along with an associated action term ("fled") and a relationship to a person ("John Smith") and a place ("the United States" and "Mexico"), indicating that the data packet is relevant. Each of the terms may be tagged for further processing. In the example, the data packet including the dictionary definition may fail processing by the information tagging device 724 because, although it contains the keyword "fugitive" and an action term "running away" or "fleeing", it lacks a relationship term (there is no person, place or organization related to the keyword). This data packet may be determined to be non-relevant and not tagged by the information tagging device 724.

In some embodiments for example, the tagging device 724 may identify relevant information and may tag the information with one or more appropriate tags. In some embodiments, the tagging device 724 may determine a relevancy score, rank, metric, and/or other value associated with relevancy. According to some embodiments, the information may be tagged to identify and/or associate the relevancy metric with the information. Other codes, identifiers, and/or other information may also or alternatively be associated with tags that are assigned to and/or inserted within the information.

According to some embodiments, the tagged data packet is received by the post-tag information filtering device 726. In some embodiments for example, the post-tag information filtering device 726 may perform a second filtration of the information. Information that is relevant (e.g., that passed the first filter by the pre-tag filtering device 722) but that has a relevancy score or metric that falls below a certain threshold, for example, may be removed, deleted, and/or otherwise discarded by the post-tag information filtering device 726.

In some embodiments, the post-tag information filtering device 726 may filter the information based on other criteria. According to some embodiments, the post-tag information filtering device 726 may not be included in system 700 and/or within the information relevancy engine 720 (e.g., the second filtration of information may not be required and/or desired).

In some embodiments, the post-tag information filtering device 726 performs a final tagging of the data packet to facilitate further processing. As an example, post-tag information filtering device 726 may include functionality provided by the ClearTags engine discussed above. Tagged data packets are then forwarded to the information redundancy engine 730 to determine if the information is redundant (e.g., with respect to information already stored and/or acquired).

Figure 8:
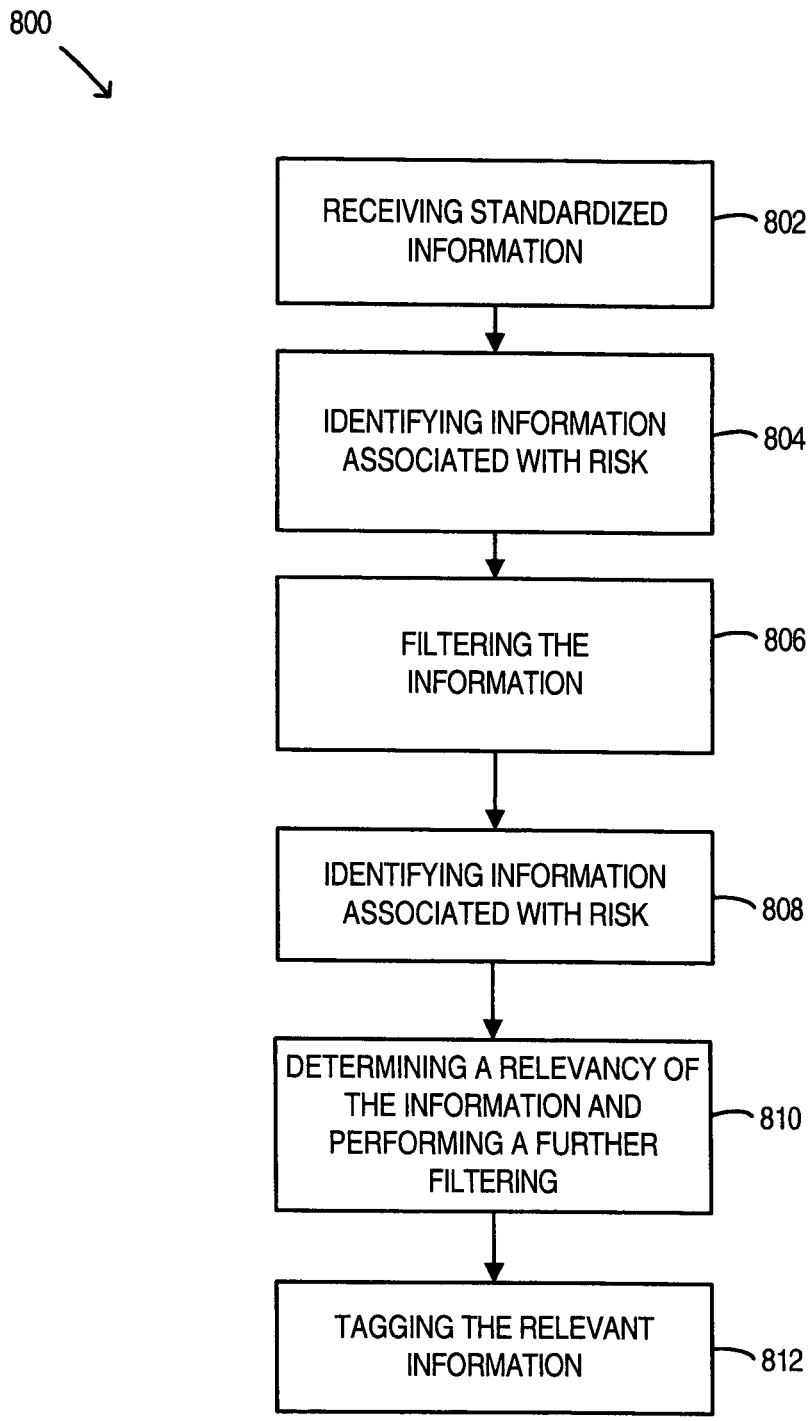
FIG. 8 is a flow diagram of a method according to some embodiments.

Referring now to FIG. 8, a method 800 according to some embodiments is shown. In some embodiments, the method 800 may be conducted by and/or by utilizing any of the systems 100, 200, 400, 600, 700 described above and/or may be otherwise associated with any of the systems 100, 200, 400, 600, 700 and/or any of the system components (e.g., the information relevancy engine 220, 420, 620, 720) described in conjunction with any of FIG. 1, FIG. 2, FIG. 4, FIG. 6, and/or FIG. 7 above. In some embodiments, the method 800 may be or include a portion of and/or a procedure within other methods such as method 300 described above.

In some embodiments, the method 800 begins at 802 by receiving standardized information. For example, the information relevancy engine 720 receives the standardized information or formatted data packets from an information feed 780. In some embodiments, the information is received in a standardized format (e.g., as applied by the information translation device 618 of the information gathering engine 610). As a specific example, the information may be received in an HTML format or in a document template (such as a Microsoft Word® template). According to some embodiments, the standardized format may include tagged portions within the information (e.g., corresponding to certain information types, sources, content, and/or to information associated with relevancy and/or risk).

The method 800 continues at 804, for example, by identifying information associated with risk. For example, the information may be analyzed and/or examined to determine if any portions of the information are relevant to risk. In some embodiments, this may involve identifying certain keywords, phrases and/or concepts within the information. As a specific example, a data packet that includes the term "fugitive" may (at least initially) determined to be risk relevant. In some embodiments, the mere presence of a term or keyword may not cause the data packet to be classified as relevant; rather, the term or keyword may need to be present in a predetermined density within the data packet for the packet to be classified as relevant. These lists of keywords, phrases or other data may be stored in a database and/or updated as appropriate. Natural language processing techniques may further be used to identify the presence of risk-relevant information. In some embodiments, the pre-tag information filtering device 722 may perform and/or otherwise be associated with the identification of the information associated with risk. In general, processing at 804 is adapted to identify data packets that do not contain risk relevant information so that such non-relevant data packets may be eliminated from further processing.

In some embodiments, the method 800 continues by filtering the information, at 806. The pre-tag information filtering device 722 may, for example, filter the information based on one or more criteria and/or guidelines. In some embodiments, the data packets that were identified as lacking risk-relevant information in step 804 are filtered from the system. For example, non-relevant data packets (or portions thereof) may be removed, deleted, and/or otherwise discarded. In some embodiments, the information filtered out may be set aside for further review and/or may be stored for later use, review, and/or analysis.

The method 800 may continue at 808, according to some embodiments, by performing further analyses on the data packets that remain (i.e., the data packets that passed the initial filtering process). Pursuant to some embodiments, processing at 808 may include the performance of further keyword searches to identify the presence of known risk-related keywords. Further, processing at 808 may include natural language processing to identify one or more associated terms or relationships related to identified keywords. These relationships and associated terms may be maintained in a database or other datastore, and updated as needed as circumstances change or as needed to improve the accuracy of the system. As discussed in the illustrative example introduced above, the keyword "fugitive" may be associated with one or more action terms (such as "flight" or "escape") and one or more relationships (such as a relationship to a person, place, or organization). Processing at 808 is adapted to identify the presence of these keywords and associated terms and relationships.

Processing continues at 810 where a relevancy of the information is determined and further filtering is performed. In some embodiments, processing at 810 includes determining whether a data packet includes sufficient keywords and their associated terms and relationships to be considered relevant. For example, each keyword may have an associated predicate that defines the associated terms or relationships that must exist within a document for the document to be considered relevant. In the example, introduced above, the article regarding John Smith the fugitive may be considered relevant because it contains a keyword ("fugitive"), a necessary relationship (a "person" and a "place"), and an action term ("fled"), while the dictionary definition would not be considered relevant because although it contains a keyword and an action term, it does not contain a necessary relationship.

Processing at 810 may include analyzing predicate information for each identified keyword to determine whether the data packet should be considered relevant. If a document is deemed to be non-relevant, it may be deleted or flagged for further analysis. In general, processing at 810 is adapted to apply a more rigorous analysis of data in data packets that were initially screened or identified as containing relevant information at step 806. Further, processing at 810 identifies terms and phrases within each data packet that are relevant to an analysis of risk, allowing them to be tagged at 812.

Processing at 812 includes tagging portions of data packets based on the analysis performed at 810. In some embodiments, only data packets deemed to be relevant are tagged. Pursuant to some embodiments, a commercial tagging system may be used to accurately and efficiently tag each data packet. In some embodiments, data packets are tagged using HTML or XML tagging schemes. In some embodiments, each item of information identified and utilized in the analysis at 808 and 810 are tagged (e.g., identified keywords are tagged, identified relationships are tagged, identified action terms or associated terms are tagged, etc.). The result is a tagged data packet that is deemed to include risk-relevant data, and that has the risk-relevant terms tagged. The article about John Smith, for example, may include tags identifying John Smith as a name, the United States and Mexico as related places, etc. These tags, as will be discussed further below, allow the data to be readily stored in a database for further analysis and use.

In some embodiments, the process may also include arriving at an overall and/or total relevancy for an item of information or packet of data. In some embodiments, any relevancy scores or metrics determined for portions of the information may be added, averaged, and/or otherwise processed to determine a relevancy for the entire item of information (i.e., the item of information that is comprised of and/or associated with the various portions). In some embodiments, the relevancy of the information may be determined based upon the most relevant portion within the item of information. According to some embodiments, information may simply be determined to either be relevant or not relevant. More stringent relevancy criteria than may have been used in previous procedures may, for example, be applied to the information on a pass or fail basis.

For example, information falling below a certain relevancy value may be discarded, while information having relevancy greater than or equal to the value may be stored and/or otherwise maintained by the system (e.g., system 100, 200, 400, 600, 700). According to some embodiments, different ranges and/or groups of relevant information may be stored in different databases, areas of a database, and/or may otherwise be maintained in a fashion indicative of the various associated relevancies. In some embodiments, any information identified for removal (e.g., information that is not relevant enough) may be checked, scanned, analyzed, and/or otherwise examined to verify that the information should be discarded. In some embodiments, even the information that is identified for filtering out may be stored and/or maintained (e.g., in an audit log, data repository, and/or other data storage area).

Figure 9:
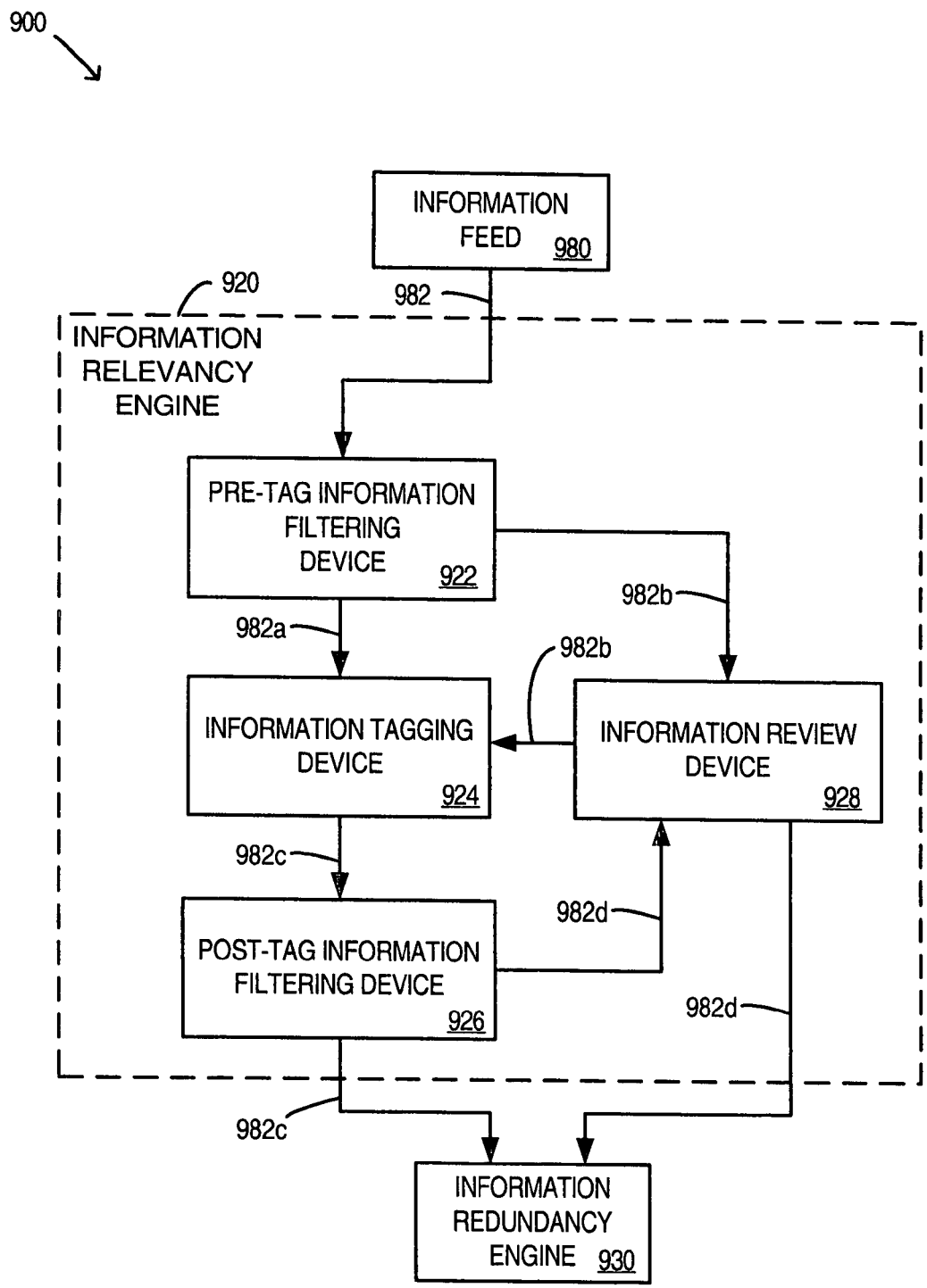
FIG. 9 is a block diagram of a system according to some embodiments.

Turning now to FIG. 9, a block diagram of a system 900 according to some embodiments is shown. In some embodiments, the system 900 may be used to implement or perform and/or may otherwise be associated with the methods 300, 500, 800 (or any portions thereof) as described in conjunction with any of FIG. 3, FIG. 5, and/or FIG. 8 above. The system 900 may, according to some embodiments, be similar in configuration and/or functionality to the system 700 described above.

The system 900 may, for example, include an information relevancy engine 920. In some embodiments, the information relevancy engine 920 may include a pre-tag information filtering device 922, an information tagging device 924, a post-tag information filtering device 926, and/or an information review device 928. The system 900 may, according to some embodiments, also or alternatively include an information redundancy engine 930, an information feed 980, and/or an information path 982. In some embodiments, the components 920, 930 of system 900 may be similar in configuration and/or functionality to the similarly-named components described in conjunction with any of FIG. 1, FIG. 2, FIG. 4, FIG. 6, and/or FIG. 7 above.

In some embodiments, the information feed 980 provides data packets or other documents to the relevancy engine. In general, the data packets are retrieved from sources (e.g., such as websites) that are selected as having relevant information. However, not all information from these sources may be relevant, and the relevancy engine allows the filtering and analysis of the data to remove non-relevant information. In the example introduced above, information feed 980 may provide data packets including a data packet containing an article about the fugitive John Smith, and another data packet containing a dictionary definition of the term "fugitive".

In some embodiments, the pre-tag information filtering device 922 may analyze the data packets and filter out any data packets that are most clearly not relevant. For example, the pre-tag information filtering device 922 may apply a number of keyword searches to identify the presence of identified risk-related keywords in each data packet. These keywords may be maintained in one or more databases (not shown) associated with the information relevancy engine 920. Each keyword may also be associated with information specifying density requirements that must be met for a document or data packet to be deemed relevant.

According to some embodiments, the filtered data packets continue along the information path 982a to the information tagging device 924. In some embodiments, the filtered and/or removed information (e.g., non-relevant data packets) may be sent along an information path 982b to the information review device 928. The removed information may then, for example, be examined and/or analyzed to verify that the information lacks relevancy.

In some embodiments, the removed information may be checked by an operator utilizing the information review device 928. According to some embodiments, the removed information may be automatically compared to various secondary lists and/or sources, and/or may be otherwise further examined to verify lack of relevancy. If the removed information is determined to have relevancy, than the removed information may be re-joined with the data packets by being transmitted along the information path 982b to the information tagging device 924. Verification of lack of relevancy may, according to some embodiments, cause the removed information to be deleted and/or otherwise discarded.

The information tagging device 924 may, in some embodiments, identify and tag certain items of data in each data packet that passes the initial filtering. For example, the information tagging device 924 may have access to the data store of keywords and may again search to identify the presence of keywords in the data packet. Further, the device may also have access to sets of defined predicates associated with each keyword and may search each data packet for the presence of this predicate information. Each located keyword and associated term may be tagged using, for example, HTML, XML or other tagging schemes. For example, a person's name located within a document or data packet may be tagged with any number of appropriate "name" identification tags. Similarly, any other potentially important information included in the data packet (e.g., dates, places, account numbers, monetary values, etc.) may be tagged.

In some embodiments, the information tagging device 924 may determine a relevancy of information contained within each data packet. For example, a data packet including the article about John Smith may be deemed relevant because the article includes a keyword as well as predicate information associated with the keyword. As another example, the data packet including the dictionary definition of "fugitive" may be deemed to be non-relevant because the definition does not required predicate information associated with the keyword. In some embodiments, the device may further assign a relevancy score to information.

In some embodiments, any information returned from the information review device 928 (e.g., along the information path 982b) may also or alternatively be tagged. The returned information may, according to some embodiments, be re-joined, re-inserted, and/or otherwise combined with data packets deemed relevant by processing at devices 922 and 924. In some embodiments, the tagged and/or re-compiled information may then be sent along the information path 982c to the post-tag information filtering device 926. The post-tag information filtering device 926 may, in some embodiments, filter the list based on the various relevancies (e.g., relevancy scores) determined by the information tagging device 924.

The post-tag information filtering device 926 may, for example, compare the relevancy of each portion of the list to a minimum relevancy criterion. In some embodiments, those portions of information (and/or associated information) that are determined to have relevancies that are too low (e.g., below the minimum criterion) may be filtered out. In some embodiments, the various relevancies associated with portions of a data packet may be added, averaged, and/or otherwise manipulated to determine a total relevancy for the entire data packet. According to some embodiments, if the total relevancy is below a pre-determined value, than the entire data packet may be deleted and/or removed. Any portions of the data packet that are determined to have an acceptable relevancy (e.g., the entire data packet, some portion of the data packet, etc.) may then, according to some embodiments, be sent along the information path 982c to the information redundancy device 930. In some embodiments, the information redundancy device 930 may determine a redundancy associated with the data packet and/or portions of the data packet.

In some embodiments, any information that is filtered out and/or otherwise removed or determined not to be relevant, may be sent along the information path 982d to the information review device 928. The information review device 928 may, according to some embodiments, analyze the removed information to verify that removal is appropriate. If a data packet is removed to the information review device 928, for example, a reviewer and/or a verification program may examine the data packet to ensure that no important, potentially important, and/or otherwise relevant information resides within the data packet. If the data packet (or portions thereof) is determined to be relevant and/or is determined to have been improperly removed, then the data packet may be sent, for example, along the information path 982d to the information redundancy device 930 (e.g., to be re-joined with other relevant data packets and/or with other associated information, etc.).

Redundancy Engine

Figure 10:
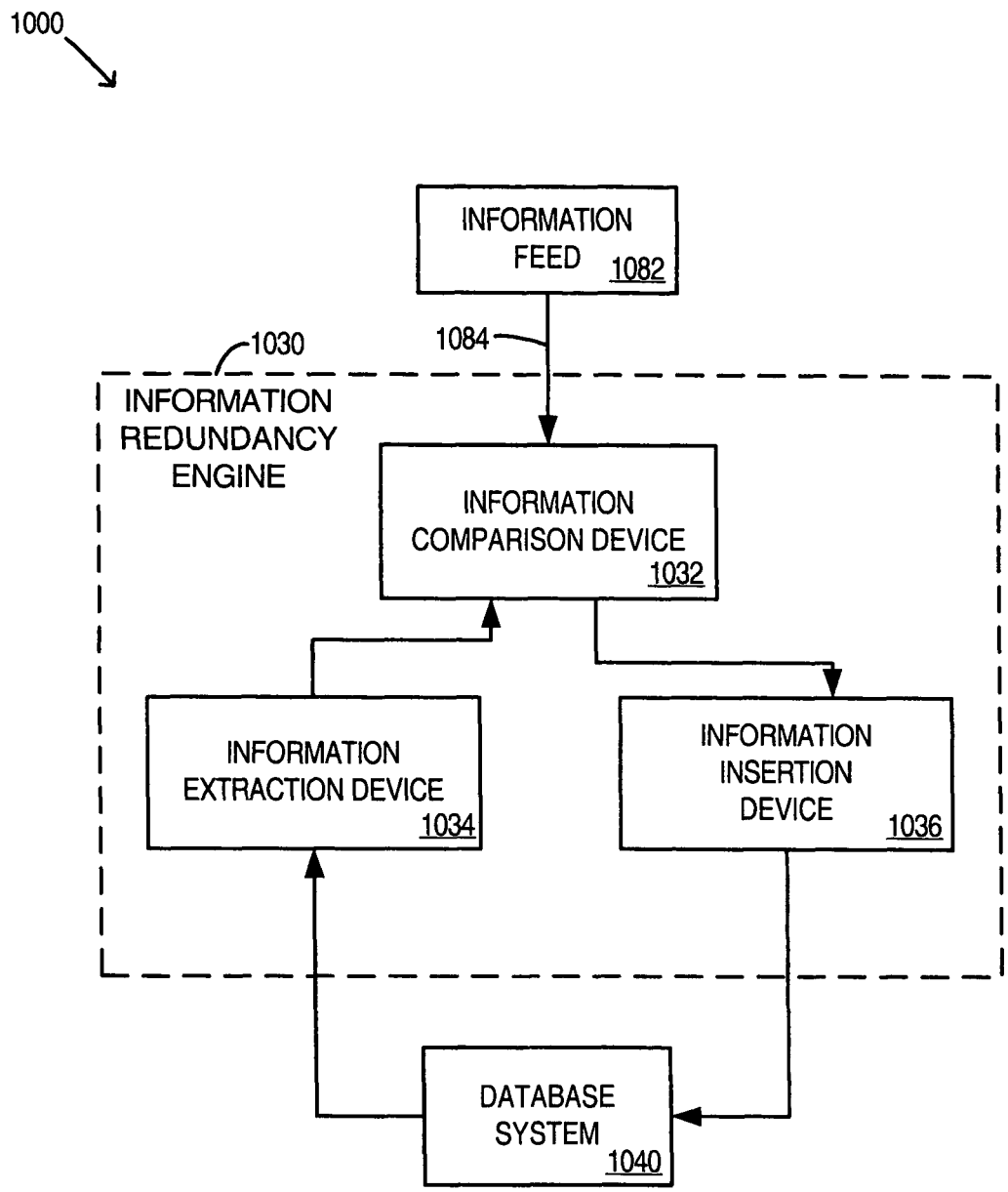
FIG. 10 is a block diagram of a system according to some embodiments.

Referring now to FIG. 10, a block diagram of a system 1000 according to some embodiments is shown. In some embodiments, the system 1000 is used to implement or perform any of the methods 300, 500, 800 and/or may otherwise be associated with any of the methods 300, 500, 800 (or any portions thereof) as described in conjunction with any of FIG.

3, FIG. 5, and/or FIG. 8 above. The system 1000, for example, is similar in configuration and/or functionality to the information redundancy engine 230, 730, 930 (or the risk server 102, 202) and/or may perform in accordance with the procedures 310, 312 as described in conjunction with FIG. 3.

The system 1000, for example, includes an information redundancy engine 1030. In some embodiments, the information redundancy engine 1030 includes an information comparison device 1032, an information extraction device 1034, and/or an information insertion device 1036. The system 1000, according to some embodiments, also or alternatively includes a database system 1040, an information feed 1082, and/or an information path 1084. In some embodiments, the components 1030, 1040 of system 1000 may be similar in configuration and/or functionality to the similarly-named components described in conjunction with any of FIG. 2, FIG. 4, FIG. 6, FIG. 7, and/or FIG. 9 above.

The information redundancy engine 1030, according to some embodiments, prevents duplicate and/or unnecessary information from being stored and/or maintained by the system 1000. For example, the information redundancy engine 1030 receives information from the information feed 1082 via the information path 1084. In some embodiments, the information is received by the information comparison device 1032. The information comparison device 1032, according to some embodiments, compares the received information to stored information and/or other information already within system 1000 and/or within the information redundancy engine 1030.

In some embodiments, the information comparison device 1032 compares the received information to information stored in and/or by the database system 1040. According to some embodiments, the information comparison device 1032 utilizes the information extraction device 1034 to retrieve stored information from the database system 1040. For example, the information comparison device 1032 submits a query to the database system 1040 to identify information that is similar and/or associated with the received information. The information comparison device 1032 then, in some embodiments, directs and/or causes the information extraction device 1034 to retrieve the identified information from the database system 1040.

In some embodiments, the information comparison device 1032 compares the received information with the information extracted from the database system 1040. According to some embodiments, the information is compared based on various attributes, tags, relations, content, and/or other information associated with the information to be compared. In some embodiments, if the received information is determined to be identical or substantially identical to any information stored in the database system 1040 (and/or extracted from the database system 1040 for comparison), than the received information may be considered redundant.

In some embodiments, if the received information describes a particular event, item, individual, and/or organization that already is described by stored information, the received information is considered redundant. In some embodiments, a limited number of sources (e.g., information pieces, groups, etc.) covering the same informational material may be stored, and any further such sources may be considered redundant. According to some embodiments, the information comparison device 1032 determines a score, rank, and/or other metric associated with the redundancy of the received information. The redundancy rank, for example, can be a metric representing the degree of redundancy associated with an item of information. In some embodiments, information that is associated with a redundancy score over a predetermined redundancy limit is considered redundant.

According to some embodiments, the information comparison device 1032 does not need to extract the stored information from the database system 1040 in order to perform the comparison (e.g., in some embodiments the information extraction device 1034 may not be required in system 1000). In some embodiments, any information and/or portions of information that are determined to be redundant may be filtered, deleted, removed, and/or otherwise disposed of. Similarly, any information that is determined not to be redundant is sent to and/or stored within the database system 1040. According to some embodiments, the information comparison device 1032 sends any non-redundant information to the information insertion device 1036.

The information insertion device 1036 then, for example, inserts, stores, and/or sends the information the database system 1040. In some embodiments, the information insertion device 1036 directly stores and/or causes the storage of the information in one or more databases (not shown in FIG. 10). The information insertion device 1036 may be or include, for example, a database driver and/or a Database Access Object (DAO). According to some embodiments, the information insertion device 1036 is not required by system 1000 to store and/or cause the storage of the information. In some embodiments for example, the information insertion device 1036 is a separate device and/or is included within another device or component (e.g., within and/or as part of the database system 1040).

In some embodiments, a staging table is used to insert the information. For example, in embodiments where a SQL Server is used, a data transformation process may be invoked to control the insertion of data. The task reads and imports the data in the data packet into a temporary staging table within the SQL Server. The staging table is configured to match the layout and format of the data being read from the data packet and all fields are propagated into the staging table.

Data from the staging table may then be mapped to the database scheme in a number of different ways. For example, simple scheme formats may be mapped and imported using SQL Server XML support. As another example, more complicated formats may use custom procedural code to populate and preserve all the data elements in the imported data. In some embodiments, XML mapping is performed using XSLT data transformation stylesheets and XPATH queries to map the data from the data packet into the database schema. Commercially available software, such as XMLSpy and MapForce may be used to facilitate this mapping.

The more complicated formats may require the use of procedural code and SQL Server Stored Procedures to mange the complex relational aspects of the data being imported. The code based importer uses import specific queries to generate the datasets needed to populate the various database tables. The task of creating a new code based importer component is reduced to creating the relational queries (Transact-SQL statements) to extract the various required datasets needed to populate the RDC schema. In some embodiments, much of the high-level functionality required to build an importer is contained in generic reusable code that may be written, for example, using the Microsoft NET programming environment. For example, the importer specific code is written as subclasses of the base importer and uses interface implementation to build new specific importer components. Microsoft ADO.NET classes along with the Microsoft Visual Studio development environment may be used in some embodiments to simplify the task of creating importer components. The ADO.NET framework provides an easy to use high-level set of tools to access relational data and stored procedures within the SQL Server environment, although other importing tools, scripts and procedures may also be used.

Figure 11:
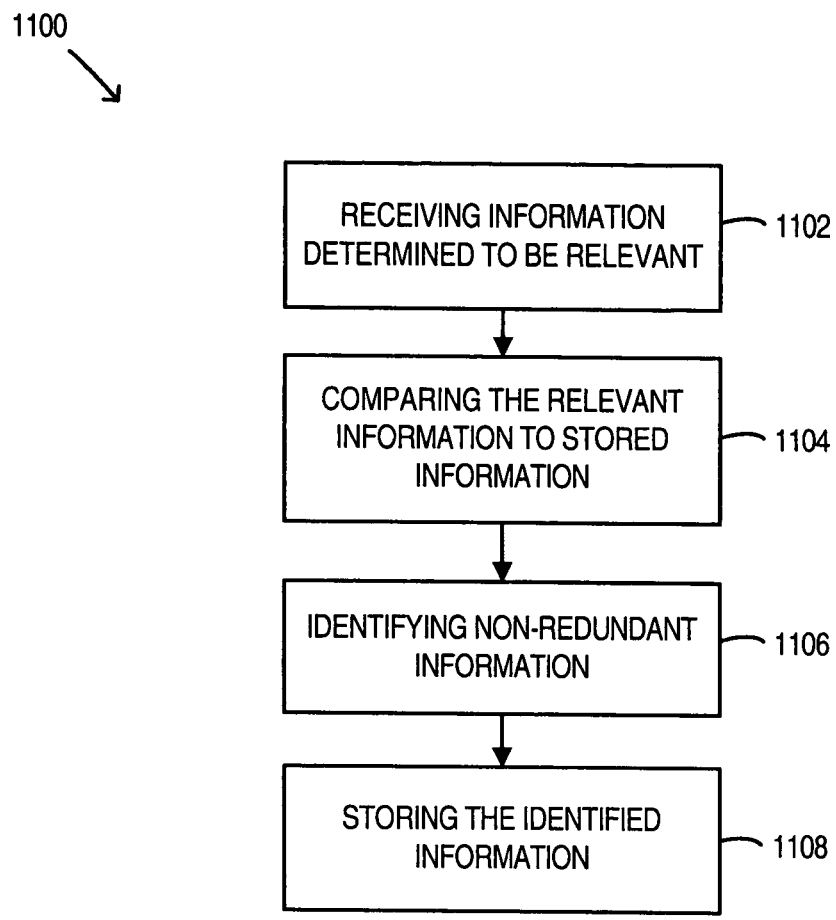
FIG. 11 is a flow diagram of a method according to some embodiments.

FIG. 11 shows a method 1100 according to some embodiments. In some embodiments, the method 1100 is conducted by and/or by utilizing any of the systems 100, 200, 400, 600, 700, 900, 1000 described above and/or may be otherwise associated with any of the systems 100, 200, 400, 600, 700, 900, 1000 and/or any of the system components (e.g., the information redundancy engine 230, 730, 930, 1030) described in conjunction with any of FIG. 1, FIG. 2, FIG. 4, FIG. 6, FIG. 7, FIG. 9, and/or FIG. 10 above. In some embodiments, the method 1100 may be or include a portion of and/or a procedure within other methods such as method 300 described above.

In some embodiments, the method 1100 begins at 1102 by receiving information determined to be relevant. For example, the information comparison device 1032 (and/or the information redundancy engine 1030) receives information that has been determined to be relevant (e.g., with respect to risk) by the information relevancy engine 220, 420, 620, 720, 920. In some embodiments, the information is received from other and/or additional sources. According to some embodiments, other information may also be received. For example, information determined not to be relevant may nonetheless be desired to be stored (e.g., for audit purposes, or in case the information later becomes or could become relevant).

The method 1100 continues, according to some embodiments, by comparing the relevant information to stored information, at 1104. The information comparison device 1032, for example, compares various attributes, relations, content, tags, and/or other aspects of the information. In some embodiments, the stored information to be compared to the received information is retrieved from the database system 1040 using the information extraction device 1034. Various information fields, in some embodiments, are loaded into a table or list (e.g., in temporary memory) to be compared. In some embodiments, the comparison includes checking for spelling errors and/or variances, interpreting information to compare the meaning, content, and/or gist of the information, and/or comparing combinations of fields and/or information types.

In some embodiments, the method 1100 continues at 1106 by identifying redundant information. The information comparison device 1032 may, for example, utilize the results of the comparison at 1104 to determine if the received information is redundant. In some embodiments, portions of the received information are evaluated for redundancy. According to some embodiments, the information is scored, ranked, and/or otherwise associated with a redundancy metric.

For each word, phrase, tagged field, and/or concept of the information that is determined to be redundant, for example, a score may be accumulated. The higher the score, according to some embodiments, the more redundant the information is. In some embodiments, redundancy scores for various portions and/or fields of the information are added, averaged, and/or otherwise examined or manipulated to determine a redundancy for the information as a whole. According to some embodiments, information that is identical, similar, related, and/or otherwise associated is considered redundant. In some embodiments, even the slightest variation between information and/or database records may be enough to consider the information non-redundant. In some embodiments for example, it may be desirable to store many variations in spelling and/or many aliases associated with a given name.

The method 1100 continues at 1108 by storing non-redundant information. The information comparison device 1032, for example, causes non-redundant information to be stored in and/or by the database system 1040. In some embodiments, the information insertion device 1036 is utilized to directly store non-redundant information in a database or other information store. In some embodiments, even information that is determined to be redundant is stored. For example, such information may be stored for audit purposes and/or in case the information later becomes important and/or non-redundant. Particularly where the received information was purchased from a commercial source, it may not be deemed prudent to discard even redundant portions of the information. In some embodiments, any information to be stored may be sent to the database system 1040 for storage.

Figure 12:
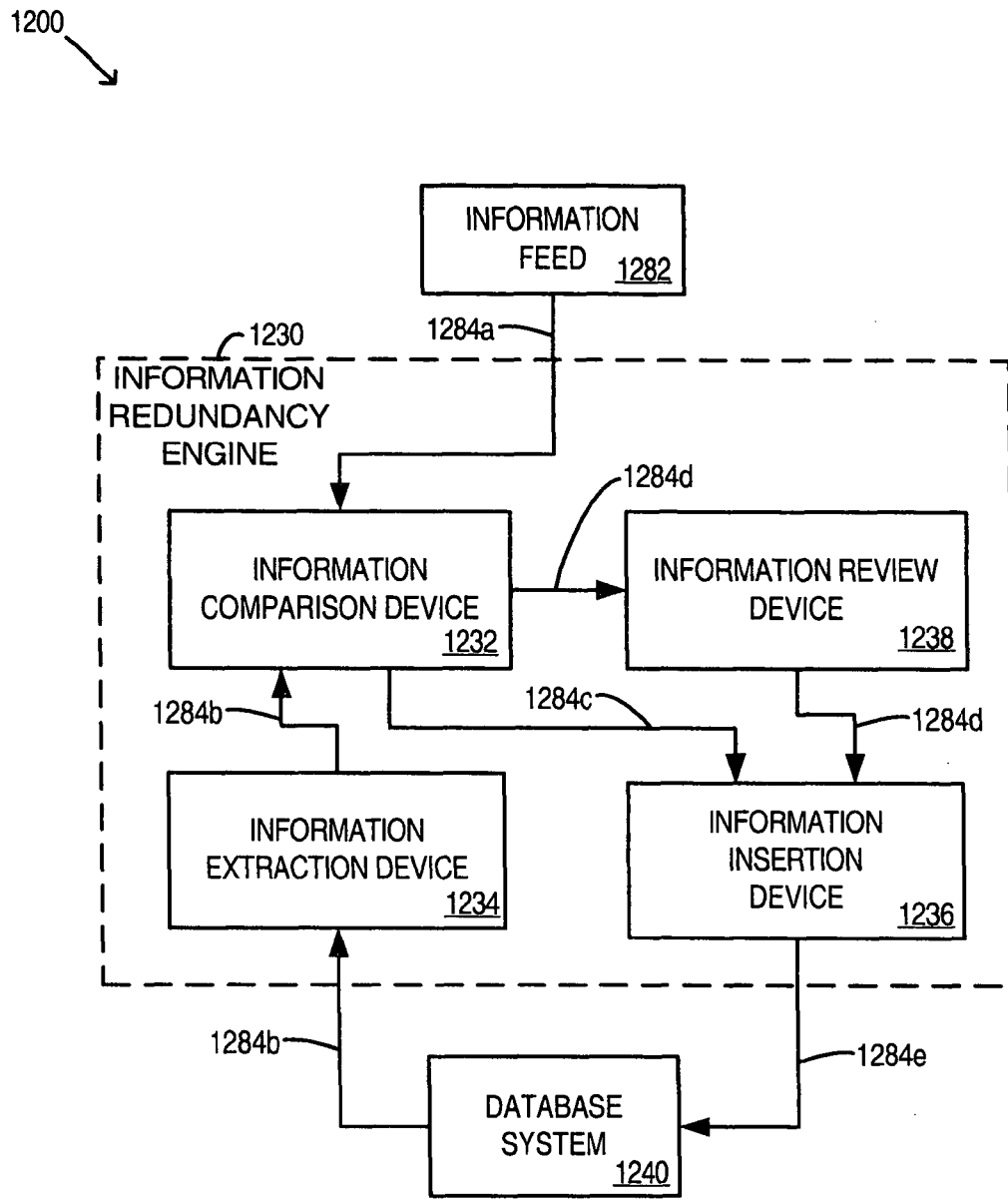
FIG. 12 is a block diagram of a system according to some embodiments.

Turning now to FIG. 12, a block diagram of a system 1200 according to some embodiments is shown. In some embodiments, the system 1200 is used to implement or perform and/or may otherwise be associated with any of the methods 300, 500, 800, 1100 (or any portions thereof) as described in conjunction with any of FIG. 3, FIG. 5, FIG. 8, and/or FIG. 11 above. The system 1200 may, according to some embodiments, be similar in configuration and/or functionality to the system 1000 described above.

The system 1200, for example, includes an information redundancy engine 1230. In some embodiments, the information redundancy engine 1230 includes an information comparison device 1232, an information extraction device 1234, an information insertion device 1236, and/or an information review device 1238. The system 1200, according to some embodiments, also or alternatively includes a database system 1240, an information feed 1282, and/or an information path 1284. In some embodiments, the components 1230, 1240 of system 1200 may be similar in configuration and/or functionality to the similarly-named components described in conjunction with any of FIG. 2, FIG. 4, FIG. 6, FIG. 7, FIG. 9, and/or FIG. 10 above.

In some embodiments, the information feed 1282 may be or include the information feed 782, 982 from the information relevancy engine 720, 920. The information feed 1282 includes, for example, information that is standardized, tagged, and/or scored or ranked with respect to relevancy. According to some embodiments, the information may be or include various scanned documents such as, for example, real estate deeds and/or other land records (e.g., restrictive covenants, bills of sale, historic records, etc.). The deeds may, for example, be scanned and/or be converted electronically via Optical Character Recognition (OCR). In some embodiments, the deeds are transmitted along information path 1284a to the information comparison device 1232.

The information comparison device 1232, according to some embodiments, utilize the deed information to structure one or more database queries. For example, deed information such as the transferee's name, the transferor's name, the location of the land, the transfer date, and/or a description of the land may be searched for within the database system 1240. The information comparison device 1232, for example, submits such a query (and/or one or more other queries) to the database system 1240.

In some embodiments, the query results are sent from the database system 1240 to the information comparison device 1232. According to some embodiments, the query results are utilized, by the information extraction device 1234 for example, to retrieve any database records from the database system 1240 that are likely to be similar to the deed information. The extracted query result information, for example, is transmitted along the information path 1284b from the database system 1240 to the information comparison device 1232 (e.g., via the information extraction device 1234).

The information comparison device 1232 then, for example, compares the deed information to the stored information (e.g., the stored information that is likely to be similar to the deed information). The owner of the land as recorded in the land deed information may, for example, be compared to other landowner names, employee names, criminal names, and/or other names stored within the database system 1240. Other fields and/or portions of the deed information, such as the address of the property, may also or alternatively be compared to similar types of stored information. In some embodiments, if many fields (e.g., name, address, price, date, etc.) match corresponding fields in the stored information, the deed information is considered redundant. If only some and/or certain fields match and/or are similar, than the deed information is considered non-redundant, according to some embodiments.

In some embodiments, if the deed information is determined to be non-redundant, the deed information is transmitted along the information path 1284c to the information insertion device 1236. According to some embodiments, if the deed information (or any portion thereof) is determined to be redundant, the information is sent along the information path 1284d to the information review device 1238. The information review device 1238 is then used, for example, to verify the redundancy of the deed information. Any portions of the deed information not verified to be redundant may be re-joined with other non-redundant deed portions by being transmitted to the information insertion device 1236 via the information path 1284d. In some embodiments, such as where the entire deed was originally determined to be redundant and then is later determined to be non-redundant (e.g., by the information review device 1238), the deed may be sent to the information insertion device 1236.

According to some embodiments, the information insertion device 1236 causes the deed information to be stored in the database system 1240. The information insertion device 1236, for example, sends the deed information to the database system 1240 via the information path 1284e. In some embodiments, the information insertion device 1236 may not be necessary (e.g., the deed information is sent directly from the information comparison device 1232 and/or from the information review device 1238, to the database system 1240). In some embodiments, the deed information also or alternatively is stored in databases and/or information stores not within and/or associated with the database system 1240.

Database

Figure 13:
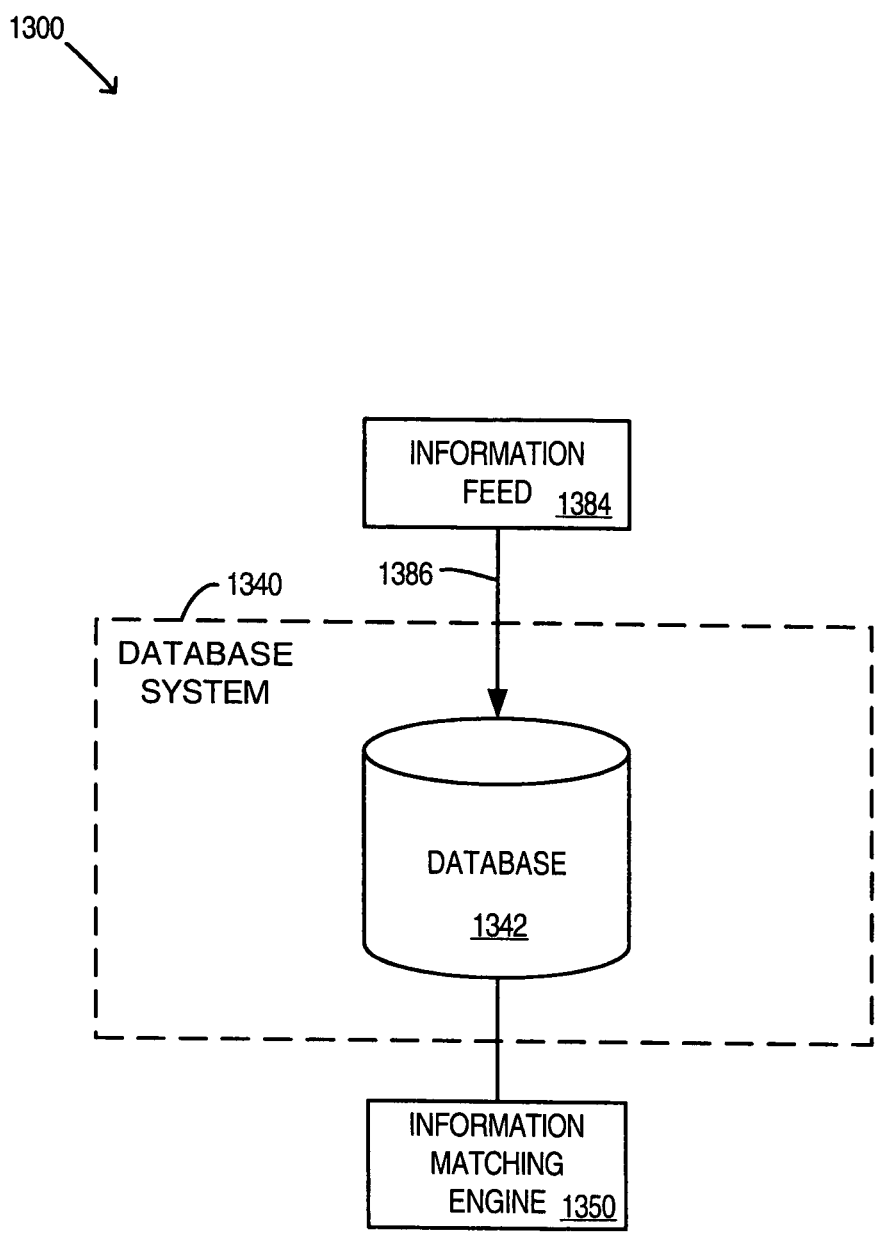
FIG. 13 is a block diagram of a system according to some embodiments.

Referring now to FIG. 13, a block diagram of a system 1300 according to some embodiments is shown. In some embodiments, the system 1300 is used to implement or perform any of the methods 300, 500, 800, 1100 and/or may otherwise be associated with any of the methods 300, 500, 800, 1100 (or any portions thereof) as described in conjunction with any of FIG. 3, FIG. 5, FIG. 8, and/or FIG. 11 above. The system 1300 may, for example, be similar in configuration and/or functionality to the database system 240, 440, 640, 1040, 1240 (or the risk server 102, 202) and/or may perform in accordance with the procedures 312, 314 as described in conjunction with FIG. 3.

The system 1300, for example, includes database system 1340. In some embodiments, the database system 1340 includes one or more databases 1342. The system 1300, according to some embodiments, also or alternatively includes an information matching engine 1350, an information feed 1384, and/or an information path 1386. In some embodiments, the components 1340, 1350 of system 1300 may be similar in configuration and/or functionality to the similarly-named components described in conjunction with any of FIG. 2, FIG. 4, FIG. 6, FIG. 10, and/or FIG. 12 above.

The information feed 1384, according to some embodiments, includes information to be stored in the database 1342. The information feed 1384 may be or include, for example, information transmitted along the information path 1284 from the redundancy engine 1230. In some embodiments, the information feed 1384 provides information to the database system 1340 and/or to the database 1342 via the information path 1386. According to some embodiments, the database 1342 may be or include a repository for information associated with risk.

The database 1342, for example, includes multiple database tables and/or areas for storing information associated with risk in a relational manner. In some embodiments, the database 1342 includes one or more data structures configured and/or designed to facilitate the identification of risk. For example, various key risk segments (e.g., information associated with important risk factors) are arranged and/or linked or otherwise associated to allow efficient, comprehensive, and/or easy identification of risk.

In some embodiments, access to the database 1342 and/or the database system 1340 is provided to a user and/or other entity. According to some embodiments, the database 1342 I (or portions thereof) is provided to a user on a recordable storage medium such as a Compact Disk (CD), a downloadable file, and/or any other form of media that is or becomes available. In some embodiments, the information stored in the database 1342 is provided and/or transmitted to the information matching engine 1350. The information matching engine 1350, for example, allows a user to submit a query, and provide information from the database 1342 that is associated with (and/or determined to be associated with) the query, to the user.

Figure 14:
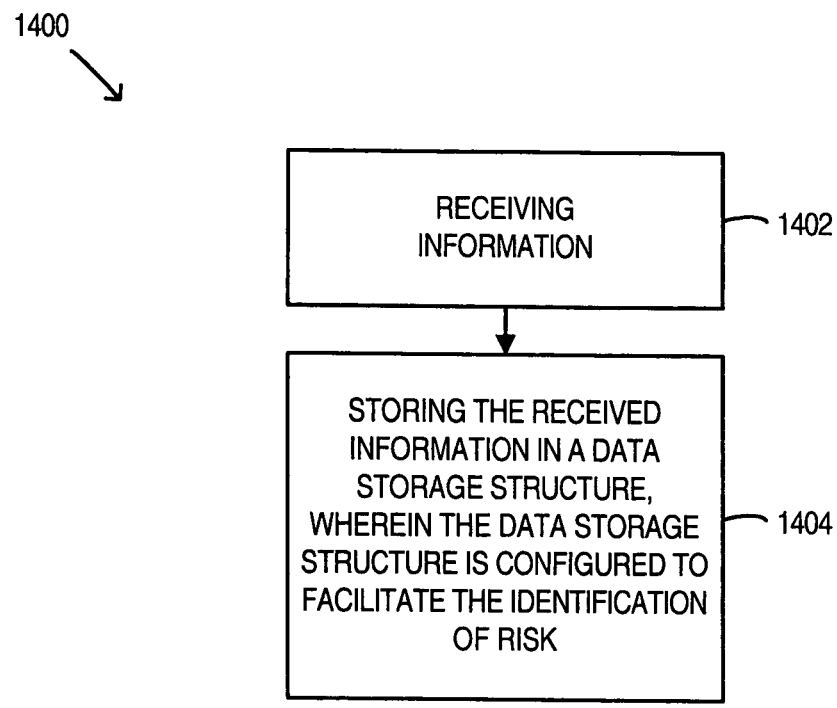
FIG. 14 is a flow diagram of a method according to some embodiments.

Turning now to FIG. 14, a method 1400 according to some embodiments is shown. In some embodiments, the method 1400 is conducted by and/or by utilizing any of the systems 100, 200, 400, 600, 700, 900, 1000, 1200, 1300 described above and/or may be otherwise associated with any of the systems 100, 200, 400, 600, 700, 900, 1000, 1200, 1300 and/or any of the system components (e.g., the database system 240, 440, 640, 1040, 1240, 1340) described in conjunction with any of FIG. 1, FIG. 2, FIG. 4, FIG. 6, FIG. 7, FIG. 9, FIG. 10, FIG. 12, and/or FIG. 13 above. In some embodiments, the method 1400 may be or include a portion of and/or a procedure within other methods such as method 300 described above.

In some embodiments, the method 1400 begins at 1402 by receiving information. The information, for example, is associated with risk. The information is received from any practicable information source including, for example, one of the plurality of information source devices 104, 204, the information gathering engine 210, 410, 610, the information relevancy engine 220, 420, 620, 720, 920, and/or the information redundancy engine 230, 730, 930, 1030, 1230. In some embodiments, the information is received from one or more devices that send, transmit, and/or otherwise provide the information to, for example, the database system 1340. According to some embodiments, the database system 1340 may retrieve, collect, solicit, and/or otherwise acquire the information.

In some embodiments, the information is specially formatted (e.g., by the information gathering engine 210, 410, 610), pre-analyzed for relevancy (e.g., by the information relevancy engine 220, 420, 620, 720, 920), and/or filtered for redundancy (e.g., by the information redundancy engine 230, 730, 930, 1030, 1230). According to some embodiments, the information includes tags and/or other associated data, identifiers, and/or references that may be associated with risk (e.g., a relevancy score, a redundancy rank, etc.).

The method 1400 continues, according to some embodiments, by storing the received information in a data storage structure, at 1404. In some embodiments, the data storage structure is configured to facilitate the identification of risk. For example, the data storage structure may include a database schema that is arranged to assist with the identification of risk. The database schema include various tables and/or sets of tables that are arranged and linked to simplify the discovery of relationships between key risk segments. In some embodiments, other types and/or configurations of data storage structures are used to facilitate the identification of risk. Some embodiments describing practicable data storage structure configurations will be described in relation to FIG. 16 through FIG. 35 below.

Figure 15:
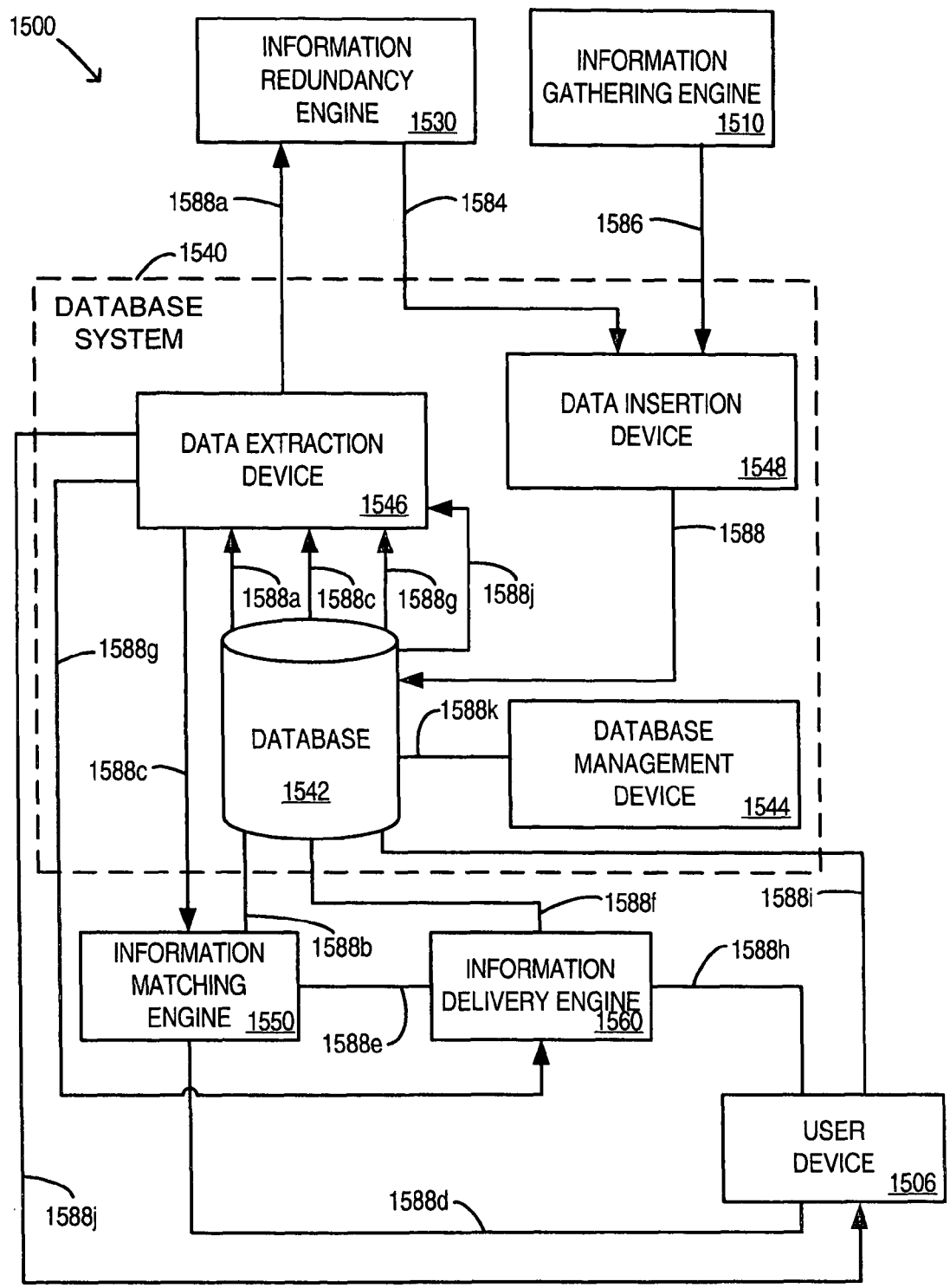
FIG. 15 is a block diagram of a system according to some embodiments.

Turning first to FIG. 15, a block diagram of a system 1500 according to some embodiments is shown. In some embodiments, the system 1500 is used to implement or perform and/or may otherwise be associated with the methods 300, 500, 800, 1100, 1400 (or any portions thereof) as described in conjunction with any of FIG. 3, FIG. 5, FIG. 8, FIG. 11, and/or FIG. 14 above. The system 1500 may, according to some embodiments, be similar in configuration and/or functionality to the system 1300 described above.

The system 1500, for example, includes one or more user devices 1506, an information gathering engine 1510, an information redundancy engine 1530, and/or database system 1540. In some embodiments, the database system 1540 includes one or more databases 1542, a database management device 1544, a data extraction device 1546, and/or a data insertion device 1548. The system 1500, according to some embodiments, also or alternatively includes an information matching engine 1550, an information delivery engine 1560, and/or information paths 1584, 1586, 1588. In some embodiments, the components 1506, 1510, 1530, 1540, 1550, 1560 of system 1500 are similar in configuration and/or functionality to the similarly-named components described in conjunction with any of FIG. 1, FIG. 2, FIG. 4, FIG. 6, FIG. 7, FIG. 9, FIG. 10, FIG. 12, and/or FIG. 13 above.

In some embodiments, the database system 1540 receives information from either or both of the information redundancy engine (e.g., via the information path 1584) and the information gathering engine 1510 (e.g., via the information path 1586). The information arrives, according to some embodiments, at the data insertion device 1548. The data insertion device 1548, for example, inserts, adds, appends, and/or otherwise stores the information in the database 1542 (e.g., via the information path 1588). According to some embodiments, the data extraction device 1546 is used to provide the stored information to various entities and/or devices. For example, to check and/or determine redundancy, the information redundancy engine 1530 uses the data extraction device 1546 to pull queried information from the database 1542 (e.g., via the information path 1588$a$).

According to some embodiments, the user device 1506 may query the database 1542 for stored information. In some embodiments for example, the user device 1506 may submit a query for risk-related information to the information delivery engine 1560 and/or to the information matching engine 1550. The information delivery engine 1560 may, according to some embodiments, handle and/or conduct all direct communications with the user device 1506. In some embodiments, the user device 1506 may also or alternatively communicate directly with the information matching engine 1550 and/or with the database 1542. For example, the stored information that matches and/or otherwise satisfies the query submitted by the user device 1506 may be sent to the user device 1506 via various information paths.

In some embodiments, the information is sent via the information path 1588$b$ from the database 1542 to the information matching engine 1550. The information matching engine 1550, for example, determines and/or identifies the stored information that satisfies the query. In some embodiments, the information is pulled from the database 1542 by utilizing the data extraction device 1546 (e.g., via the information path 1588$c$). The information may then, for example, be sent and/or provided by the information matching engine 1550 directly to the user device 1506 via the information path 1588$d$. In some embodiments, the information may also or alternatively be routed to and/or through the information delivery engine 1560 (e.g., via the information path 1588$e$).

The information delivery engine 1560, according to some embodiments, determines and/or identifies the stored information that satisfies the query. In such embodiments, the information delivery engine 1560 pulls the information directly from the database 1542 via the information path 1588$f$. In some embodiments, the data extraction device 1546 is used to obtain the information (e.g., via the information path 1588$g$). The information delivery engine 1560 includes any type of user and/or user device 1506 interface that is or becomes known. In some embodiments, the information delivery engine 1560 may be or include a web interface that provides query results and/or other stored information to the user device 1506 via the information path 1588$h$.

In some embodiments, the information delivery engine 1560 may be or include a recordable storage medium on which the database 1542 and/or a copy thereof may be stored. According to some embodiments, the information delivery engine 1560 may also or alternatively include program code and/or software (e.g., a Graphical User Interface (GUI), an Application Program Interface (API), etc.) that may, for example, provide and/or facilitate access to the database system 1540 and/or the database 1542. In some embodiments, the user device 1506 includes such a program and/or recordable medium. In such embodiments, the user device may, for example, directly communicates with and/or extracts information from the database 1542 (e.g., via the information path 1588$i$). In some embodiments, the data extraction device 1546 is used to pull the desired stored information from the database 1542 (e.g., via the information path 1588$j$).

According to some embodiments, the database management device 1544 may control, monitor, audit, and/or facilitate the flow of information within the database system 1540. In some embodiments, the database management device 1544 may also or alternatively manage and/or direct the storage of information within the database 1542. The database management device 1544, for example, uses the information path 1588$k$ to communicate directly with the database 1542. The database management device 1544, according to some embodiments, creates, edits, maintains, and/or otherwise configures or manages a data storage structure (not shown in FIG. 15) within the database 1542. The data storage structure may, for example, be a data storage structure as described elsewhere herein that is configured to facilitate the identification of risk.

Data Storage Schema

Figure 16:
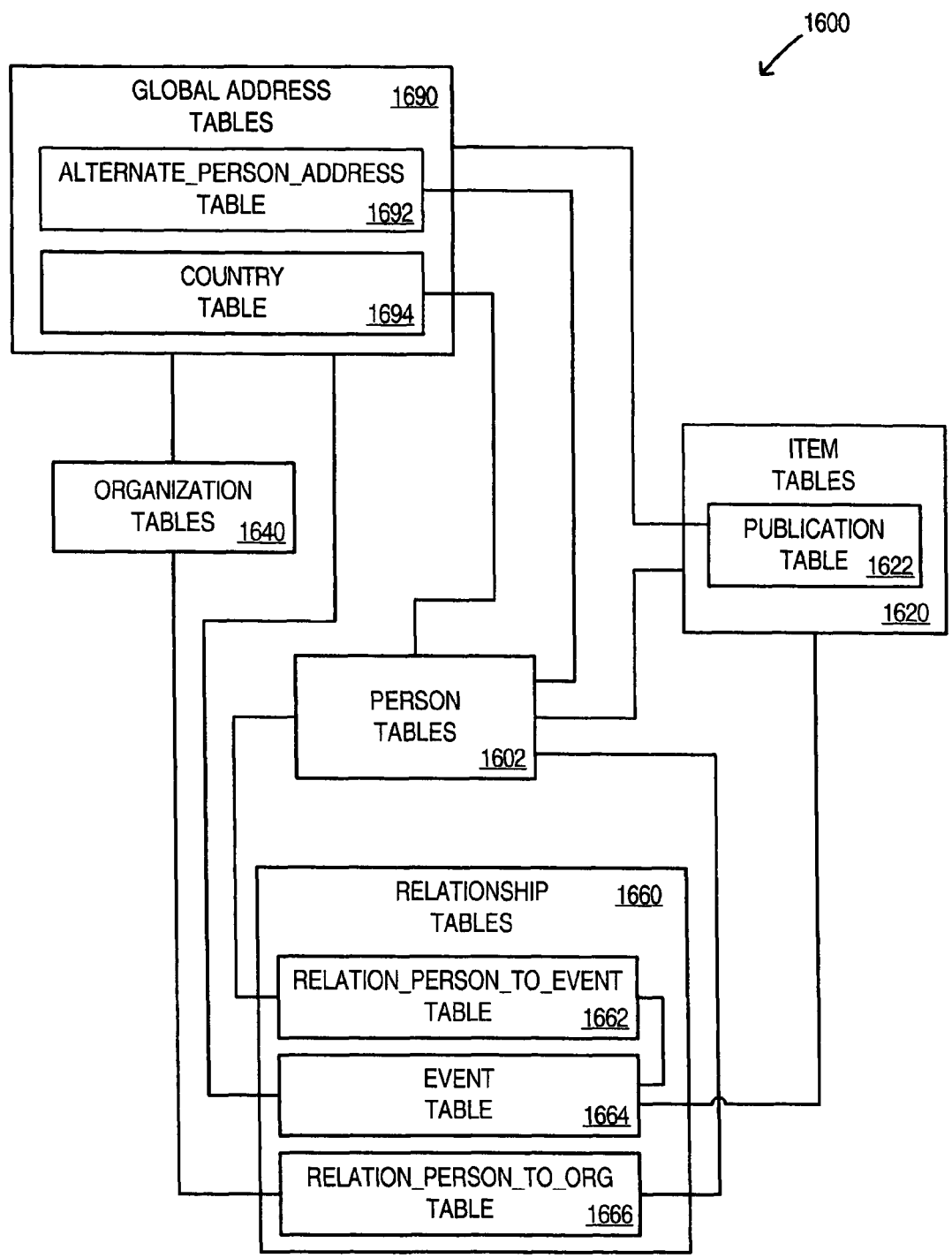
FIG. 16 is a block diagram of a data storage structure according to some embodiments.

FIG. 16, for example, shows a block diagram of a data storage structure 1600 according to some embodiments. The data structure 1600 may, for example, be stored within a database and/or other storage device such as may be included in any of the systems 100, 200, 400, 600, 700, 900, 1000, 1200, 1300, and/or 1500 described herein. According to some embodiments, the data structure 1600 may be or include a special structure for storing data that is configured to facilitate the identification of risk.

In some embodiments, the identification of risk relevant information is facilitated through the use of key risk segments. In other words, specific types, groups, and/or categories of information are used to analyze risk. In some embodiments for example, key risk segments may include, but are not limited to, individuals and/or persons, items and/or objects, organizations and/or other entities, relationships (e.g., among the various other key risk segments), and/or addresses. As shown in FIG. 16 for example, each and/or any of the key risk segments determined to be desirable and/or important for the identification of risk are represented by one or more tables or areas within a database (e.g., database 1342, 1542).

In some embodiments, the data structure 1600 includes person tables 1602 and/or item tables 1620. The person tables 1602 may be or include, for example, one or more tables designed to contain information relating to various attributes, aspects, and/or other information associated with individuals. The person tables 1602 may include, for example, information associated with a particular person such as the person's name, address, occupation, and/or age. Other information identifying a person may also be provided. For example, in some embodiments, an "extended person table" (not shown) may be provided including further detailed information associated with a person. For example, information stored about a person may include: eye color, hair color, weight, height, passport number, driver's license number, social security number, sex, race, complexion, language(s), scars and marks, aliases, known hobbies or interests, etc. Further, in some embodiments, photos or other images of the person may also be stored.

The person tables may include (or be associated with tables that include) a variety of alternative descriptions for a person. For example, an alias table (not shown) may be associated with the person table to include information about a variety of aliases used by a particular person. A person may be associated with multiple titles, occupations, birth dates, etc. Similar tables may be used to capture and store information associated with a person that includes multiple variants.

In some embodiments, the person tables 1602 are linked and/or otherwise associated with the item tables 1620. The item tables 1620 generally (according to some embodiments) include tables configured to store information associated with various information items and/or other objects. In some embodiments, the item tables 1620 include a publication table 1622. For example, the publication table 1622 may include information associated with various published information items such as newspaper articles, magazine articles, press releases, books, and/or other publications (e.g., patents, regulatory filings, etc.). The item tables 1620 may also include tables configured to store information associated with crime information. For example, different "incident codes" and crime descriptions may be specified in an item table for association with different individuals (and for association with different events if appropriate). Other information may also be provided in the item tables as will be apparent to those skilled in the art upon reading this disclosure.

In some embodiments, the data structure 1600 may also or alternatively include organization tables 1640 and/or relationship tables 1660. The organization tables 1640 may be or include, for example, one or more tables arranged to store information associated with an organization, group, and/or other entity. Examples of organizations and/or other entities may include, but are not limited to, businesses, partnerships, non-profit organizations, governments and/or government branches or agencies, and military or paramilitary groups. In some embodiments, the relationship tables 1660 may include a table relating a person to an event (e.g., the relation_person_to_event table 1662), a table storing information associated with various events (e.g., the event table 1664), and/or a table relating an organization to a person (e.g., the relation_person_to_org table 1666).

In some embodiments for example, an organization may be associated with a particular person or other individual (e.g., a president of the organization, a founder, a supporter, an employee, etc.). In such embodiments, the relation_person_to_org table 1666 may link the appropriate organization information stored in the organization tables 1640 to the appropriate person information stored in the person tables 1602. Similarly, any relation between a person and an event (e.g., a president and an election, a groom and a marriage, etc.) may be described by a link formed between the person tables 1602 and the event table 1664, via the relation_person_to_event table 1662. In some embodiments, the event table 1664 may also or alternatively be linked to the item tables 1620 (e.g., a particular newspaper article may describe an election or other event).

In some embodiments, the data storage structure 1600 may also or alternatively include address information that may, for example, be stored in one or more global address tables 1690. Address information associated with any of an organization, a person, an event, an information item, and/or any other type of information and/or key risk segment may, for example, be stored in the global address tables 1690. According to some embodiments, the global address tables 1690 may include a table for storing alternate addresses for persons (e.g., the alternate_person_address table 1692).

In some embodiments, the global address tables may also or alternatively include a table for storing information associated with various countries (e.g., the country table 1694). An address associated with a person may include country information, for example, and thus be linked via the global address tables 1690 and/or the country table 1694 to the person tables 1602. In some embodiments, the country table 1694 may be linked to the person tables 1602 to indicate the citizenship of a person.

Figure 17:
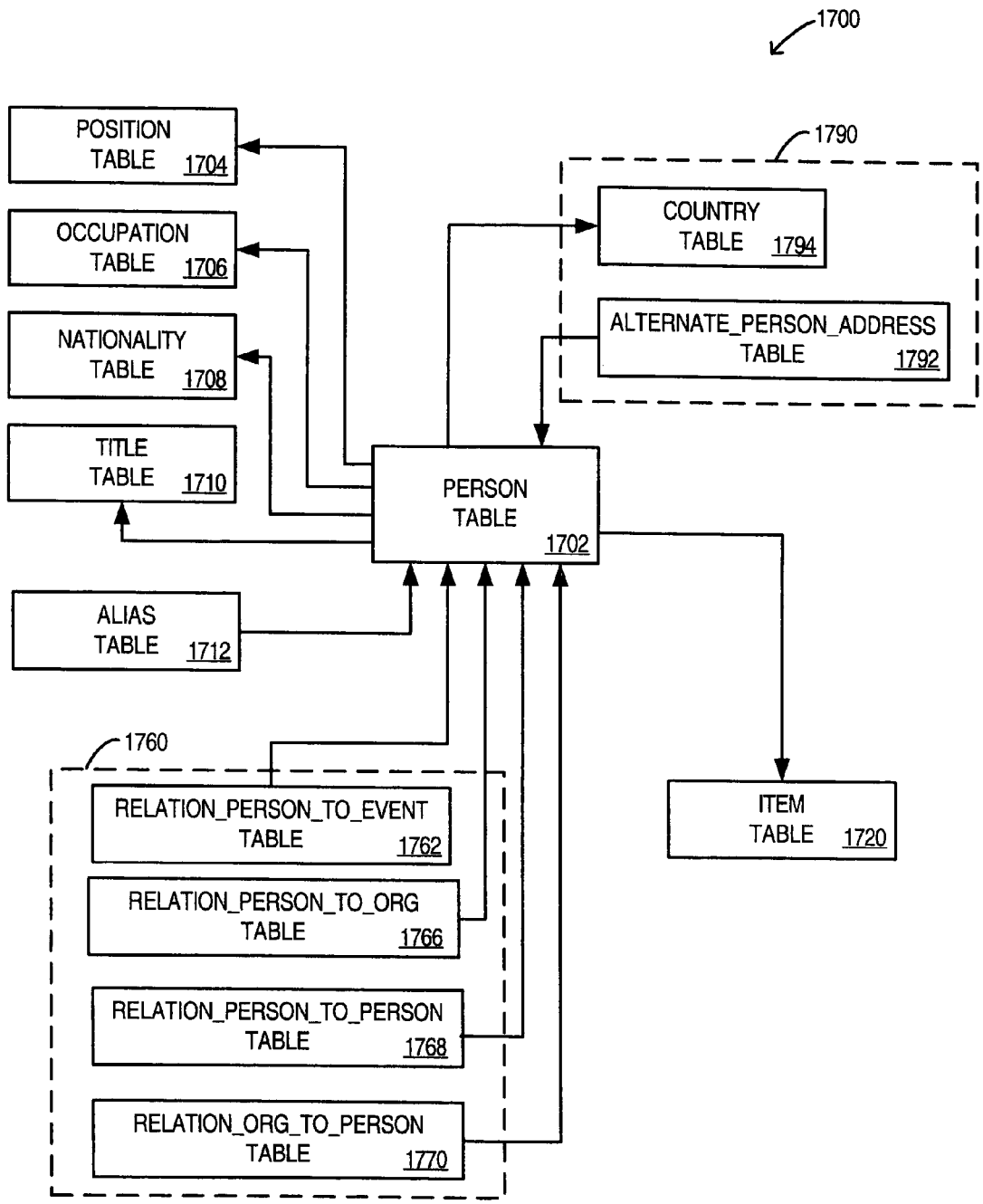
FIG. 17 is a block diagram of a portion of a data storage structure according to some embodiments.

Turning now to FIG. 17, a block diagram of a portion of a data storage structure 1700 according to some embodiments is shown. The data storage structure 1700 may, for example, be or include a portion of another data storage structure such as the data storage structure 1600 described above. In some embodiments, the data storage structure 1700 may be or include a complete data storage structure and/or may be associated with other data storage structures or portions thereof. According to some embodiments, the data storage structure 1700 may be similar to and/or otherwise associated with the person tables 1602 described above in relation to the data storage structure 1600. Other configurations of tables and/or links may be included in the data storage structure 1700 and the other data storage structures described herein without deviating from some embodiments.

The data storage structure 1700 may, according to some embodiments, include a person table 1702, a position table 1704, an occupation table 1706, a nationality table 1708, a title table 1710, and/or an alias table 1712. In some embodiments, the person table 1702 may be linked to an item table 1720, a relation_person_to_event table 1762, a relation_person_to_org table 1766, a relation_person_to_person table 1768, a relation_org_to_person table 1770, an alternate_person_address table 1792, and/or a country table 1794. In some embodiments, the tables 1702, 1720, 1760, 1762, 1766, 1790, 1792, 1794 of the data storage structure 1700 may be similar in configuration and/or functionality to the similarly-named tables described in conjunction with FIG. 16 above.

According to some embodiments, the person table 1702 may include information associated with a key risk metric (e.g., individuals). For example, individuals may often be associated with some form of risk. In some embodiments, particular types of individuals that may be associated with risk include, but are not limited to, politically exposed persons (PEP), individuals with undesirable credit and/or financial history or performance, individuals associated with socially unacceptable groups, acts, and/or positions, and/or individuals associated with crime and/or criminal acts.

An investment firm may, for example, desire not to lend money and/or enter into other transactions with a foreign national known to be associated with questionable human rights acts. To conduct business with such an individual may, for example, subject the firm to undesirable attention, scrutiny, and/or regulatory or legal action. In some embodiments therefore, information associated with such individuals (and others) may be stored in a database (e.g., in the person tables 1702).

In some embodiments, the person table 1702 may link to other tables associated with key risk segments such as the item table 1720, relationship tables 1760 (e.g., including the tables 1762, 1766, 1768, 1770), and/or global address tables 1790 (e.g., including tables 1792, 1794).

As shown in FIG. 17 and as used herein generally, links between tables may be indicated with a directional arrow pointing either away from or towards a particular table. Links pointing away from a table may, according to some embodiments, generally represent Foreign Key (FK) links to other tables (e.g., the linking field in the table is a FK representing a Primary Key (PK) of another table). Links pointing toward a table may, for example, represent PK links to other tables (e.g., the linking field is the table's PK). In some embodiments, other fields in addition to or in place of a PK may be used for linking purposes. The directions and/or types of links may, according to some embodiments, be reversed, changed, and/or otherwise altered without deviating from some embodiments.

Further aspects, according to some embodiments, of the configuration of the data storage structure 1700, and the use and types of links and PK and FK fields, will be described in reference to FIG. 18 and FIG. 19 below.

Figure 18:
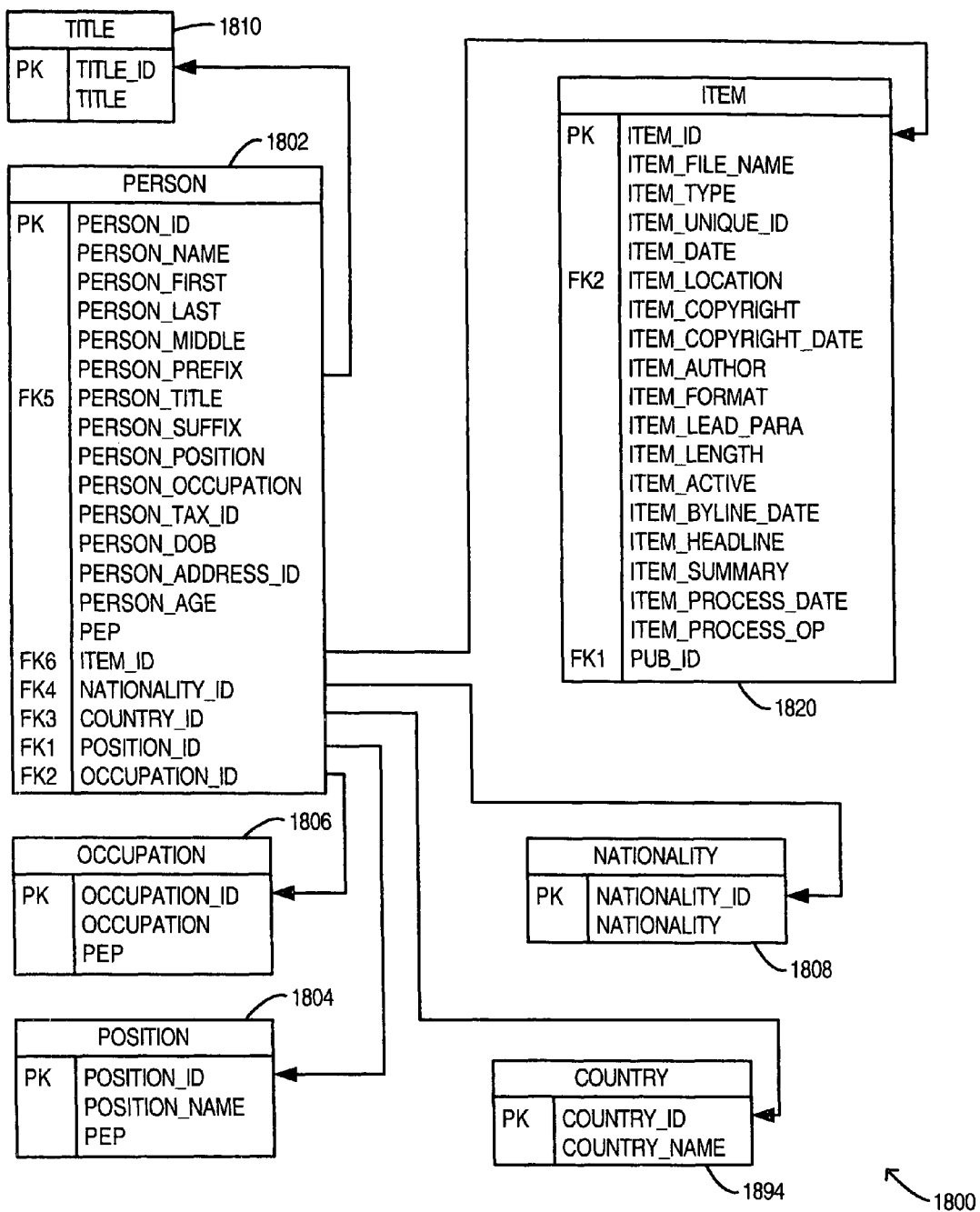
FIG. 18 is a schema diagram of an exemplary portion of a data storage structure according to some embodiments.

In FIG. 18, a schema diagram of an exemplary portion of a data storage structure 1800 according to some embodiments is shown. The data storage structure 1800 may be or include, for example, a portion of any of the data storage structures 1600, 1700 described herein. According to some embodiments, the data storage structure 1800 may be similar to and/or otherwise associated with the person tables 1602 described above in relation to the data storage structure 1600.

The data storage structure 1800 may, according to some embodiments, include a person table 1802, a position table 1804, an occupation table 1806, a nationality table 1808, and/or a title table 1810. In some embodiments, the person table 1802 may be linked to (and/or further linked to) an item table 1820 and/or a country table 1894. In some embodiments, the tables 1802, 1804, 1806, 1808, 1810, 1820, 1894 of the data storage structure 1800 may be similar in configuration and/or functionality to the similarly-named tables described in conjunction with any of FIG. 16 and/or FIG. 17 above.

In some embodiments, the person table 1802 may contain various fields related to information associated with a person (as shown). The fields may include, for example, fields relating to a person's name ("person_name", "person_first", "person_last", etc.), and/or fields relating to attributes of a person such as a person's political and/or professional capacity ("person_position", "person_occupation", etc.), a person's age ("person age"), and/or political exposure of the person ("pep"). The person table 1802 may, according to some embodiments, include a PK such as "person_id" which may, for example be a unique identifier associated with a person.

According to some embodiments, the person table 1802 may also include a FK. The FK may be or include, for example, an identifier that is unique within another table and that is represented in the person table 1802 to link the person table 1802 to the other table. More specifically, records within the person table 1802 may be linked via the FK to a specific record in the other table. For example, as shown in FIG. 18, the person table includes six fields that are identified as a FK (e.g., "position_id" as FK1, "occupation_id" as FK2, "country_id" as FK3, "nationality id" as FK4, "person_title" as FK5, and "item_id" as FK6).

Each of the FK fields represents a link to an associated table. For example, the "person_title" field of the person table 1802 is a FK (e.g., FK5) that is a link to the "title id" PK of the title table 1810. In such a manner for example, the person table 1802 may only need to store a code and/or identifier (e.g., the numeral five) for the "person_title" field. Because the field is a FK referencing the title table 1810, the code may correspond to a specific title (e.g., stored in the "title" field) stored in the title table 1810. Similarly, other tables such as the position table 1804, the occupation table 1806, the nationality table 1808, and/or the country table 1894, may be linked to the person table 1802.

In some embodiments, the person table 1802, which may be considered a key risk segment table, may also or alternatively connect and/or link to another key risk segment table. For example, the person table 1802 of FIG. 18 links to the item table 1820 via the "item_id" field. According to some embodiments, the link between two or more key risk segment tables may directly facilitate the identification of risk. For example, the link between the person table 1802 and the item table 1820 may indicate an association between an individual and an item. In some embodiments for example, the link may associate a person with a publication such as an article or an advertisement.

In some embodiments, such a link and/or association may be important for identifying risk. For example, a financial transaction involving an individual may be initiated. Utilizing the special data organization of the data storage structure 1800, a financial advisor, manager, and/or employee may, for example, easily and quickly locate the individual's name with the person table 1802. The association to the item table 1820 may, in some embodiments, indicate that the individual is mentioned in and/or authored an article condemning religious freedom. In such a manner, the individual may be determined to be suspect and/or otherwise undesirable (e.g., dealing with the individual may open the financial institution to potential criticism and/or legal disputes regarding the institution's stance on certain issues such as religious freedom).

Figure 19:
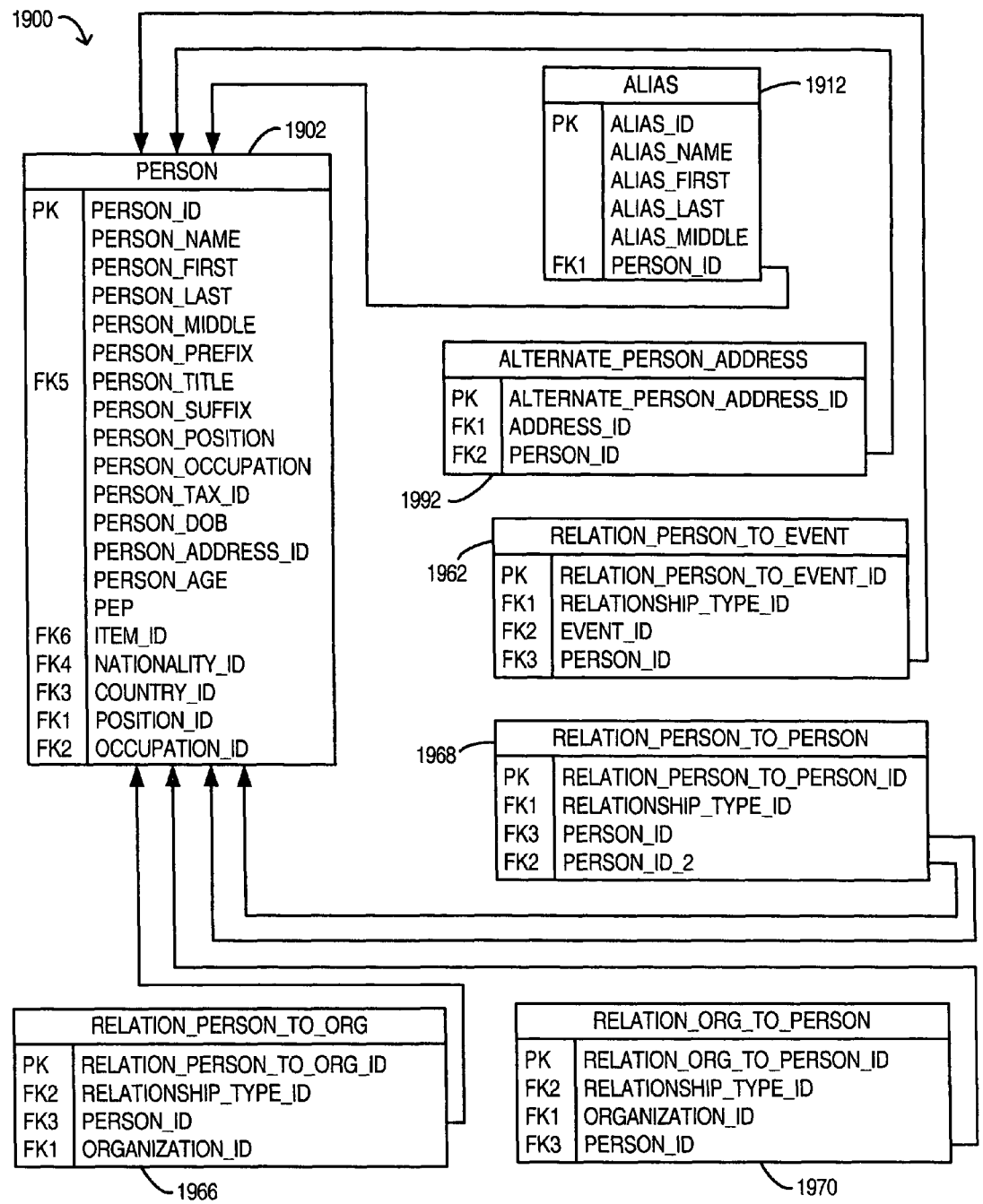
FIG. 19 is a schema diagram of an exemplary portion of a data storage structure according to some embodiments.

Referring now to FIG. 19, a schema diagram of an exemplary portion of a data storage structure 1900 according to some embodiments is shown. The data storage structure 1900 may be or include, for example, a portion of any of the data storage structures 1600, 1700, 1800 described herein. According to some embodiments, the data storage structure 1900 may be similar to and/or otherwise associated with the person tables 1602, 1802 described above in relation to the data storage structures 1600, 1802 described above.

The data storage structure 1900 may, according to some embodiments, include a person table 1902, and alias table 1912, a relation_person_to_event table 1962, a relation_person_to_org table 1966, a relation_person_to_person table 1968, a relation_org_person table 1970, and/or an alternate_person_address table 1992. In some embodiments, the tables 1902, 1912, 1962, 1966, 1968, 1970, 1992 of the data storage structure 1900 may be similar in configuration and/or functionality to the similarly-named tables described in conjunction with any of FIG. 16, FIG. 17, and/or FIG. 18 above.

In some embodiments, the data storage structure 1900 may include links between each of the alias table 1912, the relation_person_to_event table 1962, the relation_person_to_org table 1966, the relation_person_to_person table 1968, the relation_org_to_person table 1970, and/or the alternate_person_address table 1992 and the person table 1902. In some embodiments, these links may be similar to those described in conjunction with the data storage structure 1800 described above. According to some embodiments, the links may associate one of the tables 1912, 1962, 1966, 1968, 1970, 1992 to the person table 1902 by including a field for storing the PK of the person table 1902 (e.g., "person_id") in the other table.

For example, the alias table 1912 may include the "person_id" field which corresponds (e.g., as a FK) to the "person_id" field in the person table 1902. The alias table 1912 may also, in some embodiments, include its own PK, such as the "alias_id" field. In such a manner, for example, multiple unique alias names (e.g., "alias_name") may be associated with a single person. Similarly, the relation_person_to_person table 1968 may include the "person_id" as a FK (e.g. FK3) to the person table 1902. In some embodiments, the relation_person_to_person table 1968 may also include a second field (e.g., "person_id_2") related to the "person_id" field of the person table 1902. In such a manner for example, two individuals having information stored within the person table 1902 may be linked, creating an association between two members of the "person" key risk segment.

Such an association may, according to some embodiments, be important for quickly and easily identifying risk. In some embodiments for example, while a person involved in a transaction may not necessarily be associated with risk (or with much risk), the person may be related to and/or otherwise associated with a person to whom transactions should be denied. The special organization of the fields and links within the data storage structure 1900 may, in some embodiments, allow quick and/or easy identification of such an important association.

Figure 20:
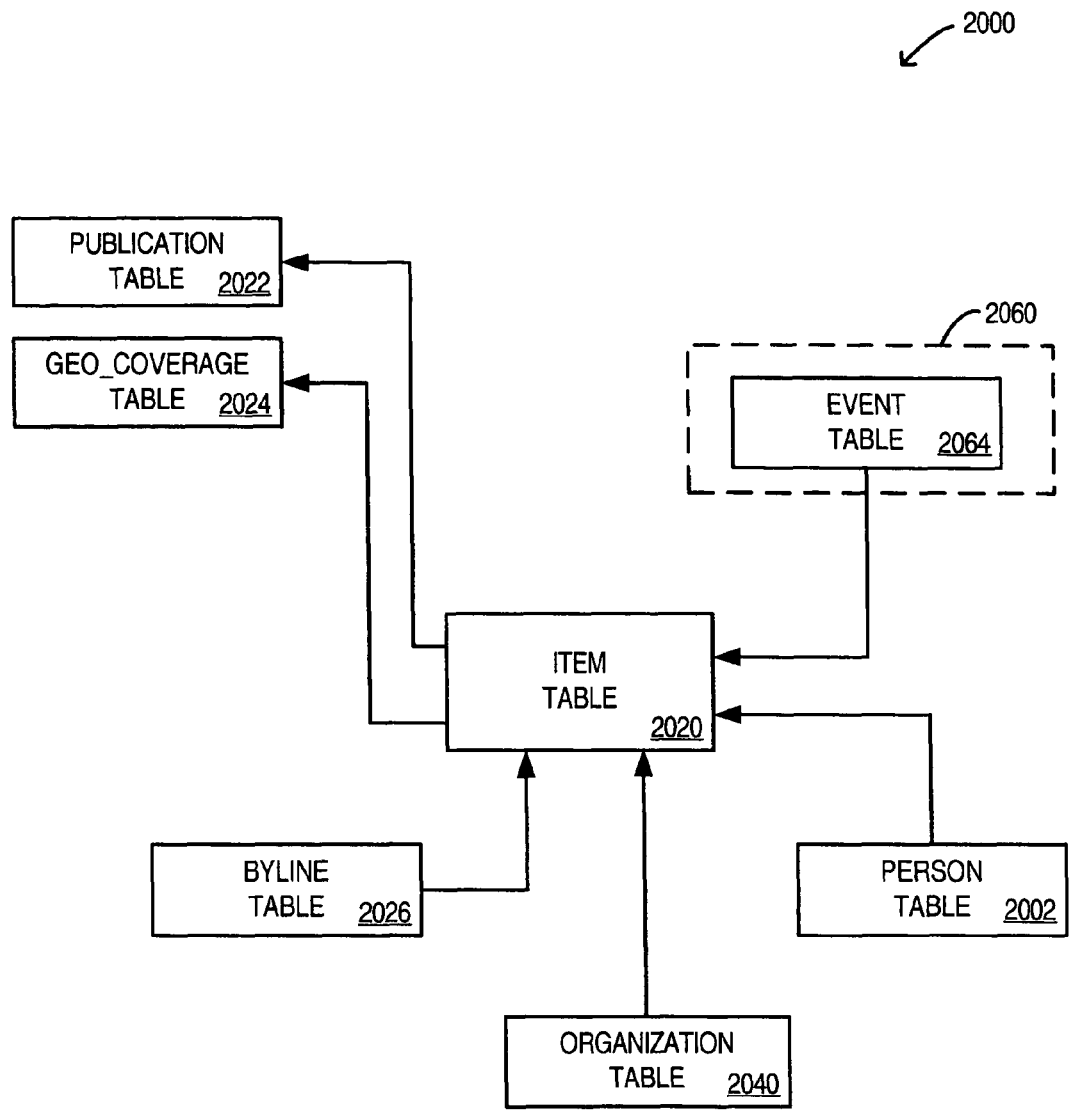
FIG. 20 is a block diagram of a portion of a data storage structure according to some embodiments.

FIG. 20 shows a block diagram of a portion of a data storage structure 2000 according to some embodiments. The data storage structure 2000 may be or include, for example, a portion of any of the data storage structures 1600, 1700, 1800, 1900 described herein. According to some embodiments, the data storage structure 2000 may be similar to and/or otherwise associated with the item tables 1620, 1720, 1820 described above in conjunction with any of FIG. 16, FIG. 17, and/or FIG. 18 above.

In some embodiments, the data storage structure 2000 may include a person table 2002, an item table 2020, a publication table 2022, a geo_coverage table 2024, a byline table 2026, an organization table 2040, and/or an event table 2064 (that may be, for example, a table associated with relationship tables 2060). In some embodiments, the tables 2002, 2020, 2022, 2040, 2060, 2064 of the data storage structure 2000 may be similar in configuration and/or functionality to the similarly-named tables described in conjunction with any of FIG. 16, FIG. 17, FIG. 18, and/or FIG. 19 above.

The item table 2020 may include, according to some embodiments, information associated with various items of information and/or other objects. In some embodiments, the item table 2020 may link to the publication table 2022 which may, for example, store information associated with one or more publications such as newspapers and other articles. The item table 2020 may, according to some embodiments, link to the geo_coverage table 2024. The geo_coverage table 2024 may, for example, store information describing the geographical scope of an item's content and/or market coverage. In some embodiments, the item table 2020 may link to the byline table 2026. For example, the byline table 2026 may include authorship and/or other important information relating to a publication and/or article.

According to some embodiments, the item table 2020 may be a key risk segment table. The item table 2020 may, for example, include information about articles and other informational items that are deemed important factors in identifying risk. In some embodiments for example, news articles and other sources of information (e.g., government lists, criminal records, etc.) may be one of the key risk segments used to determine risk-related relationships and associations. According to some embodiments, the item table 2020 may be linked to other key risk segment tables (e.g., the person table 2002, the organization table 2040, and/or the relationship tables 2060). In some embodiments, the associations and/or links between the key risk segment tables 2002, 2020, 2040, 2060 may directly facilitate the identification of risk (e.g., by allowing quick and easy identification of the important risk-related associations).

Figure 21:
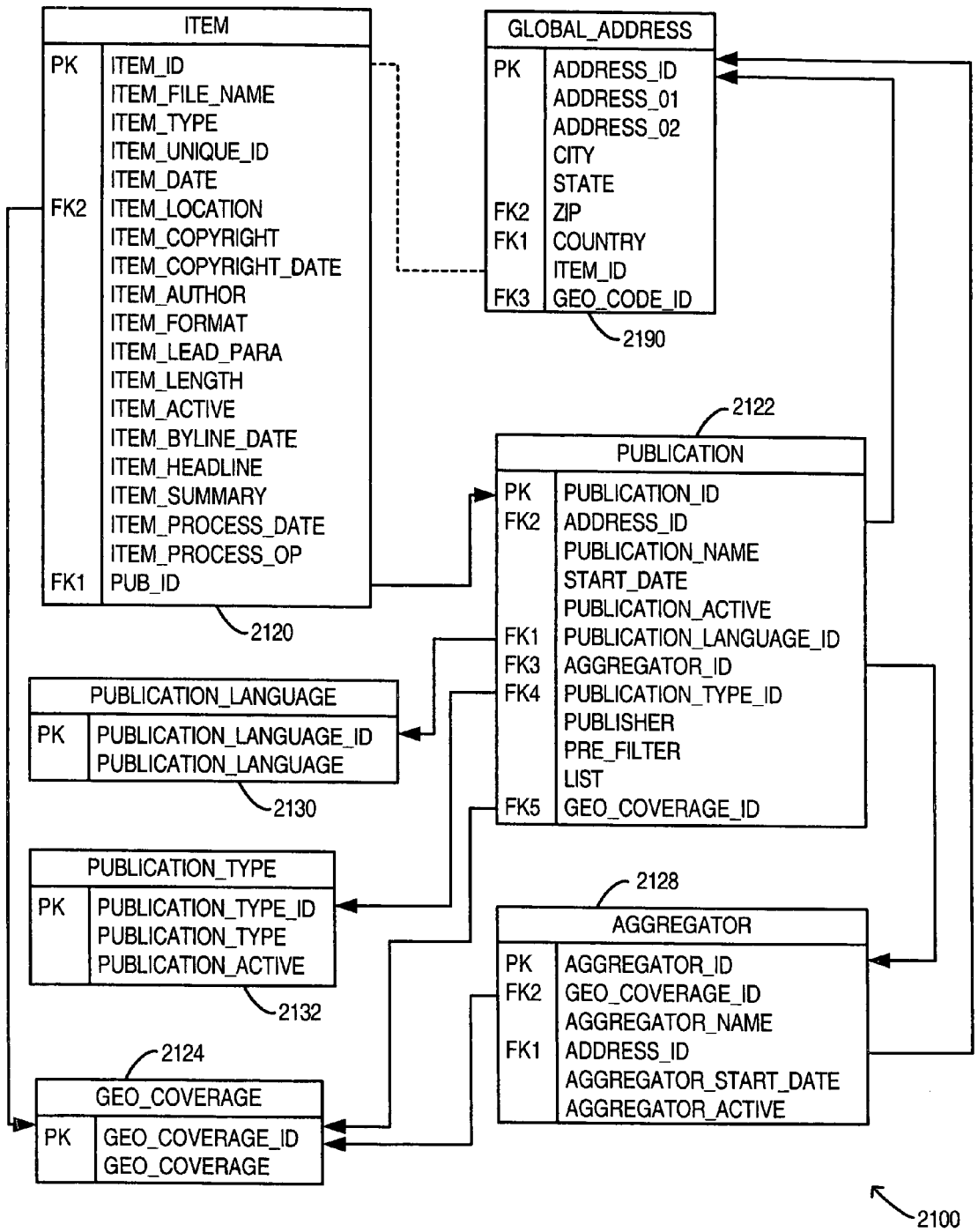
FIG. 21 is a schema diagram of an exemplary portion of a data storage structure according to some embodiments.

In FIG. 21, a schema diagram of an exemplary portion of a data storage structure 2100 according to some embodiments is shown. The data storage structure 2100 may be or include, for example, a portion of any of the data storage structures 1600, 1700, 1800, 1900, 2000 described herein. According to some embodiments, the data storage structure 2100 may be similar to and/or otherwise associated with the item tables 1620, 1720, 1820, 2020 described above in conjunction with any of FIG. 16, FIG. 17, FIG. 18, and/or FIG. 20.

The data storage structure 2100 may, according to some embodiments, include an item table 2120, a publication table 2122, a geo_coverage table 2124, an aggregator table 2128, a publication_language table 2130, a publication_type table 2132, and/or a global_address table 2190. In some embodiments, the tables 2120, 2122, 2124, 2128, 2130, 2132, 2190 of the data storage structure 2100 may be similar in configuration and/or functionality to the similarly-named tables described in conjunction with any of FIG. 16, FIG. 17, FIG. 18, and/or FIG. 20 above.

In some embodiments, the item table 2120 may include various fields and/or keys (e.g., a PK, a FK, etc.) that contain information relating to one or more items of information. The items of information may, for example, be or include collected, aggregated, tagged, filtered, and/or otherwise analyzed (e.g., for relevancy and/or redundancy) information received from various sources (e.g., the information redundancy engine 230, 730, 930, 1030, 1230, 1530, the information gathering engine 210, 410, 610, 1510, etc.). According to some embodiments, the item table 2120 may include, for example, fields relating to an item's authorship ("item_author"), an item's origin and/or type ("item_type", "item_date", "item_location", etc.), and/or various attributes of the item ("item_format", "item_length", etc.).

In some embodiments, the item table 2120 may be linked to the publication table 2122. The "pub_id" field (FK1) may, for example, link an item and/or associated information to publication information related to the same item. The publication table 2122 may include, in some embodiments, fields relating to the publication of an item such as a "publication_name" field, a "publisher" field, a "publication_language_id" field, and/or and "address_id" field. In some embodiments, the "address_id" field may by a FK (e.g., FK2) to the global_address table 2190. The link may associate, for example, one or more addresses to the publication. In some embodiments, an address may be associated by being an address of the publisher, and address listed or mentioned in the publication, and/or another type and/or form of associated address.

According to some embodiments, the item table 2120 may be a key risk segment table. Similarly, the global_address table 2190 may, according to some embodiments, be considered a key risk segment table. In some embodiments, the two tables 2120, 2190 may be linked (e.g., via the publication table 2122). Such a link may, for example, represent an association between an item and an address. For example, an anti-American newsletter may be published by a group or individual residing at and/or operating out of a particular address. The publication may be linked with that address via the "address_id" field stored in both the global_address table 2190 and the publication table 2122. In some embodiments, the global_address table 2190 may contain a field (e.g., "item_id") linking the global_address table 2190 and/or a particular address directly to the item table 2120 and/or a particular item.

Such an association between an item (such as a publication) and an address may provide many advantages. In some embodiments for example, the association may be associated with risk (e.g., as described above in relation to an anti-American newsletter). According to some embodiments, the association between an item and an address may, for example, allow a user to quickly and/or easily determine risk. The user may, for example, be considering providing a mortgage to an organization for a property located at a specific address. The layout of the data storage structure 2100 may, in some embodiments, allow the user to quickly and easily determine that the address is associated with a type of publication (and/or a specific publication) that it is not desirable to be associated with. In such a manner for example, the user may evaluate any risk associated with the address and take measures (e.g., terminating the transaction) that may reduce the amount of risk that the user may be exposed to.

Figure 22:
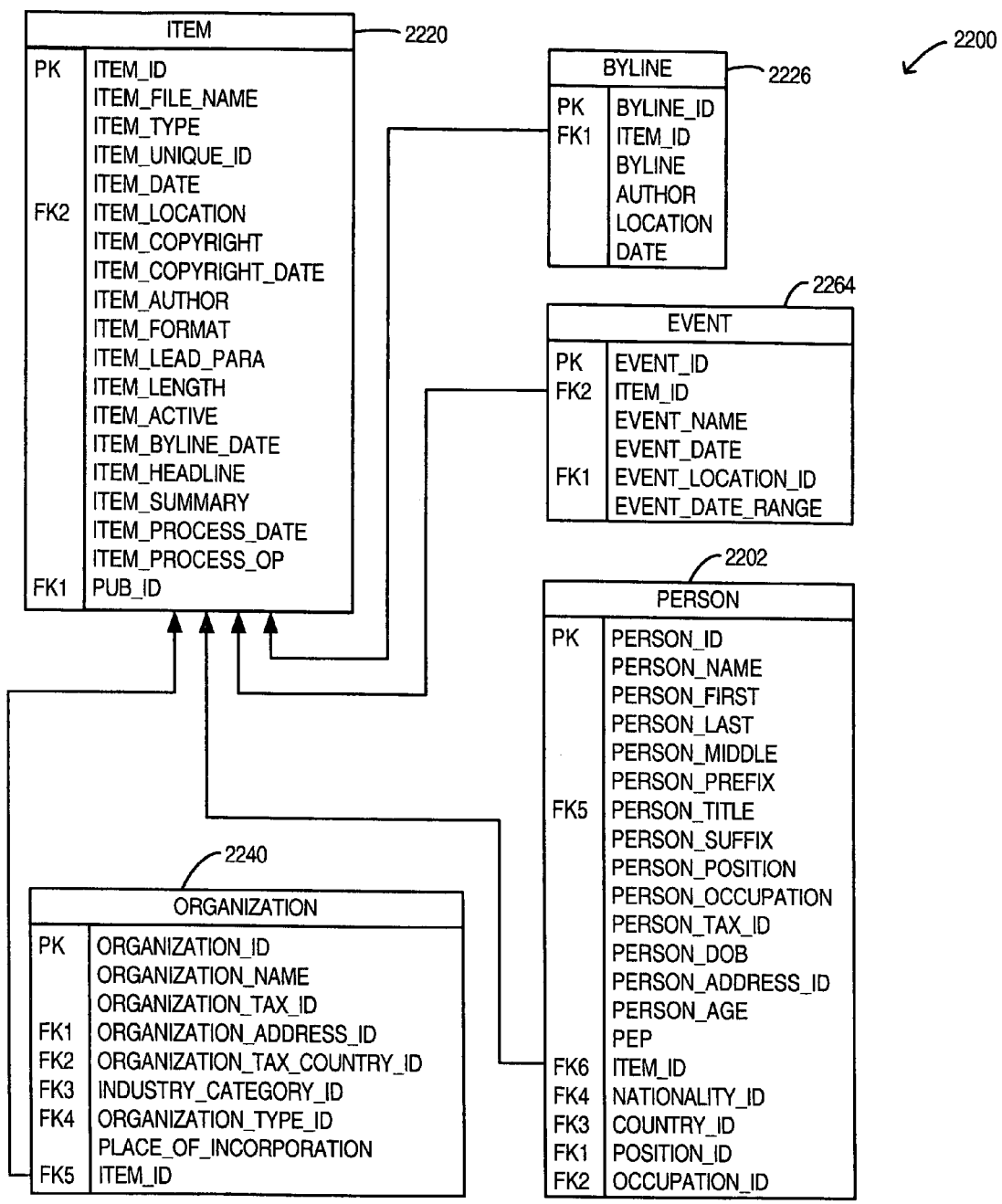
FIG. 22 is a schema diagram of an exemplary portion of a data storage structure according to some embodiments.

In FIG. 22, a schema diagram of an exemplary portion of a data storage structure 2200 according to some embodiments is shown. The data storage structure 2200 may be or include, for example, a portion of any of the data storage structures 1600, 1700, 1800, 1900, 2000, 2100 described herein. According to some embodiments, the data storage structure 2200 may be similar to and/or otherwise associated with the item tables 1620, 1720, 1820, 2020, 2120 described above in conjunction with any of FIG. 16, FIG. 17, FIG. 18, FIG. 20, and/or FIG. 21 above.

The data storage structure 2200 may, according to some embodiments, include a person table 2202, an item table 2220, a byline table 2226, an organization table 2240, and/or an event table 2264. In some embodiments, the tables 2202, 2220, 2226, 2240, 2264 of the data storage structure 2200 may be similar in configuration and/or functionality to the similarly-named tables described in conjunction with any of FIG. 16, FIG. 17, FIG. 18, FIG. 20, and/or FIG. 21 above.

In some embodiments, the byline table 2226 may be linked to the item table 2220 (e.g., via the "item_id" field). The byline table 2226 may, for example, be linked in a many-to-one fashion with the item table 2220. In other words, one or more "byline_id" fields and/or "author" fields may be associated with any particular "item_id". Where multiple authors are responsible for contributing to a publication or other item, for example, a record for each author may be stored in the byline table 2226. In some embodiments, such an association allows multiple authors to be associated with a particular item.

According to some embodiments, the item table 2220 may be considered a key risk segment table (e.g., as described elsewhere herein). In some embodiments, the item table 2220 may be linked and/or otherwise associated with other key risk segment tables such as the person table 2202, the organization table 2240, and/or the event table 2264 (which may be, for example, one of the relationship tables 1660, 1760, 2060). According to some embodiments, the item table 2220 may contain information associated with and/or otherwise representing an item such as a publication. The publication may, for example, be associated with an "item_id" field and/or with a "pub_id" field.

In some embodiments, the publication may describe a fundraising event held by a corporation to benefit a political candidate. The various associations between the publication, the organization, the fundraiser, and the candidate may, according to some embodiments, be represented by the data storage structure 2200. For example, the publication information in the item table 2220 may be linked to the organization information stored in the organization table 2240 via the "item_id" field. Similarly, the item table 2220 may be linked to the person table 2202 via the "item_id" field, relating one or more persons (in this case, for example, the political candidate) to the publication. Further, the record associated with the publication that is stored in the item table 2220 may be linked to one or more records in the event table 2264 via the "item_id" field.

Other items of information associated with organizations may be provided. For example, pursuant to some embodiments, an organization may be a shipping organization having a number of vessels or ships, aircraft, or other vehicles. As a specific example, an organization may be associated with information stored in one or more table(s) identifying specific vessels (e.g., including information identifying each vessel's call sign, type, tonnage, flag, etc.).

In some embodiments, the layout of the tables, links, and/or data elements of the data storage structure 2200 may facilitate the identification of risk. For example, the associations between the various aspects of the political fundraising event described above may be easily identified based upon the links between the appropriate key risk segment tables. In some embodiments, a user may easily and/or quickly be able to identify risk and/or risk factors associated with an individual, item, event, and/or organization. The user may, for example, search the data storage structure for information regarding the organization. The links and/or associations between the key risk segment tables, according to some embodiments, would allow the user to easily identify that the political candidate, for example, is connected to the organization (e.g., a factor that may be related to political and/or other risk).

Figure 23:
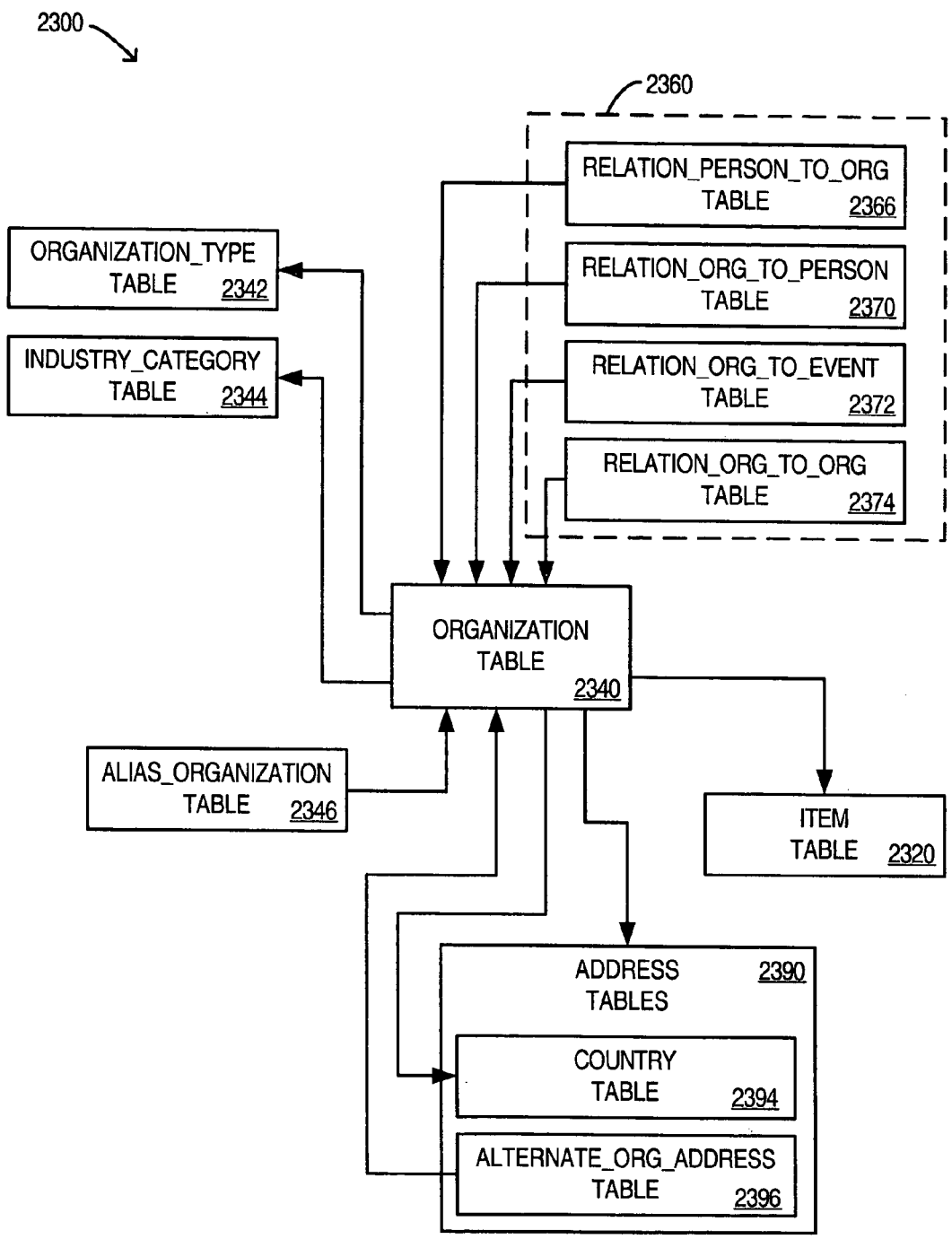
FIG. 23 is a block diagram of a portion of a data storage structure according to some embodiments.

Turning now to FIG. 23, a block diagram of a portion of a data storage structure 2300 according to some embodiments is shown. The data storage structure 2300 may be or include, for example, a portion of any of the data storage structures 1600, 1700, 1800, 1900, 2000, 2100, 2200 described herein. According to some embodiments, the data storage structure 2300 may be similar to and/or otherwise associated with the organization tables 1640, 2040, 2240 described above in conjunction with any of FIG. 16, FIG. 20, and/or FIG. 22 above.

In some embodiments, the data storage structure 2300 may include an organization table 2340, an organization_type table 2342, an industry_category table 2344, an alias_organization table 2346, an item table 2320, a global_address table 2390, a country table 2394, an alternate_org_address table 2396, a reation_person_to_org table 2366, a relation_org_to_person table 2370, a relation_org_to_event table 2372, and/or a relation_org_to_org table 2374. In some embodiments, the tables 2320, 2340, 2360, 2366, 2370, 2390, 2394 of the data storage structure 2300 may be similar in configuration and/or functionality to the similarly-named tables described in conjunction with any of FIG. 16, FIG. 17, FIG. 18, FIG. 19, FIG. 20, FIG. 21, and/or FIG. 22 above.

The organization table 2340 may include, according to some embodiments, information associated with various organizations, businesses, governments, and/or other entities. In some embodiments, the organization table 2340 may be linked to the organization_type table 2342. The organization_type table 2342 may, according to some embodiments, store information relating to the type of organization (e.g., non-profit, political action, business, trade union, etc.). In some embodiments, the organization table 2340 may be linked to the industry_category table 2344. The industry_category table 2344 may store, for example, information relating to the industry and/or category of the organization. In some embodiments, the industry category may be or include a Standard Industrial Classification (SIC) code and/or other industrial identifier (e.g., based on the International Organization for Standards (ISO) 9001:2000 certification, etc.).

The organization table 2340 may also or alternatively be linked to the alias_org table 2346. The alias_org table 2346 may include, for example, information relating an organization to an alias organization. In some embodiments, the alias organization may be another name by and/or under which the organization does business and/or is known, a parent, child, and/or sibling organization, and/or any other type of related organization (e.g., predecessor organization, etc.). In some embodiments, the alias tables described herein (e.g., the alias_org table 2346) may associate various spellings of an organization's name. Different language variations and/or foreign spellings and/or abbreviations, may for example, be related via the alias_org table 2346 to the organization table 2340.

In some embodiments, the organization table 2340 may be a key risk segment table. Relations to other key risk segment tables such as the item table 2320, the global_address tables 2390, and/or the relation tables 2360 may, according to some embodiments, be identified via links between the respective tables. The organization table 2340 may, for example, be linked to the country table 2394, which may store information associating an organization with one or more countries (e.g., of incorporation, place of business, market coverage, etc.). In some embodiments, the organization table 2340 may be linked to the alternate_org_address table 2396, which may, for example, associate an organization with one or more alternate addresses (e.g., addresses of branch offices, different departments, etc.).

According to some embodiments, the organization table 2340 may be linked to various relationship tables 2360 (e.g., including the relation_person_to_org table 2366, the relation_org_to_person table 2370, the relation_org_to_event table 2372, and/or the relation_org_to_org table 2374). The relationship tables 2360 may each, according to some embodiments, associate an organization of the organization table 2340 with other entities. For example, the relation_org_to_org table 2374 may link to the organization table 2340 to represent an association between two or more organizations that are represented in the organization table 2340. In some embodiments, such links between key risk segments may facilitate the identification of risk.

Figure 24:
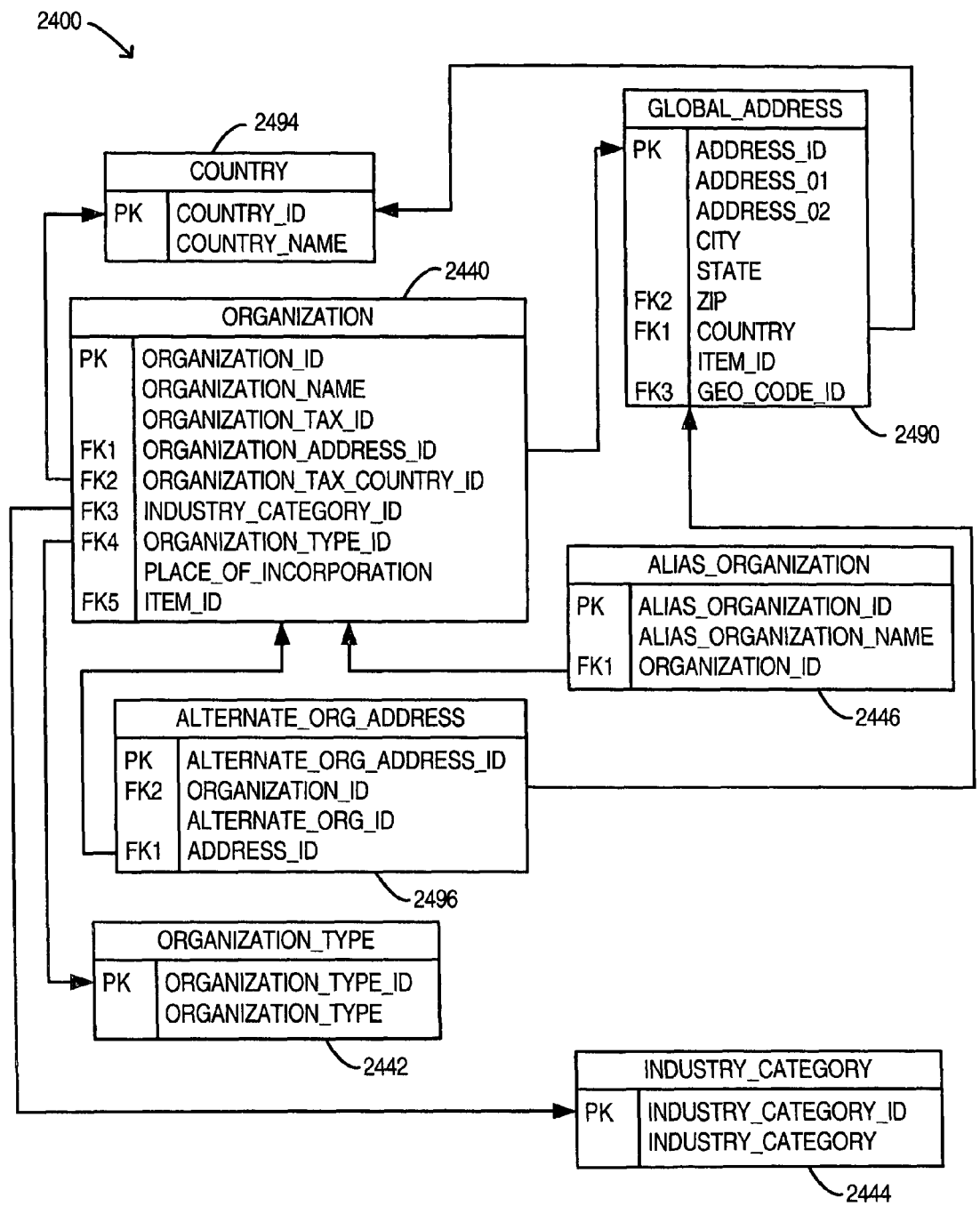
FIG. 24 is a schema diagram of an exemplary portion of a data storage structure according to some embodiments.

In FIG. 24, a schema diagram of an exemplary portion of a data storage structure 2400 according to some embodiments is shown. The data storage structure 2400 may be or include, for example, a portion of any of the data storage structures 1600, 1700, 1800, 1900, 2000, 2100, 2200, 2300 described herein. According to some embodiments, the data storage structure 2400 may be similar to and/or otherwise associated with the organization tables 1640, 2040, 2240, 2340 described above in conjunction with any of FIG. 16, FIG. 20, FIG. 22, and/or FIG. 23.

The data storage structure 2400 may, according to some embodiments, include an organization table 2440, an organization_type table 2442, an industry_category table 2444, an alias_organization table 2446, a global_address table 2490, a country table 2494, and/or an alternate_org_address table 2496. In some embodiments, the tables 2440, 2442, 2444, 2446, 2490, 2494, 2496 of the data storage structure 2400 may be similar in configuration and/or functionality to the similarly-named tables described in conjunction with any of FIG. 16, FIG. 17, FIG. 18, FIG. 19, FIG. 20, FIG. 21, FIG. 22, and/or FIG. 23 above.

In some embodiments, the organization table 2440 may include various fields and/or keys (e.g., a PK, a FK, etc.) that contain information relating to one or more organization and/or other entities. The organizations may include, for example, government agencies, social or political action groups, and/or other societies, groups, and/or entities. According to some embodiments, the organization table 2440 may include fields that relate to an organization's attributes ("organization_name", "place_of_incorporation", etc.) and/or that relate to identifiers and/or keys that are associated with organization attributes (e.g., "organization_type_id", "industry_category_id", "organization_tax_id", etc.).

In some embodiments, the organization table 2440 may be a key risk segment table. For example, many organizations are associated with principles, acts, images, and/or beliefs that are offensive, abusive, and/or harmful to others. Such organizations may, according to some embodiments, not be deemed desirable to do business with. In some embodiments, identification of associations with such organizations may be important to determining risk. In some embodiments for example, risk associated with an organization from the organization table 2440 may be identified by an association between the organization and an alias organization (e.g., that is known to be a suspect organization) as identified by a link to the alias_organization table 2446.

Figure 25:
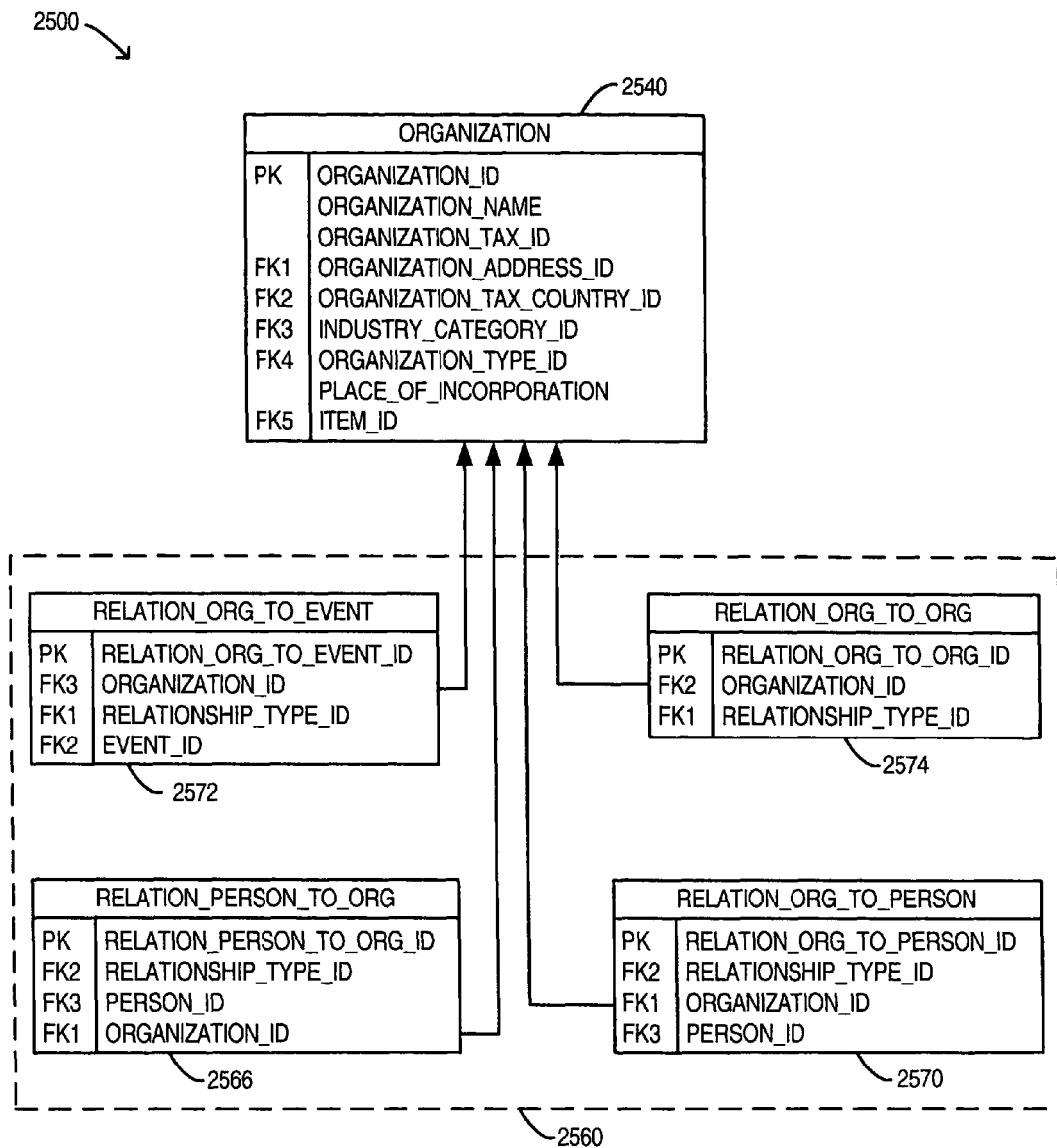
FIG. 25 is a schema diagram of an exemplary portion of a data storage structure according to some embodiments.

Referring now to FIG. 25, a schema diagram of an exemplary portion of a data storage structure 2500 according to some embodiments is shown. The data storage structure 2500 may be or include, for example, a portion of any of the data storage structures 1600, 1700, 1800, 1900, 2000, 2100, 2200, 2300, 2400 described herein. According to some embodiments, the data storage structure 2500 may be similar to and/or otherwise associated with the organization tables 1640, 2040, 2240, 2340, 2440 described above in conjunction with any of FIG. 16, FIG. 20, FIG. 22, FIG. 23, and/or FIG. 24.

The data storage structure 2500 may, according to some embodiments, include an organization table 2540, a relation_person_to_org table 2566, a relation_org_to_person table 2570, a relation_org_to_event table 2572, and/or a relation_org_to_org table 2574. In some embodiments, the tables 2540, 2566, 2570, 2572, 2574 of the data storage structure 2500 may be similar in configuration and/or functionality to the similarly-named tables described in conjunction with any of FIG. 16, FIG. 17, FIG. 18, FIG. 19, FIG. 20, FIG. 21, FIG. 22, FIG. 23, and/or FIG. 24 above.

In some embodiments, the organization table 2540 may include information associated with one or more organizations and/or other entities (e.g., as described elsewhere herein). The organization table 2540 may, for example, contain information associated with a chemical manufacturer. In some embodiments, the organization table 2540 may link to the relation_org_to_org table 2574. The relation_org_to_org table 2574 may, for example, contain information associating the chemical manufacturer with a particular subsidiary company. According to some embodiments, the organization table 2540 may also or alternatively link to the relation_org_to_event table 2572. For example, the relation_org_to_event table 2572 may contain information that associates the subsidiary company with a particular event such as a chemical spill.

According to some embodiments, the organization table 2540 may be linked to the relation_person_to_org table 2566. For example, the relation_person_to_org table 2566 may contain information that associates an individual one or more organizations such as to the chemical manufacturer and/or the subsidiary company. Such an individual may include, for example, a chief executive officer (CEO) or president, an employee (e.g., that caused the spill), a safety compliance officer, and/or any other associated individual. In some embodiments, the organization table 2540 may also or alternatively be linked to the relation_org_to_person table 2570. The relation_org_to_person table 2570 may, for example, contain information relating an organization to one or more individuals.

In some embodiments, only one of the relation_org_to_person table 2570 and the relation_person_to_org table 2566 may be included in the data storage structure 2500. According to some embodiments, the link between the organization table 2540 and one of the relation_person_to_org table 2566 and the relation_org_to_person table 2570 may be a one-to-many link, while the link between the organization table 2540 and the other of the relation_org_to_person table 2570 and the relation_person_to_org table 2566 may be a many-to-one link.

According to some embodiments, the links between the organization table and the various relation tables 2560 may facilitate the identification of risk. In some embodiments for example, a first organization may be linked to an event, and the event may be linked to an individual. Further, the individual may be linked to a second organization, and the second organization may be linked to a third organization. Each of the links described above may, for example, be exemplified by the links between the various tables of the data storage structure 2500. According to some embodiments, the chain of association between various events, organizations, items, and/or individuals may be utilized to identify risk. In some embodiments for example, the closer a risk-related entity (like a known criminal) appears to another entity (like an organization) in the chain of links and/or associations, the more risk there is that may be attributed to the other entity. According to some embodiments, a risk score may be directly (or inversely) proportional to the degree of separation between two or more entities.

Figure 26:
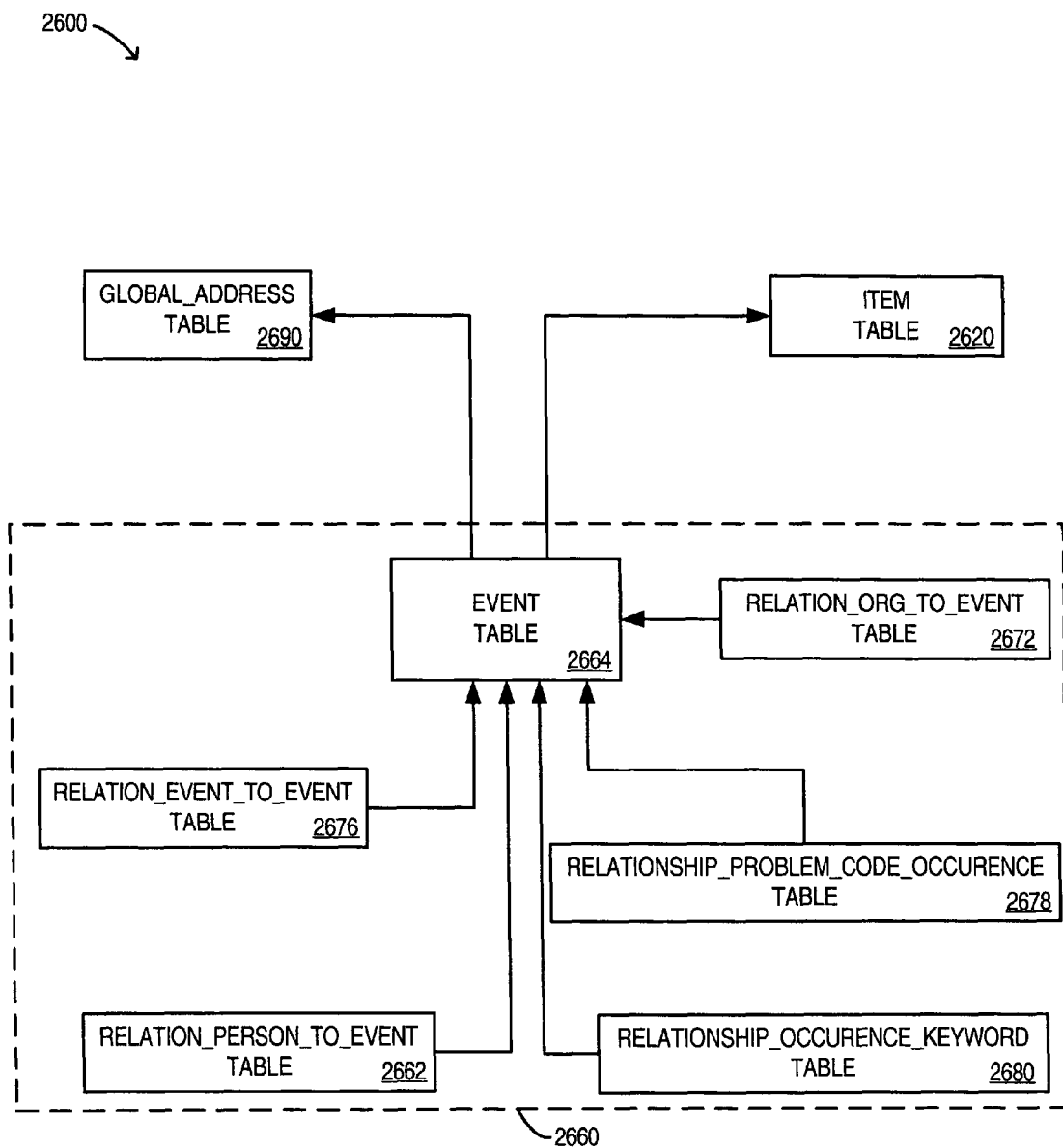
FIG. 26 is a block diagram of a portion of a data storage structure according to some embodiments.

FIG. 26 shows a block diagram of a portion of a data storage structure 2600 according to some embodiments. The data storage structure 2600 may be or include, for example, a portion of any of the data storage structures 1600, 1700, 1800, 1900, 2000, 2100, 2200, 2300, 2400, 2500 described herein. According to some embodiments, the data storage structure 2600 may be similar to and/or otherwise associated with the relationship tables 1660, 1760, 2060, 2360, 2560 described above in conjunction with any of FIG. 16, FIG. 17, FIG. 20, FIG. 23, and/or FIG. 25 above.

In some embodiments, the data storage structure 2600 may include an event table 2664, an item table 2620, a global_address table 2690, a relation_person_to_event table 2662, a relation_org_to_event table 2672, a relation_event_to_event table 2676, a relationship_problem_code_occurence table 2678, and/or a relationship_occurence_keyword table 2680. In some embodiments, the tables 2620, 2662, 2664, 2672 of the data storage structure 2600 may be similar in configuration and/or functionality to the similarly-named tables described in conjunction with any of FIG. 16, FIG. 17, FIG. 18, FIG. 19, FIG. 20, FIG. 21, FIG. 22, FIG. 23, FIG. 24, and/or FIG. 25 above.

According to some embodiments, the event table 2664 may include information associated with various events and/or happenings. The event table 2664 may, for example, contain information related to various political, social, economic, public, and/or private events. Events may include, but are not limited to, elections, convictions, verdicts, marriages, births, deaths, financial transactions, wars, conflicts, stock prices, and weather events. In some embodiments, the information associated with the one or more events may be derived, aggregated, and/or compiled from one or more items of information. Items of information stored in the item tables 1620, 1720, 1820, 2020, 2120, 2220, 2320, for example, may be analyzed, parsed, and/or otherwise examined and/or processed to extract, retrieve, and/or otherwise determine or identify the event information stored in the event table 2664.

In some embodiments, the event table 2664 may be linked to the relationship_occurence keyword table 2680. The relationship_occurence keyword table 2680 may, for example, store information relating to various keywords which may be associated with events, types of events, and/or risk. For example, the relationship_occurence keyword table 2680 may contain keywords that are used to search through available relationship information to determine risk and/or relevancy. In some embodiments, the event table 2664 may also or alternatively be linked to the relationship_problem_code_occurence table 2678. According to some embodiments, the relationship_problem_code_occurence table 2678 may include information relating to errors, problems, and/or other issues relating to various relationships.

The event table 2664, according to some embodiments, may be linked to the relation_org_to_event table 2672, the relation_event_to_event table 2676, and/or the relation_person_to_event table 2662. For example, each of the linked tables 2662, 2672, 2676 may associate one or more events with one or more other entities, events, and/or other objects. In some embodiments, the relation_event_to_event table 2676 may, for example, associate two or more events having information stored within the event table 2664. According to some embodiments, the links between the event table 2664 and the other linked tables 2662, 2672, 2676 may be or include one-to-many links, many-to-one links, and/or any combination thereof.

In some embodiments, the event table 2664 may be a key risk segment table. For example, certain events may be important to determining and/or otherwise identifying risk. According to some embodiments, the event table 2664 may be linked to other key risk segment tables such as the item table 2620 and/or the global_address table 2690. In some embodiments, the links and/or associations between the various key risk segment tables 2664, 2620, 2690 may facilitate the identification of risk. For example, an event that is known to be associated with risk and is stored in the event table 2664 may be associated with an item (e.g., a publication) stored in the item table 2620 and/or an address stored in the global_address table 2690. In such a manner for example, the item and/or the address may be easily identified as being associated with a risk-relevant event.

Figure 27:
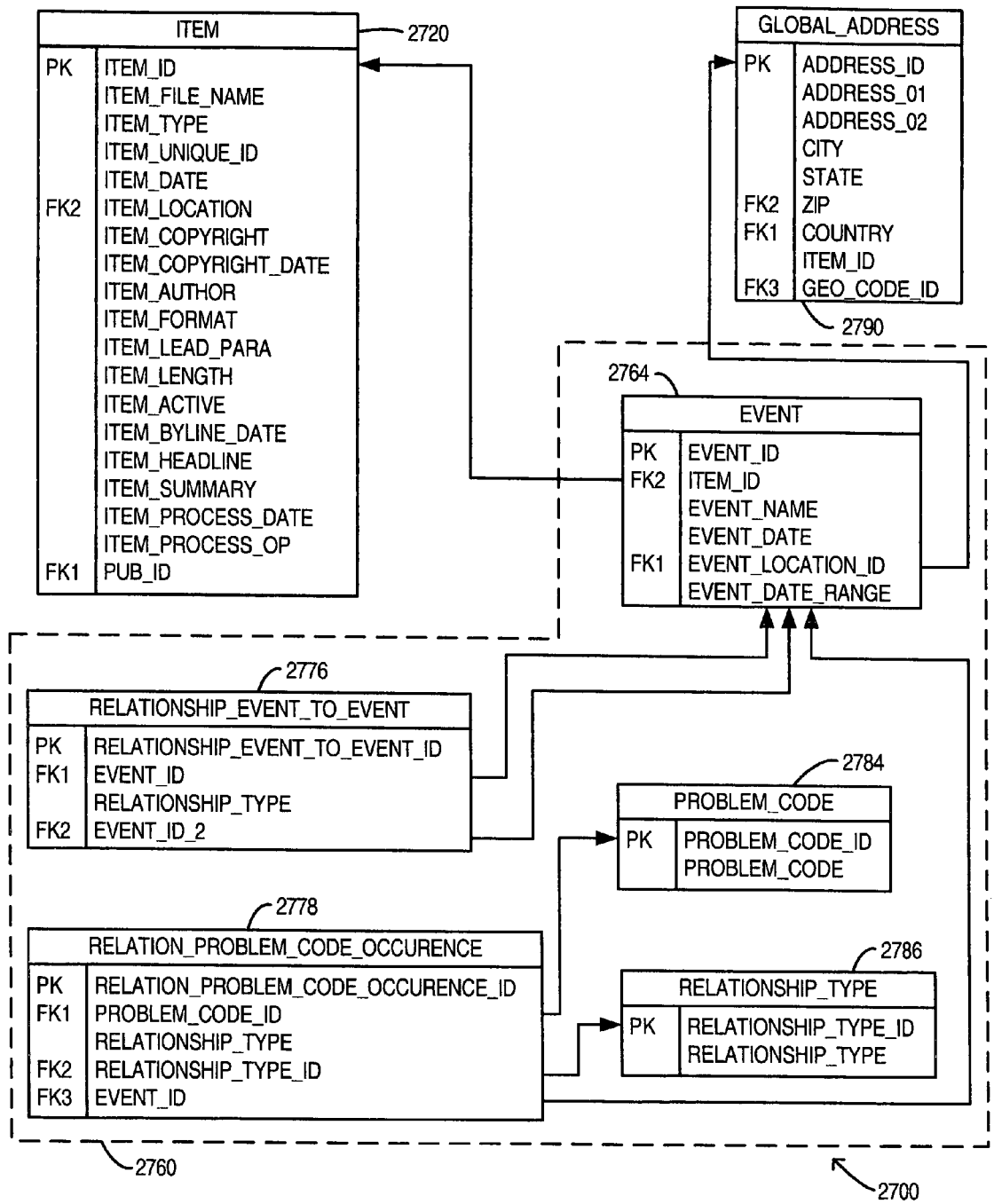
FIG. 27 is a schema diagram of an exemplary portion of a data storage structure according to some embodiments.

Turning now to FIG. 27, a schema diagram of an exemplary portion of a data storage structure 2700 according to some embodiments is shown. The data storage structure 2700 may be or include, for example, a portion of any of the data storage structures 1600, 1700, 1800, 1900, 2000, 2100, 2200, 2300, 2400, 2500, 2600 described herein. According to some embodiments, the data storage structure 2700 may be similar to and/or otherwise associated with the relationship tables 1660, 1760, 2060, 2360, 2560, 2660 described above in conjunction with any of FIG. 16, FIG. 17, FIG. 20, FIG. 23, FIG. 25, and/or FIG. 26 above.

The data storage structure 2700 may, according to some embodiments, include an event table 2764, an item table 2720, a global_address table 2790, a relation_event_to_event table 2776, a relationship_problem_code_occurence table 2778, a problem_code table 2784, and/or a relationship_type table 2786. In some embodiments, the tables 2720, 2764, 2776, 2778, 2790 of the data storage structure 2700 may be similar in configuration and/or functionality to the similarly-named tables described in conjunction with any of FIG. 16, FIG. 17, FIG. 18, FIG. 19, FIG. 20, FIG. 21, FIG. 22, FIG. 23, FIG. 24, FIG. 25, and/or FIG. 26 above.

In some embodiments, the event table 2764 may include information relating to various events. For example, the even table 2764 may include fields relating to attributes of an event ("event_name", "event_date", etc.). In some embodiments, the event table 2764 may be linked to the global_address table 2790 (e.g., via the FK "event_location_id" link to the PK "address_id"). For example, via a one-to-many link between the event table 2764 and the gobal_address table 2790, an event may be associated with one or more addresses.

According to some embodiments, the event table 2764 may be linked to the item table 2720 (either or both of which may be, for example, key risk segment tables). In some embodiments, an event having information stored in the event table 2764 may, for example, be related (e.g., via a link) to one or more items (such as publications) stored in the item table 2720. According to some embodiments, the event table 2764 may also or alternatively be linked to the relationship_event_to_event table 2776.

For example, an event stored in the event table 2764 may be linked to one or more other events stored in the event table 2764 via the relationship_event_to_event table 2776. In some embodiments, the relationship_event_to_event table 2776 may include a "relationship_type" field that describes and/or otherwise relates to the type of relationship between the events. In some embodiments, the relationship_event_to_event table 2776 may also or alternatively include a "relationship_type_id" field (not shown in the relationship_event_to_event table 2776 in FIG. 27) that may link, for example, to the relationship_type table 2786 (link not shown in FIG. 27).

According to some embodiments, the event table 2764 may be linked to the relation_problem_code_occurence table 2778 which may, for example, be further linked to the problem_code table 2784 and/or the relationship_type table 2786. In some embodiments, the relation_problem_code_occurence table 2778 may contain, for example, information relating to a problem associated with a relationship. The problem may include, for example, a technical issue, an error, a risk, and/or any other type of issue and/or problem. In some embodiments, the problem may be associated with a "problem_code_id" that may, for example, be a FK link to the problem_code table 2784.

The problem_code table 2784 may, according to some embodiments, include a code, description, and/or other explanation and/or identifier associated with a particular problem type (e.g., "problem_code"). In some embodiments, the relationship_type table 2786 may be similarly linked to the relation_problem_code_occurence table 2778 to identify one or more particular types of relationships associated with an event. In some embodiments, the relationship_type table 2786 and/or the problem_code table 2784 may be used to identify features of problems and/or relationships other than and/or instead of in relation to events.

Figure 28:
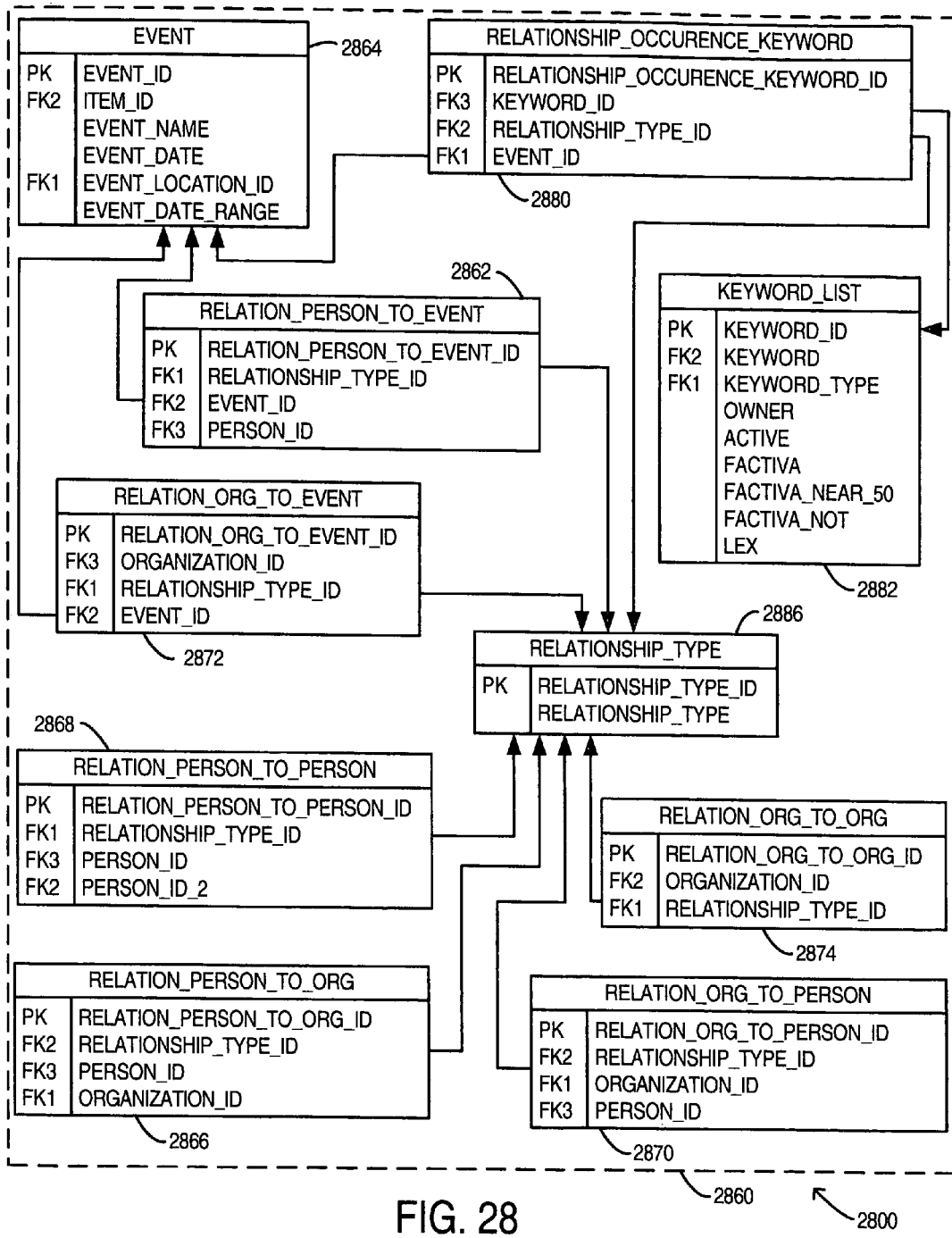
FIG. 28 is a schema diagram of an exemplary portion of a data storage structure according to some embodiments.

For example, FIG. 28 shows a schema diagram of an exemplary portion of a data storage structure 2800 according to some embodiments. The data storage structure 2800 may be or include, for example, a portion of any of the data storage structures 1600, 1700, 1800, 1900, 2000, 2100, 2200, 2300, 2400, 2500, 2600, 2700 described herein. According to some embodiments, the data storage structure 2800 may be similar to and/or otherwise associated with the relationship tables 1660, 1760, 2060, 2360, 2560, 2660, 2760 described above in conjunction with any of FIG. 16, FIG. 17, FIG. 20, FIG. 23, FIG. 25, FIG. 26, and/or FIG. 27 above.

The data storage structure 2800 may, according to some embodiments, include an event table 2864, a relation_person_to_event table 2862, a relationship_occurrence_keyword table 2880, a keyword_list table 2882, a relation_org_to_event table 2872, a relation_person_to_person table 2868, a relation_person_to_org table 2866, a relation_org_to_person table 2870, a relation_org_to_org table 2874, and/or a relationship_type table 2886. In some embodiments, the tables 2862, 2864, 2866, 2868, 2870, 2872, 2874, 2880, 2886 of the data storage structure 2800 may be similar in configuration and/or functionality to the similarly-named tables described in conjunction with any of FIG. 16, FIG. 17, FIG. 18, FIG. 19, FIG. 20, FIG. 21, FIG. 22, FIG. 23, FIG. 24, FIG. 25, FIG. 26, and/or FIG. 27 above.

In some embodiments, the relationship tables 2860 may include a keyword_list table 2882. The keyword_list table 2882 may, for example, contain records for various keywords (e.g., stored in the "keyword" field). In some embodiments, one or more of the keywords may be or include a keyword that is determined to be associated with risk. For example, keywords, terms, and/or phrases may include, but are not limited to, "convicted", "arrested", "indicted", "suspected of", "fled", "in hiding", "exiled", and "defaulted". Such words, terms, and/or phrases may, for example, be determined to have a likelihood of being associated with risk. According to some embodiments, the keywords of the keyword_list table 2882 may be linked to the relationship_occurence_keyword table 2880.

The relationship_occurence_keyword table 2880 may, for example, store information associated with various events, relationships, and/or keywords. In some embodiments, the relationship_occurence_keyword table 2880 may link to the keyword_list table 2882 via the "keyword_id" field. The relationship_occurence_keyword table 2880 may, in some embodiments, store information relating to occurrences of keywords found in relation to certain events and/or relationships. For example, every occurrence of a keyword within information associated with an event may be represented by a record (e.g., in the relationship_occurence_keyword table 2880) linking the event information stored in the event table 2864 and the keyword information stored in the keyword_list table 2880.

In some embodiments, the event table 2864 may be linked to multiple other relations tables 2860. As shown in FIG. 28 for example, the event table 2864 may be associated with persons and/or organizations via links to the relation_person_to_event table 2862 and/or to the relation_org_to_event table 2872. According to some embodiments, many or all of the relation tables 2860 may link to the relationship_type table 2886. The relationship_type table 2886 may, for example, be a lookup table that contains information describing relationship types that are referenced by the "relationship_type_id" field.

Figure 29:
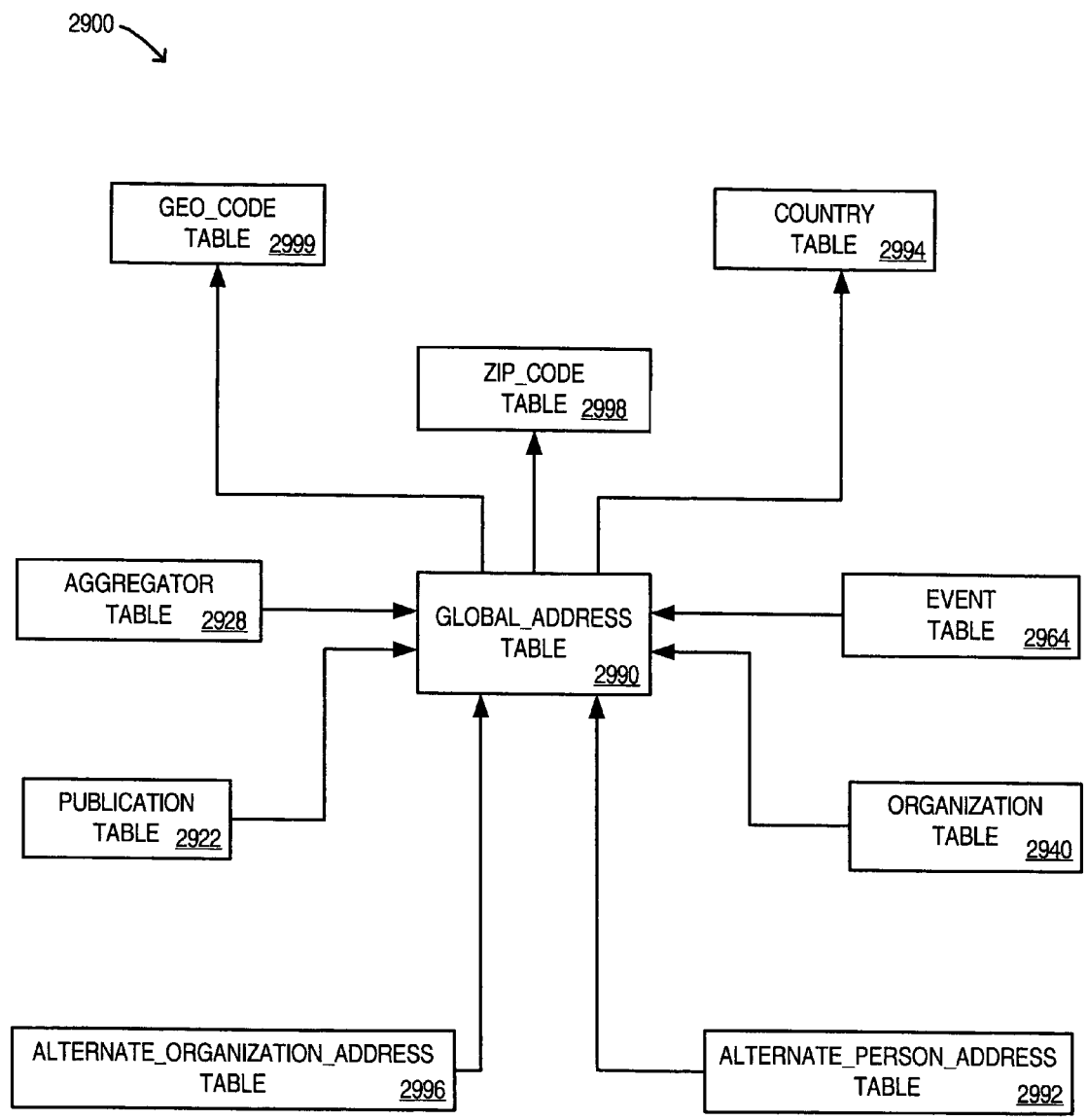
FIG. 29 is a block diagram of a portion of a data storage structure according to some embodiments.

Referring now to FIG. 29, a block diagram of a portion of a data storage structure 2900 according to some embodiments is shown. The data storage structure 2900 may be or include, for example, a portion of any of the data storage structures 1600, 1700, 1800, 1900, 2000, 2100, 2200, 2300, 2400, 2500, 2600, 2700, 2800 described herein. According to some embodiments, the data storage structure 2900 may be similar to and/or otherwise associated with the address tables 1690, 1790, 2190, 2390, 2490, 2790 described above in conjunction with any of FIG. 16, FIG. 17, FIG. 21, FIG. 23, FIG. 24, and/or FIG. 27 above.

In some embodiments, the data storage structure 2900 may include a global_address table 2990, a geo_code table 2999, a zip_code table 2998, a country_code table 2994, an aggregator table 2928, a publication table 2922, an alternate_organization_address table 2996, an alternate_person_address table 2992, an event table 2964, and/or an organization table 2940. In some embodiments, the tables 2922, 2928, 2940, 2964, 2990, 2992, 2994, 2996 of the data storage structure 2900 may be similar in configuration and/or functionality to the similarly-named tables described in conjunction with any of FIG. 16, FIG. 17, FIG. 18, FIG. 19, FIG. 20, FIG. 21, FIG. 22, FIG. 23, FIG. 24, FIG. 26, FIG. 27, and/or FIG. 28 above.

According to some embodiments, the global_address table 2990 may include information relating to addresses and/or other location and/or geographic positions. In some embodiments, the global_address table 2990 may store postal address information. The global_address table 2990 may, according to some embodiments, link to various other tables such as lookup tables. In some embodiments, lookup tables linked to the global_address table 2990 may include, but are not limited to, the zip_code table 2998, the geo_code table 2999, and/or the country table 2994. For example, the zip_code table 2998 may link to the gobal_address table 2990 and may store information associated with zip code and/or other postal codes. Similarly, the country_code table 2994 may contain information associated with various countries, provinces, and/or states. In some embodiments, the geo_code table 2999 may contain information relating to geographic, political, and/or other relational areas and/or regions.

In some embodiments, the aggregator table 2928 may link to the global_address table 2990. The aggregator table 2928 may store, for example, information associated with data and/or information aggregation. In some embodiments, information may be aggregated based on regional and/or other location information. In such embodiments, the aggregator table 2928 may, for example, link to the global_address table to associate various aggregations with appropriate regional and/or location codes and/or other information (e.g., localities, addresses, etc.).

The publication table 2922, the alternate_organization_address table 2996, and/or the alternate_person_address table 2992 may, according to some embodiments, be linked to the global_address table 2990. For example, each or any of the linked tables 2922, 2992, 2996 may link to the global_address table 2990 to associate various publications, organizations, and/or persons, respectively, to one or more addresses and/or other location information. In some embodiments, the global_address table 2990 may link to other and/or additional tables that contain information associated with one or more addresses.

In some embodiments, the global_address table 2990 may be a key risk segment table. According to some embodiments, an address may be associated with risk. For example, a real estate property associated with an address may contain and/or otherwise be associated with liability. In some embodiments, the property may be subject to liens or judgments and/or may contain contamination or other environmental, occupational, and/or political risk. Some properties, for example, may be located in an area for which ownership and/or sovereignty is disputed between one or more entities and/or nations.

The global_address table 2990 may, according to some embodiments, be linked to other key risk segment tables. The global_address table 2990 may, for example, link to the event table 2964 and/or to the organization table 2940. In some embodiments, the global_address table 2990 may store address and/or other location information associated with events and/or organizations having information stored within the event table 2964 and/or the organization table 2940, respectively. In some embodiments, the association between two or more risk segments (e.g., an address and an organization, an address and an event, etc.) may facilitate the identification of risk. If an address that is related to a known Superfund Site is identified as related to an organization, for example, it may be determined that the organization is associated with risk (e.g., environmental liability).

Figure 30:
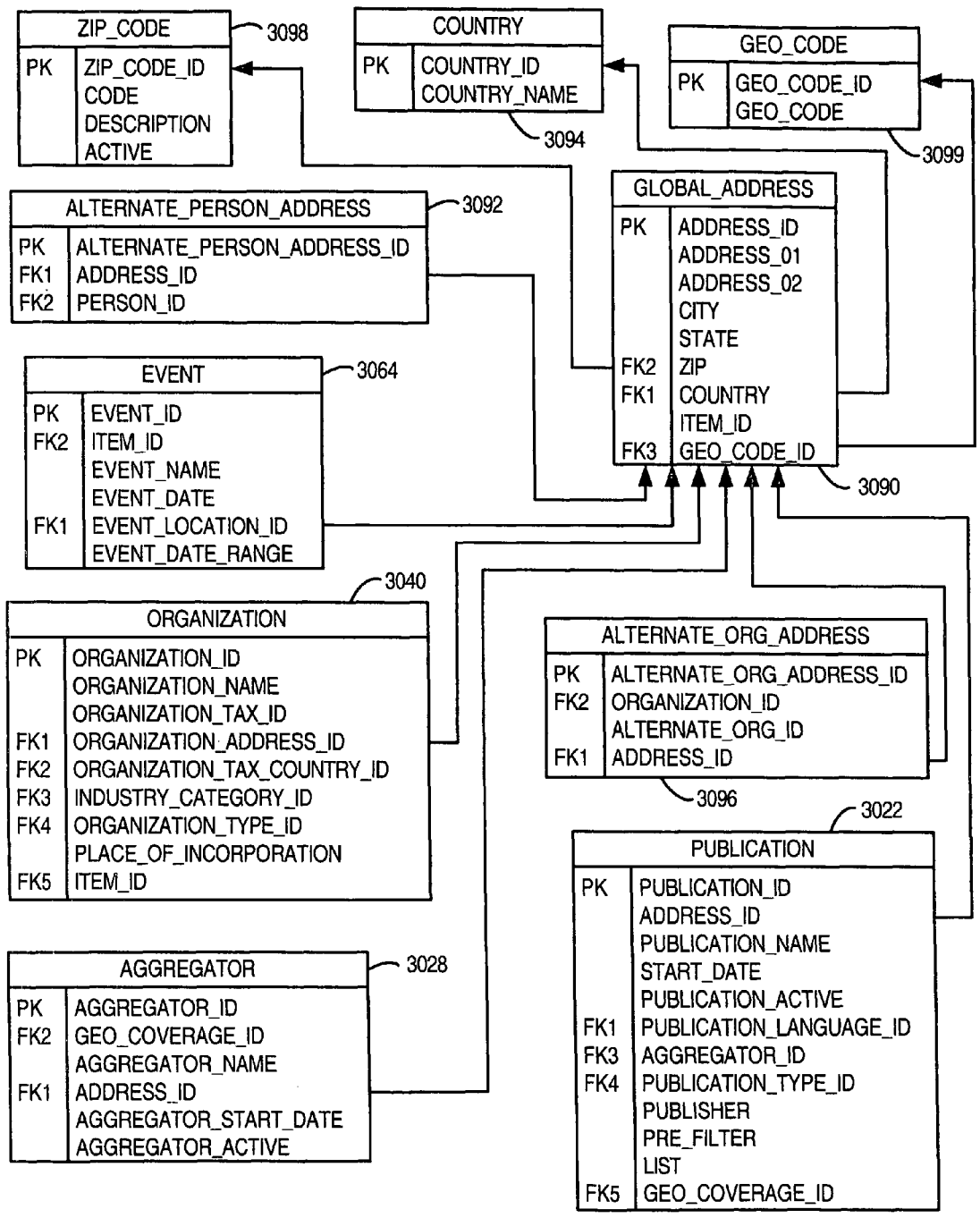
FIG. 30 is a schema diagram of an exemplary portion of a data storage structure according to some embodiments.

In FIG. 30, a schema diagram of an exemplary portion of a data storage structure 3000 according to some embodiments is shown. The data storage structure 3000 may be or include, for example, a portion of any of the data storage structures 1600, 1700, 1800, 1900, 2000, 2100, 2200, 2300, 2400, 2500, 2600, 2700, 2800, 2900 described herein. According to some embodiments, the data storage structure 3000 may be similar to and/or otherwise associated with the address tables 1690, 1790, 2190, 2390, 2490, 2790, 2990 described above in conjunction with any of FIG. 16, FIG. 17, FIG. 21, FIG. 23, FIG. 24, FIG. 27, and/or FIG. 29.

The data storage structure 3000 may, according to some embodiments, include a global_address table 3090, a geo_code table 3099, a zip_code table 3098, a country_code table 3094, an aggregator table 3028, a publication table 3022, an alternate_organization_address table 3096, an alternate_person_address table 3092, an event table 3064, and/or an organization table 3040. In some embodiments, the tables 3022, 3028, 3040, 3064, 3090, 3092, 3094, 3096 of the data storage structure 3000 may be similar in configuration and/or functionality to the similarly-named tables described in conjunction with any of FIG. 16, FIG. 17, FIG. 18, FIG. 19, FIG. 20, FIG. 21, FIG. 22, FIG. 23, FIG. 24, FIG. 26, FIG. 27, FIG. 28, and/or FIG. 29 above.

In some embodiments, the global_address table 3090 may include information relating to various addresses and/or other location identifiers or information. For example, the global_address table 3090 may include fields relating to a postal address (e.g., "address_01", "address_02", "city", "state", etc.). In some embodiments, the global_address table 3090 may link to other tables such as lookup tables. For example, the global_address table 3090 may link to the geo_code table 3099, the country table 3094, and/or the zip_code table 3098. The lookup tables 3094, 3098, 3099 may, for example, contain descriptions and/or other information associated with various codes and/or identifiers (e.g., "country_id", "zip_code_id", and "geo_code_id", respectively) stored within the global_address table 3090. In some embodiments, the various identifier fields may be related to address and/or location information stored within the global_address table 3090 (e.g., "zip_code_id" may be related to a zip code associated with one or more addresses, etc.).

In some embodiments, the global_address table 3090 may be linked to one or more alternate address tables such as the alternate_person_address table 3092 and/or the alternate_org_address table 3096. The alternate address tables 3092, 3096 may, for example, contain information associating a person and/or an organization with more than one address stored within the global_address table 3090. If a person and/or an organization has different billing and shipping addresses, a seasonal address, a temporary address, and/or an address associated with a branch office, alias, and/or associated entity, for example, such information may be represented by a record in one of the alternate address tables 3092, 3096.

In some embodiments, the global_address table 3090 may also or alternatively be linked to the aggregator table 3028. Aggregation (e.g., that is performed by the information gathering device 210, 410, 610, 1510) may, according to some embodiments, be based at least in part on location information. For example, information may be aggregated based on geographic relevancy and/or scope. In some embodiments, a software program and/or other aggregator may, for example, aggregate information relating to a specific region, state, area, and/or other location-based descriptor. The aggregator table 3028 may store, for example, fields relating to the attributes of a specific aggregator (e.g., "aggregator_name", "aggregator_start_date", etc.). According to some embodiments, an aggregator may be associated with one or more addresses and/or other locations by linking the aggregator information stored in the aggregator table 3028 to the global_address table 3090 (e.g., via the "address_id" field).

According to some embodiments, the global_address table 3090 may be a key risk segment table (e.g., as described elsewhere herein). The global_address table 3090, in some embodiments, may be linked to other key risk segment tables such as, but not limited to, the event table 3064, the organization table 3040, and the publication table 3022 (e.g., which may be an item table 1620, 1720, 1820, 2020, 2120, 2220, 2320, 2720). In some embodiments, an organization may be linked to one or more specific addresses (e.g., via the "organization_address_id" field). Similarly, an event may be associated with an address and/or other location via a link between the "event_location_id" field of the event table 3064 and the "address_id" field of the global_address table 3090. In some embodiments, the publication table 3022 may be linked to the global_address table 3090 via the "address_id" field. According to some embodiments, the "address_id" linking any or all of the key risk segment tables 3022, 3040, 3064, 3090 may be the same.

For example, a publication, an event, and an organization may all be associated with an address. In some embodiments, the address that associates the event, organization, and publication may provide an easy and/or quick way to identify the relationship between the different key risk segments. According to some embodiments, such an association via a common address may facilitate the identification of risk. For example, if an organization is being analyzed for risk, the association between the organization and any of the event, the publication, and/or the address may be easily identified by the links between the respective address identifying fields. In some embodiments, the event may be associated with a known risk for example. Any review of the organization may quickly identify that the risk-associated event is related (e.g., via an address) to the organization. In such a manner, for example, a risk assessment for the organization may be performed.

Turning now to FIGS. 31-35, diagrams of exemplary database tables according to some embodiments are shown. The exemplary data shown as being stored within the exemplary tables is provided solely for the purpose of illustration. The various database tables and/or data elements described herein are depicted for use in explanation, but not limitation, of described embodiments. Different types, layouts, quantities, and configurations of any of the database tables and/or data elements described herein may be used without deviating from the scope of some embodiments.

Figure 31:
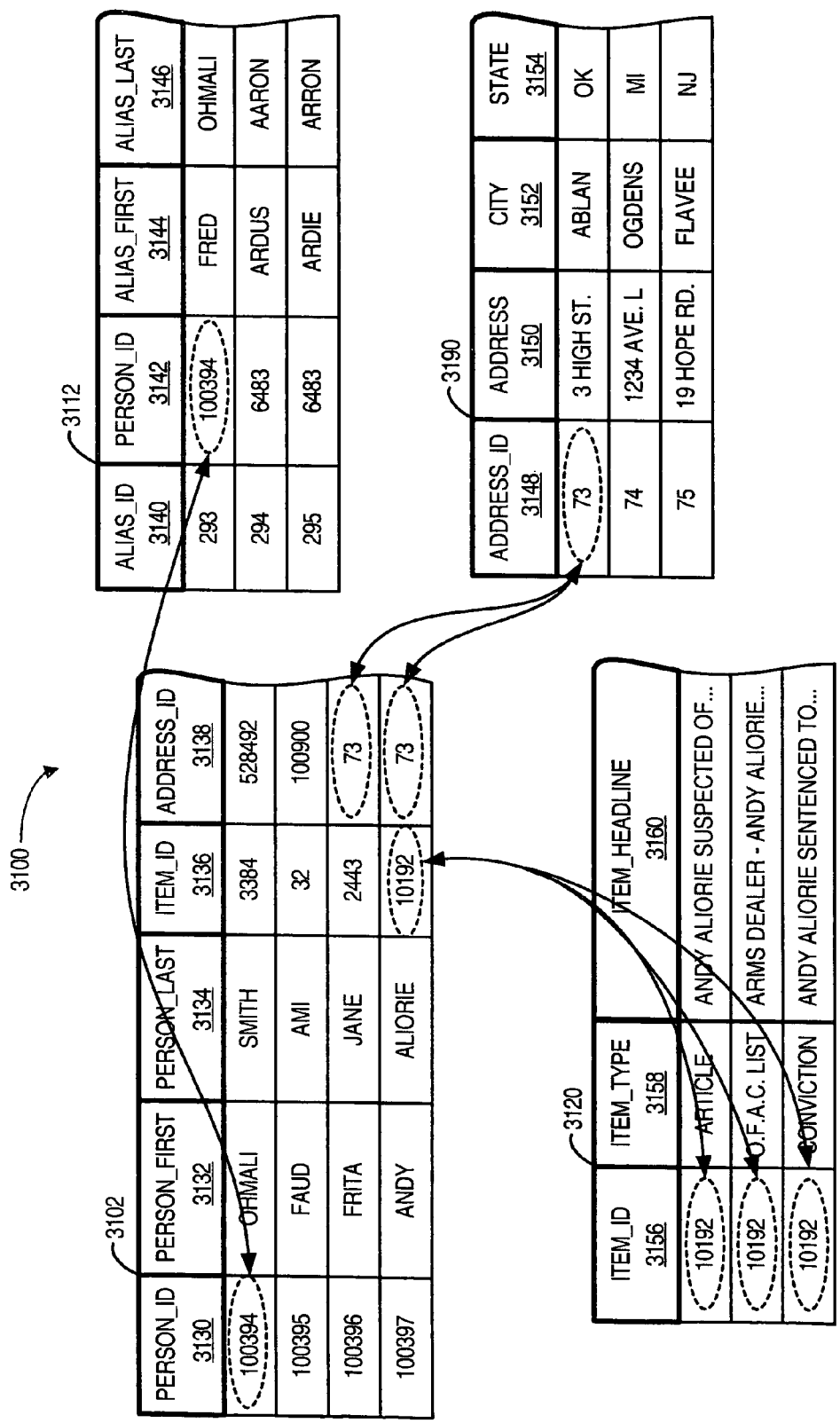
FIG. 31 is a diagram of exemplary database tables according to some embodiments.

Referring to FIG. 31, a diagram of exemplary database tables 3100 according to some embodiments is shown. In some embodiments, the database tables 3100 may be or include database tables stored within and/or by the database system 240, 440, 640, 1040, 1240, 1340, 1540 described herein. According to some embodiments, the database tables 3100 may be stored in a data storage structure similar to any of the data storage structures 1600, 1700, 1800, 1900, 2000, 2100, 2200, 2300, 2400, 2500, 2600, 2700, 288, 2900, 3000 described herein. In some embodiments, the database tables 3100 may be similar in composition, configuration, and/or functionality to the similarly-named tables described above in conjunction with any of FIG. 16, FIG. 17, FIG. 18, FIG. 19, FIG. 20, FIG. 21, FIG. 22, FIG. 23, FIG. 24, FIG. 27, FIG. 29, and/or FIG. 30.

In some embodiments, the database tables 3100 may include a person table 3102, an alias table 3112, an item table 3120, and/or an address table 3190. In some embodiments, any or all of the tables 3102, 3112, 3120, 3190 may be or include key risk segment tables. According to some embodiments for example, each of the person table 3102, the item table 3120, and the address table 3190 may be considered a key risk segment table. In some embodiments, fewer or more tables (and/or key risk segment tables) may be included with the database tables 3100.

The person table 3102 may include, according to some embodiments, a "person_id" field 3130, a "person_first" field 3132, a "person_last" field 3134, an "item_id" field 3136, and/or an "address_id" field 3138. In some embodiments, the "person_id" field 3130 may store an identifier and/or other indicator associated with a person. According to some embodiments (such as shown in FIG. 31), the "person_id" field 3130 may be or include a unique numerical identifier for each person in the table (e.g., "100394" through "100397"). In some embodiments, the "person_first" field 3132 and/or the "person_last" field 3134 may include information associated with the first and/or last names of persons, respectively. In some embodiments, the "item_id" field 3136 and/or the "address_id" field 3138 may be or include information fields linking the person table 3102 to other tables (as is described in further detail below).

According to some embodiments for example, the "item_id" field 3136 of the person table 3102 may link to the "item_id" field 3156 of the item table 3120. In some embodiments, the link may be a one-to-many link as is shown in FIG. 31. For example, the value of "10192" of the "item_id" field 3136 may link to the identical (and/or otherwise associated or corresponding) values of "10192" within the "item_id" field 3156. In such a manner, for example, a person (e.g., "Andy Aliore") may be associated with one or more items. In some embodiments, the item table 3120 may include the "item_id" field 3156, an "item_type" field 3158, and/or an "item_headline" field 3160. The "item_id" field 3156 may, according to some embodiments, be configured similarly to the "item_id" field 3136 described above in relation to the person table 3102.

In some embodiments, the "item_type" field 3158 may store information relating to the type of item referenced by the "item_id" field 3156. According to some embodiments, the "item_type" field 3158 may store information associated with various items linked to a person (e.g., relating "Andy Aliore"

to an article, a list, and/or a criminal record). The "item_headline" field 3160 may, according to some embodiments, store the headline, title, summary information, abstract information, and/or other information associated with the items stored in the item table 3120.

In some embodiments, the association between the person and the items may facilitate the identification of risk. For example, the structure and arrangement of the tables 3102, 3120 and the links there between may allow easy and/or quick identification of the article, OFAC list, and/or conviction record related to the person "Andy Aliore". The associated items may, for example, describe risk-related information associated with the person. In such a manner, the person may be easily identified as being associated with risk (e.g., "Andy Aliore" appears to be a high-profile individual with at least one conviction and having taken part in other suspect activities).

According to some embodiments, the "address_id" field 3138 of the person table 3102 may link to the "address_id" field 3148 of the address table 3190. In some embodiments, either or both of the "address_id" fields 3138, 3148 may be or include an identifier (e.g., a numeric identifier) that corresponds to and/or is otherwise associated with an address or other location. For example, the numerical identifier "73" stored with the "address_id" fields 3138, 3148 may be a unique key within the address table 3190. According to some embodiments, the identifier may reference detailed address and/or location information stored within the address table 3190. The address table 3190 may include, for example, an "address" field 3150, a "city" field 3152, and/or a "state" field 3154. In some embodiments (such as shown in FIG. 31), the fields 3148, 3150, 3152, 3154 of the address table 3190 may contain information associated with one or more postal addresses.

In some embodiments, an address may be associated with a person. For example, the numerical identifier "73" stored in the "address_id" fields 3138, 3148 may associate the person "Andy Aliore" with the address "3 High St., Ablan, Okla.". In some embodiments, such an association may be important for identifying risk. Assume for example that a financial transaction involving a person named "Frita Jane" is being processed. By accessing and/or searching through the database tables 3100, a user may quickly and/or easily identify that "Frita Jane" is associated with the address "3 High St., Ablan, Okla.".

Further, because "Andy Aliore" is also linked to and/or associated with the same address, a relationship between "Andy Aliore" and "Frita Jane". Because "Andy Aliore" may be known to be associated with risk (e.g., as evidenced by his associations with the various risk-related items stored in the item table 3120), it may be assumed, inferred, and/or determined, according to some embodiments, that "Frita Jane" is also associated with risk. In some embodiments, such as where a risk score is determined, the indirect nature of the association of "Frita Jane" with risk may be reflected in any determined score (e.g., she may not be associated with as much risk as "Andy Aliore"). In some embodiments (such as described elsewhere herein), an action, such as denying the financial transaction, may be selected and/or otherwise determined based upon the findings relating to "Frita Jane".

In some embodiments, the person table 3102 may also or alternatively be linked to the alias table 3112. In some embodiments, the alias table 3112 may include an "alias_id" field 3140, a "person_id" field 3142, a "alias_first" field 3144, and/or an "alias_last" field 3146. According to some embodiments, the "person_id" field 3130 of the person table 3102 may be linked to the "person_id" field 3142 of the alias table 3112. In such a manner for example, a person may be linked with one or more aliases (e.g., alternate and/or otherwise associated names). Such associations may be important, according to some embodiments, in the process of identifying risk. Where "Ohmali Smith" is known to be associated with risk (e.g., because he is an elected official), for example, the association with the alias name "Fred Ohmali" may be important in determining whether a transaction involving "Fred Ohmali" is associated with risk or not.

Figure 32:
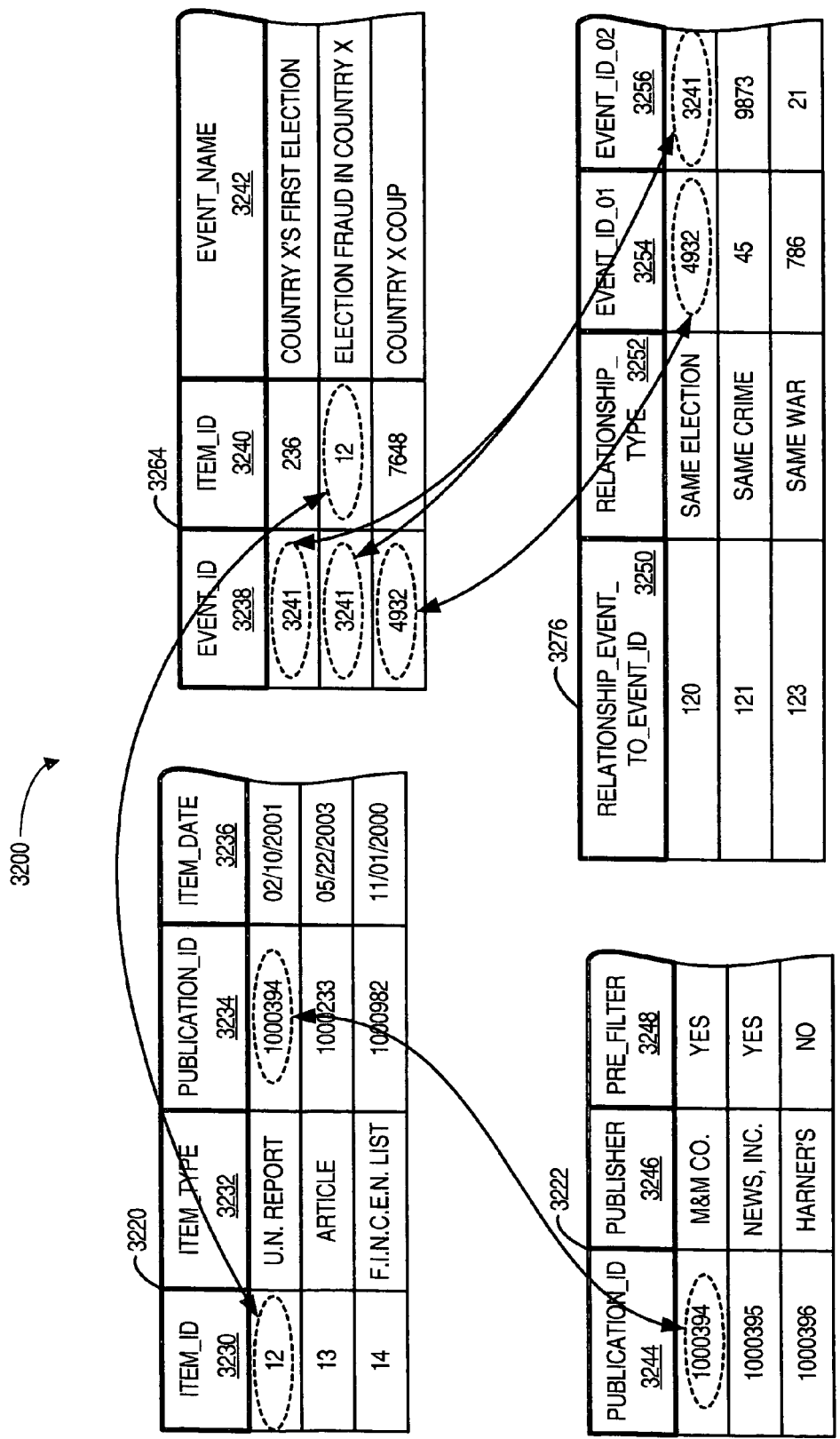
FIG. 32 is a diagram of exemplary database tables according to some embodiments.

Turning now to FIG. 32, a diagram of exemplary database tables 3200 according to some embodiments is shown. In some embodiments, the database tables 3200 may be or include database tables stored within and/or by the database system 240, 440, 640, 1040, 1240, 1340, 1540 described herein. According to some embodiments, the database tables 3200 may be stored in a data storage structure similar to any of the data storage structures 1600, 1700, 1800, 1900, 2000, 2100, 2200, 2300, 2400, 2500, 2600, 2700, 288, 2900, 3000 described herein. In some embodiments, the database tables 3200 may be similar in composition, configuration, and/or functionality to the similarly-named tables described above in conjunction with any of FIG. 16, FIG. 17, FIG. 18, FIG. 19, FIG. 20, FIG. 21, FIG. 22, FIG. 23, FIG. 24, FIG. 27, FIG. 29, FIG. 30, and/or FIG. 31.

In some embodiments, the database tables 3200 may include an item table 3220, an event table 3264, a publication table 3222, and/or a relationship table 3276. In some embodiments, any or all of the tables 3220, 3222, 3264, 3276 may be or include key risk segment tables. According to some embodiments for example, each of the item table 3220, the publication table 3222, the event table 3264, and the relationship table 3276 may be considered a key risk segment table. In some embodiments, fewer or more tables (and/or key risk segment tables) may be included with the database tables 3200.

The item table 3220 may include an "item_id" field 3230, an "item_type" field 3232, a "publication_id" field 3234, and/or an "item_date" field 3236. In some embodiments, the "item_id" field 3230 may store an identifier and/or other indicator associated with an item. According to some embodiments (such as shown in FIG. 31), the "item_id" field 3230 may be or include a unique numerical identifier for each item in the table (e.g., "12" through "14"). In some embodiments, the "item_type" field 3232 and/or the "item_date" field 3236 may include information associated with the various attributes of an item such as a type associated with an item and a date associated with an item, respectively. In some embodiments, the "publication_id" field 3234 may be or include an information field linking the item table 3222 to other tables (as is described in further detail below).

In some embodiments for example, the event table 3264 may include an "event_id" field 3238, and "item_id" field 3240, and/or an "event_name" field 3242. According to some embodiments, the item table 3220 may be linked to the event table 3264 via the "item_id" fields 3230, 3240. For example, the item identified by the numeral "12" stored in the "item_id" field 3230 may be linked to the event identified by the numeral "3241" stored in the "event_id" field 3238, and corresponding to the numeral "12" of the "item_id" field 3240 in the event table 3264. The association may represent, for example, a mention and/or description of the "Election fraud in Country X" (e.g., the event identified within the event table 3264) in the "U.N. Report" (e.g., the item identified within the item table 3220). In some embodiments, the event may be associated with more than one record in the event table 3264 (as shown in FIG. 32). Other items and/or articles may mention, describe, and/or otherwise relate to the "Country X Election", for example.

According to some embodiments, the item table 3220 may also or alternatively link to the publication table 3222. In some embodiments, the publication table 3222 may contain more detailed information regarding items that are publications. For example, the publication table 3222 may include a "publication_id" field 3244, a "publisher" field 3246, and/or a "pre_filter" field 3248. In some embodiments, the "publication_id" field 3244 may include an identifier associated with a publication. The "publication_id" field 3244 may, according to some embodiments, be or include a key such as a primary key, for example. In some embodiments, the "publisher" field 3246 may include information associated with the publisher (or publishers) of any given publication. The "pre_filter" field 3248 may, according to some embodiments, include information associated with one or more filtering (or other) operations (e.g., that may have been conducted by the information relevancy engine 220, 420, 620, 720, 920 and/or by the information redundancy engine 230, 730, 930, 1030, 1230, 1530).

In embodiments where the item table 3220 links to the publication table 3222, the link may be, for example, a many-to-one link between the "publication_id" field 3234 of the item table 3220 and the "publication_id" field 3244 of the publication table 3222. For example, any items associated with the identifier "1000394" stored within the "publication_id" field 3234 of the item table 3220 may be linked to the record in the publication table 3222 associated with the same identifier (e.g., in the "publication_id" field 3244). The "U.N. Report", for example, may have been published by the "M&M Co." publisher, and/or may have been filtered (e.g., for relevancy, redundancy, etc.).

According to some embodiments, the event table 3264 may be linked to the relationship table 3276. The relationship table 3276 may include, for example, a "relationship_event_to_event_id" field 3250, a "relationship_type" field 3252, an "event_id_01" field 3254, and/or an "event_id_02" field 3256. In some embodiments, relationship table 3276 may link and/or otherwise associate two or more events within the event table 3264. For example, the "event_id" field 3238 of the event table 3264 may link to the "event_id" fields 3254, 3256 of the relationship table 3276. The event associated with the identifier "3241" (e.g., as discussed above) may be linked, for example, to the event associated with the identifier "4932", via the "event_id_01" field 3254 and the "event_id_02" field 3256 of the relationship table 3276.

Figure 33:
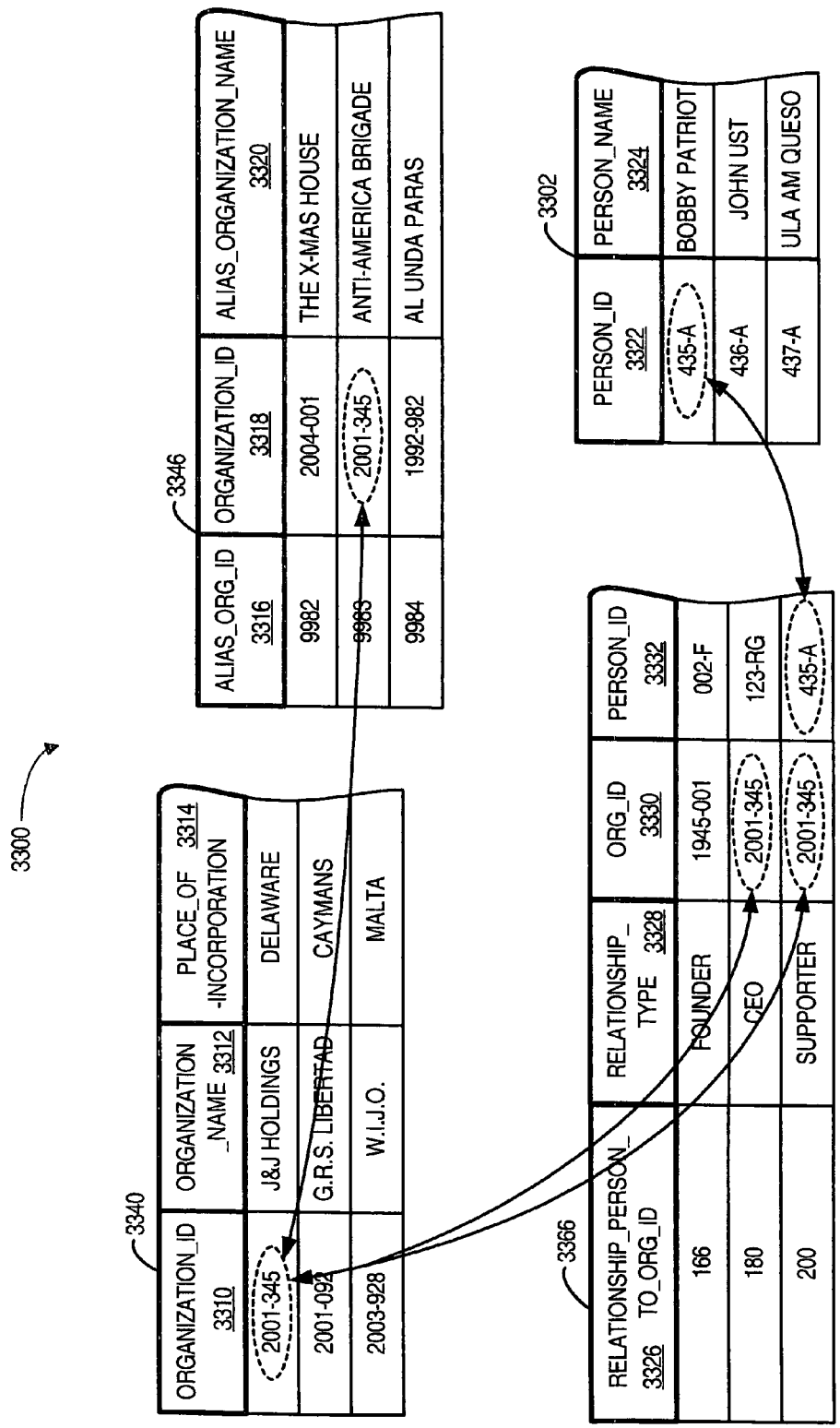
FIG. 33 is a diagram of exemplary database tables according to some embodiments.

Turning now to FIG. 33, a diagram of exemplary database tables 3300 according to some embodiments is shown. In some embodiments, the database tables 3300 may be or include database tables stored within and/or by the database system 240, 440, 640, 1040, 1240, 1340, 1540 described herein. According to some embodiments, the database tables 3300 may be stored in a data storage structure similar to any of the data storage structures 1600, 1700, 1800, 1900, 2000, 2100, 2200, 2300, 2400, 2500, 2600, 2700, 288, 2900, 3000 described herein. In some embodiments, the database tables 3300 may be similar in composition, configuration, and/or functionality to the similarly-named tables described above in conjunction with any of FIG. 16, FIG. 17, FIG. 18, FIG. 19, FIG. 20, FIG. 21, FIG. 22, FIG. 23, FIG. 24, FIG. 27, FIG. 29, FIG. 30, FIG. 31, and/or FIG. 32.

In some embodiments, the database tables 3300 may include an organization table 3340, an alias table 3346, a person table 3302, and/or a relationship table 3366. In some embodiments, any or all of the tables 3302, 3340, 3346, 3366 may be or include key risk segment tables. According to some embodiments for example, each of the organization table 3340 and the person table 3302 may be considered a key risk segment table. In some embodiments, fewer or more tables (and/or key risk segment tables) may be included with the database tables 3300.

The organization table 3340 may include, according to some embodiments, an "organization_id" field 3310, an "organization_name" field 3312, and/or a "place_of_incorporation" field 3314. In some embodiments, the "organization_id" field 3310 may store an identifier and/or other indicator associated with an organization and/or other entity. According to some embodiments (such as shown in FIG. 33), the "organization_id" field 3310 may be or include a unique numerical identifier for each organization in the table (e.g., "2001-345", "2001-092", etc.). In some embodiments, the "organization_name" field 3312 and/or the "place_of_incorporation" field 3314 may include information associated with the various attributes of an organization such as a name associated with an organization and a place of incorporation associated with an organization, respectively. In some embodiments, the "organization_id" field 3310 may be or include an information field linking the organization table 3340 to other tables (as is described in further detail below).

For example, the organization table 3340 may link to the alias table 3346. In some embodiments, the alias table 3346 may include an "alias_org_id" field 3316, an "organization_id" field 3318, and/or an "alias_organization_name" field 3320. According to some embodiments, the "organization_id" field 3310 of the organization table 3340 may link to the "organization_id" field 3318 of the alias table 3346 (e.g., via a one-to-many association). Through such a link for example, it may be easily and/or quickly determined that the organization associated with the identifier "2001-345" (e.g., "J&J Holdings") is somehow associated with an undesirable organization (e.g., the "Anti-America Brigade").

In some embodiments, the relationship table 3366 may be linked to the person table 3302. The person table 3302 may, for example, include a "person_id" field 3322 and/or a "person_name" field 3224. In some embodiments, the relationship table 3366 may include a "relationship_person_to_org" field 3326, a "relationship_type" field 3328, an "org_id" field 3330, and/or a "person_id" field 3332. According to some embodiments, the "person_id" field 3322 of the person table 3302 may link to the "person_id" field 3332 of the relationship table 3366. In some embodiments, either or both of the "person_id" fields 3322, 3332 may be or include unique alpha-numeric identifiers (e.g., "435-A", "002-F", etc.). In some embodiments, the link between the person table may show that the person associated with the identifier "435-A" (e.g., "Bobby Patriot") is somehow connected with the organization associated with the identifier "2001-345" (e.g., "J&J Holdings").

According to some embodiments, the arrangement of the database tables 3300 and/or the configuration of the links there between may facilitate the identification of risk. For example, assume an individual identified by the name "Bobby Patriot" arrives at an international airport inside the United States and seeks to gain entry (e.g., via customs) into the country. Any user having access to the database tables 3300, such as a customs officer for example, may enter the name (e.g., via any practicable type of interface) "Bobby Patriot" to analyze the name (and hence the individual) for risk.

The configuration of the database tables 3300 and/or the links between the various tables 3302, 3340, 3346, 3366 may allow the user, according to some embodiments, to quickly and/or easily identify that "Bobby Patriot" is associated with the "J&J Holding" organization. Further, because of the alias associated with "J&J Holding", it may be quickly recognized that "Bobby Patriot" may be a supporter (e.g., from the "relationship_type" field 3328) of the suspect group called the "Anti-America Brigade". In some embodiments, the individual named "Bobby Patriot" may accordingly, for example, be denied entry into the country, taken into custody, and/or further investigated.

Figure 34:
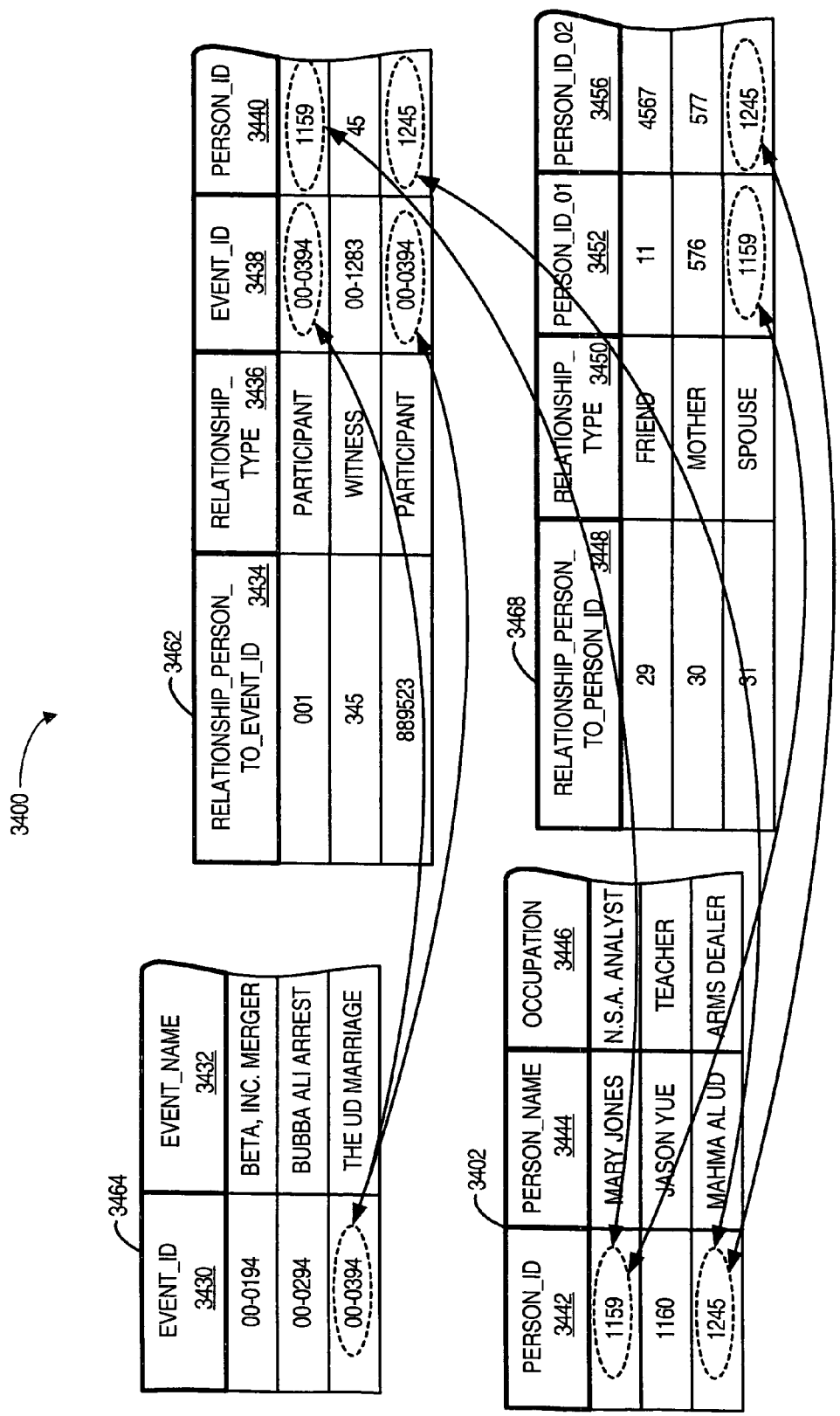
FIG. 34 is a diagram of exemplary database tables according to some embodiments.

Referring now to FIG. 34, a diagram of exemplary database tables 3400 according to some embodiments is shown. In some embodiments, the database tables 3400 may be or include database tables stored within and/or by the database system 240, 440, 640, 1040, 1240, 1340, 1540 described herein. According to some embodiments, the database tables 3300 may be stored in a data storage structure similar to any of the data storage structures 1600, 1700, 1800, 1900, 2000, 2100, 2200, 2300, 2400, 2500, 2600, 2700, 288, 2900, 3000 described herein. In some embodiments, the database tables 3400 may be similar in composition, configuration, and/or functionality to the similarly-named tables described above in conjunction with any of FIG. 16, FIG. 17, FIG. 18, FIG. 19, FIG. 20, FIG. 21, FIG. 22, FIG. 23, FIG. 24, FIG. 27, FIG. 29, FIG. 30, FIG. 31, FIG. 32, and/or FIG. 33.

In some embodiments, the database tables 3400 may include an event table 3464, a person table 3402, a relation_person_to_event table 3462, and/or a relation_person_to_person table 3468. In some embodiments, any or all of the tables 3402, 3462, 3464, 3468 may be or include key risk segment tables. According to some embodiments for example, each of the event table 3464 and the person table 3402 may be considered a key risk segment table. In some embodiments, fewer or more tables (and/or key risk segment tables) may be included with the database tables 3400.

The event table 3464 may include, according to some embodiments, an "event_id" field 3430 and/or an "event_name" field 3432. In some embodiments, the "event_id" field 3430 may store an identifier and/or other indicator associated with an event. According to some embodiments (such as shown in FIG. 34), the "event_id" field 3430 may be or include a unique numerical identifier for each event in the table (e.g., "00-0194" through "00-0394"). In some embodiments, the "event_name" field 3432 may include information associated with the name associated with an event. In some embodiments, the "event_id" field 3430 may be or include an information field linking the event table 3464 to other tables (as is described in further detail below).

For example, the event table 3464 may link to the relation_person_to_event table 3462. In some embodiments, the relation_person_to_event table 3462 may include an "relationship_person_to_event" field 3434, a "relationship_type" field 3436, an "event_id" field 3438, and/or a "person_id" field 3440. According to some embodiments, the "event_id" field 3430 of the event table 3464 may link to the "event_id" field 3438 of the relation_person_to_event table 3462. In some embodiments for example, the event associated with the identifier "00-0394" of the "event_id" field 3430 in the event table 3464 may be linked to the corresponding records associated with the same identifier in the "event_id" field 3438 in the relation_person_to_event table 3462.

In some embodiments, the link between the event table 3464 and the relation_person_to_event table 3462 may associate one or more events with one or more individuals. As shown in FIG. 34 for example, the event associated with the identifier "00-0394" is shown as being related to persons having "person_id" field 3440 values of "1159" and "1245". Such a link and/or association may, for example, promote the easy and/or quick identification of relationships between persons and events. In the exemplary data presented in FIG. 34 for example, "The Ud Marriage" is associated with two participants (represented by "person_id" field 3440 identifiers "1159" and "1245").

According to some embodiments, more information may be related and/or linked to the information presented in the relation_person_to_event table 3462. The relation_person_to_event table 3462 may link, for example, to the person table 3402. The person table 3402 may include, in some embodiments, a "person_id" field 3442, a "person_name" field 3444, and/or an "occupation" field 3446. The "person_name" field 3444 and the "occupation" field 3446 may, for example, contain information relating to the name and occupation of an individual, respectively. In some embodiments, the "person_id" field 3440 of the relation_person_to_event table 3462 may link to the "person_id" field 3442 of the person table 3402. In some embodiments, the persons described as "participants" in "The Ud Wedding" may thus easily be identified as "Mary Jones" and "Mahma Al Ud".

According to some embodiments, additional and/or complementary information (e.g., with respect to the information stored in the event table 3464, the relationship_person_to_event table 3462, and/or the person table 3402) may be stored in the relation_person_to_person table 3468. The relation_person_to_person table 3468 may include, for example, a "relationship_person_to_person_id" field 3448, a "relationship_type" field 3450, a "person_id_01" field 3452, and/or a "person_id_02" field 3456. In some embodiments, the person table 3402 may link, for example, to the relation_person_to_person table 3468 (e.g., via the "person_id" fields 3442, 3452, 3456).

In some embodiments, the relation_person_to_person table 3468 may associate two or more individuals from the person table 3402. For example, the two individuals noted above as having been "participants" at "The Ud Wedding" may be associated via a record in the relation_person_to_person table 3468. In some embodiments, the record may indicate (e.g., via the "relationship_type" field 3450) that the two individuals (identified as "1159" and "1245") are associated as spouses. In some embodiments, a person may be associated with multiple records in the relation erson to_person table 3468 (e.g., relating the person to multiple other persons having various relationship types).

According to some embodiments, the links and/or associations between the database tables 3400 may facilitate the identification of risk. Assume for example that a National Security Agency (NSA) analyst by the name of "Mary Jones" attempts to gain clearance to access certain sensitive documents. Access to the database tables 3400 may, in some embodiments, allow a user (e.g., a supervisor, a researcher, etc.) to quickly and/or easily identify that "Mary Jones" is and/or was likely married to an individual named "Mahma Al Ud". In some embodiments, such as where "Mahma Al Ud" is known to be associated with risk (e.g., may be an arms dealer, politician, etc.), "Mary Jones" may be determined to be associated with risk. According to some embodiments, the clearance to gain access to the sensitive documents may be denied based upon the risk associated with "Mary Jones".

Figure 35:
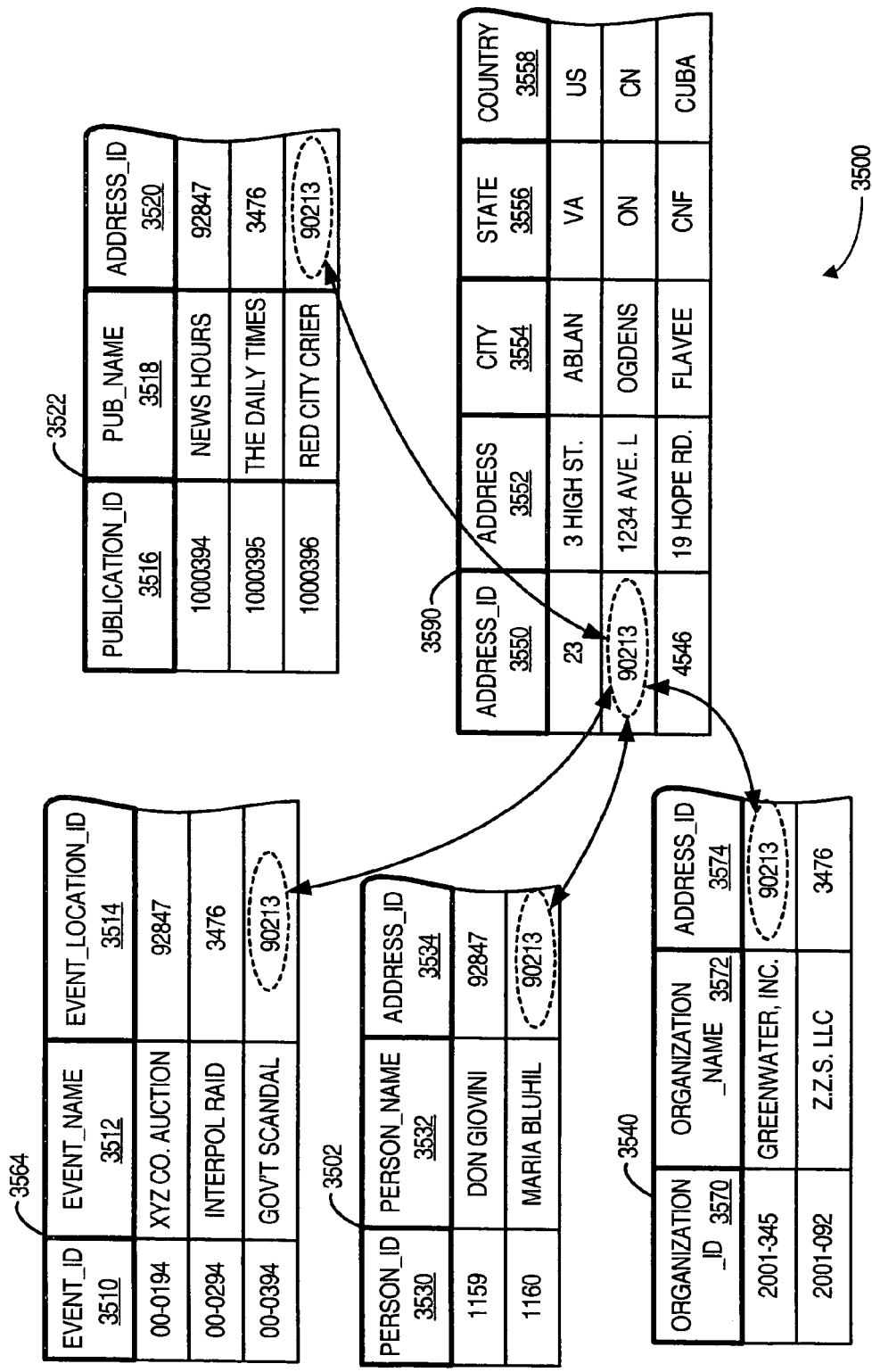
FIG. 35 is a diagram of exemplary database tables according to some embodiments.

Turning now to FIG. 35, a diagram of exemplary database tables 3500 according to some embodiments is shown. In some embodiments, the database tables 3500 may be or include database tables stored within and/or by the database system 240, 440, 640, 1040, 1240, 1340, 1540 described herein. According to some embodiments, the database tables 3500 may be stored in a data storage structure similar to any of the data storage structures 1600, 1700, 1800, 1900, 2000,

2100, 2200, 2300, 2400, 2500, 2600, 2700, 288, 2900, 3000 described herein. In some embodiments, the database tables 3500 may be similar in composition, configuration, and/or functionality to the similarly-named tables described above in conjunction with any of FIG. 16, FIG. 17, FIG. 18, FIG. 19, FIG. 20, FIG. 21, FIG. 22, FIG. 23, FIG. 24, FIG. 27, FIG. 29, FIG. 30, FIG. 31, FIG. 32, FIG. 33, and/or FIG. 34.

In some embodiments, the database tables 3500 may include an event table 3564, a person table 3502, a organization table 3540, a publication table 3522, and/or an address table 3590. In some embodiments, any or all of the tables 3502, 3522, 3540, 3564, 3590 may be or include key risk segment tables. According to some embodiments for example, each of the tables 3502, 3522, 3540, 3564, 3590 may be considered a key risk segment table. In some embodiments, fewer or more tables (and/or key risk segment tables) may be included with the database tables 3500.

The event table 3564 may include, according to some embodiments, an "event_id" field 3510, an "event_name" field 3512, and/or an "event_location_id" field 3514. The publication table 3522 may include, for example, a publication_id" field 3516, a "pub_name" field 3518, and/or an "address_id" field 3520. In some embodiments, the person table 3502 may include a "person_id" field 3530, a "person_name" field 3532, and/or an "address_id" field 3534. The organization table 3540 may include, according to some embodiments, an "organization_id" field 3570, an "organization_name" field 3572, and/or and "address_id" field 3574. The address table 3590 may include, for example, an "address_id" field 3550, and "address" field 3552, a "city" field 3554, a "state" field 3556, and/or a "country" field 3558. In some embodiments, the fields 3510, 3512, 3514, 3516, 3518, 3520, 3530, 3532, 3534, 3550, 3552, 3554, 3556, 3558, 3570, 3572, 3574 of the database tables 3500 may be similar in composition, configuration, and/or functionality to the similarly-named fields described in any of FIG. 31, FIG. 32, FIG. 33, and/or FIG. 34 above.

In some embodiments, the address table 3590 may link to any or all of the other tables 3502, 3522, 3540, 3564. For example, the address table 3590 may link to each of the other tables 3502, 3522, 3540, 3564 via the "address_id" field 3550 of the address table 3590. In some embodiments, any or all of the links may be, for example, many-to-many links (e.g., multiple addresses may be associated with a person and/or multiple persons may be associated with a single address). According to some embodiments, fewer or more tables and/or links than are shown in conjunction with FIG. 35 may be utilized without deviating from some embodiments.

According to some embodiments, the database tables 3500, the links there between, and/or the fields therein may facilitate the identification of risk. Users may, for example, query information relating to a specific address (e.g., "1234 Ave. L, Ogdens, ON") in relation to a real estate purchase, a foreclosure, a property seizure, and/or any other practicable reason. The "address_id" field 3550 value associated with the desired address (e.g., "90213") may, for example, link to various related fields 3514, 3520, 3534, 3574 in the other tables 3502, 3522, 3540, 3564. In some embodiments, the links between the database tables 3500 may allow, for example, a user to quickly and/or easily identify that the address is related to and/or otherwise associated with an event (e.g., a "Government Scandal"), a publication (e.g., the "Red City Crier"), a person (e.g., "Maria Bluhil"), and an organization (e.g., "Greenwater, Inc."). In some embodiments, the risk associated with any of the various related entities may be analyzed to determine any risk that may be associated with the address being investigated.

Information Matching Engine

Figure 36:
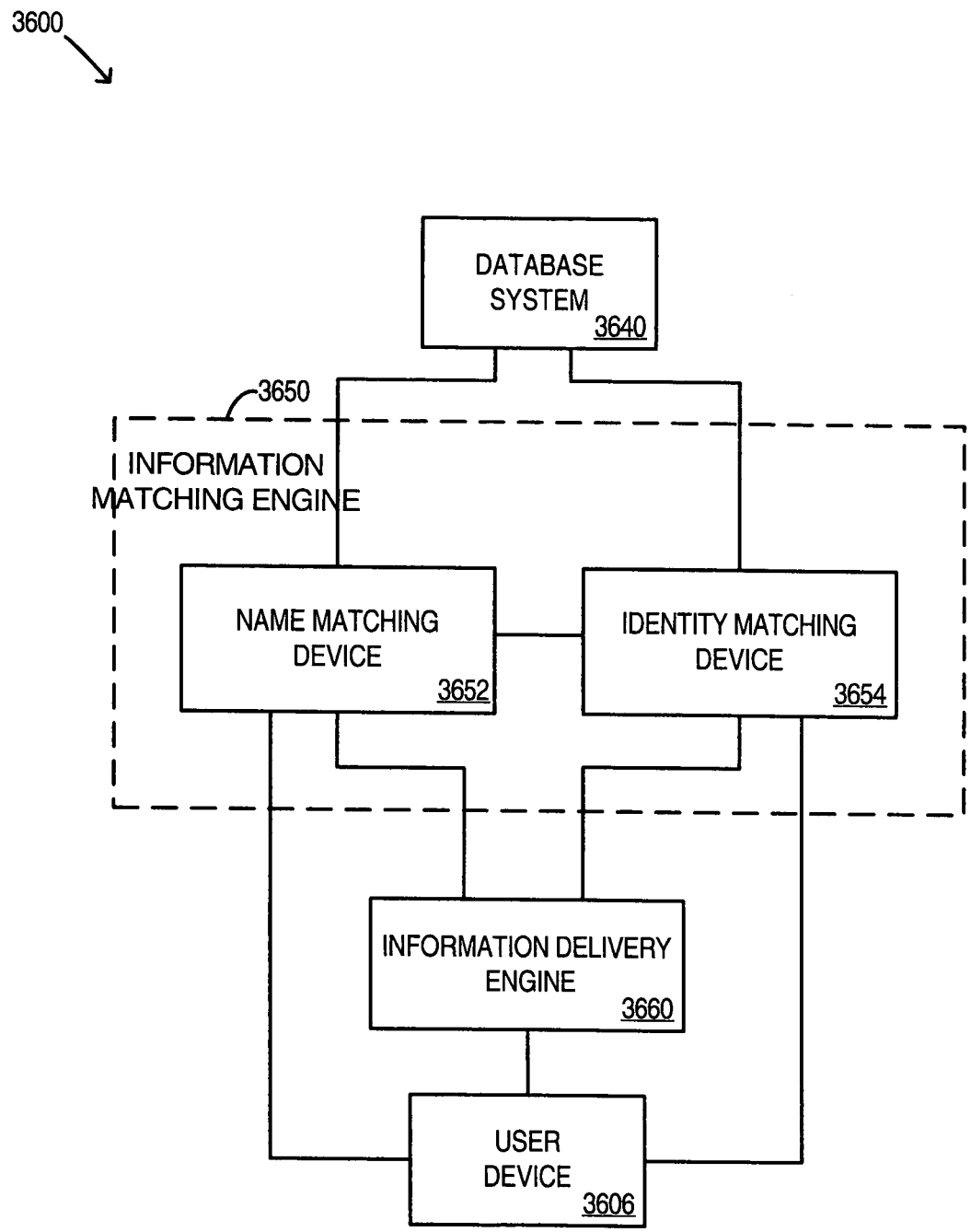
FIG. 36 is a block diagram of a system according to some embodiments.

Turning now to FIG. 36, a block diagram of a system 3600 according to some embodiments is shown. In some embodiments, the system 3600 may be used to implement or perform the methods 300, 500, 800, 1100, 1400 and/or may otherwise be associated with the methods 300, 500, 800, 1100, 1400 (or any portions thereof) as described in conjunction with any of FIG. 3, FIG. 5, FIG. 8, FIG. 11, and/or FIG. 14 above. The system 3600 may, for example, be similar in configuration and/or functionality to the information matching engine 250, 1350, 1550 (or the risk server 102, 202) and/or may perform in accordance with the procedure 314 as described above in conjunction with FIG. 3.

The system 3600 may, for example, include a user device 3606, a database system 3640 and/or an information matching engine 3650. In some embodiments, the information matching engine 3650 may include a name matching device 3652 and/or an identity matching device 3654. The system 3600 may, according to some embodiments, also or alternatively include an information delivery engine 3660. In some embodiments, the components 3606, 3640, 3650, 3660 of system 3600 may be similar in configuration and/or functionality to the similarly-named components described in conjunction with any of FIG. 1, FIG. 2, FIG. 4, FIG. 6, FIG. 10, FIG. 12, FIG. 13, and/or FIG. 15 above.

In some embodiments, it may be desirable to compare a certain piece of information to information stored within and/or by the database system 3640. For example, a user may desire to evaluate a piece of information for risk by comparing the piece of information to stored risk-relevant information. In some embodiments, a user may send a query, for example, to the information matching engine 3650. According to some embodiments, such a query may be sent directly from the user device 3606 to the information matching engine 3650. In some embodiments, the query may be sent through and/or using the information delivery engine 3660.

The query sent by the user (e.g., from the user device 3606) may include, according to some embodiments, a name of an organization, person, event, address, and/or other entity or object that is to be evaluated for risk. The name and/or the query may be sent, for example, to the name matching device 3652 of the information matching engine 3650. In some embodiments, the name matching device 3652 may compare the name and/or the query to information stored within and/or by the database system 3640. The comparison may involve, for example, searching for identical and/or similar names within the database system 3640.

In some embodiments, the name and/or the query may be matched with one or more records within a database (not shown in FIG. 36). According to some embodiments, the identified records from the database (and/or the name and/or query) may be sent to the identity matching device 3654. The identity matching device 3654 may, for example, further compare the name and/or the query to the identified (e.g., matching or potentially matching) records. In some embodiments, the identity matching device 3654 may compare various attributes, relations, and/or other information relating to each of the name and/or query and the identified records. According to some embodiments, information associated with the name and/or the query may be compared to similar information associated with the identified records.

In some embodiments, if the identity matching device 3654 determines that one or more records were inappropriately and/or mistakenly matched to the name and/or query, those records may be filtered out, discarded, and/or otherwise ignored (e.g., not included in a result set of records believed to match the name and/or query). According to some embodiments, any records determined (e.g., with some degree of probability) to be related to, identical to, and/or otherwise associated with the name and/or query may be sent to the information delivery engine 3660. The information delivery engine 3660 may, for example, format the results and deliver them to the user device 3606. In some embodiments, the query result information (e.g., the matched records from the database) may be sent and/or otherwise provided directly from the identity matching device 3654 and/or the information matching engine 3650 to the user device 3606.

Figure 37:
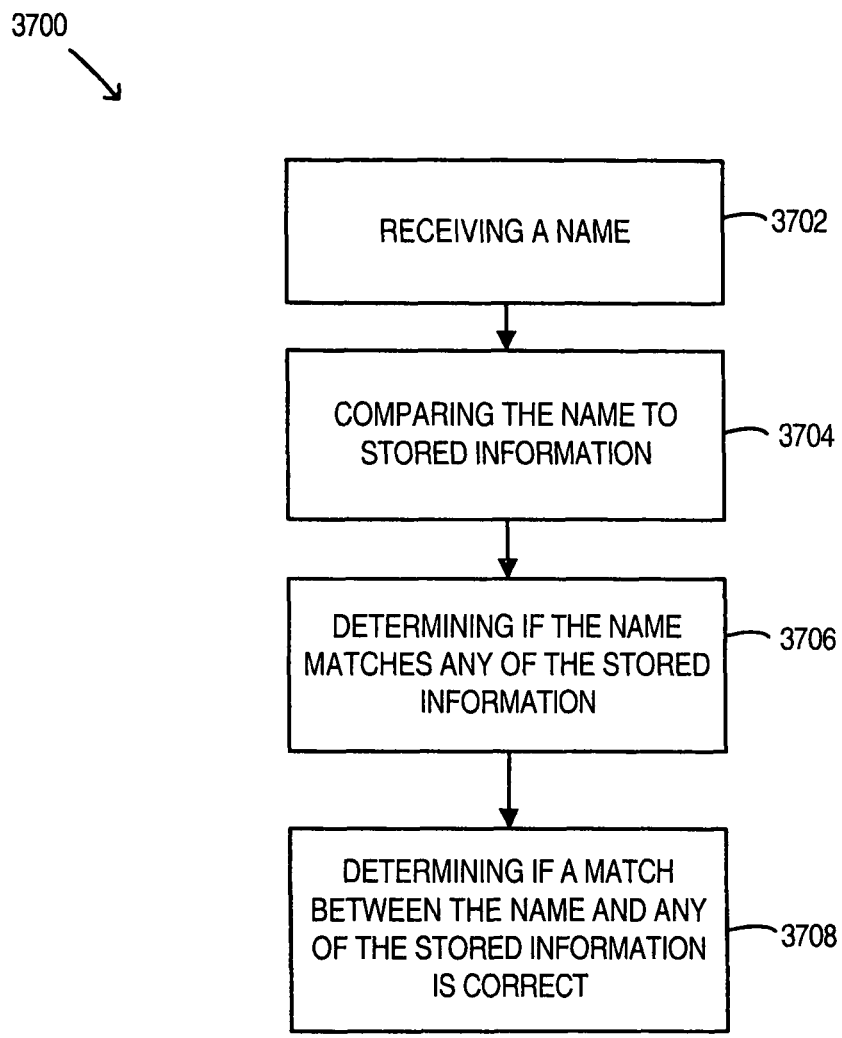
FIG. 37 is a flow diagram of a method according to some embodiments.

In FIG. 37, a method 3700 according to some embodiments is shown. In some embodiments, the method 3700 may be conducted by and/or by utilizing any of the systems 100, 200, 400, 600, 700, 900, 1000, 1200, 1300, 1500 described above and/or may be otherwise associated with any of the systems 100, 200, 400, 600, 700, 900, 1000, 1200, 1300, 1500 and/or any of the system components (e.g., the information matching engine 250, 1350, 1550, 3650) described in conjunction with any of FIG. 1, FIG. 2, FIG. 4, FIG. 6, FIG. 7, FIG. 9, FIG. 10, FIG. 12, FIG. 13, and/or FIG. 15 above. In some embodiments, the method 3700 may be or include a portion of and/or a procedure within other methods such as method 300 described above.

In some embodiments, the method 3700 may begin at 3702 by receiving a name. For example, the information matching engine 3650 may receive the name from the information delivery engine 3660 and/or a user device 3606. In some embodiments, the name may be or include and/or otherwise be associated with a query. The query may be, for example, a risk evaluation query performed for due diligence purposes. In some embodiments, information indicative of the name may be received. Multiple names and/or other pieces of information may also or alternatively be received.

The method 3700 may continue, at 3704 for example, by comparing the name to stored information. The stored information may be or include, for example, information associated with risk. In some embodiments, the stored information may be stored in and/or by the database system 3640. According to some embodiments, the stored information may be maintained and/or otherwise located in a data storage structure that is configured to facilitate the identification of risk (e.g., any of the data storage structures 1600, 1700, 1800, 1900, 2000, 2100, 2200, 2300, 2400, 2500, 2600, 2700, 2800, 2900, 3000 described herein). In some embodiments, the name may be compared to other names that are stored, for example, in a database. According to some embodiments, each letter and/or character in the name may be compared to various characters and/or letters contained within certain fields of stored information.

In some embodiments, the method 3700 may continue by determining if the name matches any of the stored information, at 3706. For example, if a stored name and/or other stored information is identical to the received name, then a match may occur. In some embodiments, entire names (e.g., first, last, middle, etc.) may be compared to determine if a match exists. According to some embodiments, variations of the received name may be compared to the stored names and/or other information to determine if a match exists.

Spelling variations of the received name may, for example, be checked against stored names and/or information to determine if a match exists. In some embodiments, certain spelling variations such as language, cultural, and/or formality variations may be identified for comparison and matching purposes. In some embodiments, associated names such as nicknames, maiden names, and/or other variations may be checked. According to some embodiments, the name matching device 3652 of the name matching engine 3650 may conduct, perform, and/or manage the determination of matched names and/or other information.

The method 3700 may continue at 3708, according to some embodiments, by determining if a match between the received name and any stored information is correct. The determining may include, for example, verifying any match determined at 3706. In some embodiments, the received name and any information determined to match the received name may be further compared and/or evaluated to determine if the match was correctly identified. For example, where a name is compared to stored names and matching database records are identified, other fields of the database records may be compared to information associated with the received name. In some embodiments, if the compared fields also are determined to match, then the match may be verified and/or maintained.

If the compared fields fail to match, then the match between the received name and the stored information may be discarded and/or otherwise ignored. In some embodiments, each and/or every comparison between the received name and the stored information may be scored to determine if a match exists. Each matching field, attribute, and/or relation may, for example, by scored and/or weighed based on a likelihood of matching (e.g., the score may be associated with a probability of a match existing). In some embodiments, the scores may be added, averaged, and/or otherwise manipulated to determine an overall or total score or rank associated with a match. If the score or rank exceeds a pre-determined value, according to some embodiments, then the match may be verified to exist. In some embodiments, the identity matching device 3654 of the information matching engine 3650 may conduct, perform, and/or manage the verification of matched names and/or other information.

In some embodiments, the method 3700 may include fewer or more procedures and/or processes than are shown in FIG. 37. For example, once a match is determined and/or verified (e.g., at 3706 and/or 3708), the match information may be provided to a user. Where the name was provided as part of a user query, for example, the match information may be provided to the user as query results. In some embodiments, the matching may be conducted specifically to identify risk. According to some embodiments, the identification of matching stored information may include comparing certain fields and/or tables that are deemed important for identifying risk (e.g., key risk segment tables, metrics, fields, etc.). In some embodiments, the links between various database tables such as between various key risk segment tables, may be compared and/or otherwise analyzed to assist in determining if name and/or other information matches exist.

Figure 38:
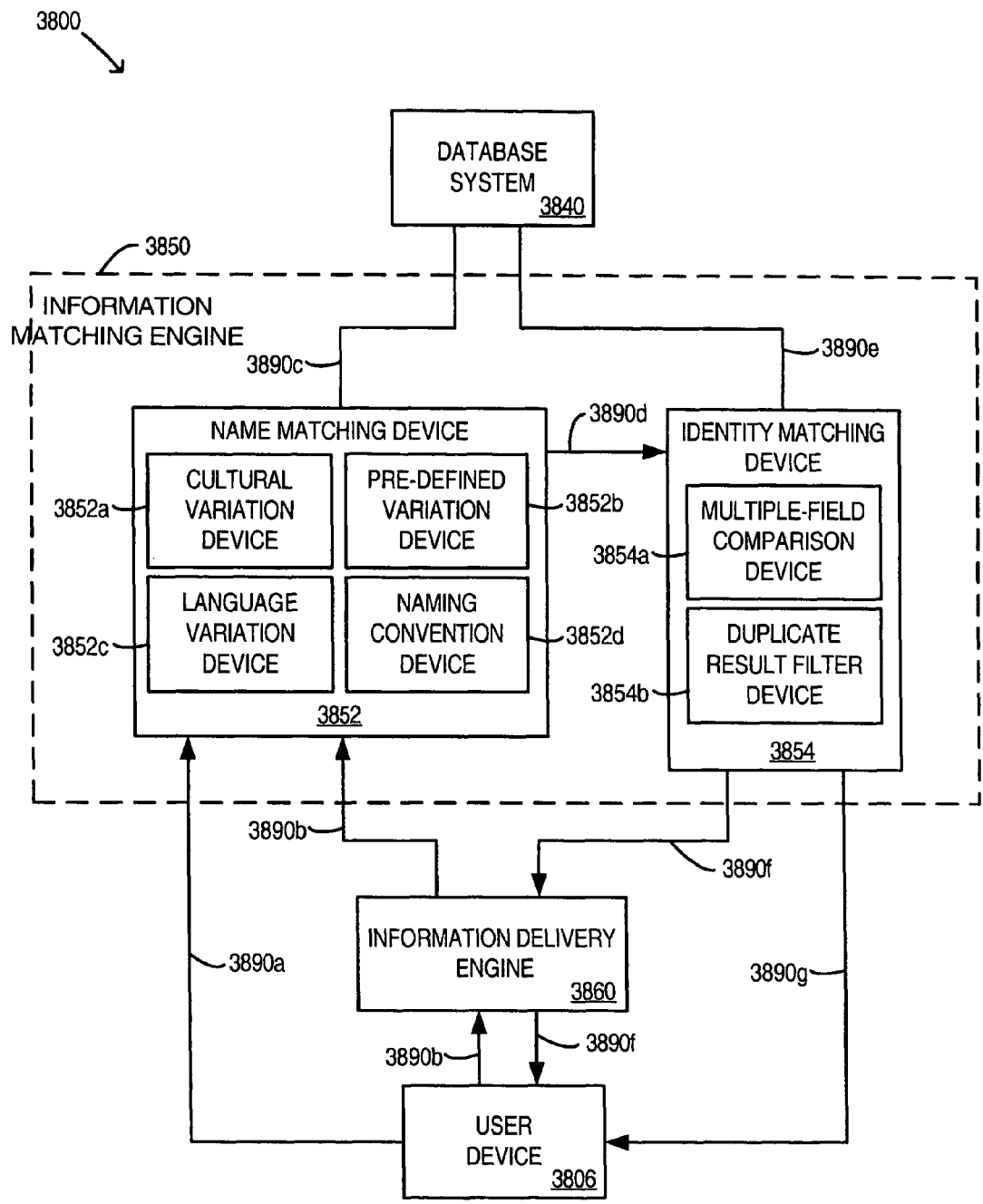
FIG. 38 is a block diagram of a system according to some embodiments.

Turning now to FIG. 38, a block diagram of a system 3800 according to some embodiments is shown. In some embodiments, the system 3800 may be used to implement or perform and/or may otherwise be associated with the methods 300, 500, 800, 1100, 1400, 3700 (or any portions thereof) as described in conjunction with any of FIG. 3, FIG. 5, FIG. 8, FIG. 11, FIG. 14, and/or FIG. 37 above. The system 3800 may, according to some embodiments, be similar in configuration and/or functionality to the system 3600 described above.

The system 3800 may, for example, include a user device 3806, a database system 3840 and an information matching engine 3850. The information matching engine 3850 may include, for example, a name matching device 3852 and/or an identity matching device 3854. In some embodiments, the name matching device 3852 may include a cultural variation device 3852*a*, a pre-defined variation device 3852*b*, a language variation device 3852*c*, and/or a naming convention device 3852*d*. According to some embodiments, the identity matching device 3854 may include a multiple-field comparison device 3854*a* and/or a duplicate result filter 3854*b*. The system 3800 may also or alternatively include an information delivery engine 3860 and/or one or more information paths 3890. In some embodiments, the components 3806, 3840, 3850, 3852, 3854, 3860 of system 3800 may be similar in configuration and/or functionality to the similarly-named components described in conjunction with any of FIG. 1, FIG. 2, FIG. 4, FIG. 6, FIG. 10, FIG. 12, FIG. 13, FIG. 15, and/or FIG. 36 above.

In some embodiments, a query, request, name, and/or other information may be received by the information matching engine 3850. The query may be sent, for example, by the user device 3806 to the name matching device 3852 via the information path 3890*a*. In some embodiments, the query or other information may be sent by the user device 3806 to the information delivery engine 3860 via the information path 3890*b*. The information delivery engine 3860 may then, for example, forward the query further along the information path 3890*b* to the name matching engine 3852. According to some embodiments, the information delivery engine 3860 may broker information between the user device 3806 and the information matching engine 3850.

In some embodiments, the name matching device 3852 may analyze the received information (e.g., the query and/or name received from the user device 3806) to determine likely variations of the received information. Where the received information includes a name such as "Al von Cru", for example, the name matching device 3852 may utilize any or all of the cultural variation device 3852*a*, the pre-defined variation device 3852*b*, the language variation device 3852*c*, and the naming convention device 3852*d* to determine variations of the name. The cultural variation device 3852*a* may, according to some embodiments, determine and/or identify one or more cultural variations that may be associated with the name. For example, the cultural variation device 3852*a* may determine that in some and/or certain cultures, the first name "Al" may be shorthand for "Alfonzo". In some cultures, the first name may be written last, while the surname may be written first. Accordingly, the cultural variation device 3852*a* may identify "Al" as a potential last name and/or "Cru" or "von Cru" as a potential first name.

According to some embodiments, the pre-defined variation device 3852*b* may analyze the name to determine if it satisfies any rules that have been previously defined. For example, the pre-defined variation device 3852*b* may include instructions that are intended to identify spelling error variations of a name. The first name "Al", for example, may be noted to often be misspelled and/or incorrectly entered into data systems as "A1" (i.e., the letter "A" plus the numeral one). The pre-defined variation device 3852*b* may accordingly determine that the name (or portion of the full received name) corresponds to a pre-defined rule. In some embodiments, the pre-defined variation device 3852*b* may then identify the potential alternate and/or incorrect spelling of the name.

In some embodiments, the language variation device 3852*c* may also or alternatively analyze the received name. For example, the language variation device 3852*c* may determine various linguistic variants likely to be associated with the name. In some languages for example, the name (or a portion thereof) may be written differently than in the English language. The last name "Cru", for example, may be written as "Crue", "Croo", "Czuth", and/or other variants. In some embodiments, any potential and/or likely linguistic variations of the name may be identified by the language variation device 3852*c*.

The naming convention device 3852*d* may, according to some embodiments, analyze the received name for potential naming convention variants. The naming convention device 3852*d* may, for example, determine various nicknames, common alias names, and/or other formal and/or stylistic variations of the name. The name "Al von Cru", for example, may alternately by written as "Al de Cru", "Al el Cru", and/or in accordance with other conventions that may deviate from the form in which the name was received. In some embodiments, one or more such variations may be identified by the naming convention device 3852*d*.

According to some embodiments, the various potential variations identified by the name matching device 3852 and/or by one or more of its components 3852*a-d* may be used to determine if associated information is stored in and/or by the database system 3840. The name matching device 3840 may, for example, search one or more databases (not shown in FIG. 38) of the database system 3840 for each variation of the received name. In some embodiments, database records having names that match any of the variants may be identified. According to some embodiments, stored names that are similar and/or otherwise likely to be associated with the received name may also or alternatively be identified.

The name matching device 3852 may, according to some embodiments, send a query via the information path 3890*c* to the database system 3840. The query may include, for example, each of the variants identified as being associated (or likely to be associated) with the received name. In some embodiments, the database system may return a result set of identified database records back to the name matching device 3852 (e.g., via the information path 3890*c*). The name matching device 3852 may then, for example, forward the result set to the identity matching device 3854 via the information path 3890*d*.

The identity matching device 3854 may, according to some embodiments, utilize either or both of the multiple-field comparison device 3854*a* and the duplicate result filter device 3854*b* to analyze the result set. In some embodiments, the result set may be provided directly by the database system 3840 to the identity matching device 3854 via the information path 3890*e*. According to some embodiments, the multiple-field comparison device 3854*a* may compare various attributes, fields, relations, and/or other information associated with the received name and/or the matching records from the results set.

For example, the multiple-field comparison device 3854*a* may access the database system 3840 (e.g., via the information path 3890*e*) to determine various fields of information associated with a database record of the result set. Continuing the example from above, the received name is "Al von Cru". One of the names found in the database that may be related to the received name may be, for example, "Al Voncru". The multiple-field comparison device 3854*a* may query the database system 3840 for other information associated with the stored name. In some embodiments for example, the query may retrieve supplemental information such as an age (e.g., "34 years"), a height (e.g., "five feet and two inches"), and/or an address (e.g., "101 Jon Street, Bermuda, W.I.") associated with the stored name.

According to some embodiments, the identity matching device 3854 and/or the multiple-field comparison device 3854*a* may compare the supplemental information associated with the stored name to similar information associated with the received name. When the supplemental information is determined to match (or substantially match), the correlation between the received name and the identified stored name may be deemed verified. According to some embodiments, matching across multiple field comparisons may be required prior to determining that the match is genuine (or otherwise likely to be correct). In some embodiments for example, where the age associated with the received name "Al von Cru" is "6 years old" and the age associated with the potentially matching stored name "Al Voncru" is "34 years old", a match between the names may be determined not to exist. The record for the stored name "Al Voncru" may then, for example, be removed from the result set.

In some embodiments, more fields may also or alternatively be compared. If the associated addresses are compared and determined to be equivalent, for example, then the age difference may be assumed to be attributable to different generations in the same family. Where the addresses also do not match and/or do not appear to be otherwise related, then the match may be determined to be invalid. In some embodiments, every field and/or every piece of secondary information available may be compared. Verification of the match may depend, for example, on a score or rank based at least in part on the number of fields and/or pieces of information that appear to match and/or otherwise be related. In some embodiments, certain fields may be known to have more bearing upon match verification and may, for example, be weighted more heavily when determining matching scores. In some embodiments, review by an operator and/or other individual may also or alternatively be used in an attempt to verify name (and/or other information) matches.

According to some embodiments, the verified result set may be further or alternatively analyzed by the duplicate result filter device 3854b. The duplicate result filter device 3854b may, for example, compare various records within the result set to remove duplicate information. In some embodiments, a record may only be removed if every field associated with the record matches every field of another record. According to some embodiments, variations between fields associated with records may be analyzed to determine if the variations are likely indicative of different information. The fields may be analyzed, for example, to determine if variations are due to spelling and/or data entry errors, or are legitimately different pieces of information.

The identity matching device 3854 may then, for example, send the analyzed result set to the information delivery engine 3860 via the information path 3890f. The information delivery engine 3890f may, for example, format and/or otherwise process the information for delivery to the user device 3806. In some embodiments, the information delivery engine 3860 may determine an appropriate manner in which to provide the result set to the user device 3806, and may, for example, send the information further along the information path 3890f to the user device 3806. In some embodiments, the identity matching device 3854 and/or the information matching engine 3850 may provide, forward, and/or send the information directly to the user device 3806 via the information path 3890g.

Information Delivery Engine

Figure 39:
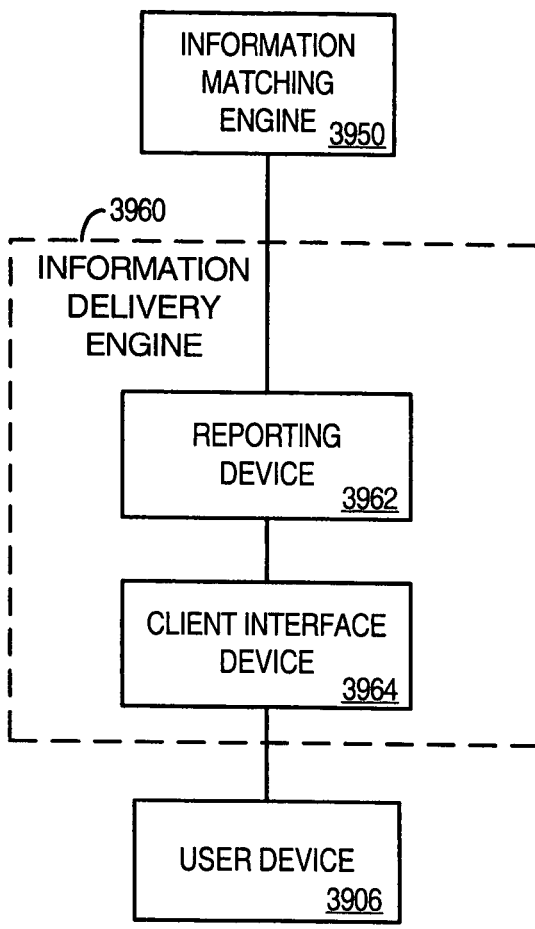
FIG. 39 is a block diagram of a system according to some embodiments.

Turning now to FIG. 39, a block diagram of a system 3900 according to some embodiments is shown. In some embodiments, the system 3900 may be used to implement or perform the methods 300, 500, 800, 1100, 1400, 3700 and/or may otherwise be associated with the methods 300, 500, 800, 1100, 1400, 3700 (or any portions thereof) as described in conjunction with any of FIG. 3, FIG. 5, FIG. 8, FIG. 11, FIG. 14, and/or FIG. 37 above. The system 3900 may, for example, be similar in configuration and/or functionality to the information delivery engine 260, 1560, 3660, 3860 (or the risk server 102, 202) and/or may perform in accordance with the procedure 314 as described above in conjunction with FIG. 3.

The system 3900 may, for example, include a user device 3906, an information matching engine 3950, and/or an information delivery engine 3960. In some embodiments, the information delivery engine 3960 may include a reporting device 3962 and/or a client interface device 3964. In some embodiments, the components 3906, 3950, 3960 of system 3900 may be similar in configuration and/or functionality to the similarly-named components described in conjunction with any of FIG. 1, FIG. 2, FIG. 4, FIG. 6, FIG. 10, FIG. 12, FIG. 13, FIG. 15, FIG. 36, and/or FIG. 38 above.

In some embodiments, the user device 3906 may submit a query associated with determining risk to the information delivery engine 3960. The query may be submitted through and/or using the client interface device 3964, for example. In some embodiments, the client interface device 3964 may be resident on, controlled by, and/or otherwise associated with the user device 3906. The client interface device 3964 may, according to some embodiments, be or include a web interface and/or a graphical user interface (GUI). In some embodiments, the client interface device 3964 may be configured in a client-server architecture which includes, for example, a portion resident on a server (e.g., on the information delivery engine 3960) and a portion resident on the user device 3906.

The user query may, according to some embodiments, be sent to the information matching engine 3950 for analysis (e.g., as described above in conjunction with FIG. 36, FIG. 37, and FIG. 38). In some embodiments, query results may be provided by the information matching engine 3950. According to some embodiments, the reporting engine 3962 may format, manage, and/or otherwise process either or both of the user query and the query results. The reporting engine 3962 may, for example, be or include an application program interface (API) and/or other program that permits queries to be created, executed, and/or formatted into reporting documents. In some embodiments, the client interface device 3964 may be a part of (e.g., a front-end and/or client-side module) and/or otherwise associated with the reporting device 3962.

Figure 40:
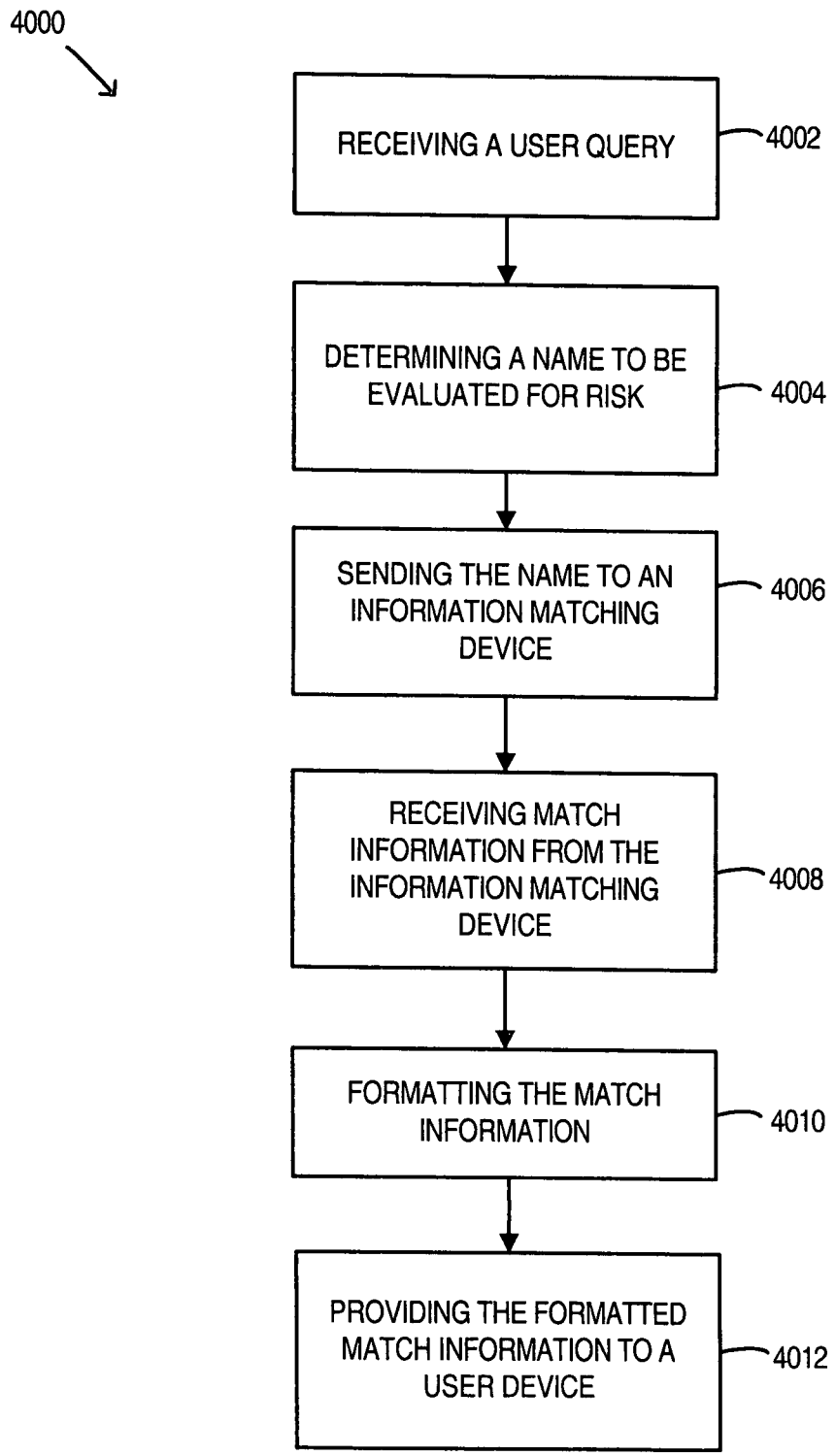
FIG. 40 is a flow diagram of a method according to some embodiments.

In FIG. 40, a method 4000 according to some embodiments is shown. In some embodiments, the method 4000 may be conducted by and/or by utilizing any of the systems 100, 200, 400, 600, 700, 900, 1000, 1200, 1300, 1500, 3600, 3800, 3900 described above and/or may be otherwise associated with any of the systems 100, 200, 400, 600, 700, 900, 1000, 1200, 1300, 1500, 3600, 3800, 3900 and/or any of the system components (e.g., the information delivery engine 260, 1560, 3660, 3860, 3960) described in conjunction with any of FIG. 1, FIG. 2, FIG. 4, FIG. 6, FIG. 7, FIG. 9, FIG. 10, FIG. 12, FIG. 13, FIG. 15, FIG. 36, FIG. 38, and/or FIG. 39 above. In some embodiments, the method 4000 may be or include a portion of and/or a procedure within other methods such as method 300 described above.

In some embodiments, the method 4000 may begin at 4002 by receiving a user query. The user query may be or include, for example, a risk assessment query. According to some embodiments, the query may be received by the information delivery engine 3960 (and/or one of its components 3962, 3964). In some embodiments, the query and/or data indicative of the query may be created, compiled, and/or received via an interface which may be provided, for example, by the client interface device 3964. The interface may be associated with either or both of the user device 3906 and the information delivery engine 3960. According to some embodiments, the query may include and/or reference one or more names, entities, organizations, items, persons, events, and/or other pieces of information or objects.

The method 4000 may continue, at 4004 for example, by determining a name to be evaluated for risk. In some embodiments, the name (or one or more names) may be specified directly by the user query. According to some embodiments, the name may be inferred, looked-up, and/or otherwise determined based at least in part on the user query. In some embodiments for example, a user may operate and/or interact with an interface and pick the name from a list of available names. According to some embodiments, the name may be determined by analyzing, scanning, and/or otherwise processing one or more documents of interest to the user. The user may scan and/or fax, for example, a transaction document that may be analyzed by the information delivery engine 3960 to determine one or more names of potential interest (e.g., parties to the transaction).

In some embodiments, the method 4000 may continue by sending the name to an information matching device (e.g., information matching device 3950), at 4006. The name determined at 4004 may, for example, be sent, transmitted, and/or otherwise provided to the information matching device 3950 to be analyzed for risk. In some embodiments, the information matching device 3950 may compare the name to stored information to identify any stored information that may be associated with the name. In some embodiments, the name may be evaluated for risk by the information matching device 3950.

The method 4000 may continue at 4008, according to some embodiments, by receiving match information from the information matching device. In some embodiments, the match information may be or include information indicative of one or more potential and/or likely relationships between the name and one or more records of stored information. The match information may also or alternatively include any records from a database (e.g., of the database system 240, 440, 640, 1040, 1240, 1340, 1540, 3640, 3840) that have been determined to match and/or otherwise be associated with (or potentially associated with) the name. In some embodiments, the match information may be or include information regarding any risk associated with the name. The information matching engine 3950 may, for example, determine and/or identify risk associated with the name and may provide such information to the information delivery engine 3960.

In some embodiments, the method 4000 may continue by formatting the match information at 4010. For example, the match information received at 4008 may be formatted, arranged, manipulated, aggregated, and/or otherwise processed to prepare it for delivery (e.g., to a user). In some embodiments, the match information may be presented in a formatted report, a list, a file, and/or in any other configuration and/or format that is or becomes practicable. In some embodiments, the match information may be formatted based on user preferences and/or based on the type and/or configuration of a user device.

The method 4000 may continue, for example, at 4012 by providing the formatted match information to a user device. In some embodiments, the match information may be transmitted, uploaded, and/or otherwise provided to one or more user devices. According to some embodiments, the match information provided to the user device may include risk assessment and/or identification information. The match information may also or alternatively include information related to one or more actions that should be taken (e.g., to minimize and/or reduce risk). In some embodiments, the match information may be or include information informing the user of a status and/or decision (e.g., a transaction associated with the user query may have been automatically denied and/or cancelled due at least in part to risk information associated with the name).

Figure 41:
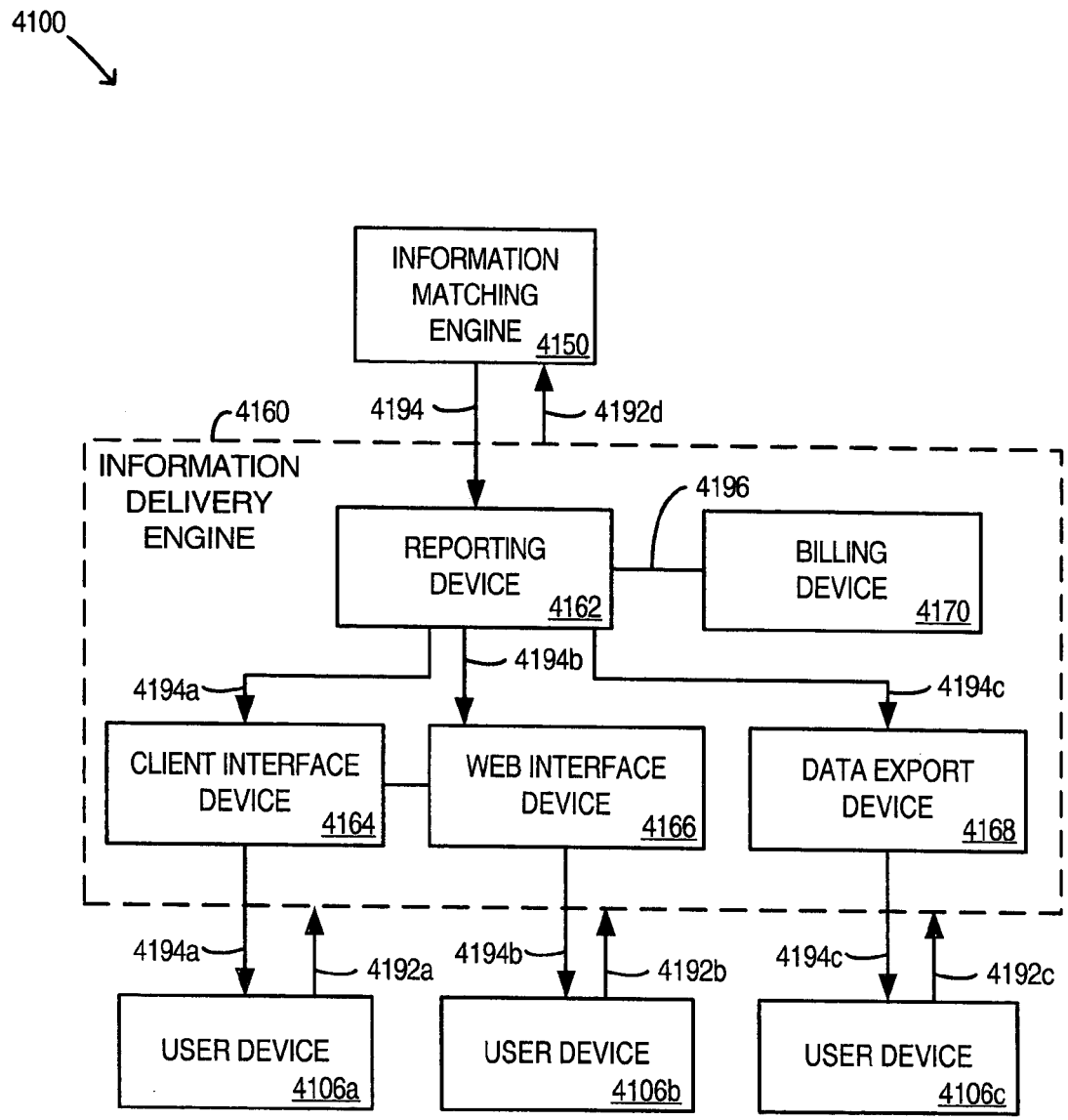
FIG. 41 is a block diagram of a system according to some embodiments.

Turning now to FIG. 41, a block diagram of a system 4100 according to some embodiments is shown. In some embodiments, the system 4100 may be used to implement or perform and/or may otherwise be associated with the methods 300, 500, 800, 1100, 1400, 3700, 4000 (or any portions thereof) as described in conjunction with any of FIG. 3, FIG. 5, FIG. 8, FIG. 11, FIG. 14, FIG. 37, and/or FIG. 40 above. The system 4100 may, according to some embodiments, be similar in configuration and/or functionality to the system 3900 described above.

The system 4100 may, for example, include user devices 4106*a-c*, an information matching engine 4150, and/or an information delivery engine 4160. The information delivery engine 4160 may include, for example, a reporting device 4162, a client interface device 4164, a web interface device 4166, a data export device 4168, and/or a billing device 4170. The system 4100 may also or alternatively include one or more information paths 4192, 4194, 4196. In some embodiments, the components 4106, 4150, 4162, 4164, 4160 of system 4100 may be similar in configuration and/or functionality to the similarly-named components described in conjunction with any of FIG. 1, FIG. 2, FIG. 4, FIG. 6, FIG. 10, FIG. 12, FIG. 13, FIG. 15, FIG. 36, FIG. 38, and/or FIG. 39 above.

In some embodiments, the information delivery engine 4160 may receive a query and/or other information from any or all of the user devices 4106*a-c* (e.g., via the information paths 4192*a-c*, respectively). In some embodiments for example, one of the user devices 4106*a-c* may submit a query including the name "Bond". According to some embodiments, the query may be forwarded to the information matching engine 4150 via the information path 4192*d*. The information matching engine 4150 may then, for example, process the query and/or other information (e.g., a name) to assess, determine, and/or identify risk. In some embodiments, the information matching engine 4150 may identify stored information that may be associated with the query information (e.g., information associated with the name "Bond"). According to some embodiments, the information matching engine 4150 may send and/or otherwise provide query result and/or match information to the information delivery engine 4160 (e.g., via the information path 4194). The query results may include, for example, stored database records relating to a "Mary Bond", "Bob Bond", "Ida Bondinski", "Bond Corporation", and/or any other potentially associated information.

In some embodiments, the query results provided by the information matching engine 4150 may be received by the reporting device 4162. According to some embodiments, the reporting device 4162 may also or alternatively provide the query information to the information matching device 4150 (e.g., via the information path 4192*d*). The reporting engine 4162 may be used by a user and/or at the direction of a user to formulate a query for the name "Bond", for example. In some embodiments, the query may be or include a simple SELECT statement written in the Structured Query Language (SQL) that identifies "Bond" as a parameter to search for in any of various name fields. The results that are to be returned to the reporting device 4162 may, according to some embodiments, be determined, formatted, and/or specified within and/or by the query request generated by the reporting device 4162.

According to some embodiments, the reporting device 4162 may provide the query results (e.g., in the form of a formatted report) to the client interface device 4164 (e.g., via the information path 4194*a*), the web interface device 4166 (e.g., via the information path 4194*b*), and/or the data export device 4168 (e.g., via the information path 4194*c*). In some embodiments, the client interface device 4164 may be or include any of the web interface device 4166 and/or the data export device 4168. According to some embodiments, the client interface device 4164 may be or include a GUI interface. In some embodiments, the client interface device 4164 may be or include a computer-readable medium storing instructions to allow a user to access the information delivery engine 4160 and/or a database (not shown in FIG. 41).

The query result information may, in some embodiments, continue along the information path 4194*a* from the client interface device 4164 to the user device 4106*a*. In some embodiments, the information may be provided via the information path 4194*b* to the web interface device 4166. The web interface device 4166 may be or include, for example, a web server, a web page and/or website, and/or a web browser. The query result information may be posted, for example, on a website associated with the web interface device 4166, which in turn may be accessed by the user device 4106*b* (e.g., via the information path 4194*b*). In some embodiments, the data export device 4168 may transfer the query result information directly to the user device 1406*c* (e.g., via the information path 4194*c*). The data export device 4168 may be or include, for example, a File Transfer Protocol (FTP) server, a web browser plug-in for downloading information, and/or a computer readable medium for storing the query result information. The information may be stored on a Compact Disk (CD) or other recordable medium, and then may be mailed, shipped, and/or otherwise delivered, for example, to the user device 4106*c*.

In some embodiments, the providing of the query result information (and/or other information) to the user devices 4106*a-c* may involve charging a fee for the information. According to some embodiments for example, the billing device 4170 may monitor and/or manage the flow of information and/or the billing associated with the information providing. In some embodiments, the billing device 4170 may communicate with the reporting device 4162 via the information path 4196. The billing device 4170 may, for example, charge a user for each report generated by the reporting device 4162 on behalf of the user. The billing device 4170 may also or alternatively manage other billing arrangements such as time of use, subscription, and/or volume billing. In some embodiments, the amount billed may be associated with the results of the query (e.g., more may be charged for queries that identify risk than those that do not).

User Interfaces

Turning now to FIG. 42, a diagram of an exemplary screen display 4200 according to some embodiments is shown. The screen display 4200 may be utilized in accordance with any of the systems 100, 200, 400, 600, 700, 900, 1000, 1200, 1300, 1500, 3600, 3800, 3900, 4100 and/or any of the methods 300, 500, 800, 1100, 1400, 3700, 4000 described above. In some embodiments, the screen display 4200 may be presented on a user device 106, 206, 1506, 3606, 3806, 3906, 4106 by a risk server 102, 202 and/or any components thereof (e.g., the information delivery engine 4160, the client interface device 4164, etc.). The various elements 4202, 4204, 4206, 4208, 4210, 4212 of the screen display 4200 may be or include any type, quantity, and/or configuration of elements that are or become practicable. The screen display 4200 may, according to some embodiments, include fewer or more components and/or features than are shown in FIG. 42.

The screen display 4200 may include, according to some embodiments, a query section 4202, one or more data entry fields 4204, a query result section 4206, one or more query result type selection boxes 4208, an information display area 4210, and/or a risk code field 4212. The query section 4202 may include, according to some embodiments, various text boxes and/or other interactive and/or informational regions that may be manipulated by a user. For example, the data entry field titled "Last Name/Business Name" 4204 may be or include a text box in which a user may enter information associated with a name. In some embodiments, it may be desired by a user to evaluate the name entered in the data entry field 4204 for risk.

As shown in FIG. 42 for example, a user may enter the name of an organization (e.g., "The Benevolence Hunger Foundation") that is to be evaluated for risk. In some embodiments, the user may be preparing to make a corporate charity donation to the organization for example. Other fields may be presented (e.g., as shown and/or as is or becomes practicable) to allow a user to enter any available information associated with the desired risk assessment. In some embodiments, the more information that is entered with respect to a query request, for example, the more accurate any determination and/or identification of risk may be.

According to some embodiments, the information entered by the user (e.g., in data entry field 4204) may be processed when the user strikes a key and/or otherwise indicates that all necessary and/or available query information has been entered (e.g., the user may click a "SUBMIT" button or other similar device not shown in FIG. 42). In some embodiments, results associated with the query may be displayed in the query result section 4206. The query result section 4206 may include, for example, one or more query result type selection boxes 4208 (e.g., the "Summary" selection box). Utilizing the selection box 4208, for example, a user may configure how the query results will be retuned and/or displayed. Selecting the "Summary" selection box 4208 may, in some embodiments, cause summarized information associated with the query results to be displayed. In some embodiments (such as shown in FIG. 42), other selection boxes may be provided to cause the query results to be formatted and/or presented in different ways (e.g., the results are presented in their entirety, as a list, a watch list, a government list, etc.).

According to some embodiments, the query results may be presented in the information display area 4210. Based on the information provided by the user (e.g., in data entry field 4204), for example, any information relevant to the user's query may be determined and provided in the information display area 4210. In some embodiments, the information presented in the information display area 4210 may be based upon the formatting selection (and/or selections) defined by the selection box 4208.

As shown in FIG. 42 for example, the selection box 4208 that is selected is a "Summary" box. The results displayed in the information display area 4210 may accordingly include, in some embodiments (such as shown in FIG. 42), a summary of the information relevant to the user's query. According to some embodiments, the information display area 4210 may be utilized by a user to identify, assess, and/or otherwise evaluate risk. The summarized query results pertaining to an Associated Press article shown in the information display area 4210 of FIG. 42, for example, may be viewed by a user to determine that the "Benevolence Hunger Foundation" may be associated with terrorists and/or terrorist activities.

In some embodiments, the screen display 4200 may also or alternatively include a risk code field 4212. The risk code field 4212 may be or include, for example, a code and/or other information associated with a determined, identified, and/or otherwise analyzed risk. The risk may be associated with the query information provided by the user in the query section 4202, for example. As shown in FIG. 42, the risk code field 4212 may include information such as a code "VM" that may, for example, correspond to a certain type, quantity, and/or quality (e.g., magnitude) of risk. The field 4212 may also or alternatively include a description of the code such as "Terrorist Related" as shown in FIG. 42. In some embodiments, the risk server 102, 202 and/or one of its associated components (e.g., the information matching engine 250, 1350, 1550, 3650, 3850, 3950, 4150) may, for example, provide the risk code and/or risk description to populate the risk code field 4212.

Referring now to FIG. 43, a diagram of an exemplary screen display 4300 according to some embodiments is shown. The screen display 4300 may be utilized in accordance with any of the systems 100, 200, 400, 600, 700, 900, 1000, 1200, 1300, 1500, 3600, 3800, 3900, 4100 and/or any of the methods 300, 500, 800, 1100, 1400, 3700, 4000 described above. In some embodiments, the screen display 4300 may be presented on a user device 106, 206, 1506, 3606, 3806, 3906, 4106 by a risk server 102, 202 and/or any components thereof (e.g., the information delivery engine 4160, the client interface device 4164, etc.).

The various elements 4302, 4304, 4306, 4308, 4310, 4312, 4314 of the screen display 4300 may be or include any type, quantity, and/or configuration of elements that are or become practicable. In some embodiments, the screen display 4300 may be similar to and/or otherwise associated with the screen display 4200 described above. The screen display 4300 may, according to some embodiments, include fewer or more components and/or features than are shown in FIG. 43.

The screen display 4300 may include, according to some embodiments, a query section 4302, one or more data entry fields 4304, a query result section 4306, one or more query result type selection boxes 4308, an information display area 4310, a risk code field 4312, and/or customer information 4314. In some embodiments, the components 4302, 4304, 4306, 4308, 4310, 4312 of the screen display 4300 may be similar in configuration and/or functionality to the similarly-named components described in conjunction with FIG. 42 above. The query section 4302 may include, for example, one or more data entry objects and/or fields such as the "Last Name/Business Name" text box 4304. Similarly, the query result section 4306 may include various result presentation mechanisms and/or objects such as the one or more query result type selection boxes 4308, the information display area 4310, and/or the risk code field 4312.

In some embodiments (such as shown in FIG. 43), a user may enter a risk assessment query to evaluate the "Benevolence Hunger Foundation" (e.g., as entered into the text box 4304). The user may indicate, by selecting the "OFAC" query result type selection box 4308 for example, that the query results to be presented in the information display area 4310 should include any information available from the OFAC (e.g., such as an OFAC list). The query results shown in the information display area 4310 of FIG. 43 may, for example, be or include information provided by and/or otherwise associated with the OFAC. In some embodiments, the risk code displayed in the risk code field 4312 may vary depending upon the result type selected by the user. As shown in FIG. 43 for example, the risk code "VT" may be, include, and/or be indicative of a risk code provided by the OFAC (e.g., "Specially Designated Individual").

According to some embodiments, the screen display 4300 may include customer information 4314. For example, one or more fields and/or identifiers may be included in the screen display 4300 that identify, track, and/or are otherwise associated with one or more customers or users. As shown in FIG. 43, the customer information 4314 may include, according to some embodiments, a customer reporting identification number and/or a customer tracking identification number. Such information may be utilized, for example, to track a user's activity associated with the risk server 102, 202. In some embodiments, the customer information 4314 may be used to audit user activities and/or provide due diligence reports.

Figure 44:
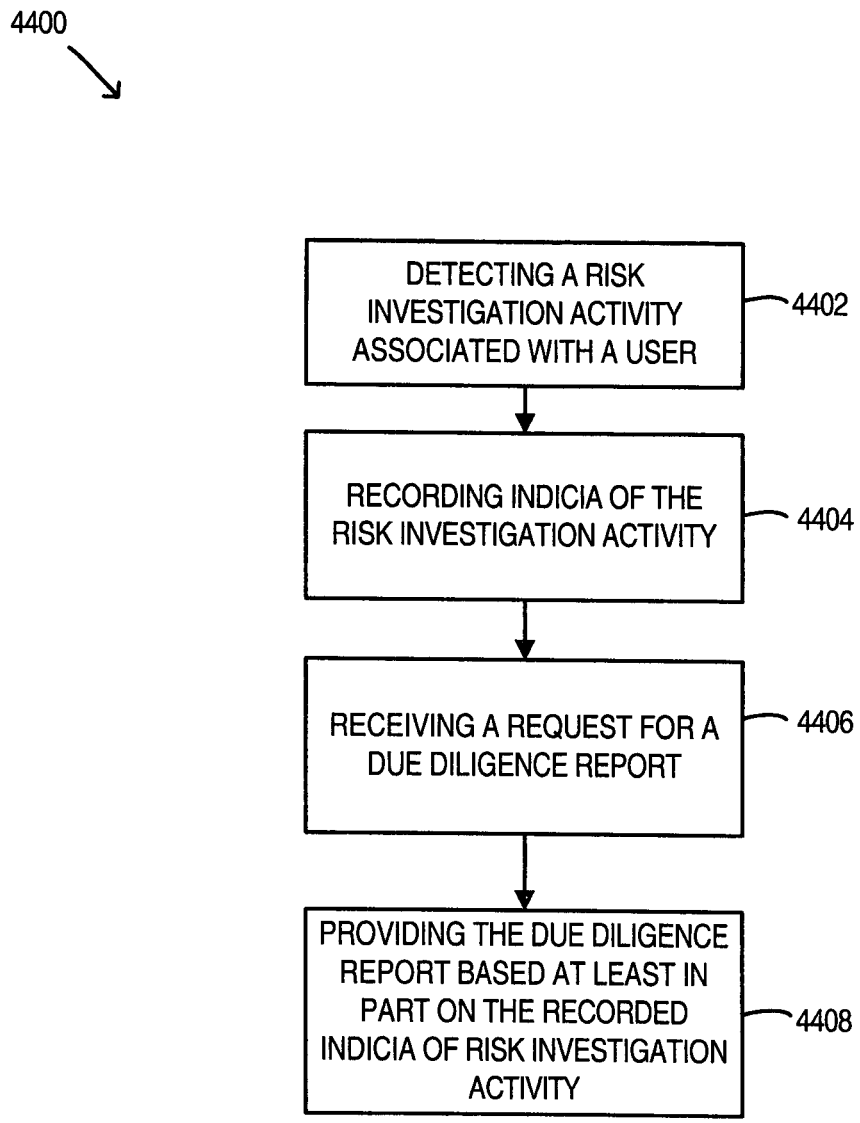
FIG. 44 is a flow diagram of a method according to some embodiments.

In FIG. 44, a method 4400 according to some embodiments is shown. In some embodiments, the method 4400 may be conducted by and/or by utilizing any of the systems 100, 200, 400, 600, 700, 900, 1000, 1200, 1300, 1500, 3600, 3800, 3900, 4100 described above and/or may be otherwise associated with any of the systems 100, 200, 400, 600, 700, 900, 1000, 1200, 1300, 1500, 3600, 3800, 3900, 4100 and/or any of the system components (e.g., the risk server 102, 202) described in conjunction with any of FIG. 1, FIG. 2, FIG. 4, FIG. 6, FIG. 7, FIG. 9, FIG. 10, FIG. 12, FIG. 13, FIG. 15, FIG. 36, FIG. 38, FIG. 39, and/or FIG. 41 above. In some embodiments, the method 4400 may be or include a portion of and/or a procedure within and/or may be otherwise associated with other methods such as method 300 described above.

In some embodiments, the method 4400 may begin at 4402 by detecting a risk investigation activity associated with a user. The detecting may include, for example, recording, monitoring, and/or otherwise identifying user activity associated with any of the systems 100, 200, 400, 600, 700, 900, 1000, 1200, 1300, 1500, 3600, 3800, 3900, 4100 described herein. In some embodiments, user queries submitted to the risk server 102, 202 may, for example, be considered risk investigation activities. According to some embodiments, a risk investigation activity may be considered to take place every time a user logs onto and/or otherwise interacts with the risk server 102, 202 (and/or one of its components). The risk investigation activity may be detected by any device and/or entity that is or becomes practicable. In some embodiments for example, the activity may be detected by the risk server 102, 202. According to some embodiments, the activity may be detected by a dedicated audit device that may, for example, either be a stand-alone device or may be associated with or included within the risk server 102, 202.

The method 4400 may continue by recording indicia of the risk investigation activity, at 4404. According to some embodiments, every action (and/or every important action) taken by a user during interaction with the risk server 102, 202 (and/or one of its components) may be recorded and/or stored (e.g., in the database system 240, 440, 640, 1040, 1240, 1340, 1540, 3640, 3840). In some embodiments, a timestamp and/or user identification number may be recorded. According to some embodiments, other information such as the content and/or type of user query may also or alternatively be recorded (e.g., in an audit log and/or database).

According to some embodiments, the method 4400 may continue at 4406 by receiving a request for a due diligence report. The due diligence report may be requested, for example, by a user that has utilized the risk server 102, 202 and/or otherwise investigated risk. In some embodiments, the user may request the due diligence report to satisfy due diligence requirements associated with insurance, legal and/or regulatory investigations, and/or other liabilities or compliance efforts. The request may be received, according to some embodiments, by the risk server 102, 202 and/or one of its associated components.

The method 4400 may continue at 4408, for example, by providing the due diligence report based at least in part on the recorded indicia of risk investigation activity. The risk server 102, 202 may, according to some embodiments, create, compile, and/or otherwise identify and/or determine a due diligence report in accordance with, for example, the request received at 4406. The risk server 102, 202 may then, according to some embodiments, provide the report to the user and/or to another entity, as required). In some embodiments, the reporting device 3962, 4162 of the information delivery engine 3960, 4160 may create and/or compile the report. The reporting device 3962, 4162 may, for example, utilize audit information stored within and/or by the database system 240, 440, 640, 1040, 1240, 1340, 1540, 3640, 3840 to determine risk investigation usage associated with the user. The reporting device 3962, 4162 may then, for example, send, transmit, and/or otherwise provide the report to the user (e.g., a user operating a user device 3906, 4106).

Figure 45:
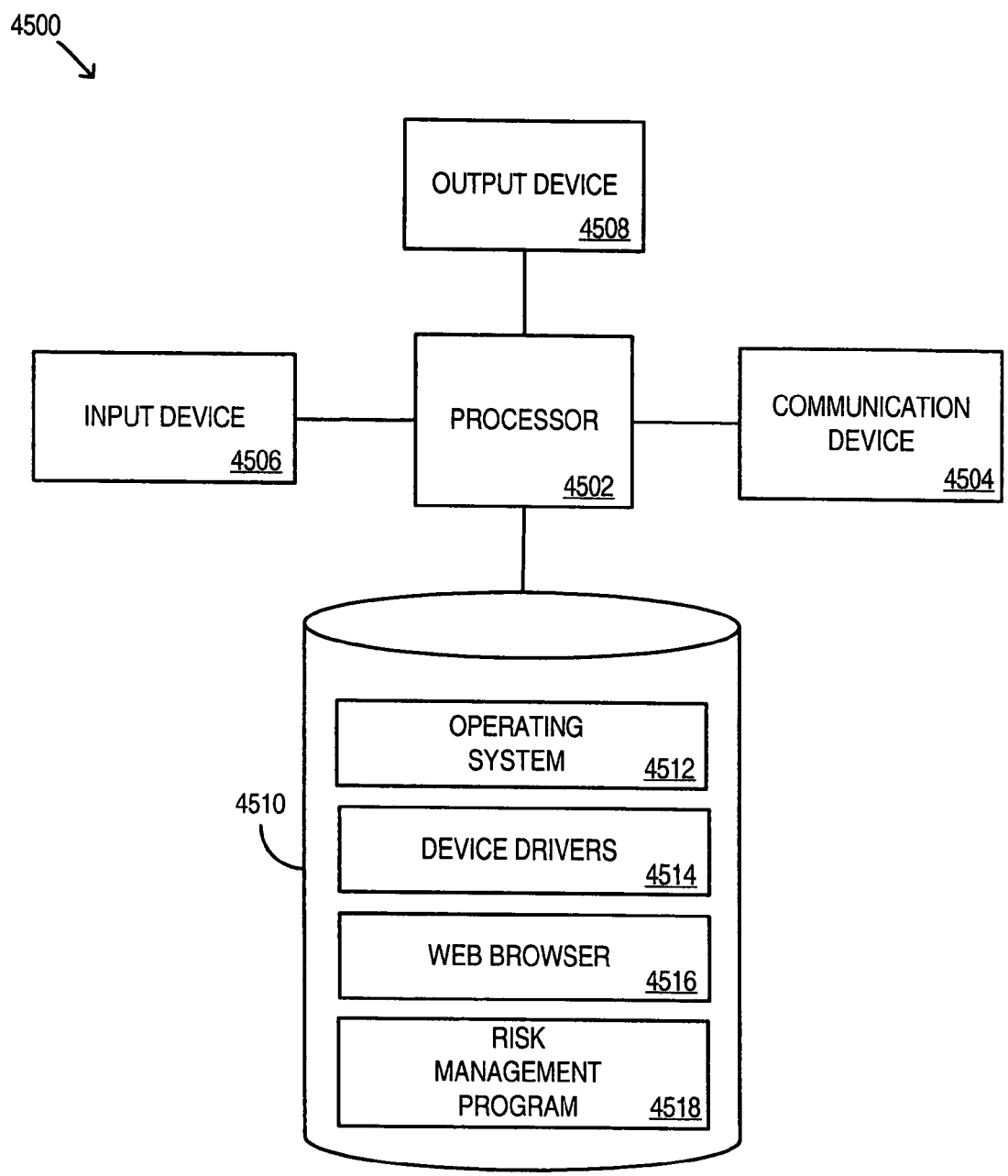
FIG. 45 is a block diagram of an apparatus according to some embodiments.

Referring now to FIG. 45, a block diagram of an apparatus 4500 according to some embodiments is shown. The apparatus 4500 may, for example, be similar to and/or include a user device 106, 206, 1506, 3606, 3806, 3906, 4106 described in conjunction with any of FIG. 1, FIG. 2, FIG. 15, FIG. 36, FIG. 38, FIG. 39, and/or FIG. 41 above. The apparatus 4500 may, according to some embodiments, be associated with and/or perform the methods 300, 500, 800, 1100, 1400, 3700, 4000, 4400 described in conjunction with any of FIG. 3, FIG. 5, FIG. 8, FIG. 11, FIG. 14, FIG. 37, FIG. 40, and/or FIG. 44 above. In some embodiments, fewer or more components than are shown in FIG. 45 may be included in the apparatus 4500. In some embodiments, the apparatus 4500 may be or include and/or be representative of a network device.

In some embodiments, the apparatus 4500 may be or include a computer such as a computer server, computer workstation, PC, and/or any other type or configuration of computational and/or logic device. According to some embodiments, the apparatus 4500 may include a processor 4502, such as one or more Intel® Pentium® processors, coupled to a communication device 4504 configured to communicate via a communication network. The processor 4502 may be or include any type or configuration of processor, microprocessors, and/or micro-engines that is or becomes known. In some embodiments, the apparatus 4500 may also or alternatively include an input device 4506 (e.g., a mouse and/or keyboard), an output device 4508 (e.g., a computer monitor), and/or a memory device 4510, all and/or any of which may be in communication with the processor 4502.

The communication device 4504 may be used to communicate, for example, with the risk server 102, 202 as described in conjunction with any of the systems 100, 200 herein. The communication device 4504 may, according to some embodiments, be or include any type and/or configuration of communication device that is or becomes known. In some embodiments, the communication device 4504 may allow the apparatus 4500 (and/or the processor 4502) to communicate with, for example, the risk server 102, 202 (and/or one of its components) as described herein. The input device 4506 and the output device 4508 may be or include one or more conventional devices such as displays, printers, keyboards, a mouse, a trackball, etc. The devices 4506, 4508 may be utilized, for example, by an operator and/or user to submit risk evaluation queries and/or to otherwise retrieve and/or obtain information associated with risk. In some embodiments, the system may be configured as a stand-alone or client side device operated as an "interdiction" device allowing a user to perform searches and perform analyses of transactions or other queries.

As used herein, information may be "received" by or "transmitted" to, for example: (i) the apparatus 4500 from another system and/or device; or (ii) a software application or module within the apparatus 4500 from another apparatus and/or system, software application, module, and/or any other source. For example, information (e.g., associated with risk and/or to be evaluated for risk) that is processed by the processor 4502 may be sent via the communication device 4504 to the risk server 102, 202.

In some embodiments, the processor 4502 may also or alternatively communicate with the memory device 4510. The memory device 4510 may be or include, according to some embodiments, one or more magnetic storage devices, such as hard disks, one or more optical storage devices, and/or solid state storage. The memory device 4510 may store, for example, operating systems 4512, device drivers 4514, applications (e.g., a web browser 4516), and/or programs, procedures, and/or modules. The operating system 4512 may, for example, store instructions allowing the processor 4502 to communicate with and/or manage the various components 4504, 4506, 4508, 4510 of the apparatus 4500. Similarly, the device drivers 4514 may include instructions allowing the processor 4502 and/or the apparatus 4500 to communicate with and/or interface with (e.g., using the communication interface 4504) other apparatus, devices, and/or systems. In some embodiments, the device drivers 4514 may be or include drivers such as database drivers that allow and/or facilitate the storing of information in, on, and/or by the memory device 4510.

In some embodiments, the memory device 4510 may store one or more program applications such as the web browser 4516. The web browser 4516 may generally allow the apparatus 4500 to interface with various networks and/or network devices operating in accordance with the Transfer Control Protocol (TCP) and/or Internet Protocol (IP). According to some embodiments, the web browser 4516 may allow a user operating the apparatus 4500 to interface with the risk server 102, 202 and/or the information delivery engine 260, 1560, 3660, 3860, 3960, 4160 and/or any components thereof (e.g., the client interface device 3964, 4164). For example, a user operating the apparatus 4500 may utilize the web browser 4516 to submit risk evaluation queries and/or to receive information associated with risk (e.g., risk evaluation query results).

The memory device 4510 may, according to some embodiments, store a program such as the risk management program 4518 for controlling the processor 4502. The processor 4502 may perform instructions of the risk management program 4518, and for example, thereby operate in accordance with embodiments described herein. The risk management program 4518 may be stored in a compressed, un-compiled and/or encrypted format. In some embodiments, the risk management program 4518 may, for example, be similar in functionality and/or configuration to the risk server 102, 202 and/or any of its components as described herein. In some embodiments, the risk management program 4518 may operate in accordance with the methods 300, 500, 800, 1100, 1400, 3700, 4000, 4400 described in conjunction with any of FIG. 3, FIG. 5, FIG. 8, FIG. 11, FIG. 14, FIG. 37, FIG. 40, and/or FIG. 44 above. According to some embodiments, the risk management program 4518 may be or include a client-side application configured to communicate with, for example, the risk server 102, 202. In some embodiments, the risk management program 4518 may not be required and/or included within the apparatus 4500. For example, the apparatus 4500 may communicate with another device such as the risk server 102, 202 to perform risk assessment and/or risk analysis queries.

Figure 46:
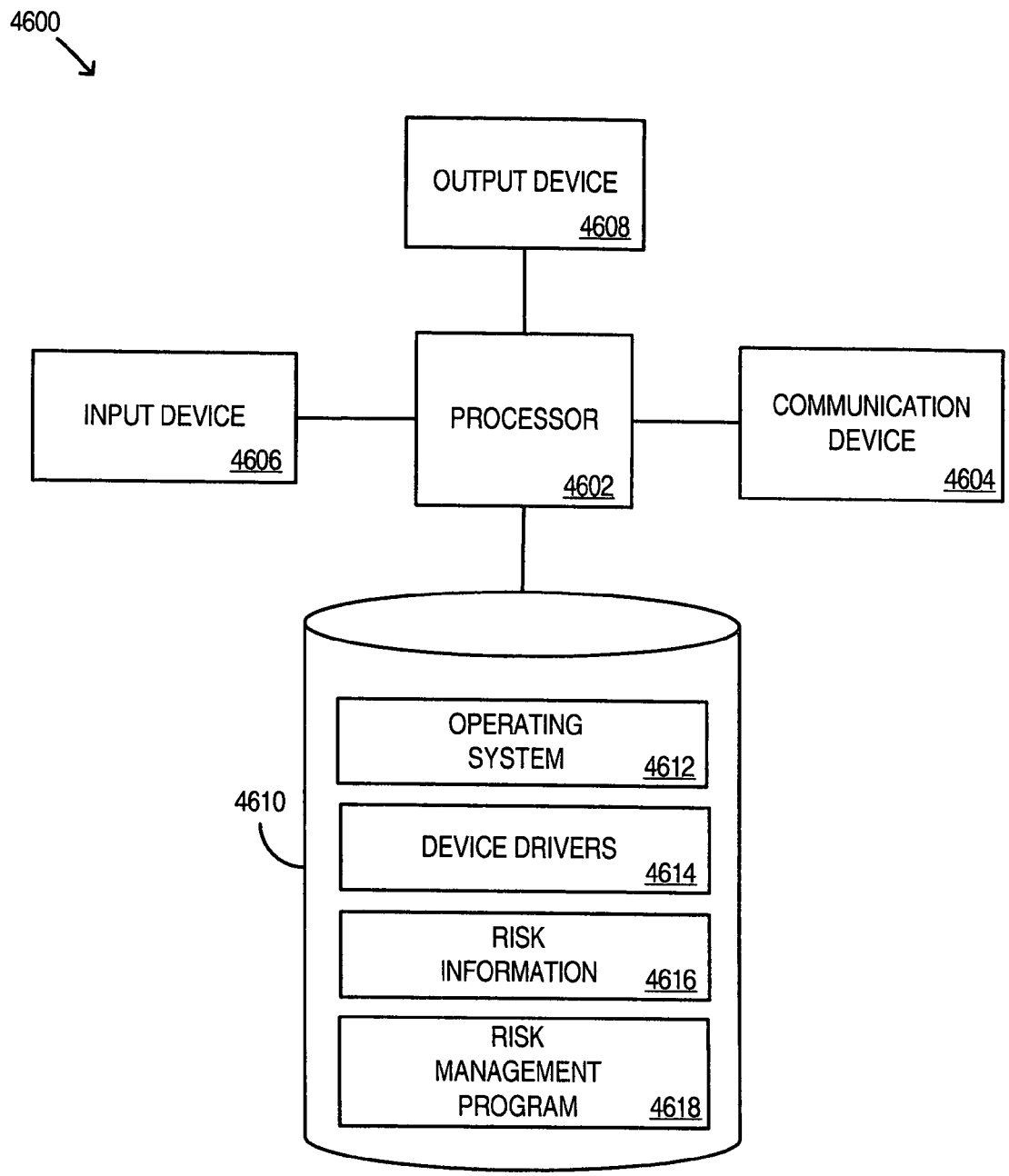
FIG. 46 is a block diagram of an apparatus according to some embodiments.

Turning finally to FIG. 46, a block diagram of an apparatus 4600 according to some embodiments is shown. The apparatus 4600 may, for example, be similar to and/or include the risk server 102, 202 (and/or any one or combination of its components) as described in conjunction with any of the systems 100, 200, 400, 600, 700, 900, 1000, 1200, 1300, 1500, 3600, 3800, 3900, 4100 herein. The apparatus 4600 may, according to some embodiments, be associated with and/or perform the methods 300, 500, 800, 1100, 1400, 3700, 4000, 4400 described in conjunction with any of FIG. 3, FIG. 5, FIG. 8, FIG. 11, FIG. 14, FIG. 37, FIG. 40, and/or FIG. 44 above. In some embodiments, fewer or more components than are shown in FIG. 46 may be included in the apparatus 4600. In some embodiments, the apparatus 4600 may be or include and/or be representative of a network device.

In some embodiments, the apparatus 4600 may be or include a computer such as a computer server, computer workstation, PC, and/or any other type or configuration of computational and/or logic device (e.g., a web server). According to some embodiments, the apparatus 4600 may include a processor 4602, such as one or more Intel® Pentium® processors, coupled to a communication device 4604 configured to communicate via a communication network. The processor 4602 may be or include any type or configuration of processor, microprocessors, and/or micro-engines that is or becomes known. In some embodiments, the apparatus 4600 may also or alternatively include an input device 4606 (e.g., a mouse and/or keyboard), an output device 4608 (e.g., a computer monitor), and/or a memory device 4610, all and/or any of which may be in communication with the processor 4602.

The communication device 4604 may be used to communicate, for example, with a user device 106, 206, 1506, 3606, 3806, 3906, 4106 such as is described in conjunction with any of FIG. 1, FIG. 2, FIG. 15, FIG. 36, FIG. 38, FIG. 39, and/or FIG. 41 above. The communication device 4604 may, according to some embodiments, be or include any type and/or configuration of communication device that is or becomes known. In some embodiments, the communication device 4604 may allow the apparatus 4600 (and/or the processor 4602) to communicate with, for example, the user device 106, 206, 1506, 3606, 3806, 3906, 4106 (and/or one of its components) as described herein. The input device 4606 and the output device 4608 may be or include one or more conventional devices such as displays, printers, keyboards, a mouse, a trackball, etc. The devices 4606, 4608 may be utilized, for example, by an operator and/or user to manage, assess, provide, and/or otherwise process information associated with risk.

In some embodiments, the processor 4602 may also or alternatively communicate with the memory device 4610. The memory device 4610 may be or include, according to some embodiments, one or more magnetic storage devices, such as hard disks, one or more optical storage devices, and/or solid state storage. The memory device 4610 may store, for example, operating systems 4612, device drivers 4614, information (e.g., risk information 4616), and/or programs, procedures, and/or modules. The operating system 4612 may, for example, store instructions allowing the processor 4602 to communicate with and/or manage the various components 4604, 4606, 4608, 4610 of the apparatus 4600. Similarly, the device drivers 4614 may include instructions allowing the processor 4602 and/or the apparatus 4600 to communicate with and/or interface with (e.g., using the communication interface 4604) other apparatus, devices, and/or systems (e.g., the database system 240, 440, 640, 1040, 1240, 1340, 1540, 3640, 3840). In some embodiments, the device drivers 4614 may be or include drivers such as database drivers that allow and/or facilitate the storing of information in, on, and/or by the memory device 4610 (and/or by the database system 240, 440, 640, 1040, 1240, 1340, 1540, 3640, 3840).

In some embodiments, the memory device 4610 may store various information such as information associated with risk (i.e., risk information 4616). The risk information 4616 may, according to some embodiments, be or include any type, quantity, and/or configuration of information associated with risk that is or becomes known. For example, the risk information 4616 may include information stored within a data storage structure that is configured to facilitate the identification if risk. The risk information 4616 may be stored, for example, in any of the data storage structures 1600, 1700, 1800, 1900, 2000, 2100, 2200, 2300, 2400, 2500, 2600, 2700, 2800, 2900, 3000 described herein. In some embodiments, the memory device 4612 may be or include the database system 240, 440, 640, 1040, 1240, 1340, 1540, 3640, 3840.

The memory device 4610 may, according to some embodiments, store a program such as the risk management program 4618 for controlling the processor 4602. The processor 4602 may perform instructions of the risk management program 4618, and for example, thereby operate in accordance with embodiments described herein. The risk management program 4618 may be stored in a compressed, un-compiled and/or encrypted format. In some embodiments, the risk management program 4618 may, for example, be similar in functionality and/or configuration to the risk server 102, 202 and/or any of its components as described herein. In some embodiments, the risk management program 4618 may operate in accordance with the methods 300, 500, 800, 1100, 1400, 3700, 4000, 4400 described in conjunction with any of FIG. 3, FIG. 5, FIG. 8, FIG. 11, FIG. 14, FIG. 37, FIG. 40, and/or FIG. 44 above. For example, the apparatus 4600 may receive a risk evaluation query from a user and may, utilizing the risk management program 4618, assess, identify, and/or otherwise determine or analyze risk.

The several embodiments described herein are solely for the purpose of illustration. Those skilled in the art will note that various substitutions may be made to those embodiments described herein without departing from the spirit and scope of the present invention. Those skilled in the art will also recognize from this description that other embodiments may be practiced with modifications and alterations limited only by the claims.

We claim:
1. A processor implemented method for identifying risk, comprising:
receiving information associated with at least one risk for identifying at least one predetermined indicator of risk-relevant information, wherein based on the identifying, the received information is processed to redact redundant information;
analyzing, by a processor, the received information to determine relevancy of the information with regard to the at least one risk;
tagging, by the processor, the information with at least one risk-relevancy tag based on the determination of the relevancy of the information with regard to the at least one risk;
processing the tagged information to remove redundant information and information not deemed to be relevant to the at least one risk, thereby creating the risk-relevant information;
parsing, by the processor, the risk-relevant information into a plurality of portions categorized by the at least one risk-relevancy tag;
determining, by the processor, a risk-relevancy metric of each of the plurality of portions, wherein the at least one risk-relevancy tag identifies the risk-relevancy metric associated with a relevant portion of the information with respect to the at least one risk, the risk-relevancy metric indicating a likelihood that the relevant portion of the information is relevant to the at least one risk;

storing the risk-relevant information in a data storage structure, wherein the data storage structure includes a plurality of areas that are interrelated to facilitate the identification of the at least one risk; and outputting the risk-relevant information stored in the data storage structure to a risk identification graphical user interface.

2. The method of claim 1, wherein the each of the plurality of portions is associated with the at least one of the tags.

3. The method of claim 2, wherein each of the plurality of portions is stored in at least one of the plurality of areas.

4. The method of claim 1, wherein the received information is associated with a device that determines the relevancy of the information with regard to the at least one risk.

5. The method of claim 1, wherein the information is received from a device that determines a redundancy of the information.

6. The method of claim 1, wherein the information is received from a device that collects the information from a plurality of sources.

7. The method of claim 1, wherein the information is received from a device that causes insertion of the information into the data storage structure.

8. The method of claim 1, wherein the plurality of areas include:
an area for storing information associated with an individual;
an area for storing information associated with an event;
an area for storing information associated with an item; and
an area for storing information associated with an organization.

9. The method of claim 8, wherein the plurality of areas further include:
an area for storing information associated with an address.

10. The method of claim 8, wherein the individual includes an individual that is a party involved in a transaction.

11. The method of claim 10, wherein the transaction includes a financial transaction.

12. The method of claim 8, wherein the event includes at least one event associated with the at least one risk.

13. The method of claim 1, wherein the data storage structure further includes the risk-relevant information that is further parsed into:
at least one unique key that defines an association between at least one of (i) an individual and an event, (ii) an individual and an item, (iii) an individual and an organization, (iv) an event and an item, (v) an event and an organization (vi) an item and an organization, (vii) a first individual and a second individual, (viii) a first event and a second event, (ix) a first item and a second item, and (x) a first organization and a second organization.

14. The method of claim 1, wherein the data storage structure further includes the risk-relevant information that is further parsed into:
at least one unique key that defines an association between at least one of (i) an event and an address, (iii) an item and an address, and (v) a first address and a second address.

15. The method of claim 1, wherein the data storage structure further includes the risk-relevant information that is further parsed into:
at least one unique key that defines an association between at least one of (i) an individual and an address, and (iv) an organization and an address, wherein the address is related to the at least one risk.

16. The method of claim 1, wherein the at least one risk includes at least one of a financial risk, a risk to reputation, a regulatory risk, or a legal risk.

17. A risk identifying processor-implemented method, comprising:
collecting, by a processor, information from a plurality of information sources;
translating, via the processor, the collected information into at least one standardized format;
parsing, via the processor, the information into a plurality of portions;
determining, via the processor, a risk-relevancy metric of each of the plurality of portions, the risk-relevancy metric of each of the plurality of portions indicating a likelihood that a respective portion of the plurality of portions of the information is relevant to at least one risk;
analyzing, via the processor, the parsed information to determine risk relevancy of the parsed information for determining a risk-relevancy tag;
tagging, via the processor, at least one portion of the information as risk-relevant based on the determined risk-relevancy metric;
filtering, via the processor, the tagged at least one portion of the information to remove information not deemed to be risk-relevant;
filtering, via the processor, a redundancy of the tagged at least one portion of the information;
storing, via the processor, the filtered tagged at least one portion of the information in a data storage structure; and
outputting, via the processor, the information stored in the data storage structure to a risk identification graphical user interface.

18. A risk identifying apparatus, comprising:
a memory;
a processor disposed in communication with said memory, and configured to issue a plurality of processing instructions stored in the memory, wherein the processor issues instructions to:
receive information associated with at least one risk for identifying at least one predetermined indicator of risk-relevant information;
analyze the received information to determine relevancy of the information with regard to the at least one risk and tagging the information with at least one risk-relevancy tag based on a determination of the relevancy of the information with regard to the at least one risk;
process the tagged information to remove redundant information and information not deemed to be relevant to the at least one risk, thereby creating the risk-relevant information;
parse the risk-relevant information into a plurality of portions categorized by the at least one risk-relevancy tag;
determine a risk-relevancy metric of each of the plurality of portions, wherein the at least one risk-relevancy tag identifies the risk-relevancy metric associated with a relevant portion of the information with respect to the at least one risk, the risk-relevancy metric indicating a likelihood that the relevant portion of the information is relevant to the at least one risk;
store the risk-relevant information In a data storage structure, wherein the data storage structure includes a plurality of areas that are interrelated to facilitate the identification of the at least one risk; and output the risk-relevant information stored in the data storage structure to a risk identification graphical user interface.

19. The apparatus of claim 18, wherein the information is received from a device that determines a relevancy of the information.

20. The apparatus of claim 18, wherein the information is received from a device that determines a redundancy of the information.

21. The apparatus of claim 18, wherein the information is received from a device that collects the information from a plurality of sources.

22. The apparatus of claim 18, wherein the information is received from a device that causes insertion of the information into the data storage structure.

23. A risk identifying apparatus, comprising:
a memory;
a processor disposed in communication with said memory, and configured to issue a plurality of processing instructions stored in the memory, wherein the processor issues instructions to:
collect information from a plurality of information sources;
translate the collected information into at least one standardized format;
parse the information into a plurality of portions;
determine a risk-relevancy metric of each of the plurality of portions, the risk-relevancy metric of each of the plurality of portions indicating a likelihood that a respective portion of the plurality of portions of the information is relevant to at least one risk;
analyze the information to determine risk relevancy of the parsed information for determining a risk-relevancy tag;
tag at least one portion of the information as risk-relevant based on the determined risk-relevancy metric;
filter the tagged at least one portion of the information to remove information not deemed to be risk-relevant;
filter a redundancy of the tagged at least one portion of the information;
store the filtered tagged at least one portion of the information in a data storage structure; and
output the information stored in the data storage structure to a risk identification graphical user interface.

24. The method of claim 1, further comprising computing an overall risk-relevancy metric for the information.

25. The method of claim 24, wherein computing the overall risk-relevancy metric for the information includes averaging the risk-relevancy metrics for the plurality of portions.

26. The method of claim 17, further comprising computing an overall risk-relevancy metric for the information.

27. The method of claim 26, wherein computing the overall risk-relevancy metric for the information includes averaging the risk-relevancy metrics for the plurality of portions.

28. The apparatus of claim 18, wherein the processor further issues instructions to compute an overall risk relevancy for the information.

29. The apparatus of claim 28, wherein computing the overall risk relevancy for the information includes averaging the risk-relevancy metrics for the plurality of portions.

30. The apparatus of claim 23, wherein the processor further issues instructions to compute an overall risk relevancy for the information.

31. The method of claim 30, wherein computing the overall risk relevancy for the information includes averaging the risk-relevancy metrics for the plurality of portions.

* * * * *

UNITED STATES PATENT AND TRADEMARK OFFICE
CERTIFICATE OF CORRECTION

PATENT NO.        : 8,762,191 B2                                         Page 1 of 1
APPLICATION NO.   : 10/941265
DATED             : June 24, 2014
INVENTOR(S)       : David Lawrence It is certified that error appears in the above-identified patent and that said Letters Patent is hereby corrected as shown below:

In the Claims:

Column 78, claim 18, line 38, delete "issue" and insert --execute--

Column 78, claim 18, line 39, delete "issues" and insert --executes--

Column 79, claim 23, line 19, delete "issue" and insert --execute--

Column 79, claim 23, line 20, delete "issues" and insert --executes--

Column 80, claim 28, line 22, delete "issues" and insert --executes--

Column 80, claim 30, line 28, delete "issues" and insert --executes--

Signed and Sealed this
Fourteenth Day of October, 2014

Michelle K. Lee
*Deputy Director of the United States Patent and Trademark Office*